(12) United States Patent
Cosic

(10) Patent No.: US 11,036,695 B1
(45) Date of Patent: *Jun. 15, 2021

(54) SYSTEMS, METHODS, APPARATUSES, AND/OR INTERFACES FOR ASSOCIATIVE MANAGEMENT OF DATA AND INFERENCE OF ELECTRONIC RESOURCES

(71) Applicant: Jasmin Cosic, Miami, FL (US)

(72) Inventor: Jasmin Cosic, Miami, FL (US)

( * ) Notice: Subject to any disclaimer, the term of this patent is extended or adjusted under 35 U.S.C. 154(b) by 205 days.

This patent is subject to a terminal disclaimer.

(21) Appl. No.: 16/272,925

(22) Filed: Feb. 11, 2019

Related U.S. Application Data

(63) Continuation of application No. 14/634,474, filed on Feb. 27, 2015, now Pat. No. 10,255,302.

(51) Int. Cl.
| | | |
|---|---|---|
| *G06F 16/00* | (2019.01) | |
| *G06F 16/21* | (2019.01) | |
| *G06F 3/0482* | (2013.01) | |
| *G06F 3/0484* | (2013.01) | |
| *G06F 16/25* | (2019.01) | |

(52) U.S. Cl.
CPC .......... *G06F 16/211* (2019.01); *G06F 3/0482* (2013.01); *G06F 3/04842* (2013.01); *G06F 16/25* (2019.01)

(58) Field of Classification Search
CPC .............................. G06F 16/211; G06F 16/25
See application file for complete search history.

(56) References Cited

U.S. PATENT DOCUMENTS

| | | |
|---|---|---|
| 4,862,390 A | 8/1989 | Weiner |
| 5,121,470 A | 6/1992 | Trautman |
| 5,185,857 A | 2/1993 | Rozmanith et al. |
| 5,533,029 A | 7/1996 | Gardner |
| 5,544,222 A | 8/1996 | Robinson et al. |
| 5,592,661 A | 1/1997 | Eisenberg et al. |
| 5,598,534 A | 1/1997 | Haas |
| 5,758,333 A | 5/1998 | Bauer et al. |
| 5,812,117 A | 9/1998 | Moon |
| 5,956,637 A | 9/1999 | Ericsson et al. |
| 5,983,232 A | 11/1999 | Zhang |
| 6,075,536 A * | 6/2000 | Kunieda et al. .......... G06F 3/00 345/355 |
| 6,087,952 A | 7/2000 | Prabhakaran |
| 6,112,201 A | 8/2000 | Wical |

(Continued)

OTHER PUBLICATIONS

Tim Paek, Bongshin Lee, Bo Thiesson, Designing Phrase Builder: A Mobile Real-Time Query Expansion Interface, 2009, 10 pages, Microsoft Research.

(Continued)

*Primary Examiner* — Khanh B Pham

(57) ABSTRACT

The disclosure may be generally directed to systems, methods, apparatuses, and/or interfaces for managing data, metadata, and/or other elements of a DBMS through interacting with objects from a user's experience or with which the user can relate. The disclosure may also be generally directed to systems, methods, apparatuses, and/or interfaces for constructing a data management instruction by interacting with objects from a users experience or with which the user can relate. The disclosure may further be generally directed to systems, methods, apparatuses, and/or interfaces for inferring an electronic resource.

20 Claims, 41 Drawing Sheets

(56) References Cited

U.S. PATENT DOCUMENTS

| | | |
|---|---|---|
| 6,122,527 A | 9/2000 | Robinson et al. |
| 6,128,012 A | 10/2000 | Seidensticker, Jr. et al. |
| 6,202,060 B1 | 3/2001 | Tran |
| 6,226,665 B1 | 5/2001 | Deo et al. |
| 6,493,717 B1 | 12/2002 | Junkin |
| 6,549,625 B1 | 4/2003 | Rautila et al. |
| 6,636,873 B1 | 10/2003 | Carini et al. |
| 6,654,762 B2 | 11/2003 | Cheng et al. |
| 6,795,706 B1 | 9/2004 | Cheng |
| 6,832,084 B1 | 12/2004 | Deo et al. |
| 6,850,942 B2 | 2/2005 | Cotner et al. |
| 6,871,068 B1 | 3/2005 | O'Neill |
| 6,879,989 B2 | 4/2005 | Cheng et al. |
| 6,889,139 B2 | 5/2005 | Prabhakaran |
| 6,895,234 B1 | 5/2005 | Laursen et al. |
| 6,959,436 B2 | 10/2005 | Peng |
| 7,082,435 B1 | 7/2006 | Guzman et al. |
| 7,113,946 B2 | 9/2006 | Cosic |
| 7,117,225 B2 | 10/2006 | Cosic |
| 7,328,030 B2 | 2/2008 | Laursen et al. |
| 7,395,255 B2 | 7/2008 | Li |
| 7,409,401 B2 | 8/2008 | Hansen et al. |
| 7,444,143 B2 | 10/2008 | Deo et al. |
| 7,444,338 B1 | 10/2008 | Fisher |
| 7,450,962 B2 | 11/2008 | Kim |
| 7,483,905 B2 | 1/2009 | Gauweiler |
| 7,523,112 B2 | 4/2009 | Hassan et al. |
| 7,533,128 B1 | 5/2009 | Sanchez et al. |
| 7,685,127 B2 | 3/2010 | Gauweiler |
| 7,756,525 B1 | 7/2010 | Thomas et al. |
| 7,756,829 B2 | 7/2010 | Bhanote |
| 7,779,029 B2 | 8/2010 | Neil |
| 7,805,397 B2 | 9/2010 | Kurian et al. |
| 7,813,714 B2 | 10/2010 | Laursen et al. |
| 7,831,554 B2 | 11/2010 | Schreter et al. |
| 7,831,564 B1 | 11/2010 | Wei et al. |
| 7,849,114 B2 | 12/2010 | Boss et al. |
| 7,865,924 B2 | 1/2011 | Teegan et al. |
| 7,885,635 B2 | 2/2011 | Laursen et al. |
| 7,945,687 B2 | 5/2011 | Kim |
| 7,958,270 B2 | 6/2011 | Sidon |
| 8,031,694 B2 | 10/2011 | Gidron et al. |
| 8,041,372 B1 | 10/2011 | Minns et al. |
| 8,099,332 B2 | 1/2012 | Lemay et al. |
| 8,103,272 B2 | 1/2012 | Williamson |
| 8,145,663 B2 | 3/2012 | Meng |
| 8,190,645 B1 | 5/2012 | Bashaw |
| 8,204,911 B2 | 6/2012 | Neil |
| 8,214,409 B2 | 7/2012 | O'Farrell et al. |
| 8,266,187 B2 | 9/2012 | Mercer et al. |
| 8,290,898 B2 | 10/2012 | Bowlus et al. |
| 8,291,408 B1 | 10/2012 | Czymontek |
| 8,335,805 B2 | 12/2012 | Cosic |
| 8,359,223 B2 | 1/2013 | Chi et al. |
| 8,401,539 B2 | 3/2013 | Beenau et al. |
| 8,412,150 B2 | 4/2013 | Louch |
| 8,417,740 B2 | 4/2013 | Cosic |
| 8,572,035 B2 | 10/2013 | Cosic |
| 8,655,900 B2 | 2/2014 | Cosic |
| 8,762,428 B2 | 6/2014 | Kulack et al. |
| 8,949,186 B1 | 2/2015 | Yueh et al. |
| 9,031,981 B1 | 5/2015 | Potter et al. |
| 9,047,324 B2 | 6/2015 | Cosic |
| 2001/0044732 A1 | 11/2001 | Maus et al. |
| 2002/0078209 A1 | 1/2002 | Peng |
| 2002/0019822 A1 | 2/2002 | Seki et al. |
| 2002/0161735 A1 | 10/2002 | Cheng et al. |
| 2002/0174189 A1 | 11/2002 | Peng |
| 2003/0046451 A1 | 3/2003 | Prabhakaran |
| 2003/0065662 A1 | 4/2003 | Cosic |
| 2003/0164827 A1* | 9/2003 | Gottesman et al. .... G06T 15/10 345/419 |
| 2004/0010699 A1 | 1/2004 | Shao et al. |
| 2004/0049476 A1 | 3/2004 | Sai et al. |
| 2004/0098394 A1 | 5/2004 | Merritt et al. |
| 2004/0128327 A1 | 7/2004 | Shi et al. |
| 2004/0194017 A1 | 9/2004 | Cosic |
| 2004/0203845 A1 | 10/2004 | Lal |
| 2004/0224675 A1 | 11/2004 | Puskoor et al. |
| 2004/0229595 A1 | 11/2004 | Laursen et al. |
| 2004/0249785 A1 | 12/2004 | Gauweiler |
| 2004/0249857 A1 | 12/2004 | Gauweiler |
| 2005/0044165 A1 | 2/2005 | O'Farrell et al. |
| 2005/0076069 A1 | 4/2005 | Deo et al. |
| 2005/0086203 A1 | 4/2005 | Gauweiler |
| 2005/0149517 A1 | 7/2005 | Cosic |
| 2005/0149542 A1 | 7/2005 | Cosic |
| 2005/0154745 A1 | 7/2005 | Hansen et al. |
| 2005/0289105 A1 | 12/2005 | Cosic |
| 2006/0074967 A1 | 4/2006 | Shaburov |
| 2006/0136454 A1 | 6/2006 | Tchouati et al. |
| 2006/0212846 A1 | 9/2006 | O'Farrell et al. |
| 2006/0259466 A1 | 11/2006 | Bilotti |
| 2007/0136264 A1 | 1/2007 | Tran |
| 2007/0049246 A1 | 3/2007 | Schreter et al. |
| 2007/0291757 A1 | 12/2007 | Dobson et al. |
| 2008/0005054 A1 | 1/2008 | Kurian et al. |
| 2008/0039062 A1 | 2/2008 | Laursen et al. |
| 2008/0040782 A1 | 2/2008 | Laursen et al. |
| 2008/0045205 A1 | 2/2008 | Park et al. |
| 2008/0071770 A1 | 3/2008 | Schloter et al. |
| 2008/0086481 A1 | 4/2008 | Kim |
| 2008/0091763 A1 | 4/2008 | Devonshire et al. |
| 2008/0126403 A1 | 5/2008 | Moon |
| 2008/0172274 A1 | 7/2008 | Hurowitz et al. |
| 2008/0189250 A1 | 8/2008 | Cha et al. |
| 2008/0281825 A1 | 11/2008 | Meng |
| 2009/0070149 A1 | 3/2009 | Kurian et al. |
| 2009/0070337 A1 | 3/2009 | Romem et al. |
| 2009/0094225 A1 | 4/2009 | Cradick et al. |
| 2009/0106360 A1 | 4/2009 | Peng et al. |
| 2009/0176529 A1 | 7/2009 | Warren et al. |
| 2009/0201908 A1 | 8/2009 | Gidron et al. |
| 2009/0217375 A1 | 8/2009 | Joosten et al. |
| 2009/0254594 A1 | 10/2009 | Burchall |
| 2009/0275331 A1 | 11/2009 | Maitreya et al. |
| 2010/0023531 A1 | 1/2010 | Brisebois et al. |
| 2010/0023541 A1 | 1/2010 | Cosic |
| 2010/0077468 A1 | 3/2010 | Pragides et al. |
| 2010/0082536 A1 | 4/2010 | Cosic |
| 2010/0088316 A1 | 4/2010 | Robinson et al. |
| 2010/0118025 A1 | 5/2010 | Smith et al. |
| 2010/0159903 A1 | 6/2010 | Goldman-Shenhar |
| 2010/0223228 A1 | 9/2010 | Logan et al. |
| 2010/0257376 A1 | 10/2010 | Little et al. |
| 2010/0278162 A1 | 11/2010 | Groux et al. |
| 2011/0004586 A1 | 1/2011 | Cherryholmes et al. |
| 2011/0010344 A1 | 1/2011 | Sjogren |
| 2011/0016089 A1 | 1/2011 | Freedman et al. |
| 2011/0093435 A1 | 4/2011 | Zha et al. |
| 2011/0106448 A1 | 5/2011 | Widmann et al. |
| 2011/0119758 A1 | 5/2011 | Uterhardt et al. |
| 2011/0145210 A1 | 6/2011 | Rathinam et al. |
| 2011/0145242 A1 | 6/2011 | Mehrotra et al. |
| 2011/0161290 A1 | 6/2011 | Waterman et al. |
| 2011/0258345 A1 | 10/2011 | Bhanote |
| 2011/0314482 A1 | 12/2011 | Cupala et al. |
| 2012/0016901 A1 | 1/2012 | Agarwal et al. |
| 2012/0089570 A1 | 4/2012 | Zha et al. |
| 2012/0101993 A1 | 4/2012 | Wong |
| 2012/0131116 A1 | 5/2012 | Tu et al. |
| 2012/0159393 A1 | 6/2012 | Sethi |
| 2012/0173485 A1 | 7/2012 | Kothule et al. |
| 2012/0183221 A1 | 7/2012 | Alasry et al. |
| 2012/0209925 A1 | 8/2012 | Lee et al. |
| 2012/0209948 A1 | 8/2012 | Tenenblat et al. |
| 2013/0036089 A1 | 2/2013 | Lucas |
| 2013/0198171 A1 | 8/2013 | Shah et al. |
| 2013/0204907 A1 | 8/2013 | Alonso Alarcon et al. |
| 2013/0218932 A1 | 8/2013 | Cosic |
| 2013/0226974 A1 | 8/2013 | Cosic |
| 2014/0143276 A1 | 5/2014 | Rogers et al. |

(56) References Cited

U.S. PATENT DOCUMENTS

| | | |
|---|---|---|
| 2014/0164430 A1 | 6/2014 | Hadjieleftheriou et al. |
| 2014/0298216 A1 | 10/2014 | Prazak et al. |
| 2014/0365943 A1 | 12/2014 | Senesac |

OTHER PUBLICATIONS 2D computer graphics, retrieved from <URL: http://wikipedia.com> on Nov. 9, 2014, 7 pages.

3D computer graphics, retrieved from <URL: http://wikipedia.com> on Nov. 9, 2014, 3 pages.

3D modeling, retrieved from <URL: http://wikipedia.com> on Nov. 9, 2014, 5 pages.

8: Mouse Handling, retrieved from <URL: http://ericsink.com/wpf3d/8_Mouse.html> on Nov. 13, 2014, 2 pages.

AutoCAD, retrieved from <URL: http://wikipedia.com> on Nov. 9, 2014, 7 pages.

Collision detection, retrieved from <URL: http://wikipedia.com> on Nov. 23, 2014, 5 pages.

Comparison of OpenGL and Direct3D, retrieved from <URL: http://wikipedia.com> on Nov. 22, 2014, 7 pages.

Data dictionary, retrieved from <URL: http://wikipedia.com> on Nov. 6, 2014, 3 pages.

DBA_Tables, retrieved from <URL: http://wikipedia.com> on Nov. 6, 2014, 1 pages.

Digital sculpting, retrieved from <URL: http://wikipedia.com> on Nov. 12, 2014, 3 pages.

Facial recognition system, retrieved from <URL: http://wikipedia.com> on Dec. 13, 2014, 7 pages.

Game engine, retrieved from <URL: http://wikipedia.com> on Nov. 23, 2014, 4 pages.

JavaFX, retrieved from <URL: http://wikipedia.com> on Nov. 22, 2014, 7 pages.

Jreality, retrieved from <URL: http://wikipedia.com> on Nov. 22, 2014, 3 pages.

List of 14+ Image Recognition APIs, retrieved from <URL: http://blog.mashape.com/list-of-14-image-recognition-apis/> on Dec. 13, 2014, 2 pages.

List of 50+ Face Detection / Recognition APIs, libraries, and software, retrieved from <URL: http://blog.mashape.com/list-of-50-face-detection-recognition-apis/> on Dec. 13, 2014, 4 pages.

List of file formats, retrieved from <URL: http://wikipedia.com> on Nov. 9, 2014, 33 pages.

List of game engines, retrieved from <URL: http://wikipedia.com> on Nov. 22, 2014, 17 pages.

Lua (programming language), retrieved from <URL: http://wikipedia.com> on Nov. 25, 2014, 10 pages.

Mantle (API), retrieved from <URL: http://wikipedia.com> on Nov. 22, 2014, 5 pages.

Microsoft XNA, retrieved from <URL: http://wikipedia.com> on Nov. 22, 2014, 7 pages.

3.4 Getting Information About Databases and Tables, retrieved from <URL: http://dev.mysql.com/doc/refman/5.7/en/getting-information.html> on Nov. 6, 2014, 2 pages.

MySQL show users—how to show the users in a MySQL database, retrieved from <URL: http://alvinalexander.com/blog/post/mysql/show-users-i-ve-created-in-mysql-database> on Nov. 6, 2014, 4 pages.

OpenCV, retrieved from <URL: http://wikipedia.com> on Dec. 13, 2014, 3 pages.

Optical character recognition, retrieved from <URL: http://wikipedia.com> on Dec. 13, 2014, 6 pages.

Outline of object recognition, retrieved from <URL: http://wikipedia.com> on Dec. 13, 2014, 8 pages.

Particle system, retrieved from <URL: http://wikipedia.com> on Nov. 12, 2014, 3 pages.

Physics engine, retrieved from <URL: http://wikipedia.com> on Nov. 23, 2014, 5 pages.

Polygonal modeling, retrieved from <URL: http://wikipedia.com> on Nov. 12, 2014, 4 pages.

POV-Ray, retrieved from <URL: http://wikipedia.com> on Nov. 10, 2014, 5 pages.

Raster graphics, retrieved from <URL: http://wikipedia.com> on Nov. 9, 2014, 3 pages.

Scene graph, retrieved from <URL: http://wikipedia.com> on Nov. 22, 2014, 4 pages.

STL (file format), retrieved from <URL: http://wikipedia.com> on Nov. 11, 2014, 4 pages.

Subdivision surface, retrieved from <URL: http://wikipedia.com> on Nov. 12, 2014, 3 pages.

Sysobjects, retrieved from <URL: http://technet.microsoft.com/en-us/library/aa260447(d=default,l=en-us,v=sql.80).aspx> on Nov. 6, 2014, 2 pages.

Vector graphics, retrieved from <URL: http://wikipedia.com> on Nov. 9, 2014, 5 pages.

Vertex (computer graphics), retrieved from <URL: http://wikipedia.com> on Nov. 9, 2014, 2 pages.

Voxel, retrieved from <URL: http://wikipedia.com> on Nov. 11, 2014, 5 pages.

Wavefront .obj file, retrieved from <URL: http://wikipedia.com> on Nov. 9, 2014, 6 pages.

Acrobat 3D tutorials—basic interaction, retrieved from <URL: https://acrobatusers.com/assets/collections/tutorials/legacy/tech_corners/3d/3d_tutorials/basic_interaction.pdf> on Nov. 23, 2014, 2 pages.

* cited by examiner

SYSTEMS, METHODS, APPARATUSES, AND/OR INTERFACES FOR ASSOCIATIVE MANAGEMENT OF DATA AND INFERENCE OF ELECTRONIC RESOURCES

CROSS REFERENCE TO RELATED APPLICATION

This application is a continuation of, and claims priority under 35 U.S.C. § 120 from, nonprovisional U.S. patent application Ser. No. 14/634,474 entitled "SYSTEMS, METHODS, APPARATUSES, AND/OR INTERFACES FOR ASSOCIATIVE MANAGEMENT OF DATA AND INFERENCE OF ELECTRONIC RESOURCES", filed on Feb. 27, 2015. The disclosure of the foregoing document is incorporated herein by reference.

FIELD

The disclosure generally relates to computing devices. The disclosure includes systems, methods, apparatuses, and/or interfaces for providing associative management of data functionalities. The disclosure also includes systems, methods, apparatuses, and/or interfaces for inferring electronic resources.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Database Management Systems (DBMSs) have been utilized to manage data that range from personal data, organizational data, manufacturing data, sales data, marketing data to social media data, artificial intelligence data, expert systems data, and other data. DBMSs or their interfaces often require significant effort to familiarize the user with the DBMS or its interface. Operating a DBMS to gain its benefits may be reserved for expensive and well-trained DBMS operators.

Electronic resources on a computing device range from text, images, video, sound, to digital objects, data structures, network resources, and other digital resources. Electronic resources that a user may want to utilize on a computing device are typically manually selected by the user.

SUMMARY OF THE INVENTION

In some aspects, the disclosure relates to a system for management of data. The system may operate on one or more computing devices. In some embodiments, the system comprises a database management system (DBMS). The system may also comprise an interface configured to receive a DBMS element from the DBMS. The system may also comprise a generator configured to generate an interactive object associated with the DBMS element based on an association schema. The system may also comprise an user interaction unit configured to render the interactive object in a graphical user interface and receive an user interaction with the interactive object. The user interaction may include a DBMS instruction for performing an operation on the DBMS element. The DBMS may be configured to perform the operation defined by the DBMS instruction.

In certain embodiments, the DBMS includes a system for at least one of: a storing, a managing, or a manipulating a data. In further embodiments, the DBMS includes a system for performing data operations. In further embodiments, the DBMS includes at least one of: a relational DBMS, a non-relational DBMS, a text file, a delimited file, a spreadsheet, an extensible markup language (XML) document, hypertext markup language (HTML) document, a data structure, an object, a file or a repository.

In some embodiments, the DBMS element includes one or more DBMS elements. In further embodiments, the DBMS element includes at least one of: a database, a table, a row, a column, a data cell, a data, a metadata, a report, a view, a relation, a user account, a login, a password, a privilege, a setting, a cube, or a dimension. In further embodiments, the interface configured to receive the DBMS element includes at least one of: an open database connectivity (ODBC) interface, a java database connectivity (JDBC) interface, an application programming interface (API), a bridge, a driver, a connection, a network, a function, or a code. In further embodiments, receiving the DBMS element includes issuing a structured query language (SQL) statement to the DBMS and the DBMS transmitting the DBMS element. In further embodiments, receiving the DBMS element includes accessing at least one of: a data dictionary, or a metadata. In further embodiments, receiving the DBMS element includes accessing at least one of: a DBMS file, a DBMS data structure, or a DBMS repository. In further embodiments, receiving the DBMS element includes utilizing at least one of: a native application programming interface (API), a third party API, a custom API, a software development kit (SDK), a report building tool, or a data access tool.

In certain embodiments, the interactive object includes one or more interactive objects. In further embodiments, the interactive object includes a representation of an object from a user's experience. The object from the user's experience may include a physical object familiar to the user. The object from the user's experience may include a physical object which the user knows how to use. The object from the user's experience may include a computer generated object familiar to the user. The object from the user's experience may include a computer generated object which the user knows how to use. The object from the user's experience may include at least one of: a building, an infrastructure object, a transportation object, an apparatus, an object of nature, or a stellar object. The object from the user's experience may include at least one of: a still object, or a mobile object. In some embodiments, generating the interactive object associated with the DBMS element based on an association schema includes utilizing an interactive object definition. The interactive object definition may include at least one of: a shape, a color, a data, a metadata, an attribute, a parameter, a field, or a feature of the interactive object. The interactive object definition may include at least one of: a three dimensional graphic, a two dimensional graphic, a voxel graphic, a vector graphic, a raster graphic, or a bitmap of the interactive object. The interactive object definition may include a definition of a surface of the interactive object. The definition of a surface of the interactive object includes at least one of: a polygonal model, a subdivision surface, a curve model, a digital sculpture, a level set, or a particle system. The interactive object definition may include a definition of a volume of the interactive object. The interactive object definition may include an interactive object definition created using at least one of: a three dimensional modeling tool, a vectorizing, a programming language's graphic capability, a specialized program, or an application programming interface.

In some embodiments, generating the interactive object associated with the DBMS element based on an association schema includes at least one of: a resizing, a rotating, a positioning, a transforming, or an animating the interactive object. In further embodiments, generating the interactive object associated with the DBMS element based on an association schema includes generating a scene, the scene comprising the interactive object. The scene includes at least one of: a three dimensional scene, a two dimensional scene, a three dimensional space, a two dimensional space, a three dimensional environment, a two dimensional environment, a three dimensional setting, a two dimensional setting, a three dimensional site, or a two dimensional site.

In certain embodiments, generating the interactive object associated with the DBMS element based on an association schema includes utilizing at least one of: a graphics engine, a simulation engine, a computer aided design (CAD) application, a computer aided manufacturing (CAM) application, or a game engine. The graphics engine, the simulation engine, the computer aided design (CAD) application, the computer aided manufacturing (CAM) application, or the game engine may include at least one of: a physics engine, a collision detection, an event detection, a networking capability, a memory management, a scene graph, a rendering capability, or a scripting capability.

In certain embodiments, the association schema includes an association between the interactive object and the DBMS element. The association between the interactive object and the DBMS element includes one or more associations between an interactive object and a DBMS element.

In some embodiments, the association schema includes an association between the interactive object and the DBMS element stored in at least one of: a table, a database, a memory structure, a data structure, a storage structure, a file, or a repository. In further embodiments, the association schema includes an association between the interactive object and the DBMS element stored in at least one of: a field, a member, an attribute, a variable, or a location of the DBMS element. In further embodiments, the association schema includes an association between the interactive object and the DBMS element stored in at least one of: a field, a member, an attribute, a variable, or a location of the interactive object.

In certain embodiments, rendering the interactive object in a graphical user interface includes processing the interactive object for portrayal on a visual portrayal device. The visual portrayal device includes at least one of: a display, a projector, or a glasses.

In some embodiments, the user interaction includes an user controllable avatar interaction. In further embodiments, the user interaction includes a simulation of an interaction with a physical object. The interaction with the physical object may include at least one of: a contact with the physical object, a collision with the physical object, a detection of the physical object, an observation of the physical object, or a movement of the physical object.

In certain embodiments, the user interaction includes an event. The event includes at least one of: a mouse click, a button press, a key press, a touchscreen tap, a touchscreen swipe, a touchscreen drag, a user controllable avatar's contact, a user controllable avatar's collision, a user controllable avatar's detection, or a user controllable avatar's approach.

In some embodiments, the user interaction includes an interaction function. The interaction function may include the DBMS instruction for performing the operation on the DBMS element. The interaction function may include an interaction function associated with the user interaction based on an interaction association schema. The interaction association schema includes an association between the interaction and the interaction function. The interaction function may include an instruction for animating the interactive object. The interaction function may include an instruction for transitioning from one interactive object to another interactive object. The interaction function may include an interaction function executed responsive to an occurrence of an event. The event includes at least one of: a mouse click, a button press, a key press, a touchscreen tap, a touchscreen swipe, a touchscreen drag, a user controllable avatar's contact, a user controllable avatar's collision, a user controllable avatar's detection, a user controllable avatar's approach, an object's contact, an object's collision, an object's detection, an object's approach, an application start, an application close, a system start, a system shut-down, a system clock event, or a system scheduler event.

In certain embodiments, the DBMS instruction for performing the operation on the DBMS element includes at least one of: a structured query language (SQL) statement, a DBMS command, a computer command, a function, an instruction, or an instruction set.

In some embodiments, the operation defined by the DBMS instruction includes at least one of: inserting a data, deleting a data, editing a data, creating a table, deleting a table, editing a table, creating a report, deleting a report, editing a report, creating a database, deleting a database, editing a database, creating an user account, deleting an user account, editing an user account, creating a DBMS setting, deleting a DBMS setting, editing a DBMS setting, creating a relation, deleting a relation, or editing a relation.

In some aspects, the system further comprises: an inference unit configured to infer the interactive object from an electronic repository. In some embodiments, inferring the interactive object from the electronic repository includes determining a substantial similarity between a frequently occurring reference from the electronic repository and an identifier of the interactive object. The electronic repository may include at least one of: an email, a social media record, a file, a data, or a metadata. The frequently occurring reference may include a portion of the electronic repository. The frequently occurring reference may include at least one of: a text, an image, or a sound. The frequently occurring reference includes a reference to the interactive object. The frequently occurring reference may include a reference with the highest number of occurrences. The frequently occurring reference may include a reference with a count of higher than one. The identifier of the interactive object may include an identifier from a plurality of interactive object identifiers. Determining the substantial similarity between the frequently occurring reference from the electronic repository and the identifier of the interactive object may include comparing the frequently occurring reference and the identifier. Determining the substantial similarity between the frequently occurring reference from the electronic repository and the identifier of the interactive object may include determining a match between the frequently occurring reference and the identifier. Determining the substantial similarity between the frequently occurring reference from the electronic repository and the identifier of the interactive object may include determining a match between at least one character of the frequently occurring reference and at least one character of the identifier. Determining the substantial similarity between the frequently occurring reference from the electronic repository and the identifier of the interactive object may include determining a match between all but a threshold number of characters of the frequently occurring reference and all but a threshold number of characters of the identifier. Determining the substantial similarity between the frequently occurring reference from the electronic repository and the identifier of the interactive object may include determining a match between all but one portion of the frequently occurring reference and all but one portion of the identifier. Determining the substantial similarity between the frequently occurring reference from the electronic repository and the identifier of the interactive object may include determining a match between all but two portions of the frequently occurring reference and all but two portions of the identifier. Determining the substantial similarity between the frequently occurring reference from the electronic repository and the identifier of the interactive object may include finding a semantically indicative reference of the frequently occurring reference and determining a substantial similarity between the semantically indicative reference and the identifier. In certain embodiments, inferring the interactive object from the electronic repository includes accessing a default interactive object. The default interactive object includes an interactive object assigned by at least one of: a user, a system administrator, or an automatic system. In further embodiments, inferring the interactive object from the electronic repository includes receiving a user selection of the interactive object.

In certain aspects, the generator may be further configured to re-generate the interactive object. Re-generating the interactive object may include re-generating the interactive object associated with the updated DBMS element.

In some aspects, the generator may be further configured to re-associate the re-generated interactive object with the updated DBMS element based on the association schema. The user interaction unit may be further configured to render the re-generated re-associated interactive object.

In certain aspects, the system further comprises: a DBMS control unit configured to redirect an execution of the DBMS to the interface for receiving the DBMS element from the DBMS. In some embodiments, redirecting the execution of the DBMS includes a detection of at least one of: an event, a state, or a condition. The event, the state, or the condition includes at least one of: a DBMS start, a DBMS shut-down, an operating system start, an operating system shut-down, an application start, an application shut-down, a system start, a system shut-down, a system clock event, a system scheduler event, a function call, a function exit, an instruction execution, or an instruction detection. In further embodiments, redirecting the execution of the DBMS includes manipulating a DBMS internal processing element. The DBMS internal processing element includes at least one of: an execution engine, a precompiler, or a parser. In further embodiments, redirecting the execution of the DBMS includes at least one of: inserting, adding, branching, redirecting, modifying, removing, rewriting, overwriting, extending, or hot swapping a DBMS code. The DBMS code includes at least one an internal instruction of the DBMS.

In some aspects, the disclosure relates to a system comprising: one or more processors; and a computer-readable medium coupled to the one or more processors, the computer-readable medium having instructions stored thereon, which, when executed by the one or more processors, cause the one or more processors to perform operations comprising: receiving a database management system (DBMS) element from a DBMS. The operations may also comprise generating an interactive object associated with the DBMS element based on an association schema. The operations may also comprise rendering the interactive object in a graphical user interface through which a user can interact with the interactive object. The operations may also comprise receiving an user interaction with the interactive object. The user interaction may include a DBMS instruction for performing an operation on the DBMS element. The operations may further include performing the operation defined by the DBMS instruction.

In some aspects, the disclosure relates to a non-transitory computer storage medium having a computer program stored thereon, the program comprising instructions that when executed by one or more computing devices cause the one or more computing devices to perform operations comprising: receiving a database management system (DBMS) element from a DBMS. The operations may also comprise generating an interactive object associated with the DBMS element based on an association schema. The operations may also comprise rendering the interactive object in a graphical user interface through which a user can interact with the interactive object. The operations may also comprise receiving an user interaction with the interactive object. The user interaction may include a DBMS instruction for performing an operation on the DBMS element. The operations may also comprise performing the operation defined by the DBMS instruction.

In certain aspects, the disclosure relates to a computer-implemented method comprising: receiving a database management system (DBMS) element from a DBMS. The method may also comprise generating an interactive object associated with the DBMS element based on an association schema. The method may also comprise rendering the interactive object in a graphical user interface through which a user can interact with the interactive object. The method may also comprise receiving an user interaction with the interactive object. The user interaction may include a DBMS instruction for performing an operation on the DBMS element. The method may also comprise performing the operation defined by the DBMS instruction.

In some aspects, the disclosure relates to a non-transitory computer storage medium having a computer program stored thereon, the program comprising instructions that when executed by one or more computing devices cause the one or more computing devices to generate an interface for management of data, the interface configured to: receive a database management system (DBMS) element from a DBMS. The interface may also be configured to generate an interactive object associated with the DBMS element based on an association schema. The interface may also be configured to render the interactive object in a graphical user interface through which a user can interact with the interactive object. The interface may also be configured to receive an user interaction with the interactive object. The user interaction may include a DBMS instruction for performing an operation on the DBMS element. The interface may also be configured to perform the operation defined by the DBMS instruction.

The system, the non-transitory computer storage media, the method, and/or the interface may include the following in various embodiments.

In some embodiments, the DBMS includes a system for at least one of: a storing, a managing, or a manipulating a data. In further embodiments, the DBMS includes a system for performing data operations. In further embodiments, the DBMS includes at least one of: a relational DBMS, a non-relational DBMS, a text file, a delimited file, a spreadsheet, an extensible markup language (XML) document, hypertext markup language (HTML) document, a data structure, an object, a file or a repository.

In certain embodiments, the DBMS element includes one or more DBMS elements. In further embodiments, the DBMS element includes at least one of: a database, a table, a row, a column, a data cell, a data, a metadata, a report, a view, a relation, a user account, a login, a password, a privilege, a setting, a cube, or a dimension. In further embodiments, receiving the DBMS element includes receiving the DBMS element through an interface comprising at least one of: an open database connectivity (ODBC) interface, a java database connectivity (JDBC) interface, an application programming interface (API), a bridge, a driver, a connection, a network, a function, or a code. In further embodiments, receiving the DBMS element includes issuing a structured query language (SQL) statement to the DBMS and the DBMS transmitting the DBMS element. In further embodiments, receiving the DBMS element includes accessing at least one of: a data dictionary, or a metadata. In further embodiments, receiving the DBMS element includes accessing at least one of: a DBMS file, a DBMS data structure, or a DBMS repository. In further embodiments, receiving the DBMS element includes utilizing at least one of: a native application programming interface (API), a third party API, a custom API, a software development kit (SDK), a report building tool, or a data access tool.

In some embodiments, the interactive object includes one or more interactive objects. In further embodiments, the interactive object includes a representation of an object from a user's experience. The object from the user's experience may include a physical object familiar to the user. The object from the user's experience may include a physical object which the user knows how to use. The object from the user's experience may include a computer generated object familiar to the user. The object from the user's experience may include a computer generated object which the user knows how to use. The object from the user's experience may include at least one of: a building, an infrastructure object, a transportation object, an apparatus, an object of nature, or a stellar object. The object from the user's experience may include at least one of: a still object, or a mobile object.

In some embodiments, generating the interactive object associated with the DBMS element based on an association schema includes utilizing an interactive object definition. In further embodiments, the interactive object definition may include at least one of: a shape, a color, a data, a metadata, an attribute, a parameter, a field, or a feature of the interactive object. In further embodiments, the interactive object definition includes at least one of: a three dimensional graphic, a two dimensional graphic, a voxel graphic, a vector graphic, a raster graphic, or a bitmap of the interactive object. In further embodiments, the interactive object definition includes a definition of a surface of the interactive object. The definition of a surface of the interactive object includes at least one of: a polygonal model, a subdivision surface, a curve model, a digital sculpture, a level set, or a particle system. In further embodiments, the interactive object definition includes a definition of a volume of the interactive object. In further embodiments, the interactive object definition includes an interactive object definition created using at least one of: a three dimensional modeling tool, a vectorizing, a programming language's graphic capability, a specialized program, or an application programming interface.

In certain embodiments, generating the interactive object associated with the DBMS element based on an association schema includes at least one of: a resizing, a rotating, a positioning, a transforming, or an animating the interactive object. In further embodiments, generating the interactive object associated with the DBMS element based on an association schema includes generating a scene, the scene comprising the interactive object. The scene includes at least one of: a three dimensional scene, a two dimensional scene, a three dimensional space, a two dimensional space, a three dimensional environment, a two dimensional environment, a three dimensional setting, a two dimensional setting, a three dimensional site, or a two dimensional site.

In some embodiments, generating the interactive object associated with the DBMS element based on an association schema includes utilizing at least one of: a graphics engine, a simulation engine, a computer aided design (CAD) application, a computer aided manufacturing (CAM) application, or a game engine. The graphics engine, the simulation engine, the computer aided design (CAD) application, the computer aided manufacturing (CAM) application, or the game engine may include at least one of: a physics engine, a collision detection, an event detection, a networking capability, a memory management, a scene graph, a rendering capability, or a scripting capability.

In certain embodiments, the association schema includes an association between the interactive object and the DBMS element. The association between the interactive object and the DBMS element may include one or more associations between an interactive object and a DBMS element. In further embodiments, the association schema includes an association between the interactive object and the DBMS element stored in at least one of: a table, a database, a memory structure, a data structure, a storage structure, a file, or a repository. In further embodiments, the association schema includes an association between the interactive object and the DBMS element stored in at least one of: a field, a member, an attribute, a variable, or a location of the DBMS element. In further embodiments, the association schema includes an association between the interactive object and the DBMS element stored in at least one of: a field, a member, an attribute, a variable, or a location of the interactive object.

In certain embodiments, rendering the interactive object in a graphical user interface includes processing the interactive object for portrayal on a visual portrayal device. The visual portrayal device includes at least one of: a display, a projector, or a glasses.

In some embodiments, the user interaction includes an user controllable avatar interaction. In further embodiments, the user interaction includes a simulation of an interaction with a physical object. The interaction with the physical object may include at least one of: a contact with the physical object, a collision with the physical object, a detection of the physical object, an observation of the physical object, or a movement of the physical object.

In certain embodiments, the user interaction includes an event. The event includes at least one of: a mouse click, a button press, a key press, a touchscreen tap, a touchscreen swipe, a touchscreen drag, a user controllable avatar's contact, a user controllable avatar's collision, a user controllable avatar's detection, or a user controllable avatar's approach.

In some embodiments, the user interaction includes an interaction function. In further embodiments, the interaction function includes the DBMS instruction for performing the operation on the DBMS element. In further embodiments, the interaction function includes an interaction function associated with the user interaction based on an interaction association schema. The interaction association schema includes an association between the interaction and the interaction function. In further embodiments, the interaction function includes an instruction for animating the interactive object. In further embodiments, the interaction function includes an instruction for transitioning from one interactive object to another interactive object. In further embodiments, the interaction function includes an interaction function executed responsive to an occurrence of an event. The event includes at least one of: a mouse click, a button press, a key press, a touchscreen tap, a touchscreen swipe, a touchscreen drag, a user controllable avatar's contact, a user controllable avatar's collision, a user controllable avatar's detection, a user controllable avatar's approach, an object's contact, an object's collision, an object's detection, an object's approach, an application start, an application close, a system start, a system shut-down, a system clock event, or a system scheduler event.

In some embodiments, the DBMS instruction for performing the operation on the DBMS element includes at least one of: a structured query language (SQL) statement, a DBMS command, a computer command, a function, an instruction, or an instruction set.

In certain embodiments, the operation defined by the DBMS instruction includes at least one of: inserting a data, deleting a data, editing a data, creating a table, deleting a table, editing a table, creating a report, deleting a report, editing a report, creating a database, deleting a database, editing a database, creating an user account, deleting an user account, editing an user account, creating a DBMS setting, deleting a DBMS setting, editing a DBMS setting, creating a relation, deleting a relation, or editing a relation.

In some aspects, the system, the non-transitory computer storage media, the method, and/or the interface further comprise: inferring the interactive object from an electronic repository. In some embodiments, inferring the interactive object from the electronic repository may include determining a substantial similarity between a frequently occurring reference from the electronic repository and an identifier of the interactive object. The electronic repository may include at least one of: an email, a social media record, a file, a data, or a metadata. The frequently occurring reference may include a portion of the electronic repository. The frequently occurring reference may include at least one of: a text, an image, or a sound. The frequently occurring reference may include a reference to the interactive object. The frequently occurring reference may include a reference with the highest number of occurrences. The frequently occurring reference may include a reference with a count of higher than one. The identifier of the interactive object may include an identifier from a plurality of interactive object identifiers.

In some embodiments, determining the substantial similarity between the frequently occurring reference from the electronic repository and the identifier of the interactive object includes comparing the frequently occurring reference and the identifier. In further embodiments, determining the substantial similarity between the frequently occurring reference from the electronic repository and the identifier of the interactive object includes determining a match between the frequently occurring reference and the identifier. In further embodiments, determining the substantial similarity between the frequently occurring reference from the electronic repository and the identifier of the interactive object includes determining a match between at least one character of the frequently occurring reference and at least one character of the identifier. In further embodiments, determining the substantial similarity between the frequently occurring reference from the electronic repository and the identifier of the interactive object includes determining a match between all but a threshold number of characters of the frequently occurring reference and all but a threshold number of characters of the identifier. In further embodiments, determining the substantial similarity between the frequently occurring reference from the electronic repository and the identifier of the interactive object includes determining a match between all but one portion of the frequently occurring reference and all but one portion of the identifier. In further embodiments, determining the substantial similarity between the frequently occurring reference from the electronic repository and the identifier of the interactive object includes determining a match between all but two portions of the frequently occurring reference and all but two portions of the identifier. In further embodiments, determining the substantial similarity between the frequently occurring reference from the electronic repository and the identifier of the interactive object includes finding a semantically indicative reference of the frequently occurring reference and determining a substantial similarity between the semantically indicative reference and the identifier. In certain embodiments, inferring the interactive object from the electronic repository includes accessing a default interactive object. The default interactive object includes an interactive object assigned by at least one of: a user, a system administrator, or an automatic system. In further embodiments, inferring the interactive object from the electronic repository includes receiving a user selection of the interactive object.

In certain aspects, the system, the non-transitory computer storage media, the method, and/or the interface further comprise: re-generating the interactive object. Re-generating the interactive object may include re-generating the interactive object associated with the updated DBMS element.

In some aspects, the system, the non-transitory computer storage media, the method, and the interface further comprise: re-associating the re-generated interactive object with the updated DBMS element based on the association schema.

In certain aspects, the system, the non-transitory computer storage media, the method, and the interface further comprise: rendering the re-generated re-associated interactive object.

In some aspects, the system, the non-transitory computer storage media, the method, and the interface further comprise: redirecting an execution of the DBMS to an interface for receiving the DBMS element from the DBMS. Redirecting the execution of the DBMS may include a detection of at least one of: an event, a state, or a condition. The event, the state, or the condition includes at least one of: a DBMS start, a DBMS shut-down, an operating system start, an operating system shut-down, an application start, an application shut-down, a system start, a system shut-down, a system clock event, a system scheduler event, a function call, a function exit, an instruction execution, or an instruction detection. In some embodiments, redirecting the execution of the DBMS includes manipulating a DBMS internal processing element. The DBMS internal processing element includes at least one of: an execution engine, a precompiler, or a parser. In further embodiments, redirecting the execution of the DBMS includes at least one of: inserting, adding, branching, redirecting, modifying, removing, rewriting, overwriting, extending, or hot swapping a DBMS code. The DBMS code includes at least one an internal instruction of the DBMS.

In some aspects, the disclosure relates to a system for inferring an electronic resource. The system may operate on one or more computing devices. In some embodiments, the system comprises: an interface configured to receive at least one a reference from at least one an electronic repository. The system may also comprise a reference processing unit configured to determine a frequently occurring reference from the at least one reference, the frequently occurring reference including a reference with an occurrence count of higher than one. The system may also comprise a plurality of electronic resources, each electronic resource including an identifier identifying the electronic resource. The system may also comprise a comparison unit configured to compare the frequently occurring reference with each of the identifiers from the plurality of electronic resources and determine that there is a substantial similarity between the frequently occurring reference and a first identifier. The system may also comprise an application interface configured to transmit the electronic resource identified by the first identifier.

In certain embodiments, the at least one reference includes at least one of: a text, an image, or a sound. The text may include at least one of: a word, a phrase, a letter, a symbol, a digit, or a character. In further embodiments, the at least one reference includes a portion of the at least one electronic repository. The portion of the at least one electronic repository may include at least one of: a character, a letter, a symbol, a digit, a word, a phrase, a pixel, or a digital sound sample.

In certain embodiments, the at least one reference includes a reference to an electronic resource. In further embodiments, the at least one electronic repository includes the at least one reference. In further embodiments, the at least one electronic repository includes at least one of: an email, a social media record, a file, a data, a metadata, a database management system (DBMS), or a data source. In further embodiments, the at least one electronic repository includes an electronic repository comprising a default reference. The default reference includes a reference assigned by at least one of: a user, a system administrator, or an automatic system. In further embodiments, the at least one electronic repository includes an electronic repository comprising a user selected reference.

In some embodiments, determining the frequently occurring reference includes traversing the at least one electronic repository and counting occurrences of each of the at least one reference. In further embodiments, determining the frequently occurring reference includes utilizing a frequency distribution comprising an occurrence count of each of the at least one reference. The frequency distribution may include a frequency distribution arranged to account for a weight of each of the at least one reference. In further embodiments, determining the frequently occurring reference includes utilizing at least one of: a tree, a graph, a list, or a data structure comprising an occurrence count of each of the at least one reference. In further embodiments, the frequently occurring reference includes one or more frequently occurring references. In further embodiments, the frequently occurring reference includes at least one of: a reference with the highest number of occurrences, a reference with a second highest number of occurrences, a reference with a third highest number of occurrences, a reference with a fourth highest number of occurrences, a reference with a fifth highest number of occurrences, or a reference with a threshold number of occurrences.

In certain embodiments, each of the plurality of electronic resources includes at least one of: an interactive object, a site, an electronic file, an electronic repository, a data structure, an electronic object, or a data. In further embodiments, each of the plurality of electronic resources includes at least one of: a digital image, a digital video, a digital sound, a digital text document, or a computer file. In further embodiments, the plurality of electronic resources includes a plurality of electronic resources stored in at least one of: a database, a table, an object, a data structure, a repository, or a file system. In further embodiments, the identifier includes one or more identifiers.

In some embodiments, determining that there is the substantial similarity between the frequently occurring reference and the first identifier includes determining a match between the frequently occurring reference and the first identifier. In further embodiments, determining that there is the substantial similarity between the frequently occurring reference and the first identifier includes determining a match between at least one portion of the frequently occurring reference and at least one portion of the first identifier. In further embodiments, determining that there is the substantial similarity between the frequently occurring reference and the first identifier includes determining a match between at least one character of the frequently occurring reference and at least one character of the first identifier. In further embodiments, determining that there is the substantial similarity between the frequently occurring reference and the first identifier includes determining a match between all but one portion of the frequently occurring reference and all but one portion of the first identifier. In further embodiments, determining that there is the substantial similarity between the frequently occurring reference and the first identifier includes determining a match between all but one character of the frequently occurring reference and all but one character of the first identifier. In further embodiments, determining that there is the substantial similarity between the frequently occurring reference and the first identifier includes determining a match between all but two portions of the frequently occurring reference and all but two portions of the first identifier. In further embodiments, determining that there is the substantial similarity between the frequently occurring reference and the first identifier includes determining a match between all but two characters of the frequently occurring reference and all but two characters of the first identifier. In further embodiments, determining that there is the substantial similarity between the frequently occurring reference and the first identifier includes determining a match between all but a threshold number of portions of the frequently occurring reference and all but a threshold number of portions of the first identifier. In further embodiments, determining that there is the substantial similarity between the frequently occurring reference and the first identifier includes determining a match between all but a threshold number of characters of the frequently occurring reference and all but a threshold number of characters of the first identifier. In further embodiments, determining that there is the substantial similarity between the frequently occurring reference and the first identifier includes determining a match between a foremost portion of the frequently occurring reference and a foremost portion of the first identifier. In further embodiments, determining that there is the substantial similarity between the frequently occurring reference and the first identifier includes determining a match between a foremost character of the frequently occurring reference and a foremost character of the first identifier. In further embodiments, determining that there is the substantial similarity between the frequently occurring reference and the first identifier includes adjusting a strictness of the comparison. The strictness of the comparison may include a strictness of the comparison assigned by at least one of: a user, a system administrator, or an automatic system. In further embodiments, determining that there is the substantial similarity between the frequently occurring reference and the first identifier includes utilizing at least one of: a threshold for a minimum or a threshold for a maximum number of matches between the frequently occurring reference and the first identifier.

In certain embodiments, transmitting the electronic resource identified by the first identifier includes transmitting the electronic resource identified by the first identifier to at least one of: an application, a process, or a system that can utilize the electronic resource identified by the first identifier. The at least one of an application, a process, or a system that can utilize the electronic resource identified by the first identifier may include at least one of: a generator, a media streaming service, a news provider, a content provider, a web store, an operating system, or a media player.

In some aspects, the system further comprises: an image recognizer configured to convert an image of the at least one reference into a text describing the image, wherein the at least one reference comprising the image. In some embodiments, the image includes at least one of: a raster graphic, a bitmap, or a vector graphic. In further embodiments, the text describing the image includes a text comprising an information encoded in the image. In further embodiments, converting the image of the at least one reference into the text describing the image includes identifying at least one of: an object, or a person in the image. Identifying at least one of the object, or the person in the image may include comparing a region of pixels from the image with a region of pixels from a plurality of known images. In further embodiments, converting the image of the at least one reference into the text describing the image includes at least one of: an optical character recognition (OCR), a facial recognition, an object recognition, or a person recognition.

In certain embodiments, the system further comprises: a sound recognizer configured to convert a sound of the at least one reference into a text describing the sound, wherein the at least one reference comprising the sound. In some embodiments, the sound includes a digitally sampled sound. In further embodiments, the text describing the sound includes a text comprising an information encoded in the sound. In further embodiments, converting the sound of the at least one reference into the text describing the sound includes identifying at least one of: a speech, or a pattern in the sound. Identifying at least one of the speech, or the pattern in the sound may include comparing at least one digital sample value from the sound with at least one digital sample value from a plurality of known sounds. In further embodiments, converting the sound of the at least one reference into the text describing the sound includes at least one of: an operating system's sound recognition, a sound recognition application programming interface (API), a sound recognition application, or a sound recognition engine. In further embodiments, converting the sound of the at least one reference into the text describing the sound includes at least one of: a keyword spotting, or a full speech recognition.

In some aspects, the system further comprises: a semantic conversion unit configured to convert the frequently occurring reference into a semantically indicative reference. In some embodiments, converting the frequently occurring reference into the semantically indicative reference includes finding the semantically indicative reference in a plurality of semantically indicative references, the plurality of semantically indicative references comprising at least one reference each associated with a semantically indicative reference.

In certain aspects, the comparison unit may be further configured to: compare the semantically indicative reference with each of the identifiers from the plurality of electronic resources, and determine that there is a substantial similarity between the semantically indicative reference and a first identifier.

In some aspects, the disclosure relates to a system comprising: one or more processors; and a computer-readable medium coupled to the one or more processors, the computer-readable medium having instructions stored thereon, which, when executed by the one or more processors, cause the one or more processors to perform operations comprising: receiving at least one a reference from at least one an electronic repository. The operations may also comprise determining a frequently occurring reference from the at least one reference, the frequently occurring reference including a reference with an occurrence count of higher than one. The operations may also comprise receiving a plurality of electronic resources, each electronic resource including an identifier identifying the electronic resource. The operations may also comprise comparing the frequently occurring reference with each of the identifiers from the plurality of electronic resources. The operations may also comprise determining that there is a substantial similarity between the frequently occurring reference and a first identifier. The operations may also comprise transmitting the electronic resource identified by the first identifier.

In certain aspects, the disclosure relates to a non-transitory computer storage medium having a computer program stored thereon, the program comprising instructions that when executed by one or more computing devices cause the one or more computing devices to perform operations comprising: receiving at least one a reference from at least one an electronic repository. The operations may also comprise determining a frequently occurring reference from the at least one reference, the frequently occurring reference including a reference with an occurrence count of higher than one. The operations may also comprise receiving a plurality of electronic resources, each electronic resource including an identifier identifying the electronic resource. The operations may also comprise comparing the frequently occurring reference with each of the identifiers from the plurality of electronic resources. The operations may further include determining that there is a substantial similarity between the frequently occurring reference and a first identifier. The operations may further include transmitting the electronic resource identified by the first identifier.

In some aspects, the disclosure relates to a computer-implemented method comprising: receiving at least one a reference from at least one an electronic repository. The method may also comprise determining a frequently occurring reference from the at least one reference, the frequently occurring reference including a reference with an occurrence count of higher than one. The method may also comprise receiving a plurality of electronic resources, each electronic resource including an identifier identifying the electronic resource. The method may also comprise comparing the frequently occurring reference with each of the identifiers from the plurality of electronic resources. The method may also comprise determining that there is a substantial similarity between the frequently occurring reference and a first identifier. The method may also comprise transmitting the electronic resource identified by the first identifier.

In certain aspects, the disclosure relates to a non-transitory computer storage medium having a computer program stored thereon, the program comprising instructions that when executed by one or more computing devices cause the one or more computing devices to generate an interface for inferring an electronic resource, the interface configured to: receive at least one a reference from at least one an electronic repository. The interface may also be configured to determine a frequently occurring reference from the at least one reference, the frequently occurring reference including a reference with an occurrence count of higher than one. The interface may also be configured to receive a plurality of electronic resources, each electronic resource including an identifier identifying the electronic resource. The interface may also be configured to compare the frequently occurring reference with each of the identifiers from the plurality of electronic resources. The interface may also be configured to determine that there is a substantial similarity between the frequently occurring reference and a first identifier. The interface may also be configured to transmit the electronic resource identified by the first identifier.

The system, the non-transitory computer storage media, the method, and/or the interface may include the following in various embodiments.

In some embodiments, the at least one reference includes at least one of: a text, an image, or a sound. The text may include at least one of: a word, a phrase, a letter, a symbol, a digit, or a character. In further embodiments, the at least one reference includes a portion of the at least one electronic repository. The portion of the at least one electronic repository may include at least one of: a character, a letter, a symbol, a digit, a word, a phrase, a pixel, or a digital sound sample. In further embodiments, the at least one reference includes a reference to an electronic resource. In further embodiments, the at least one electronic repository includes the at least one reference. In further embodiments, the at least one electronic repository includes at least one of: an email, a social media record, a file, a data, a metadata, a database management system (DBMS), or a data source. In further embodiments, the at least one electronic repository includes an electronic repository comprising a default reference. The default reference may include a reference assigned by at least one of: a user, a system administrator, or an automatic system. In further embodiments, the at least one electronic repository includes an electronic repository comprising a user selected reference.

In certain embodiments, determining the frequently occurring reference includes traversing the at least one electronic repository and counting occurrences of each of the at least one reference. In further embodiments, determining the frequently occurring reference includes utilizing a frequency distribution comprising an occurrence count of each of the at least one reference. The frequency distribution may include a frequency distribution arranged to account for a weight of each of the at least one reference. In further embodiments, determining the frequently occurring reference includes utilizing at least one of: a tree, a graph, a list, or a data structure comprising an occurrence count of each of the at least one reference. In further embodiments, the frequently occurring reference includes one or more frequently occurring references. In further embodiments, the frequently occurring reference includes at least one of: a reference with the highest number of occurrences, a reference with a second highest number of occurrences, a reference with a third highest number of occurrences, a reference with a fourth highest number of occurrences, a reference with a fifth highest number of occurrences, or a reference with a threshold number of occurrences.

In some embodiments, each of the plurality of electronic resources includes at least one of: an interactive object, a site, an electronic file, an electronic repository, a data structure, an electronic object, or a data. In further embodiments, each of the plurality of electronic resources includes at least one of: a digital image, a digital video, a digital sound, a digital text document, or a computer file. In further embodiments, the plurality of electronic resources includes a plurality of electronic resources stored in at least one of: a database, a table, an object, a data structure, a repository, or a file system. In further embodiments, the identifier includes one or more identifiers.

In certain embodiments, determining that there is the substantial similarity between the frequently occurring reference and the first identifier includes determining a match between the frequently occurring reference and the first identifier. In further embodiments, determining that there is the substantial similarity between the frequently occurring reference and the first identifier includes determining a match between at least one portion of the frequently occurring reference and at least one portion of the first identifier. In further embodiments, determining that there is the substantial similarity between the frequently occurring reference and the first identifier includes determining a match between at least one character of the frequently occurring reference and at least one character of the first identifier. In further embodiments, determining that there is the substantial similarity between the frequently occurring reference and the first identifier includes determining a match between all but one portion of the frequently occurring reference and all but one portion of the first identifier. In further embodiments, determining that there is the substantial similarity between the frequently occurring reference and the first identifier includes determining a match between all but one character of the frequently occurring reference and all but one character of the first identifier. In further embodiments, determining that there is the substantial similarity between the frequently occurring reference and the first identifier includes determining a match between all but two portions of the frequently occurring reference and all but two portions of the first identifier. In further embodiments, determining that there is the substantial similarity between the frequently occurring reference and the first identifier includes determining a match between all but two characters of the frequently occurring reference and all but two characters of the first identifier. In further embodiments, determining that there is the substantial similarity between the frequently occurring reference and the first identifier includes determining a match between all but a threshold number of portions of the frequently occurring reference and all but a threshold number of portions of the first identifier. In further embodiments, determining that there is the substantial similarity between the frequently occurring reference and the first identifier includes determining a match between all but a threshold number of characters of the frequently occurring reference and all but a threshold number of characters of the first identifier. In further embodiments, determining that there is the substantial similarity between the frequently occurring reference and the first identifier includes determining a match between a foremost portion of the frequently occurring reference and a foremost portion of the first identifier. In further embodiments, determining that there is the substantial similarity between the frequently occurring reference and the first identifier includes determining a match between a foremost character of the frequently occurring reference and a foremost character of the first identifier. In further embodiments, determining that there is the substantial similarity between the frequently occurring reference and the first identifier includes adjusting a strictness of the comparison. The strictness of the comparison my include a strictness of the comparison assigned by at least one of: a user, a system administrator, or an automatic system. In further embodiments, determining that there is the substantial similarity between the frequently occurring reference and the first identifier includes utilizing at least one of: a threshold for a minimum or a threshold for a maximum number of matches between the frequently occurring reference and the first identifier.

In some embodiments, transmitting the electronic resource identified by the first identifier includes transmitting the electronic resource identified by the first identifier to at least one of: an application, a process, or a system that can utilize the electronic resource identified by the first identifier. The at least one of an application, a process, or a system that can utilize the electronic resource identified by the first identifier may include at least one of: a generator, a media streaming service, a news provider, a content provider, a web store, an operating system, or a media player.

In some aspects, the system, the non-transitory computer storage media, the method, and/or the interface further comprise: converting an image of the at least one reference into a text describing the image, wherein the at least one reference comprising the image. In some embodiments, the image includes at least one of: a raster graphic, a bitmap, or a vector graphic. In further embodiments, the text describing the image includes a text comprising an information encoded in the image. In further embodiments, converting the image of the at least one reference into the text describing the image includes identifying at least one of: an object, or a person in the image. Identifying at least one of the object, or the person in the image may include comparing a region of pixels from the image with a region of pixels from a plurality of known images. In further embodiments, converting the image of the at least one reference into the text describing the image includes at least one of: an optical character recognition (OCR), a facial recognition, an object recognition, or a person recognition.

In some aspects, the system, the non-transitory computer storage media, the method, and/or the interface further comprise: converting a sound of the at least one reference into a text describing the sound, wherein the at least one reference comprising the sound. In some embodiments, the sound includes a digitally sampled sound. In further embodiments, the text describing the sound includes a text comprising an information encoded in the sound. In further embodiments, converting the sound of the at least one reference into the text describing the sound includes identifying at least one of: a speech, or a pattern in the sound. Identifying at least one of the speech, or the pattern in the sound may include comparing at least one digital sample value from the sound with at least one digital sample value from a plurality of known sounds. In further embodiments, converting the sound of the at least one reference into the text describing the sound includes at least one of: an operating system's sound recognition, a sound recognition application programming interface (API), a sound recognition application, or a sound recognition engine. In further embodiments, converting the sound of the at least one reference into the text describing the sound includes at least one of: a keyword spotting, or a full speech recognition.

In certain aspects, the system, the non-transitory computer storage media, the method, and/or the interface further comprise: converting the frequently occurring reference into a semantically indicative reference. In some embodiments, converting the frequently occurring reference into the semantically indicative reference includes finding the semantically indicative reference in a plurality of semantically indicative references, the plurality of semantically indicative references comprising at least one reference each associated with a semantically indicative reference.

In some aspects, the system, the non-transitory computer storage media, the method, and/or the interface further comprise: comparing the semantically indicative reference with each of the identifiers from the plurality of electronic resources, and determining that there is a substantial similarity between the semantically indicative reference and a first identifier.

In some aspects, the disclosure relates to a system for constructing a data management instruction. The system may operate on one or more computing devices. In some embodiments, the system comprises: a plurality of collections of database management system (DBMS) instruction portions, each collection including one or more DBMS instruction portions. The system may also comprise a generator configured to generate an interactive object associated with a DBMS instruction portion of a first collection. The system may also comprise a user interaction unit configured to render the interactive object in a graphical user interface and receive a user selection of the interactive object. The system may also comprise an assembler configured to assemble a first portion of a new DBMS instruction using the DBMS instruction portion of the first collection associated with the interactive object.

In certain embodiments, each DBMS instruction portion includes at least one of: a command, a keyword, an instruction, an operator, a variable, a value, an object, a function, or a component of a DBMS instruction. In further embodiments, each collection of DBMS instruction portions includes a collection of DBMS instruction portions stored in at least one of: a table, a database, a memory structure, a data structure, a storage structure, a file, or a repository. In further embodiments, each collection of DBMS instruction portions corresponds to a different DBMS instruction portion of the new DBMS instruction.

In some embodiments, the interactive object includes one or more interactive objects each associated with a different DBMS instruction portion of the first collection. In further embodiments, the interactive object includes a representation of an object from a user's experience. The object from the user's experience may include a physical object familiar to the user. The object from the user's experience may include a physical object which the user knows how to use. The object from the user's experience may include a computer generated object familiar to the user. The object from the user's experience may include a computer generated object which the user knows how to use. The object from the user's experience may include at least one of: a building, an infrastructure object, a transportation object, an apparatus, an object of nature, or a stellar object. The object from the user's experience may include at least one of: a still object, or a mobile object.

In certain embodiments, generating the interactive object associated with the DBMS instruction portion of the first collection includes utilizing an interactive object definition. The interactive object definition may include at least one of: a shape, a color, a data, a metadata, an attribute, a parameter, a field, or a feature. The interactive object definition may include at least one of: a three dimensional graphic, a two dimensional graphic, a voxel graphic, a vector graphic, a raster graphic, or a bitmap. The interactive object definition may include a definition of a surface of the interactive object. The definition of the surface of the interactive object includes at least one of: a polygonal model, a subdivision surface, a curve model, a digital sculpture, a level set, or a particle system. The interactive object definition may include a definition of a volume of the interactive object. The interactive object definition may include an interactive object definition created using at least one of: a three dimensional modeling tool, a vectorizing, a programming language's graphic capability, a specialized program, or an application programming interface.

In some embodiments, generating the interactive object associated with the DBMS instruction portion of the first collection includes at least one of: a resizing, a rotating, a positioning, a transforming, or an animating the interactive object. In further embodiments, generating the interactive object associated with the DBMS instruction portion of the first collection includes generating a scene, the scene comprising the interactive object. The scene may include at least one of: a three dimensional scene, a two dimensional scene, a three dimensional space, a two dimensional space, a three dimensional environment, a two dimensional environment, a three dimensional setting, a two dimensional setting, a three dimensional site, or a two dimensional site. In further embodiments, generating the interactive object associated with the DBMS instruction portion of the first collection includes utilizing at least one of: a graphics engine, a simulation engine, a computer aided design (CAD) application, a computer aided manufacturing (CAM) application, or a game engine. The graphics engine, the simulation engine, the computer aided design (CAD) application, the computer aided manufacturing (CAM) application, or the game engine may include at least one of: a physics engine, a collision detection, an event detection, a networking capability, a memory management, a scene graph, a rendering capability, or a scripting capability. In further embodiments, generating the interactive object associated with the DBMS instruction portion of the first collection includes utilizing a repository for storing the association between the interactive object and the DBMS instruction portion of the first collection. The repository for storing the association between the interactive object and the DBMS instruction portion of the first collection may include a table, a database, a memory structure, a data structure, a storage structure, or a file. In further embodiments, generating the interactive object associated with the DBMS instruction portion of the first collection includes storing the association between the interactive object and the DBMS instruction portion of the first collection in at least one of: a field, a member, an attribute, or a variable of the interactive object. In further embodiments, the first collection of DBMS instruction portions includes choices of DBMS instruction portions for assembling a first DBMS instruction portion of the new DBMS instruction.

In certain embodiments, rendering the interactive object in a graphical user interface includes processing the interactive object for portrayal on a visual portrayal device. The visual portrayal device may include at least one of: a display, a projector, or a glasses. In further embodiments, the user selection of the interactive object includes at least one of: a mouse click, a button press, a key press, a touchscreen tap, a touchscreen swipe, or a touchscreen drag. In further embodiments, the user selection of the interactive object includes at least one of: an user interaction, or an user controllable avatar's interaction with the interactive object. In further embodiments, the user selection of the interactive object includes a simulation of an interaction with a physical object. The interaction with the physical object may include at least one of: a contact with the physical object, a collision with the physical object, a detection of the physical object, an observation of the physical object, or a movement of the physical object.

In some embodiments, assembling the first portion of the new DBMS instruction using the DBMS instruction portion of the first collection associated with the interactive object includes storing the DBMS instruction portion of the first collection associated with the interactive object into a repository, the repository comprising assembled portions of the new DBMS instruction. Storing the DBMS instruction portion of the first collection associated with the interactive object into the repository may include storing the DBMS instruction portion of the first collection associated with the interactive object in a first position of the repository. In further embodiments, assembling the first portion of the new DBMS instruction using the DBMS instruction portion of the first collection associated with the interactive object includes appending the DBMS instruction portion of the first collection associated with the interactive object to a string of characters, the string of characters comprising assembled portions of the new DBMS instruction. In further embodiments, the new DBMS instruction includes at least one of: a structured query language (SQL) statement, a DBMS command, a computer command, a function, an instruction, or an instruction set.

In certain aspects, the user interaction unit may be further configured to: render an user controllable avatar configured to select the interactive object.

In some aspects, the disclosure relates to a system comprising: one or more processors; and a computer-readable medium coupled to the one or more processors, the computer-readable medium having instructions stored thereon, which, when executed by the one or more processors, cause the one or more processors to perform operations comprising: receiving a plurality of collections of database management system (DBMS) instruction portions, each collection including one or more DBMS instruction portions. The operations may also comprise generating an interactive object associated with a DBMS instruction portion of a first collection. The operations may also comprise rendering the interactive object in a graphical user interface through which a user can interact with the interactive object. The operations may also comprise receiving a user selection of the interactive object. The operations may also comprise assembling a first portion of a new DBMS instruction using the DBMS instruction portion of the first collection associated with the interactive object.

In some aspects, the disclosure relates to a non-transitory computer storage medium having a computer program stored thereon, the program comprising instructions that when executed by one or more computing devices cause the one or more computing devices to perform operations comprising: receiving a plurality of collections of database management system (DBMS) instruction portions, each collection including one or more DBMS instruction portions. The operations may also comprise generating an interactive object associated with a DBMS instruction portion of a first collection. The operations may also comprise rendering the interactive object in a graphical user interface through which a user can interact with the interactive object. The operations may also comprise receiving a user selection of the interactive object. The operations may also comprise assembling a first portion of a new DBMS instruction using the DBMS instruction portion of the first collection associated with the interactive object.

In certain aspects, the disclosure relates to a computer-implemented method comprising: receiving a plurality of collections of database management system (DBMS) instruction portions, each collection including one or more DBMS instruction portions. The method may also comprise generating an interactive object associated with a DBMS instruction portion of a first collection. The method may also comprise rendering the interactive object in a graphical user interface through which a user can interact with the interactive object. The method may also comprise receiving a user selection of the interactive object. The method may also comprise assembling a first portion of a new DBMS instruction using the DBMS instruction portion of the first collection associated with the interactive object.

In some aspects, the disclosure relates to a non-transitory computer storage medium having a computer program stored thereon, the program comprising instructions that when executed by one or more computing devices cause the one or more computing devices to generate an interface for constructing a data management instruction, the interface configured to: receive a plurality of collections of database management system (DBMS) instruction portions, each collection including one or more DBMS instruction portions. The interface may also be configured to generate an interactive object associated with a DBMS instruction portion of a first collection. The interface may also be configured to render the interactive object in a graphical user interface through which a user can interact with the interactive object. The interface may also be configured to receive a user selection of the interactive object. The interface may also be configured to assemble a first portion of a new DBMS instruction using the DBMS instruction portion of the first collection associated with the interactive object.

The system, the non-transitory computer storage media, the method, and/or the interface may include the following in various embodiments.

In some embodiments, each DBMS instruction portion includes at least one of: a command, a keyword, an instruction, an operator, a variable, a value, an object, a function, or a component of a DBMS instruction. In further embodiments, each collection of DBMS instruction portions includes a collection of DBMS instruction portions stored in at least one of: a table, a database, a memory structure, a data structure, a storage structure, a file, or a repository. In further embodiments, each collection of DBMS instruction portions corresponds to a different DBMS instruction portion of the new DBMS instruction.

In certain embodiments, the interactive object includes one or more interactive objects each associated with a different DBMS instruction portion of the first collection. In further embodiments, the interactive object includes a representation of an object from a user's experience. The object from the user's experience may include a physical object familiar to the user. The object from the user's experience may include a physical object which the user knows how to use. The object from the user's experience may include a computer generated object familiar to the user. The object from the user's experience may include a computer generated object which the user knows how to use. The object from the user's experience may include at least one of: a building, an infrastructure object, a transportation object, an apparatus, an object of nature, or a stellar object. The object from the user's experience may include at least one of: a still object, or a mobile object.

In some embodiments, generating the interactive object associated with the DBMS instruction portion of the first collection includes utilizing an interactive object definition. The interactive object definition may include at least one of: a shape, a color, a data, a metadata, an attribute, a parameter, a field, or a feature. The interactive object definition may include at least one of: a three dimensional graphic, a two dimensional graphic, a voxel graphic, a vector graphic, a raster graphic, or a bitmap. The interactive object definition may include a definition of a surface of the interactive object. The definition of the surface of the interactive object includes at least one of: a polygonal model, a subdivision surface, a curve model, a digital sculpture, a level set, or a particle system. The interactive object definition may include a definition of a volume of the interactive object. The interactive object definition may include an interactive object definition created using at least one of: a three dimensional modeling tool, a vectorizing, a programming language's graphic capability, a specialized program, or an application programming interface.

In certain embodiments, generating the interactive object associated with the DBMS instruction portion of the first collection includes at least one of: a resizing, a rotating, a positioning, a transforming, or an animating the interactive object. In further embodiments, generating the interactive object associated with the DBMS instruction portion of the first collection includes generating a scene, the scene comprising the interactive object. The scene may include at least one of: a three dimensional scene, a two dimensional scene, a three dimensional space, a two dimensional space, a three dimensional environment, a two dimensional environment, a three dimensional setting, a two dimensional setting, a three dimensional site, or a two dimensional site. In further embodiments, generating the interactive object associated with the DBMS instruction portion of the first collection includes utilizing at least one of: a graphics engine, a simulation engine, a computer aided design (CAD) application, a computer aided manufacturing (CAM) application, or a game engine. The graphics engine, the simulation engine, the computer aided design (CAD) application, the computer aided manufacturing (CAM) application, or the game engine may include at least one of: a physics engine, a collision detection, an event detection, a networking capability, a memory management, a scene graph, a rendering capability, or a scripting capability. In further embodiments, generating the interactive object associated with the DBMS instruction portion of the first collection includes utilizing a repository for storing the association between the interactive object and the DBMS instruction portion of the first collection. The repository for storing the association between the interactive object and the DBMS instruction portion of the first collection may include a table, a database, a memory structure, a data structure, a storage structure, or a file. In further embodiments, generating the interactive object associated with the DBMS instruction portion of the first collection includes storing the association between the interactive object and the DBMS instruction portion of the first collection in at least one of: a field, a member, an attribute, or a variable of the interactive object. In further embodiments, the first collection of DBMS instruction portions includes choices of DBMS instruction portions for assembling a first DBMS instruction portion of the new DBMS instruction.

In some embodiments, rendering the interactive object in a graphical user interface includes processing the interactive object for portrayal on a visual portrayal device. The visual portrayal device includes at least one of: a display, a projector, or a glasses. In further embodiments, the user selection of the interactive object includes at least one of: a mouse click, a button press, a key press, a touchscreen tap, a touchscreen swipe, or a touchscreen drag. In further embodiments, the user selection of the interactive object includes at least one of: an user interaction, or an user controllable avatar's interaction with the interactive object. In further embodiments, the user selection of the interactive object includes a simulation of an interaction with a physical object. The interaction with the physical object may include at least one of: a contact with the physical object, a collision with the physical object, a detection of the physical object, an observation of the physical object, or a movement of the physical object.

In certain embodiments, assembling the first portion of the new DBMS instruction using the DBMS instruction portion of the first collection associated with the interactive object includes storing the DBMS instruction portion of the first collection associated with the interactive object into a repository, the repository comprising assembled portions of the new DBMS instruction. The DBMS instruction portion of the first collection associated with the interactive object into the repository may include storing the DBMS instruction portion of the first collection associated with the interactive object in a first position of the repository. In further embodiments, assembling the first portion of the new DBMS instruction using the DBMS instruction portion of the first collection associated with the interactive object includes appending the DBMS instruction portion of the first collection associated with the interactive object to a string of characters, the string of characters comprising assembled portions of the new DBMS instruction. In further embodiments, the new DBMS instruction includes at least one of: a structured query language (SQL) statement, a DBMS command, a computer command, a function, an instruction, or an instruction set.

In some aspects, the system, the non-transitory computer storage media, the method, and/or the interface further comprise: rendering an user controllable avatar configured to select the interactive object.

Other features and advantages of the disclosure will become apparent from the following description, including the claims and drawings.

Figure 1:
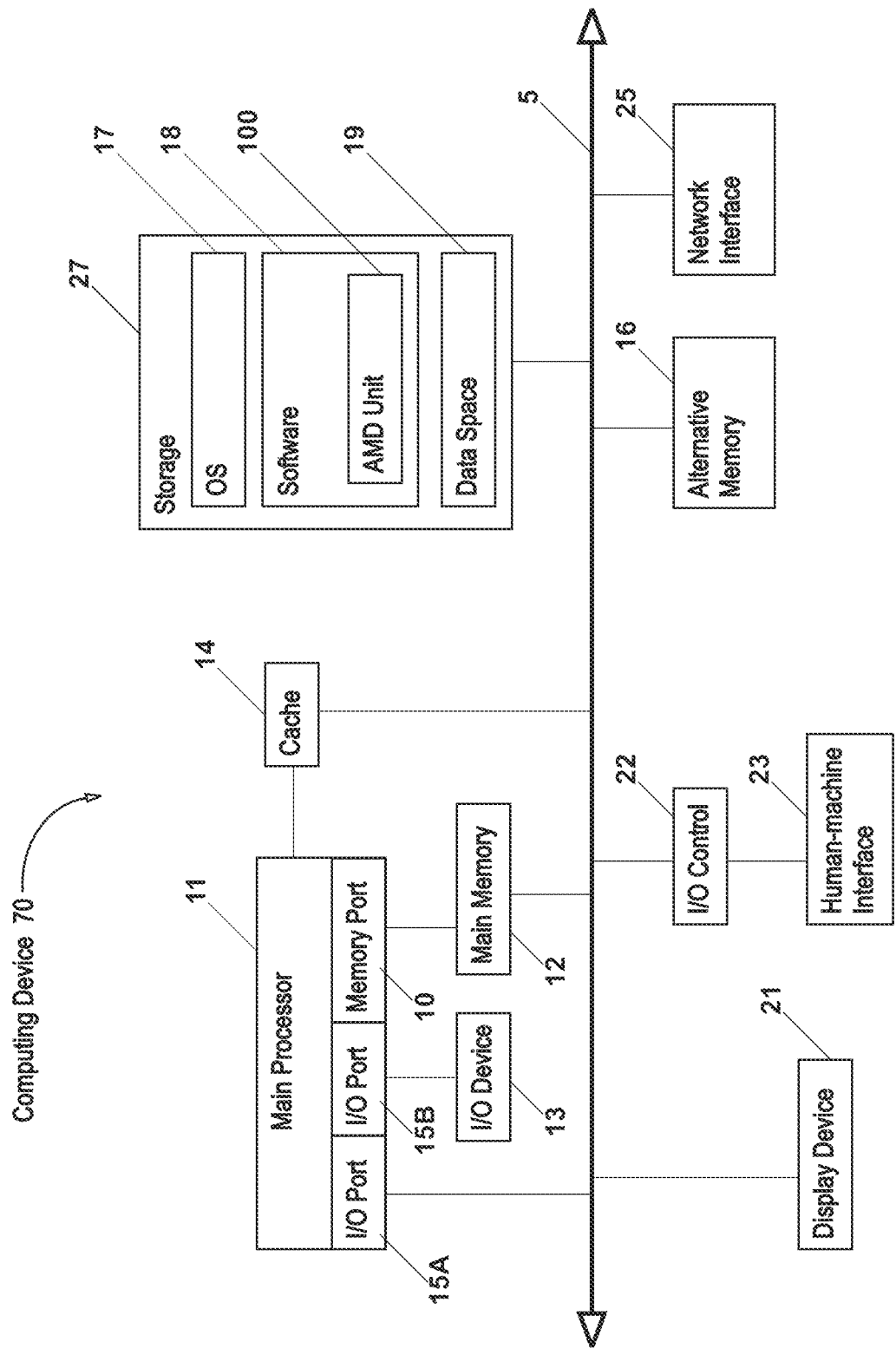
FIG. 1 illustrates an embodiment of a system for associative management of data in an environment or architecture on which the features of the disclosure may be implemented.

Like reference numerals in different figures indicate like elements. Horizontal or vertical " . . . " and other such indicia may be used to indicate additional instances of the same type of element n, m, n+m, n−m or other such indicia may represent integers or other sequential numbers that follow the sequence where they are indicated. Any of these or other such indicia may be used interchangeably according to the context and space available. The drawings are not necessarily to scale, with emphasis instead being placed upon illustrating the embodiments, principles and concepts of the disclosure.

DETAILED DESCRIPTION

The disclosed systems, methods, apparatuses, and/or interfaces for associative management of data include features, functionalities, embodiments, and/or applications that enable a user to manage data, metadata, and/or other elements of a DBMS through interacting with objects from user's experience or with which user can relate. The disclosed systems, methods, apparatuses, and/or interfaces for associative management of data, any of their elements, any of their embodiments, or a combination thereof may generally be referred to as associative management of data (AMD), AMD Unit 100, AMD application, or as other similar name or reference.

Referring now to FIG. 1, an embodiment is illustrated of Computing Device 70 that may provide the structure on which the embodiments of the disclosure may be practiced. The disclosed systems, methods, apparatuses, and/or interfaces include functions, logic, hardware, software, or a combination thereof that may be implemented or executed on any type or form of computing device such as a computer, a mobile device, a computing capable telephone, a server, a gaming device, a television device, a GPS receiver, a media player, an embedded device, a supercomputer, or any other type or form of a computing device capable of performing the operations described herein.

Computing Device 70 comprises hardware, software, or a combination of hardware and software. Computing device 70 includes a central processing unit, which may also be referred to as main processor 11. Main processor 11 includes one or more memory ports 10 and/or one or more input-output ports, also referred to as I/O ports 15, such as I/O ports 15A and 15B. Main processor 11 may be special or general purpose. Computing Device 70 may further include a memory, also referred to as main memory 12, which may be connected to the remainder of the components of Computing Device 70 via bus 5. Memory 12 may be connected to main processor 11 via memory port 10. Computing Device 70 may also include display device 21 such as a monitor, projector, glasses, and/or other display device. Computing Device 70 may also include human-machine interface 23 such as a keyboard, a pointing device, a mouse, a touchscreen, a joystick, and/or other input device that may be connected with the remainder of the Computing Device 70 components via I/O control 22. In some implementations, human-machine interface 23 may be directly connected with bus 5 or specific components of Computing Device 70. Computing Device 70 may include additional optional elements, such as one or more input/output devices 13. Main processor 11 may comprise or be interfaced with cache memory 14. Storage 27 may comprise memory, which provides an operating system, also referred to as OS 17, additional software 18 operating on OS 17, and/or data space 19 in which additional data or information may be stored. Alternative memory device 16 may be connected to the remaining components of Computing Device 70 via bus 5. Network interface 25 may also be connected with bus 5 and be used to communicate with external computing devices via an external network. Some or all described elements of Computing Device 70 may be directly or operatively connected with each other or with other additional elements as depicted in FIG. 1 or using any other connection means known in art in alternate implementations.

Main processor 11 includes any logic circuitry that can respond to and process instructions fetched from main memory unit 12. Main processor 11 may also include any combination of hardware and software for implementing and executing logic functions or algorithms. Main processor 11 may include a single core or a multi core processor. Main processor 11 may comprise any functionality for loading operating system 17 and operating any software 18 thereon. In some embodiments, the central processing unit may be provided by a microprocessing or a processing unit, such as, for example, Snapdragon processors produced by Qualcomm Inc., processors by Intel Corporation of Mountain View, Calif., those manufactured by Motorola Corporation of Schaumburg, Ill.; those manufactured by Transmeta Corporation of Santa Clara, Calif.; the RS/6000 processor, those manufactured by International Business Machines of White Plains, N.Y.; those manufactured by Advanced Micro Devices of Sunnyvale, Calif., or any computing unit for performing similar functions. Computing Device 70 may be based on any of these processors, or any other processor capable of operating as described herein, whether on a mobile or embedded device, or a more conventional machine.

Memory 12 includes one or more memory chips capable of storing data and allowing any storage location to be accessed by microprocessor 11, such as Static random access memory (SRAM), Flash memory, Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). Memory 12 may be based on any of the above described memory chips, or any other available memory chips capable of operating as described herein. In some embodiments, main processor 11 may communicate with memory 12 via a system bus 5. In other embodiments, main processor 11 may communicate directly with main memory 12 via a memory port 10.

Main processor 11 may communicate directly with cache memory 14 via a connection means such as a secondary bus which may also sometimes be referred to as a backside bus. In some embodiments, main processor 11 may communicate with cache memory 14 using the system bus 5. Memory 12, I/O device 13, and/or other components of Computing Device 70 may be connected with any other components via similar secondary bus, depending on design. Cache memory 14 however may typically have a faster response time than main memory 12 and can include a type of memory which may be considered faster than main memory 12, such as for example SRAM, BSRAM, or EDRAM. Cache memory includes any structure such as multilevel caches, for example. In some embodiments, main processor 11 may communicate with one or more I/O devices 13 via a system bus 5. Various busses may be used to connect main processor 11 to any of the I/O devices 13, such as a VESA VL bus, an ISA bus, an EISA bus, a MicroChannel Architecture (MCA) bus, a PCI bus, a PCI-X bus, a PCI-Express bus, or a NuBus. In some embodiments, main processor 11 may communicate directly with I/O device 13 via HyperTransport, Rapid I/O, or InfiniBand. In further embodiments, local busses and direct communication may be mixed. For example, main processor 11 may communicate with an I/O device 13 using a local interconnect bus while communicating with another I/O device 13 directly. Similar configurations may be used for any other components described herein.

Computing Device 70 may further include alternative memory such as a SD memory slot, a USB memory stick, an optical drive such as a CD-ROM drive, a CD-R/RW drive, a DVD-ROM drive or a BlueRay disc, a hard-drive, and/or any other device comprising non-volatile memory suitable for storing data or installing software and programs. Computing device 70 may further include a storage device 27 comprising any type or form of non-volatile memory for storing an operating system (OS) such as any type or form of Windows OS, Mac OS, Unix OS, Linux OS, Android OS, iPhone OS, mobile version of Windows OS, an embedded OS, or any other OS that may operate on Computing Device 70. Computing Device 70 may also include software 18, and/or data space 19 for storing additional data or information. In some embodiments, alternative memory 16 may be used as or similar to storage device 27. Additionally, OS 17 and/or software 18 may be run from a bootable medium, such as for example, a flash drive, a micro SD card, a bootable CD for GNU/Linux that is available as a GNU/Linux distribution from knoppix.net, and/or other bootable medium.

Software 18 (also referred to as program, computer program, software application, application, script, code, etc.) comprises instructions that can provide functionality when executed by processor 11. Software 18 may be implemented in a high-level procedural or object-oriented programming language, or in a low-level machine or assembly language. Any language used may be a compiled, interpreted, or otherwise translated language. Software 18 may be deployed in any form including as a stand-alone program or as a module, component, subroutine, or other unit suitable for use in a computing system. Software 18 or computer program does not necessarily correspond to a file in a file system. A program may be stored in a portion of a file that may hold other programs or data, in a single file dedicated to the program, or in multiple files (i.e. files that may store one or more modules, sub programs, or portions of code, etc.). Software 18 may be deployed to be executed on one computer or on multiple computers (i.e. cloud, distributed, or parallel computing, etc.), or at one site or distributed across multiple sites interconnected by a communication network.

Network interface 25 may be utilized for interfacing Computing Device 70 with other devices via a communication network through a variety of connections including standard telephone lines, wired or wireless connections, LAN or WAN links (i.e. 802.11, T1, T3, 56 kb, X.25, etc.), broadband connections (i.e. ISDN, Frame Relay, ATM, etc.), or a combination thereof. Examples of communication networks include the Internet, an intranet, an extranet, a local area network (LAN), a wide area network (WAN), a personal area network (PAN), a home area network (HAN), a campus area network (CAN), a metropolitan area network (MAN), a global area network (GAN), a storage area network (SAN), virtual network, a virtual private network (VPN), Bluetooth network, a wireless network, a wireless LAN, a radio network, a HomePNA, a power line communication network, a G.hn network, an optical fiber network, an Ethernet network, an active networking network, a client-server network, a peer-to-peer network, a bus network, a star network, a ring network, a mesh network, a star-bus network, a tree network, a hierarchical topology network, and/or other networks known in art. Network interface 25 comprises Bluetooth or WiFi capability. Network interface 25 may comprise a built-in network adapter, network interface card, PCMCIA network card, card bus network adapter, wireless network adapter, Bluetooth adapter, USB network adapter, modem or any other device suitable for interfacing Computing Device 70 with any type of network capable of communication and/or operations described herein.

Still referring to FIG. 1, I/O devices 13 may be present in various shapes or forms in Computing Device 70. Examples of an input device include a joystick, a keyboard, a mouse, a trackpad, a trackpoint, a touchscreen, a trackball, a microphone, a drawing tablet, a glove, a tactile input device, a video camera, and/or other input device. Examples of an output device include a video display, a touchscreen, a projector, a glasses, a speaker, a tactile output device, and/or other output device. I/O devices 13 may be controlled by I/O control 22 in some implementations. I/O control 22 may control one or more I/O devices such as human-machine interface 23 (i.e. keyboard, pointing device, touchscreen, joystick, mouse, optical pen, etc.). I/O control 22 may enable any type or form of a detecting device such as a video camera or microphone to be interfaced with other components of Computing Device 70. Furthermore, I/O device 13 may also provide storage such as or similar to storage 27, and/or alternative memory such as or similar to alternative memory 16 in some implementations. In some embodiments, Computing Device 70 may receive handheld USB storage devices such as, for example, USB flash drive line of devices manufactured by Twintech Industry, Inc. of Los Alamitos, Calif.

Elements such as a graphical user interface, an acoustical output interface, a tactile output interface, any device driver (i.e. audio, video, or other driver), and/or other output interface or element may be utilized to process output from Computing Device 70 elements for conveyance on Display 21 or other output device. In some aspects, Display 21 or other output device itself may include the functionality for processing such output from other Computing Device 70 elements. Also, elements such as a keyboard listener, a keypad listener, a touchscreen listener, a mouse listener, a trackball listener, any device driver (i.e. audio, video, keyboard, mouse, touchscreen, or other driver), a speech recognizer, a video interpreter, and/or other input interface or element may be utilized to process input from Human-machine Interface 23 or other input device for use by Computing Device 70 elements. In some aspects, Human-machine Interface 23 or other input device itself may include the functionality for processing such input for use by other Computing Device 70 elements.

Computing Device 70 may comprise or be connected to multiple display devices 21. Display devices 21 may each be of the same or different type or form. Computing Device 70 and/or its elements comprise any type or form of suitable hardware, software, or a combination thereof to support, enable, or provide for the connection and use of multiple display devices 21 or multiple detection devices. In one example, Computing Device 70 includes any type or form of video adapter, video card, driver, and/or library to interface, communicate, connect, or otherwise use display devices 21. In some aspects, a video adapter includes multiple connectors to interface to multiple display devices 21. In other aspects, Computing Device 70 includes multiple video adapters, with each video adapter connected to one or more display devices 21. In some embodiments, any portion of Computing Device's 70 operating system may be configured for using multiple displays 21. In other embodiments, one or more display devices 21 may be provided by one or more other computing devices such as remote computing devices connected to Computing Device 70 via a network. In some aspects, main processor 11 may use an Advanced Graphics Port (AGP) to communicate with one or more display devices 21.

In some embodiments, I/O device 13 may be a bridge between system bus 5 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, and/or other bus.

Computing Device 70 may operate under the control of an operating system, which may support Computing Device's 70 basic functions, interface with and manage hardware resources, interface with and manage peripherals, provide common services for software applications, schedule tasks, and/or perform other functionalities. A modern operating system may enable features and functionalities such as a high resolution display, graphical user interface (GUI), touchscreen, cellular network connectivity (i.e. mobile operating system, etc.), Bluetooth connectivity, WiFi connectivity, global positioning system (GPS) capabilities, mobile navigation, microphone, speaker, still picture camera, video camera, voice recorder, speech recognition, music player, video player, near field communication, personal digital assistant (PDA), and/or other features, functionalities, and/or applications. For example, Computing Device 70 may use any conventional operating system, any embedded operating system, any real-time operating system, any open source operating system, any video gaming operating system, any proprietary operating system, any online operating system, any operating system for mobile computing devices, or any other operating system capable of running on Computing Device 70 and performing operations described herein. Typical operating systems include: Windows XP, Windows 7, Windows 8, etc. manufactured by Microsoft Corporation of Redmond, Wash.; Mac OS, iPhone OS, etc. manufactured by Apple Computer of Cupertino, Calif.; OS/2 manufactured by International Business Machines of Armonk, N.Y.; Linux, a freely-available operating system distributed by Caldera Corp. of Salt Lake City, Utah; or any type or form of a Unix operating system, among others. Similarly, any operating systems such as the ones for Android devices can be utilized, just as those of the Microsoft or Apple.

Computing Device 70 may be implemented as or be a part of various different model architectures such as web services, distributed computing, grid computing, cloud computing, and/or other architectures or environments. For example, in addition to the traditional desktop, server, or mobile operating system architectures, a cloud-based operating system may be utilized to provide the structure on which embodiments of the disclosure may be implemented. Other aspects of Computing Device 70 may also be implemented in the cloud without departing from the spirit and scope of the disclosure. For example, memory, storage, processing elements, and/or other elements may be hosted in the cloud. In some embodiments, Computing Device 70 may be implemented on multiple devices. For example, a portion of Computing Device 70 may be implemented on a mobile device and another portion may be implemented on wearable electronics.

Computing Device 70 may be, or include, any mobile device, a mobile phone, a smartphone (i.e. iPhone, Windows phone, Blackberry, Android phone, etc.), a tablet, a personal digital assistant (PDA), wearable electronics, implantable electronics, or another mobile device capable of implementing the functionalities described herein. In other embodiments, Computing Device 70 may be, or include, an embedded device, which can be any device or system with a dedicated function within another device or system. Embedded systems may range from the simplest ones dedicated to one task with no user interface to complex ones with advanced user interface that may resemble modern desktop computer systems. Simple embedded devices may use buttons, light emitting diodes (LEDs), graphic or character LCDs with a simple menu system. More sophisticated devices may use a graphical screen with touch sensing or screen-edge buttons where the meaning of the buttons may change with the screen. Examples of devices comprising an embedded device include a mobile telephone, a personal digital assistant (PDA), a gaming device, a media player, a digital still or video camera, a pager, a television device, a set-top box, a personal navigation device, a global positioning system (GPS) receiver, a portable storage device (i.e. a USB flash drive, etc.), a digital watch, a DVD player, a printer, a microwave oven, a washing machine, a dishwasher, a gateway, a router, a hub, an automobile entertainment system, an automobile navigation system, a refrigerator, a washing machine, a factory automation device, an assembly line device, a factory floor monitoring device, a thermostat, an automobile, a factory controller, a telephone, a network bridge, and/or other devices. An embedded device may operate under control of an operating system for embedded devices such as MicroC/OS-II, QNX, VxWorks, eCos, TinyOS, Windows Embedded, Embedded Linux, and/or other embedded device operating systems.

Computing Device 70 may include any combination of processors, operating systems, input/output devices, and/or other elements consistent with the device's purpose and structure. For example, Computing Device 70 includes a Snapdragon by Qualcomm, Inc., or Tegra processors by nVidia, or any other mobile device processor or a microprocessor for a similar application. Computing Device 70 may be operated under the control of the Android OS, iPhone OS, Palm OS, or any other operating system for a similar purpose. Computing Device 70 may also include a stylus input device as well as a five-way navigator device. In another example, Computing Device 70 includes a Wii video game console released by Nintendo Co. operating an es operating system. I/O devices may include a video camera or an infrared camera for recording or tracking movements of a player or a participant of a Wii video game. Other I/O devices may include a joystick, a keyboard, or an RF wireless remote control device. Similarly, Computing Device 70 may be tailored to any workstation, mobile or desktop computer, laptop or notebook computer, smartphone device or tablet, server, handheld computer, gaming device, embedded device, or any other computer or computing product, or other type or form of computing or telecommunication device that has sufficient processor power and memory capacity to perform the functionalities described herein.

Various implementations of the disclosed systems, methods, apparatuses, and/or interfaces may be realized in digital electronic circuitry, integrated circuitry, specially designed application specific integrated circuits (ASICs), field programmable gate arrays (FPGAs), computer hardware, firmware, software, virtual machines, and/or combinations thereof including their structural, logical, and/or physical equivalents.

The disclosed systems, methods, apparatuses, and/or interfaces may include clients and servers. A client and server are generally remote from each other and typically interact through a communication network. The relationship of a client and server may arise by virtue of computer programs running on the respective computers and having a client-server relationship to each other.

Computing Device 70 may include or be interfaced with a computer program product comprising computer program logic encoded on a computer-readable medium that, when performed in a computing device having a coupling of a memory, a processor, and/or a display, programs the processor to perform the operations disclosed herein. Such arrangements may be typically provided as software, code, and/or data (i.e. data, data structures, etc.) arranged or encoded on a computer-readable medium such as an optical medium (i.e. DVD-ROM, etc.), flash drive, hard disk, or other medium such as firmware or microcode in one or more ROM, RAM, or PROM chips or as an Application Specific Integrated Circuit (ASIC). The software, firmware, or other such configuration can be installed onto a computing device to cause the computing device to perform the operations or functionalities disclosed herein. As used herein, machine-readable medium, computer-readable medium, or other such terms may refer to any computer program product, apparatus, and/or device for providing instructions and/or data to a programmable processor. As such, machine-readable medium includes any medium that may send or receive machine instructions as a machine-readable signal. The term machine-readable signal may refer to any signal used for providing instructions and/or data to a programmable processor. A non-transitory machine-readable medium comprises all machine-readable media except for a transitory, propagating signal. Examples of a machine-readable medium include a volatile and/or non-volatile medium, a removable and/or non-removable medium, a communication medium, a storage medium, and/or other medium. A communication medium, for example, may transmit computer readable instructions and/or data in a modulated data signal such as a carrier wave or other transport technique, and may include any other form of information delivery medium known in art.

The disclosed systems, methods, apparatuses, and/or interfaces may be implemented in a computing system that includes a back end component, a middleware component, a front end component, or any combination of such back end, middleware, or front end components. The components of the system may be interconnected by any form or medium of digital data communication such as, for example, a communication network.

Any of the files shown in the figures or described in the specification may reside in any repository accessible by an embodiment of the disclosed systems, methods, apparatuses, and/or interfaces. In each instance where a specific file or file type is mentioned, other files, file types or formats may be substituted.

Where a reference to a data structure is used herein, it should be understood that any variety of data structures may be used such as, for example, array, list, linked list, doubly linked list, queue, tree, heap, graph, map, grid, matrix, multi-dimensional matrix, table, database, DBMS, file, and/or any other type or form of a data structure including a custom one. A data structure may include one or more fields or data fields that are a part of or associated with the data structure. A field or data field may include a data, an object, a data structure, and/or any other element or a reference/pointer thereto. A data structure may be stored in one or more files or other repositories.

Where a reference to a repository is used herein, it should be understood that a repository may be or include one or more files or file systems, one or more storage locations or structures, one or more storage systems, one or more data structures or objects, one or more memory locations or structures, and/or other storage or data arrangements.

Where a reference to rendering is used herein, it should be understood that rendering includes processing a computer generated scene, site, environment, space, and/or objects for presentation or conveyance on a display or other output device. Rendering may also refer to the actual displaying or conveying of any processed information.

Where a reference to an element coupled to a processor is used herein, it should be understood that the element may operate on the processor. Also, one of ordinary skill in art will understand that an element coupled to another element comprises an element in communication with (i.e. wired or wireless network communication, etc.), connected with, or in any other interactive relationship with another element.

Where a mention of a function, method, routine, subroutine, or other such procedure is used herein, it should be understood that the function, method, routine, subroutine, or other such procedure comprises a call, reference, or pointer to the function, method, routine, subroutine, or other such procedure.

Where a mention of data, object, data structure, item, element, or thing is used herein, it should be understood that the data, object, data structure, item, element, or thing comprises a reference or pointer to the data, object, data structure, item, element, or thing.

The term operating or operation when used casually may refer to processing, executing, or other such actions, and vice versa. Therefore, the terms operating, operation, processing, executing, or other such actions may be used interchangeably herein.

Figure 2:
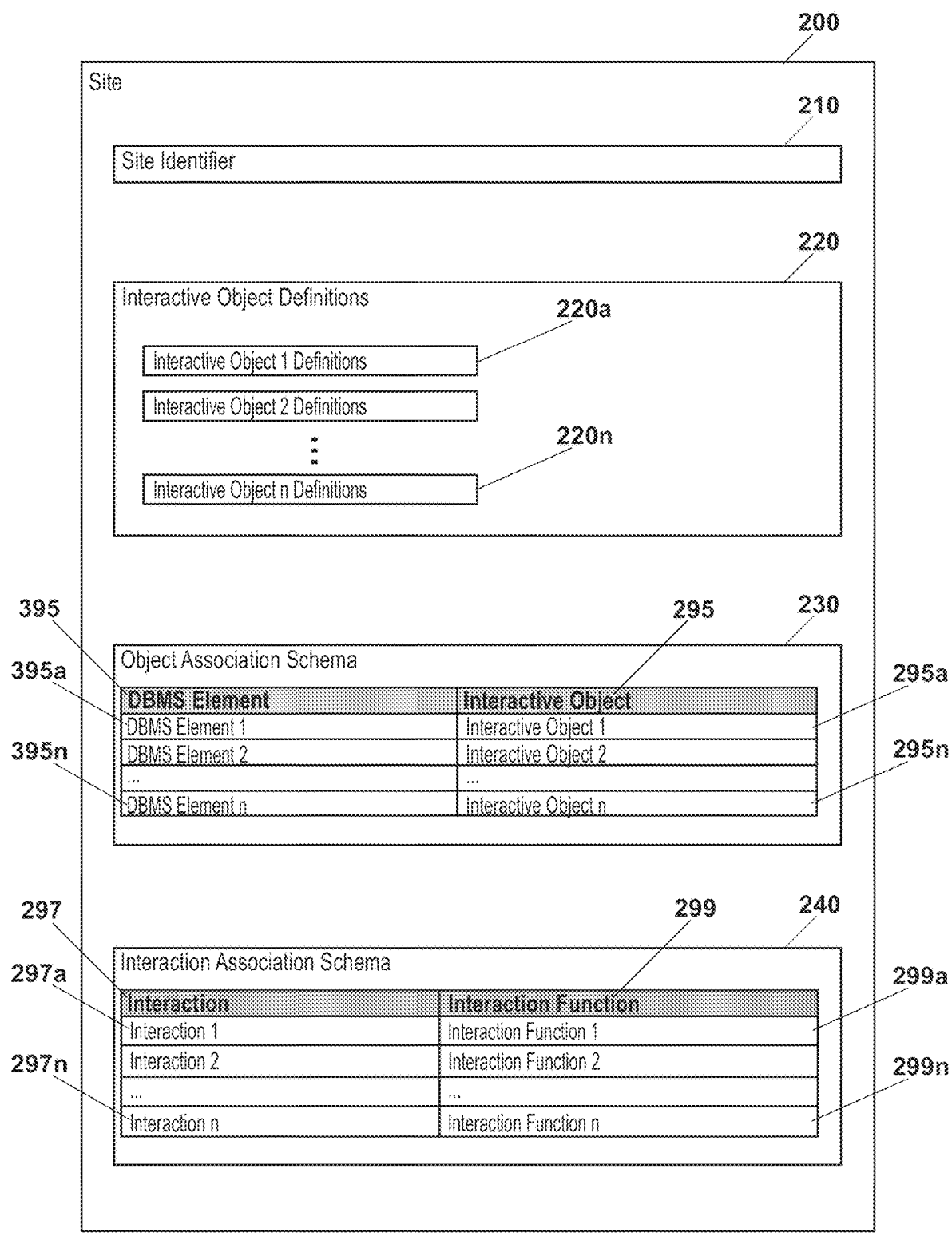
FIG. 2 illustrates an embodiment of Site 200.

Referring to FIG. 2, an embodiment of a Site 200 is illustrated. Site 200 comprises Site Identifier 210, Interactive Object Definitions 220, Object Association Schema 230, and Interaction Association Schema 240. Site 200 may include a file, an object, a data structure, a database, a system, or other data repository or system comprising Site Identifier 210, Interactive Object Definitions 220, Object Association Schema 230, and Interaction Association Schema 240. Other additional elements may be included as needed, or some of the disclosed ones may be excluded, or a combination thereof may be utilized in alternate embodiments. Site 200 may be provided to any of the disclosed elements and/or it may include the functionalities to directly or operatively interface with any of the disclosed elements. For example, Site 200 may be provided as input into Site Generator 110 (later described). Site Generator 110 may read the elements of Site 200 by opening or connecting with the file, object, data structure, database, system, or other data repository or system, and accessing the stored data, fields, objects, and/or other elements. Site Generator 110 may generate Interactive Objects 295 (later described), which Interactive Objects 295 may then be associated with DBMS Elements 395 (later described). In some aspects, Site 200 may be generated as a computer generated scene, space, or environment, which scene, space, or environment comprises Interactive Objects 295 defined in a particular Site 200. Therefore, the terms site, Site 200, scene, environment, space, and/or other such terms may be used interchangeably herein. The scene itself may be an Interactive Object 295 in some implementations. Details of scene operation are described in later text and figures.

Site Identifier 210 comprises the functionality for storing information that may identify a specific Site 200. The information includes textual information, visual information (i.e. digital image, digital video, etc.), sound (i.e. digitally sampled sound, etc.), pointer, reference, and/or other information. For example, Site Identifier 210 including a text "Empire State Building" may identify a Site 200 representing the tallest building in New York City. Interactive Object Definitions 220 comprises the functionality for storing information about Interactive Objects 295. Interactive Object Definitions 220 comprises the functionality for storing information on how to generate Interactive Objects 295. The information includes shape, color, transparency, size, and/or other information. The information may further include any data, metadata, attributes, parameters, fields, features, and/or other information that may be used for generating Interactive Objects 295. Such information, when provided to a generator (i.e. Site Generator 110, etc.), game engine, simulation engine, CAD/CAM engine, graphics engine, or other such system, may enable generation of computer or mathematical representations of Interactive Objects 295. Therefore, Interactive Objects 295, computer generated Interactive Objects 295, and/or other such terms may be used interchangeably herein.

Interactive Object Definitions 220 may store information on Interactive Objects 295 internally, or in one or more external files or other data repositories. Interactive Object Definitions 220 may include a reference or pointer to each of the one or more external files or other data repositories. In one example, all Interactive Object Definitions 220a-n may be stored in a single file, data structure, object, or other data repository comprising definitions of all Interactive Objects 295. In another example, each of the Interactive Object Definitions 220a-n may be stored in its own file, data structure, object, or other data repository comprising definitions of its corresponding Interactive Object 295.

In some embodiments, Interactive Object Definitions 220 comprises definitions of a three dimensional (3D) object (i.e. Interactive Object 295, etc.) that may generally be implemented using 3D graphics, voxel graphics, vector graphics, raster graphics (i.e. bitmaps used for surface textures, etc.), and/or other techniques. Vector graphics, for example, comprise basic geometric shapes (i.e. primitives, etc.) such as points (i.e. vertices or vertexes, etc.), lines, curves, circles, ellipses, triangles, rectangles, polygons, and/or other shapes. 3D graphics may be an extension of or similar to vector graphics and implemented in 3D space. 3D graphics, for example, include vertices (i.e. points, etc.) positioned in 3D space describing polygons, which may form surfaces of a 3D object (i.e. 3D Interactive Object 295, etc.). Basic 3D objects may be combined into more complex objects enabling the definition of practically any 3D object (i.e. 3D Interactive Object 295, etc.). In one example, a 3D door Interactive Object 295 may be formed using a thin rectangular box (i.e. rectangular cuboid, rectangular parallelepiped, etc.) and appropriately positioned and sized sphere representing a doorknob. In another example, a 3D house Interactive Object 295 may be formed using four rectangles representing walls, two angled rectangles representing the roof, and a number of doors and windows that themselves may comprise other objects as previously described. 3D objects or a combination thereof may be provided or stored in a form of a computer or mathematical model that may be placed where needed in an overall site or scene. As such, Interactive Object Definitions 220 includes definitions of any 3D objects, models, primitives, and/or other shapes including their attributes (i.e. shape, size, color, transparency, etc.), parameters, or other properties.

In some embodiments, a 3D object (i.e. 3D Interactive Object 295, etc.) may be created using a 3D modeling tool such as AutoCAD, SolidWorks 3D CAD, Cinema 4D, form-Z, Maya, 3DS Max, Blender, Modo, or other 3D modeling tools. In other embodiments, a 3D object (i.e. 3D Interactive Object 295, etc.) may be created by converting (also referred to as vectorizing, etc.) one or more bitmap images into vector or 3D graphics. In yet other embodiments, a 3D object (i.e. 3D Interactive Object 295, etc.) may be created programmatically by using a programming language's graphic capabilities such as Java's, C++'s, Visual Basic's, and/or other languages' native graphics capabilities, graphics libraries, graphics application programming interfaces (APIs), and/or other capabilities. Also, a 3D object (i.e. 3D Interactive Object 295, etc.) may be created programmatically by programs, software development kits (SDKs), or APIs such as POV-Ray, AutoLISP, Visual LISP, ObjectARX, and/or other such tools. In further embodiments, a 3D object (i.e. 3D Interactive Object 295, etc.) may be created procedurally, algorithmically, or via physical simulation. In further embodiments, a 3D object (i.e. 3D Interactive Object 295, etc.) may be created from multiple 2D image slices from a magnetic resonance imaging (MRI), computed tomography (CT), positron emission tomography (PET), single-photon emission computed tomography (SPECT), or other such device typically used in medical applications. A 3D object (i.e. 3D Interactive Object 295, etc.) may be created by any manual or automatic tool or technique known in art. In some aspects, computer or mathematical representation of a 3D object (i.e. 3D Interactive Object 295, etc.) includes shell or boundary representation that may define the surface of the object. Examples of techniques for creating such surface definitions of 3D objects (i.e. 3D Interactive Objects 295, etc.) include polygonal modeling (i.e. points/vertices in 3D space forming polygons or polygonal mesh, etc.), subdivision surfaces (i.e. recursively subdividing a surface by creating new vertices and polygons that better approximate the surface, etc.), curve modeling (i.e. defining an object using curves expressed as mathematical functions, etc.), digital sculpting (i.e. manipulating a digital object as if it were made of a real-life substance such as clay, etc.), level sets (i.e. representation of deforming surfaces which undergo many topological changes such as fluids, etc.), and/or other techniques. Complex materials such as blowing sand, clouds, fire, and others may be represented with particle systems that include a plurality of 3D coordinates comprising either points, polygons, texture splats, or sprites assigned to them. In other aspects, computer or mathematical representation of a 3D object (i.e. 3D Interactive Object 295, etc.) includes solid representation that may define the volume of an object in addition to its surface.

Interactive Object Definitions 220 comprises any known or custom file format to represent and/or store a 3D object (i.e. 3D Interactive Object 295, etc.). Some of the typical 3D formats include .obj (i.e. Wavefront), .dae (i.e. COLLADA), .b3d (i.e. Blitz3D), .md3 (i.e. Quake), .x (i.e. Direct3D), .blend (i.e. Blender), .max (3D Studio Max), any variation of XML, and/or others. Some of the typical CAD formats that may encode or store one or more 3D objects (i.e. 3D Interactive Objects 295, etc.) include .dwg (i.e. AutoCAD) .dxf (i.e. AutoCAD), 0.3dmlw (i.e. 3D markup language for web), .stl (i.e. Stereolithography), .tcw (i.e. TurboCAD), .sldprt (i.e. SolidWorks), .sldasm (i.e. SolidWorks), and/or others. Each format may include its own specific data, metadata, attributes, parameters, fields, and/or other information about the defined one or more objects therein. In one example, .obj file format comprises information on the position of each vertex, the UV position of each texture coordinate vertex, vertex normals, the faces that make each polygon defined as a list of vertices and texture vertices, and/or other attributes or parameters. In another example, .dxf file comprises header, classes, tables, blocks, entities, objects, thumbnailimage, end of file, and/or other sections each comprising information on one or more objects.

3D graphics, voxel graphics, vector graphics, raster graphics (i.e. bitmaps, etc.), and/or other graphic techniques may be combined with each other to implement Interactive Object Definitions 220. For example, 3D, vector, or other such graphics technique used in 3D objects may be combined with a bitmap such as JPEG, GIF, TIFF, PNG, PDF, or other bitmap. Such bitmap may typically be used as texture on a surface of a 3D object (i.e. 3D Interactive Object 295, etc.).

A computer generated 3D object (i.e. 3D Interactive Object 295, etc.) may be displayed visually through rendering or other such process for showing computer generated objects. Examples of 3D and 2D rendering engines or systems include Direct3D, OpenGL, Mantle, and/or other rendering engines or systems. In some aspects, 3D objects may also be utilized in non-graphical applications such as simulations, calculations, and/or other applications without being visually presented.

In some embodiments, Interactive Object Definitions 220 comprises definitions of a two dimensional (2D) object (i.e. 2D Interactive Object 295, etc.) that may generally be implemented using raster graphics (also referred to as bitmaps, array of pixels, raster map, etc.), vector graphics, and/or other techniques. Raster graphics, for example, includes a bitmap or reference thereto such as JPEG, GIF, TIFF, PNG, PDF, or other bitmap. As such, Interactive Object Definitions 220 may include a file or reference (i.e. pointer, etc.) thereto comprising a bitmap, such as for example, C:\pictures\three_story_building.jpeg that may show or represent a three story building when generated and/or rendered. In addition to a bitmap's inherent capabilities of portraying 2D objects, a bitmap may be drawn in a manner to create an illusion of three dimensions for a 2D object. In one example, an illusion of 3D may be achieved by applying shading or other filters to a 2D graphic. In another example, an illusion of 3D may be achieved by drawing a 2D graphic in perspective. In some aspects, Interactive Object Definitions 220 includes a stream of bitmap images (i.e. video, etc.) to portray animation or transformation of an Interactive Object 295 over time. Also, Interactive Object Definitions 220 may include deformation of a vector graphic over time to portray animation or transformation of an Interactive Object 295 over time.

In some embodiments, Interactive Object Definitions 220 or entire Site 200 may be generated automatically or on the fly. Generating Interactive Object Definitions 220 automatically or on the fly may include receiving (i.e. at runtime for example, etc.) specifications of Interactive Objects 295 to be defined or generated. A function for converting raw specifications into Interactive Object Definitions 220 may be utilized, for example. Such raw specifications may be passed as parameters or other input to such function. In one example, elevations, dimensions, and/or other specifications may be available for an object such as the Empire State Building. These elevations, dimensions, and/or other specifications of the Empire State Building may then be used as inputs into a function, code, engine, generator, or other such system for creating Interactive Object Definitions 220 of the Empire State Building automatically. In another example, elevations, dimensions, and/or other specifications may be searched on the Internet for an object such as Arlington National Cemetery. These elevations, dimensions, and/or other specifications for Arlington National Cemetery may then be used as inputs into a function, code, engine, generator, or other such system for creating Interactive Object Definitions 220 of Arlington National Cemetery on the fly.

Object Association Schema 230 comprises the functionality for storing DBMS Elements 395 or references thereto and their corresponding Interactive Objects 295 or references thereto. In some embodiments, Object Association Schema 230 includes a table in which one column comprises DBMS Elements 395 such as DBMS Elements 395a-n and another column comprises the corresponding Interactive Objects 295 such as Interactive Objects 295a-n. In other embodiments, Object Association Schema 230 includes a table in which one column comprises identifiers of or references (i.e. pointers, etc.) to DBMS Elements 395 and another column comprises the corresponding identifiers of or references (i.e. pointers, etc.) to Interactive Objects 295. In yet other embodiments, Object Association Schema 230 includes a table in which one column comprises types of DBMS Elements 395 and another column comprises the corresponding types of Interactive Objects 295. Object Association Schema 230 may be utilized later in the process for generating correct types of Interactive Objects 295 for given DBMS Elements 395, for associating the generated Interactive Objects 295 with DBMS Elements 395, or for other purposes as described herein. In some aspects, an Interactive Object 295 may be unassociated with a DBMS Element 395, in which case an association between the Interactive Object 295 and a DBMS Element 395 may be omitted.

Interaction Association Schema 240 comprises the functionality for storing Interactions 297 or references thereto and their corresponding Interaction Functions 299 or references thereto. In some embodiments, Interaction Association Schema 240 includes a table in which one column comprises Interactions 297 such as Interactions 297a-n and another column comprises the corresponding Interaction Functions 299 such as Interaction Functions 299a-n. In other embodiments, Interaction Association Schema 240 includes a table in which one column comprises identifiers of or references (i.e. pointers, etc.) to Interactions 297 and another column comprises the corresponding identifiers of or references (i.e. pointers, etc.) to Interaction Functions 299. In yet other embodiments, Interaction Association Schema 240 includes a table in which one column comprises types of Interactions 297 and another column comprises the corresponding types of Interaction Functions 299. Interaction Association Schema 240 may be utilized later in the process for defining interactivity (i.e. Interaction 297 and its corresponding Interaction Function 299, etc.) of the scene and/or Interactive Objects 295, or for other purposes as described herein.

Interaction 297 comprises an event, for example. In some embodiments, Interaction 297 includes any user related event such as mouse click, button or key press, touchscreen tap, swipe, or drag, and/or other user related events. In other embodiments, Interaction 297 includes any user controllable avatar event such as the avatar's contact or collision with an object, the avatar's detection of an object, the avatar's approaching (i.e. coming into vicinity, etc.) an object, and/or other user controllable avatar events. User controllable avatar (i.e. User Controllable Avatar 600 later described, etc.) may be any object controllable by user such as a character, car, rocket, and/or other objects. In yet other embodiments, Interaction 297 includes any object event such as the object's contact or collision with another object, the object's detection of another object, the object's approaching (i.e. coming into vicinity, etc.) another object, and/or other object events. In further embodiments, Interaction 297 includes any computer, operating system, or other system event such as application start event, application close event, system start event, system shut-down event, system clock event, system scheduler event, and/or other computer or system events. Interaction 297 includes any computer event.

Interactivity of a scene and/or Interactive Objects 295 may be implemented via a procedure, routine/sub-routine, or function (i.e. Interaction Function 299, etc.) handling a specific event (i.e. Interaction 297, etc.), for example. In some embodiments, Interaction Function 299 includes an event handler for handling a specific Interaction 297. Examples of event handlers include mouse click handler, mouse double click handler, mouse over handler, mouse move handler, button or key press handler, touchscreen tap handler, touchscreen swipe handler, touchscreen drag handler, user controllable avatar's collision handler, object's approaching another object handler, application start handler, and/or other event handlers. Interactions 297 may be implemented programmatically in a computer generated environment such as a graphics engine, computer game, simulation engine, and/or other such system. In more detail, a program may include the functionality to track locations, forms, statuses, and/or other properties of objects (i.e. Interactive Objects 295, etc.) within a computer generated environment (i.e. scene, etc.), and detect various events (i.e. Interactions 297, etc.), in which case an appropriate event handler (i.e. Interaction Function 299, etc.) may be activated or called. In one example, in the event (i.e. Interaction 297, etc.) of a user or user controllable avatar engaging (i.e. clicking, pressing a key, tapping, selecting, etc.) a door Interactive Object 295, an event handler (i.e. Interaction Function 299, etc.) may cause the door Interactive Object 295 to open. In another example, in an event (i.e. Interaction 297, etc.) of a file folder Interactive Object 295 colliding with (i.e. being thrown into, etc.) a trash can Interactive Object 295, an event handler (i.e. Interaction Function 299, etc.) may cause the file folder Interactive Object 295 to disappear.

In some aspects, an event handler may be added to an object (i.e. Interactive Object 295, etc.) or be available as a native built-in feature of an object. In Visual Basic, for example, a mouse click event handler is provided as a member of image control (i.e. image object, etc.). The mouse click event for the image control may be implemented as a function (i.e. Interaction Function 299, etc.) such as Private Sub myImage_Click( ). Function myImage_Click( ) may automatically be called when the image myImage is clicked. Function (i.e. Interaction Function 299, etc.) myImage_Click( ) may include any instructions such as instructions to create a door opening experience, instructions to animate or transform the scene and/or Interactive Objects 295, instructions to link or transition to another Site 200 or Interactive Object 295, DBMS instructions to perform an operation on a DBMS, and/or other instructions.

In other aspects, an event handler may be created for or added to an application, program, scene, window, screen, template, thread, runtime, or other such application or object comprising other objects (i.e. Interactive Objects 295, etc.). In such configurations, an event handler may be activated when an event for which the event handler is designed occurs anywhere in the application or scene, for example. A determination may be made through processing whether the event occurred on a specific Interactive Object 295 of interest. In one example, a mouse click event handler (i.e. Interaction Function 299, etc.) may be added to a scene comprising an Interactive Object 295 such as a door Interactive Object 295. A user may click on a location on the screen and an event handler (i.e. Interaction Function 299, etc.) for a mouse click may be activated. In 2D applications, for example, the clicked object (i.e. Interactive Object 295, etc.) may be determined by calculating within which object's edges the coordinates of the mouse click fall. In 3D applications, for example, the clicked object (i.e. Interactive Object 295, etc.) may be determined by selecting an object from an array of objects intersected by a ray from a camera or viewpoint in the direction of the mouse click. Any other techniques for relating mouse or other input device event or behavior to a given plane or 3D space may be utilized herein. The following includes a simple code example of the preceding concept:

```
//construct mouse event handler
Var mouseEventHandler=new MouseEventHandler( );
//when mouse click event occurs call mouseEventHandlingFunction( )
mouseEventHandler.onMouseClick=mouseEventHandlingFunction( )
//add mouse event handler to runtime
runtime.addEventHandler(mouseEventHandler);
public mouseEventHandlingFunction( )
{
  /*Assuming that the hits array may contain objects intersected by a ray from a camera or user viewpoint in the direction of the mouse click, and if the closest object to the camera or user viewpoint (first object in the array) is an object named "door2", then call openDoor( ) function and send it the door object as parameter*/ if (event.hits[0].objectName="door2")
  {
    openDoor(event.hits[0])
  }
}
public openDoor(Object door)
{
  . . . //door manipulating and/or other instructions
}
```

One of ordinary skill in art will understand that the above code may not have been written in any particular language and that the code includes a common structure and/or syntax used in many programming languages, and that other structures and/or syntax may be utilized and are within the scope of this disclosure. The above code is source code and any other code such as bytecode, assembly code, machine code, and/or any other code may be utilized. One of ordinary skill in art will also recognize, while all the possible techniques for implementing interactivity of a scene and/or Interactive Objects 295 may be too voluminous to list, all of these techniques are within the scope of this disclosure in addition to the ones described.

In some embodiments, Interaction Function 299 comprises instructions for animating and/or transforming a scene and/or Interactive Objects 295 such as portraying a door opening experience, file folder disappearance experience, user controllable avatar's movement experience, and/or other animating and/or transforming as later described in exemplary embodiments. In one example, Interaction Function 299 such as openDoor function includes a variety of techniques for creating a door opening experience. In 3D graphics, for example, openDoor function may include instructions for rotating a door Interactive Object 295 (i.e. thin rectangular box, rectangular cuboid, etc.) by 90 degrees around its axis near the edge of the door. In raster graphics, for example, openDoor function may include instructions for playing a stream of bitmap images (i.e. video, animation, etc.) portraying a door in various positions to create an illusion of opening the door. Examples of the types of streams of bitmap images or video include MPEG, AVI, DivX, H.264, and/or other types or formats of video. Interaction Function 299 such as openDoor function may include instructions for performing any operation needed to effect an animation or transformation appropriate for a particular scene or situation.

In other embodiments, Interaction Function 299 comprises instructions for linking or transitioning from one Site 200 and/or Interactive Object 295 to another Site 200 and/or Interactive Object 295. For example, Site 200 includes one or more building Interactive Objects 295 each associated with a database DBMS Element 395. When a user enters a building Interactive Object 295, a transition may be made to another Site 200 including a lobby and/or other Interactive Objects 295 each associated with their respective DBMS Elements 395.

In further embodiments, Interaction Function 299 comprises one or more DBMS instructions for performing one or more operations on a DBMS. In one example, DBMS instruction includes a SELECT SQL statement such as SELECT*FROM Table1. In another example, DBMS instruction includes a DELETE SQL statement such as DELETE FROM Table1 WHERE Col1=Val1. In yet another example, DBMS instruction includes an INSERT SQL statement such as INSERT INTO Table1 (Col1, Col2, Col3, . . . ) VALUES (Val1, Val2, Val3, . . . ). In yet another example, DBMS instruction includes an UPDATE SQL statement such as UPDATE Table1 SET Col1=Val1, Col2=Val2, . . . WHERE ColN=ValN. In yet another example, DBMS instruction includes an ALTER SQL statement such as ALTER TABLE Table1 ADD Col1 Datatype, or such as ALTER TABLE Table1 DROP COLUMN Col1, or such as ALTER TABLE Table1 MODIFY Col1 Datatype. In yet another example, DBMS instruction includes a DROP SQL statement such as DROP TABLE Table1, or such as DROP DATABASE Db1. In yet another example, DBMS instruction includes a CREATE SQL statement such as CREATE TABLE Table1 (Col1 Datatype(size), Col2 Datatype(size), Col3 Datatype(size), . . . ), or such as CREATE DATABASE Db1. In yet another example, DBMS instruction includes a database connection function such as the following code example:
Dim conn As New System.Data.Odbc.OdbcConnection
conn.ConnectionString=& _"FIL=MS Access; DSN=valid data source name"
conn.Open( )

In yet another example, DBMS instruction includes a database connection close function such as conn.Close( ). Any instruction understood or implementable by any DBMS may be utilized as a DBMS instruction.

Figure 3:
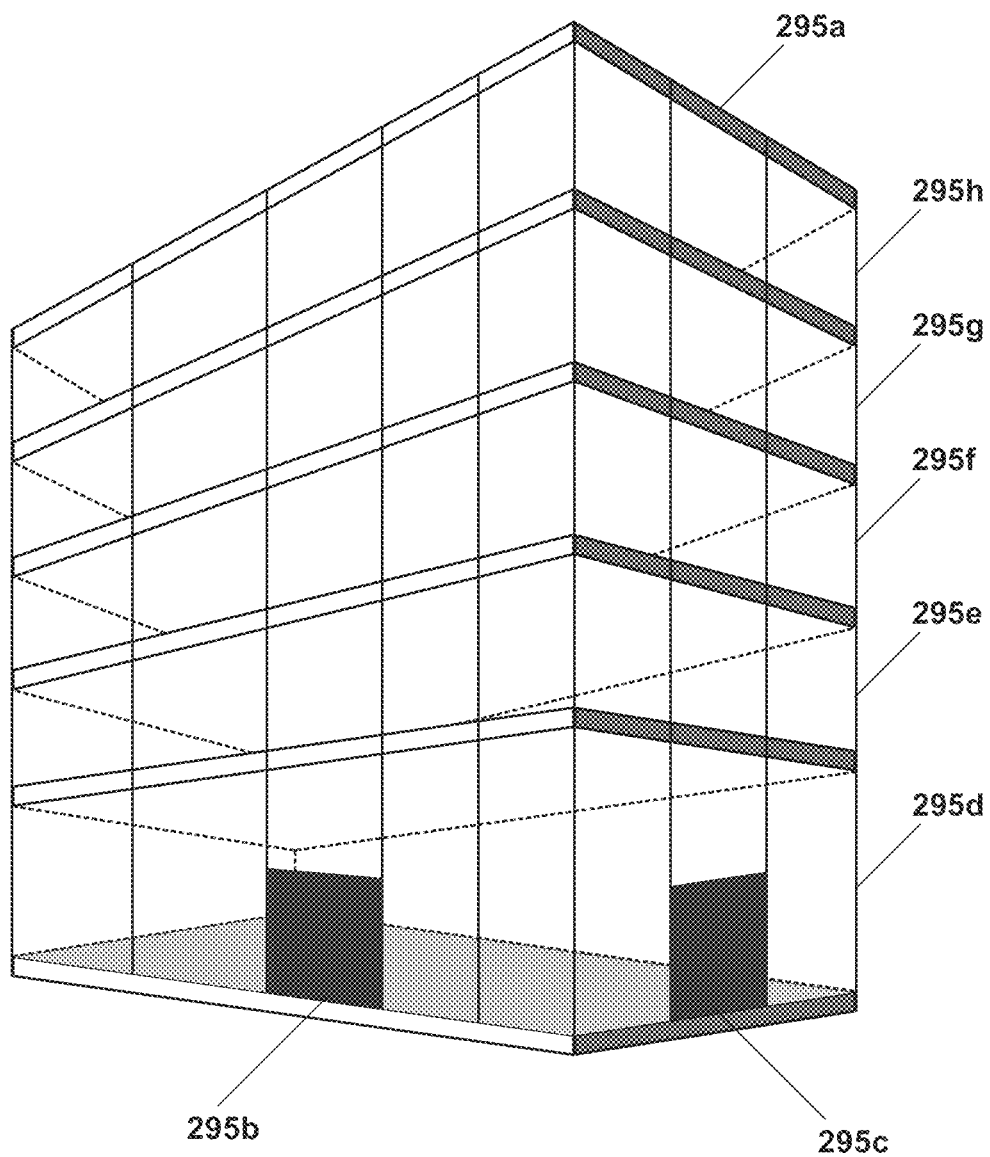
FIG. 3 illustrates an embodiment of a generated and graphically portrayed Interactive Object 295.

Referring to FIG. 3, an embodiment of a generated (i.e. computer generated, etc.) and graphically portrayed Interactive Object 295 is illustrated. Shown is a building Interactive Object 295*a*, for example. The building Interactive Object 295*a* may include other objects or Interactive Objects 295*b-h* that together make up the building Interactive Object 295*a*. In one example, the building Interactive Object 295*a* includes objects or Interactive Object 295 such as door Interactive Objects 295*b-c* and floor Interactive Objects 295*d-h*. Examples of other objects or Interactive Objects 295 that may be utilized within the building Interactive Object 295*a* include stairs, elevators, escalators, hallways, rooms, windows, and/or others each of which may be its own separate Interactive Object 295 in some embodiments. Any other additional objects or Interactive Objects 295 may be included as needed, or some of the disclosed ones may be excluded, or a combination thereof may be utilized in alternate embodiments.

In some embodiments, Interactive Object Definitions 220 for an Interactive Object 295 includes fields (also referred to as member fields, instance variables, member variables, attributes, properties, etc.) such as name of the Interactive Object 295, model file of the Interactive Object 295, a DBMS Element 395 with which the Interactive Object 295 may be associated (if any), and/or other fields, for example. Interactive Object Definitions 220 for an Interactive Object 295 may also include functions (also referred to as methods, procedures, routines/subroutines, member functions, etc.) such as onClick( ), onMouseOver( ) and/or other functions including any Interaction Functions 299. The following is a code example of the preceding concepts for a building Interactive Object 295.

```
public class Building {
   public String name=" ";
   public String associatedDBMSElement=" ";
   public String model="officeBuildingModel.x";
   . . . //any additional fields or member variables
   //constructor1
   public Building(String n, String a) {
      name=n;
      associatedDBMSElement=a;
   }
   //constructor2, in case you want to change default model
   public Building(String n, String a, String m) {
      name=n;
   associatedDBMSElement=a;
      model=m;
   }
   . . . //any additional constructors or other code
   //function1
   public void onClick( ){
      . . . //code for showing interior of the building and
      //performing a corresponding DBMS operation, for
         example
   }
   //function2
   public void onMouseOver( ){
      . . . //code for pop-up window showing DBMS element
      //associated with the building (if any), for example
   }
   . . . //any additional functions or other code
}
```

Calling a constructor Building building1=new Building ("bldg1", "2014_Sales") may create a building1 Interactive Object 295*a* with name bldg1, associated DBMS element 2014_Sales (i.e. 2014_Sales database, etc.), and model officeBuildingModel.x. Such building1 Interactive Object 295*a* may later be placed into a scene or scene graph as later described. In some aspects, officeBuildingModel.x may be a reference or pointer to an external file such as C:\models\officeBuildingModel.x. In other aspects, building1 Interactive Object 295*a* includes internally defined or encoded model. In yet other aspects, building1 Interactive Object 295*a* includes references or pointers to external files each comprising an object or Interactive Object 295 such as door Interactive Object 295*b-c*, floor Interactive Object 295*d-h*, and/or other objects or Interactive Objects 295. In such embodiments, a constructor may be provided to dynamically create building1 Interactive Object 295*a* comprising the number of doors, floors, and/or other objects or Interactive Objects 295 known only at runtime. For example, a floor Interactive Object 295 may be associated with a table in a database, and the number of tables within the database may not be known at Interactive Object Definitions 220 design time. As such, a constructor for building1 Interactive Object 295*a* may be provided that may dynamically create a floor for each of the tables in the database.

One of ordinary skill in art will understand that the above code may not have been written in any particular language and that the code includes a common structure and/or syntax used in many programming languages, and that other structures and/or syntax may be utilized and are within the scope of this disclosure. One of ordinary skill in art will also understand that the above code is source code and that any other code such as bytecode, assembly code, machine code, and/or any other code may be utilized.

In general, Interactive Object 295 includes any 3D or 2D object, model, and/or any previously described or other shape or structure. Examples of such Interactive Objects 295 include a variety of objects from user's experience or with which a user can relate such as buildings, building interiors (i.e. rooms, windows, doors, hallways, etc.), office equipment or furniture (i.e. file cabinets, drawers, shelves, file folders, etc.), houses, restaurants, cars, persons, geographical places, terrains, roads, mountains, valleys, lakes, planets, and/or other objects.

In some embodiments, an alternative to storing the associated DBMS Element 395 (if any) as a field of an object or Interactive Object 295 includes a table (i.e. association table, etc.) where one column comprises specific generated Interactive Objects 295 or references (i.e. pointers, etc.) thereto and another column comprises the corresponding specific DBMS Elements 395 or references (i.e. pointers, etc.) thereto.

Figure 4:
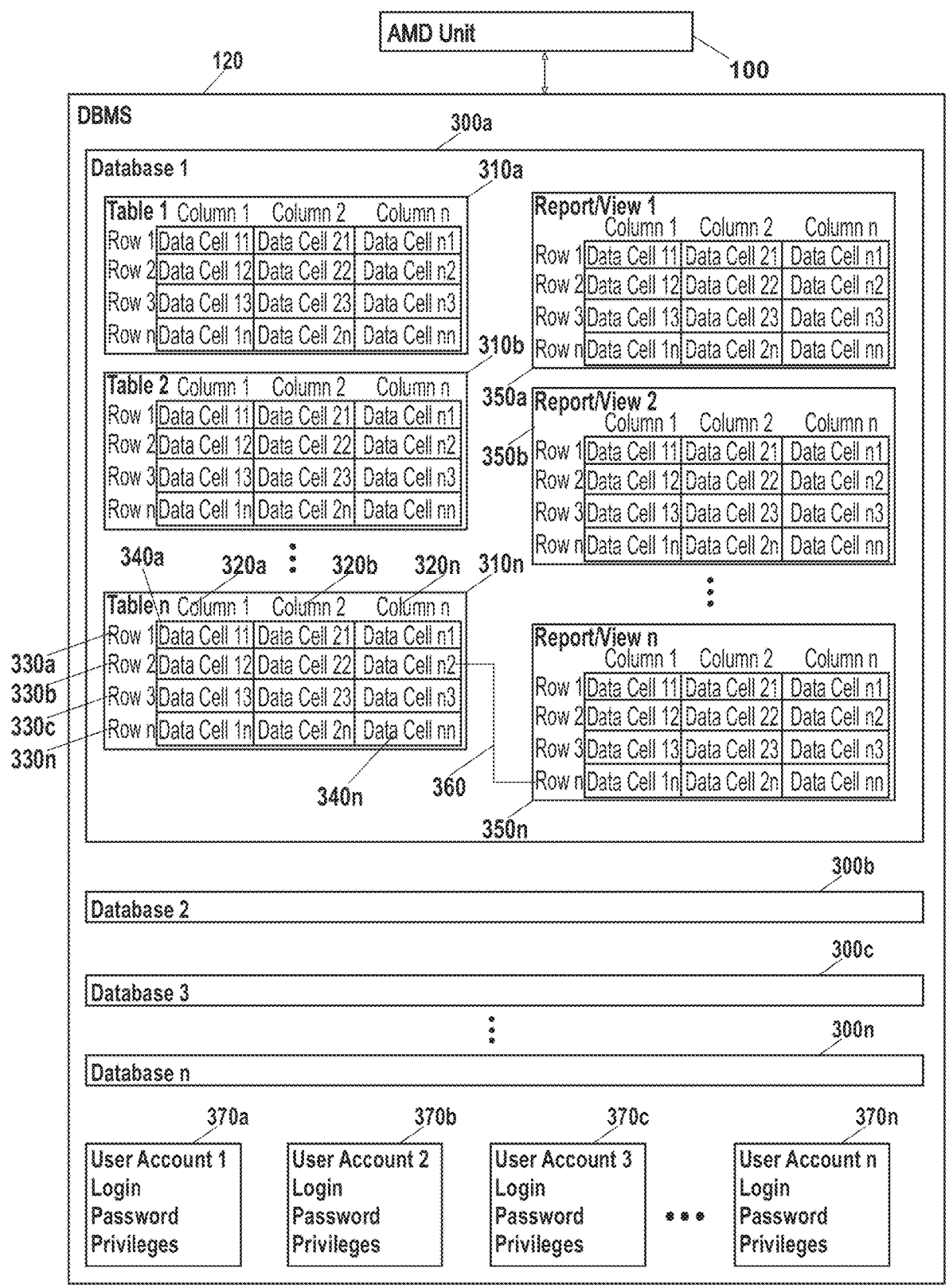
FIG. 4 illustrates an embodiment of DBMS 120.

Referring to FIG. 4, an embodiment of DBMS 120 is illustrated. DBMS 120 comprises any hardware, software, or a combination of hardware and software. DBMS 120 comprises the functionality for storing, managing, and/or manipulating data and/or metadata. DBMS 120 comprises the functionality for performing data operations which User 50 may want to perform.

DBMS 120 includes data generally organized in Databases 300. Database 300 may be a collection of data generally organized in Tables 310. The terms "database" and/or "data" when used casually may often refer to a DBMS and the data it contains as well as the supporting elements or data structures such as databases, tables, reports/views, rows of data, relations, user accounts and their privileges, and/or other elements. DBMS 120 may be a relational DBMS in which case Tables 310 and/or Reports/Views 350 may be linked, and Relations 360 among Tables 310 and/or Reports/Views 350 may be defined. Furthermore, DBMS 120 may be or include any repository or system that may store any data on which data operations described herein may be performed such as text files (i.e. delimited or other text files, etc.), spreadsheets, Extensible Markup Language (XML), HyperText Markup Language (HTML) or other markup language documents, any structured data (i.e. data structures, etc.), objects, a file system, and/or other repositories. DBMS elements such as Database 300, Table 310, Column 320, Row 330, Data Cell 340 (i.e. also generally referred to as data, etc.), Report/View 350, Relation 360, User Account 370, a login, a password, a privilege, a DBMS or database setting, and/or other elements of DBMS 120 may be collectively referred to as DBMS Elements 395 herein. In some aspects, elements such as cubes (i.e. multi-dimensional data sets, etc.), dimensions, and/or other such elements may also be collectively referred to as DBMS Elements 395 herein. One of ordinary skill in art will understand that other elements may be utilized and included in DBMS Elements 395 such as schemas, namespaces, settings (i.e. DBMS settings, etc.) of various DBMS variables and features, and/or other DBMS elements.

DBMS 120 may be capable of executing instructions (i.e. DBMS instructions, etc.) such as structured query language (SQL) statements, for example. SQL is a computer language used to access, manage, and/or manipulate data in a DBMS, although other similar languages having similar capabilities may be utilized as needed. An example of a SQL statement is as follows: "SELECT col1, col2, col3, . . . FROM tbl1, tbl2, tbl3, . . . ORDER BY col1*, col2*, col3*, . . . ". In this SQL statement, "col1, col2, col3, . . . " may represent Columns 320 to be selected, "tbl1, tbl2, tbl3, . . . " may represent the names of Tables 310 from which to obtain data, and "col1*, col2*, col3*, . . . " may represent Columns 320 by which to sort the resulting Report/View 350.

In some embodiments, User 50 may not need to input DBMS instructions such as SQL statements to operate DBMS 120. User 50 may utilize a software application with a graphical user interface or program that may generate DBMS instructions understood by DBMS 120. AMD Unit 100 includes the functionality to generate SQL code or other DBMS instructions. For example, in response to User's 50 selecting (i.e. clicking on, etc.) a computer generated Interactive Object 295 (i.e. door, etc.), AMD Unit 100 may generate a SQL statement to access, manage, and/or manipulate a DBMS Element 395 associated with the selected Interactive Object 295.

User 50 may access, manage, and/or manipulate data in DBMS 120 including (1) storing, accessing, creating, altering, and/or deleting one or more Databases 300 within DBMS 120; (2) storing, accessing, creating, altering, and/or deleting one or more Tables 310 within the one or more Databases 300; (3) storing, accessing, creating, altering, deleting, searching, sorting and/or rearranging one or more Columns 320, Rows 330, and/or Data Cells 340 (i.e. also generally referred to as data, etc.) within the one or more Tables 310; (4) storing, accessing, creating, altering, and/or deleting one or more Reports/Views 350 within the one or more Databases 300; (5) storing, accessing, creating, altering, and/or deleting one or more Relations 360 among the one or more Tables 310 and/or ReportsNiews 350; (6) storing, accessing, creating, altering, and/or deleting one or more User Accounts 370 and/or its privileges; and/or (7) other operations.

The disclosed systems, methods, apparatuses, and/or interfaces are independent of the type of DBMS 120 and any DBMS that can perform operations described herein may be utilized. Examples of DBMSs that may be utilized include Oracle, Microsoft SQL Server, MySQL, Informix, Sybase, Advantage Database Server, EffiProz, ElevateDB, Embedded InnoDB, Empress Embedded Database, Extensible Storage Engine, eXtremeDB, Firebird Embedded, HSQLDB, Informix Dynamic Server, InfinityDB, InterBase, ITTIA DB, NexusDB, Raima Database Manager, ScimoreDB, SolidDB, SQLite, SQL Server Compact, Valentina DB, VistaDB, and/or other DBMSs.

Figure 5:
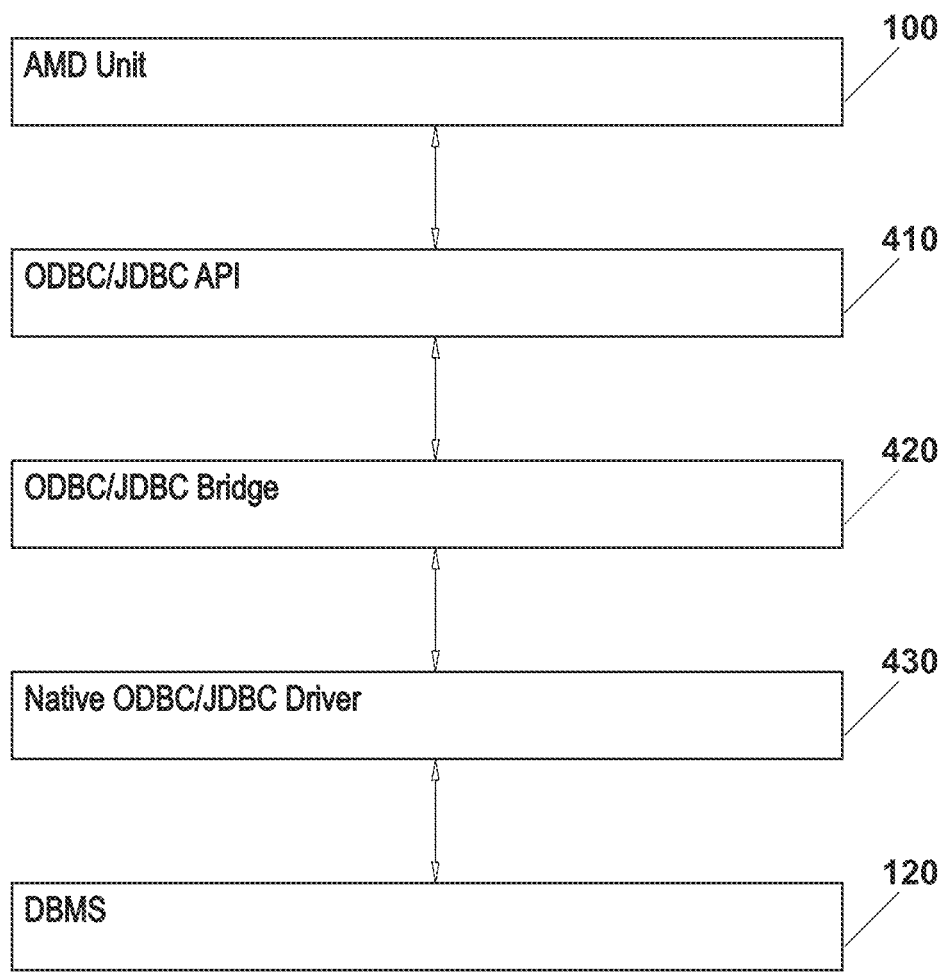
FIG. 5 illustrates an embodiment of connections or interfaces between AMD Unit 100 and DBMS 120.

Referring to FIG. 5, an embodiment of connections or interfaces between AMD Unit 100 and DBMS 120 is illustrated. AMD Unit 100 or any of its elements may be directly or operatively connected to DBMS 120 through ODBC/JDBC API 410, ODBC/JDBC Bridge 420, and/or Native ODBC/JDBC Driver 430, for example. The inter-process interaction may occur on a single mobile, embedded, or other computing device, or between two or more mobile, embedded, or other computing devices over a network. Other elements or types of connections such as a specialized database interface, a socket, an operating system command, a global function, a local function, a direct command, and/or other elements or types of connections may be included, or some of the disclosed ones may be excluded, or a combination thereof may be utilized in alternate implementations of the interaction between AMD Unit 100 and DBMS 120. Upon connecting to DBMS 120, AMD Unit 100 or any of its elements may transmit to DBMS 120 a DBMS instruction (i.e. SQL statement, etc.) understood by DBMS 120. Subsequently, DBMS 120 may perform an operation that corresponds to the instruction and may transmit results to AMD Unit 100. For example, AMD Unit or any of its elements may send a DBMS instruction to receive DBMS Elements 395 and DBMS 120 may transmit DBMS Elements 395 to AMD Unit 100. In the case that the DBMS instruction is a SQL statement, it would be platform-independent and supported by a vast majority of commercial and open-source DBMSs. One of ordinary skill in art will understand that the DBMS instruction (i.e. SQL statement, etc.) discussed herein as an example, may be replaced by any type or form of instruction or statement in any other language or script as needed to conform to a given DBMS.

Figure 6:
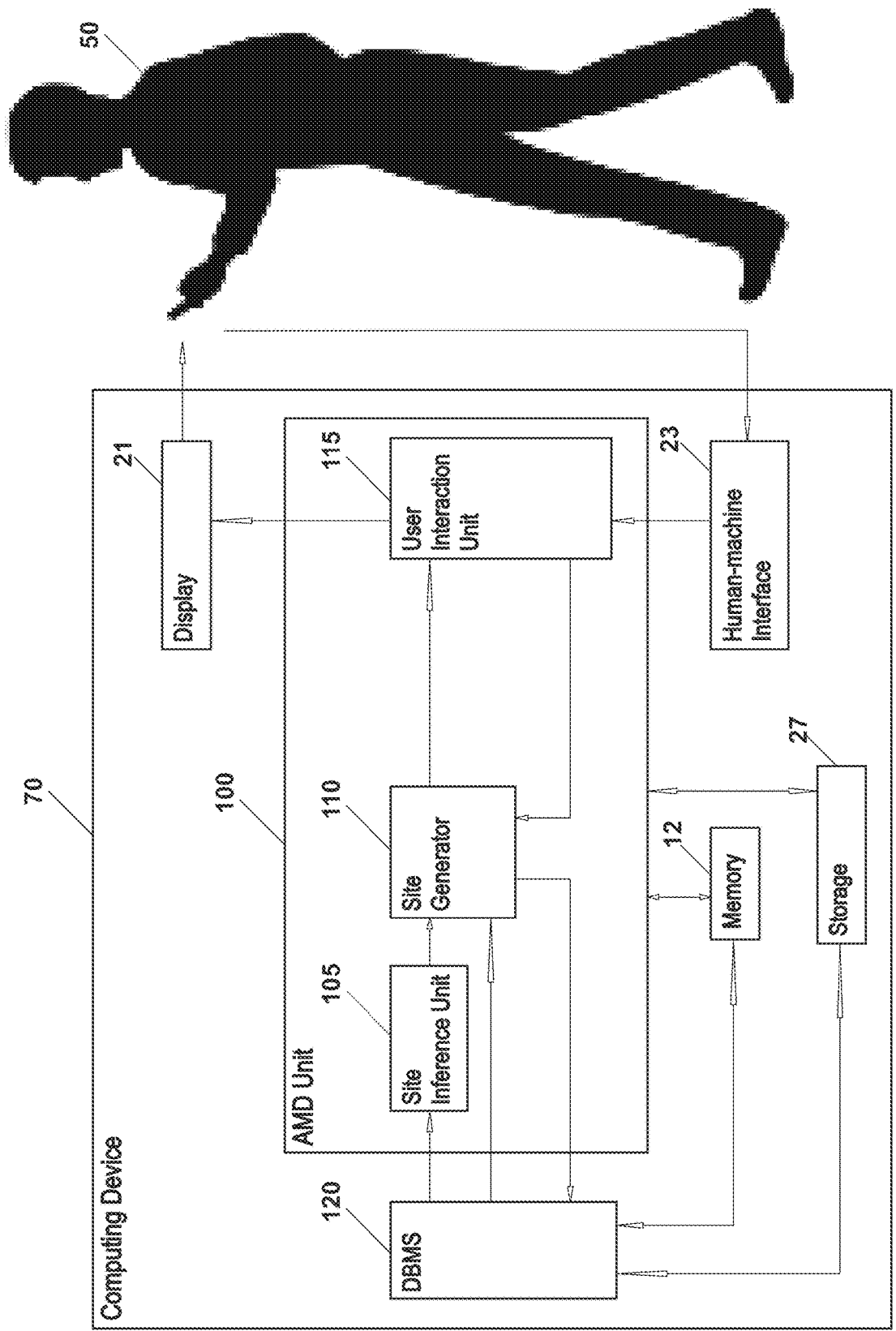
FIG. 6 illustrates an embodiment of Computing Device 70 comprising AMD Unit 100.

Referring to FIG. 6, an embodiment of a Computing Device 70 comprising AMD Unit 100 is illustrated. AMD Unit 100 comprises interconnected Site Inference Unit 105, Site Generator 110, and User Interaction Unit 115. AMD Unit 100 may be connected to DBMS 120, Display 21, Human-machine Interface (HMI) 23, Memory 12, and Storage 27. Other additional elements may be included as needed, or some of the disclosed ones may be excluded, or a combination thereof may be utilized in alternate embodiments.

AMD Unit 100 comprises any hardware, software, or a combination of hardware and software. In some embodiments and as a general overview, AMD Unit 100 may be implemented as Software 18 and executed by one or more Processors 11 as previously described. For example, Processor 11 may receive one or more DBMS Elements 395 from DBMS 120. Processor 11 may infer a Site 200 suitable to represent DBMS Elements 395. Processor 11 may generate one or more Interactive Objects 295 and associate them with corresponding DBMS Elements 395. Processor 11 may render Interactive Objects 295 in a user interface (i.e. GUI, etc.) through which a user can interact with Interactive Objects 295. Processor 11 may receive an user interaction with an Interactive Object 295 and derive one or more DBMS instructions for performing an operation on DBMS 120 or DBMS Elements 395. Processor 11 may perform the operation defined by the one or more DBMS instructions. Processor 11 may re-generate Interactive Objects 295 and re-associate the re-generated Interactive Objects 295 with updated DBMS Elements 395. Processor 11 may render the re-generated re-associated Interactive Objects 295 in the user interface to enable user to issue subsequent user interactions. In other embodiments, AMD Unit 100 may be included in Alternative Memory 16, which may provide instructions to Processor 11 for implementation of AMD Unit 100 functionalities. In yet other embodiments, AMD Unit 100 may be implemented as network, web, distributed, cloud, or other such application that may be accessed on a remote computing device via Network Interface 25, which remote computing device includes AMD instructions for implementation of AMD functionalities by a processor. In yet other embodiments, AMD Unit 100 may be a device (i.e. storage device, microchip, embedded device, etc.) including AMD Unit 100 instructions encoded thereon, which device may be connected with Processor 11 or other Computing Device 70 elements via Bus 5 or other connection means to provide AMD Unit 100 instructions for implementation of AMD Unit 100 functionalities. In yet other embodiments, AMD Unit 100 may be an embedded computing device, a processor, or other such computing device dedicated to implementing AMD Unit 100 functionalities, such computing device including processing capabilities and AMD Unit 100 instructions encoded thereon.

AMD Unit 100 may be attached to any DBMS 120, AMD Unit 100 may be included as a feature of DBMS 120, AMD Unit 100 may be built (i.e. hard coded, etc.) into DBMS 120, AMD Unit 100 may be a user application utilizing DBMS 120 as an underlying data storage/management system, and/or AMD Unit 100 may be available in any other configuration to provide its functionalities. For example, AMD Unit 100 may be installed as a standalone application that may attach to, interface with, and/or take control of DBMS 120 to implement the functionalities described herein. AMD Unit 100 may be directly or operatively coupled with DBMS 120, Display 21, Human-machine Interface 23, Memory 12, Storage 27, and/or other elements to produce desired results. AMD Unit 100 may be initiated by User 50 or it may be initiated automatically when Computing Device 70 turns on. AMD Unit 100 may run continuously as a deamon or it may run only as long as User 50 needs it.

In some embodiments, AMD Unit 100 may be implemented as a Java Micro Edition (ME), Java Standard Edition (SE), or other Java Edition (also referred to as Java or Java platform) application or program. Java ME is generally designed for mobile and embedded devices and it may provide a robust and flexible environment for software applications including flexible user interfaces, robust security, built-in network protocols, powerful application programming interfaces, DBMS connectivity and interfacing functionalities, file manipulation capabilities, support for networked and offline applications, and/or other features or functionalities. Software applications based on Java ME may be portable across many devices, yet leverage each device's native capabilities. The feature-rich Java SE is generally designed for traditional computing devices, but more mobile and embedded devices continue to support it. Java SE may support the feature sets of most smartphones and a broad range of high-end connected devices while still fitting within their resource constraints. Java platforms include one or more basic application programming interfaces (APIs) and virtual machine features comprising a runtime environment for software applications such as some embodiments of AMD Unit 100. Java applications may provide a wide range of user-level functionalities that may be implemented in software applications such as providing an Internet browser, displaying text and graphics, playing and recording audio media, displaying and recording visual media, communicating with another computing device, and/or other functionalities. In one example, AMD Unit 100 may be implemented as a Xlet within a Java platform. A Xlet may be a Java applet or application configured to execute on a mobile, embedded, and/or other computing device. AMD Unit 100 is programming language, platform, and operating system independent. Programming languages that can be used in addition to Java include C, C++, Cobol, Python, Java Script, Tcl, Visual Basic, Pascal, VB Script, Perl, PHP, Ruby, and/or other programming languages capable of implementing the functionalities described herein.

In brief overview, Site Inference Unit 105 comprises any hardware, software, or a combination of hardware and software. Site Inference Unit 105 may directly or operatively interface with DBMS 120, Site Generator 110, and/or other elements to implement the functionalities described herein. Details of Site Inference Unit 105 are described in later text and figures.

Site Generator 110 comprises any hardware, software, or a combination of hardware and software. Site Generator 110 comprises the functionality for generating Interactive Objects 295. Site Generator 110 comprises the functionality for receiving a Site 200 and DBMS Elements 395. Site Generator 110 comprises the functionality for associating DBMS Elements 395 with Interactive Objects 295. Site Generator 110 comprises the functionality for creating interactivity with respect to Interactive Objects 295. Site Generator 110 may directly or operatively interface with DBMS 120, Site Inference Unit 105, User Interaction Unit 115, and/or other elements to implement the functionalities described herein.

In some embodiments, Site Generator 110 may receive DBMS Elements 395 or references thereto by utilizing any of the previously described connections or interfaces between AMD Unit 100, DBMS 120, and/or other disclosed elements. In some aspects, Site Generator 110 may receive DBMS Elements 395 by issuing a SQL statement responsive to which DBMS 120 may transmit requested DBMS Elements 395 or references thereto. In one example, mySQL or other DBMSs include SQL statement such as SHOW DATABASES that may list databases within a DBMS. In another example, mySQL or other DBMSs include SQL statement such as SHOW TABLES that may list tables within a database. In yet another example, mySQL or other DBMSs include a table such as MYSQL.USER that may list users of a database or DBMS, and SQL statement such as SELECT*FROM MYSQL.USER may be utilized to obtain the users. In a further example, Oracle or other DBMSs include SQL statement such as DESC TABLE or DESCRIBE TABLE that may list columns/fields of a specified table. In a further example, Oracle or other DBMSs include a table such as USER_TAB_COLUMNS that list columns/fields of a user's tables, views, and clusters, and SQL statement such as SELECT*FROM USER_TAB_COLUMNS WHERE TABLE_NAME='Tbl1' may be utilized to obtain the columns/fields of a specified table. In yet another example, Site Generator 110 may receive DBMS Elements 395 by reading a data dictionary or metadata of DBMS 120. A data dictionary or metadata may include one or more tables, files, file systems, data structures, or other repositories comprising information on the data stored in DBMS 120. In a further example, Oracle or other DBMSs include a table such as DBA_TABLES that may list tables in a database, and SQL statement such as SELECT*FROM DBA_TABLES may be utilized to obtain the tables. In yet another example, Microsoft SQL Server or other DBMSs provide a table such as SYSOBJECTS that may list various objects (i.e. tables, views, primary keys, foreign keys, stored procedures, triggers, etc.) in a database, and SQL statement such as SELECT*FROM SYSOBJECTS WHERE TYPE='U' may be utilized to obtain tables within a database. In a further example, Site Generator 110 may receive DBMS Elements 395 by accessing a DBMS's files, file system, data structures, and/or other repositories. In more detail, Oracle or other DBMSs include ORACLE_HOME directory in which Oracle DBMS software is installed. ORACLE_HOME may be found in a directory such as /etc/oratab on Unix, it may be pointed to by an environment variable, and/or it may be located by other techniques. ORACLE_HOME may include a directory such as $ORACLE_HOME/dbs in which pfile<ID>.ora, spfile<ID>.ora, init<ID>.ora, or other such files may exist for each database in a DBMS. In yet another example, Site Generator 110 may receive DBMS Elements 395 by utilizing a native, third party, or custom API, software development kit (SDK), report building tool (i.e. Crystal Reports, etc.), or other data access tool that may access DBMS Elements 395 by utilizing any of the previously described or other techniques.

Site Generator 110 may receive Site 200 from Site Inference Unit 105 or other elements. Interactive Object Definitions 220, within the received Site 200, includes information (i.e. shape, color, etc.) on Interactive Objects 295 to be generated and how to generate them as previously described.

In some embodiments, Site Generator 110 may start by generating a scene (i.e. 3D or 2D scene, 3D or 2D space, 3D or 2D environment, 3D or 2D setting, 3D or 2D site, etc.) comprising Interactive Objects 295. In some aspects, the scene may itself be an object or Interactive Object 295 comprising other Interactive Objects 295. The scene may include attributes or properties such as shape, size, origin, and/or other attributes or properties. In one example, a scene may be a rectangular 3D space having dimensions of 300 (width)×250 (height)×450 (depth). In another example, a scene may be a cylindrical 3D space having dimensions of 200 (radius)×250 (height). In a further example, a scene may be a spherical 3D space including dimensions of 400 (radius). Any of the described dimensions or sizes include any units of measurement such as pixels, voxels, millimeters, centimeters, meters, inches, feet, yards, or other units of measurement. A scene may typically be rendered or processed for visual display. In some aspects, raster graphics (i.e. bitmaps, etc.) may enable Interactive Objects 295 to be shown directly on the display of a computing device without the need for rendering of a scene in which case the use of a scene may be omitted. The initial shape, size, and/or other attributes or properties of a scene may be changed manually or programmatically at any time during the system's operation.

In some embodiments, Site Generator 110 may utilize a 3D engine, a graphics engine, a simulation engine, a game engine, or other such tool to implement generation of a scene and/or Interactive Objects 295. Examples of such engines or tools include Unreal Engine, Quake Engine, Unity Engine, jMonkey Engine, Microsoft XNA, Torque 3D, Crystal Space, Genesis3D, Irrlicht, Truevision3D, Vision, Second Life, Open Wonderland, 3D ICC Terf, and/or other engines or tools. Such engines or tools may typically provide high-level functionalities such as a physics engine, collision detection and response, sound, animation, event detection and handlers, networking, memory management, scene graph, rendering 3D or 2D graphics, scripting/programming capabilities and interfaces, and/or other functionalities. Such engines or tools may provide a rendering engine such as Direct3D, OpenGL, Mantle, derivatives thereof, and/or other systems for processing 3D or 2D graphics for visual display. Such engines or tools may provide the functionality for loading of 3D models (i.e. 3D models stored in Interactive Object Definitions 220, etc.) into a scene. The loaded or generated 3D models (i.e. Interactive Objects 295, etc.) may then be moved, transformed, or animated using any of the previously described or other techniques. A 3D engine, a graphics engine, a simulation engine, a game engine, or other such tool may provide functions that define mechanics of the scene and/or its objects (i.e. Interactive Object 295, etc.), interactions among the scene objects (i.e. Interactive Object 295, etc.), user interactions with the scene and/or its objects, and or other functions. In some aspects, such engines or tools may provide detection of mouse, keyboard, touchscreen, joystick, GUI, and/or other typical events including appropriate event handlers. Such engines or tools may implement a scene and/or its objects (i.e. Interactive Object 295, etc.) as a scene graph, tree, and/or other data structure. A scene graph, for example, may be an object-oriented representation of a 3D environment such as a computer generated scene and or it objects. In more detail, a scene graph includes a network of interconnected nodes where each node may represent an object (i.e. Interactive Object 295, etc.) in the scene. Also, each node includes its own attributes, dependencies, and/or other properties. Nodes may be added, managed, and/or manipulated at runtime using scripting or programming functionalities of the engine or tool used. Such scripting or programming functionalities may enable defining the mechanics, behavior, transformation, interactivity, actions, and/or other properties of objects (i.e. Interactive Object 295, etc.) in a scene at or prior to runtime. Examples of such scripting or programming functionalities include Lua, UnrealScript, QuakeC, UnityScript, TorqueScript, Linden Scripting Language, C #, Python, JavaScript, and/or other scripting or programming functionalities. In other embodiments, in addition to the full featured 3D engines, graphics engines, simulation engines, game engines, or other such tools, Site Generator 110 may utilize a tool native to or built on/for a particular programming language or platform. Examples of such tools include any Java graphics API or SDK such as jReality, Java 3D, JavaFX, etc., any .NET graphics API or SDK such as Visual3D.NET, etc., any Python API or SDK such as Panda3D, etc., and/or other API or SDK for another language or platform. Such tools may provide 2D and 3D drawing, rendering, and/or other capabilities leaving to the programmer to implement some or most high-level functionalities such as physics simulation, collision detection, animation, networking, and/or other high-level functionalities. In yet other embodiments, Site Generator 110 may utilize any programming language's general programming capabilities or APIs to implement generation of a scene and/or Interactive Objects 295. Utilizing general programming capabilities or APIs of a programming language may require a programmer to implement some or all high-level functionalities from scratch, but gives the programmer full freedom of customization. One of ordinary skill in art will recognize that while all the engines, APIs, SDKs, or other such tools that may be utilized in Site Generator 110 may be too voluminous to list, all of these engines, APIs, SDKs, or such other tools, whether known publically or proprietary, are within the scope of this disclosure.

In one example, a 3D engine, graphics engine, simulation engine, game engine, or other such tool includes an application programming interface (API) for loading definitions (i.e. Interactive Object Definitions 220, etc.) of objects (i.e. Interactive Objects 295, etc.), generating the objects, placing the objects into a scene, implementing relationships among the objects, implementing motion or other transformations of the objects, detecting events (i.e. Interactions 297, etc.), and/or other functionalities. Site Generator 110 may utilize such API to implement AMD Unit 100 functionalities described herein. In more detail, Interactive Object Definitions 220 may be loaded into a 3D engine, for example, responsive to which the 3D engine may generate the corresponding Interactive Objects 295. The 3D engine may also position the generated Interactive Objects 295 within a scene thereby describing spatial relationships (i.e. location, relative size, etc.) among the Interactive Objects 295. The 3D engine may also be configured to move or otherwise animate the Interactive Objects 295 within the scene thereby describing motion or other transformations of the Interactive Objects 295 over time. The 3D engine may also be configured to track locations, forms, statuses, and/or other properties of objects within the scene and detect events such as an object's contact or collision with another object, an object's detection of another object, an object's approaching (i.e. coming into vicinity, etc.) another object, and/or other events, which may activate or call appropriate event handlers (i.e. Interaction Functions 299, etc.). The 3D engine may also be configured to detect user's or user controllable avatar's interactions with respect to Interactive Objects 295 such as user's clicking on an Interactive Object 295, user's selecting or tapping an Interactive Object 295, the avatar's contact or collision with an object, the avatar's detection of an object, the avatar's approaching (i.e. coming into vicinity, etc.) an object, and/or other interactions or events, which may activate or call appropriate event handlers (i.e. Interaction Functions 299, etc.).

Site Generator 110 may proceed with processing DBMS Elements 395, generating the corresponding Interactive Objects 295, and placing the Interactive Objects 295 within the previously generated scene. Site Generator 110 may process DBMS Elements 395 one at a time, for example. Site Generator 110 may look up each DBMS Element 395 in Site's 200 Object Association Schema 230 and find its corresponding Interactive Object 295. Site Generator 110 may then find the Interactive Object's 295 definitions in Interactive Object Definitions 220. Using the Interactive Object Definitions 220, Site Generator 110 may then generate the Interactive Object 295 within the scene.

In some aspects, Site Generator 110 comprises the functionality for positioning, resizing, rotating, or otherwise transforming an Interactive Object 295. Positioning may be absolute anywhere within a scene or relative to other objects or references. In one example, Site Generator 110 may generate a first building Interactive Object 295 representing a first database in a default location such as location with coordinates 0,0,0 in Cartesian coordinate system. Site Generator 110 may then position a second building Interactive Object 295 representing a second database in the next available location such as a location 0,75,0, which may represent the original location 0,0,0 offset by the first building's 75 feet depth. Site Generator 110 may position any subsequent building Interactive Objects 295 representing additional databases in a similar manner forming a line (i.e.

street, etc.) of buildings that User 50 may perceive and interact with (i.e. enter, exit, etc.). In another example, Site Generator 110 may generate a first building Interactive Object 295 representing a database in a relative location such as location with coordinates of a corner of a street object. Site Generator 110 may then position a second building Interactive Object 295 representing a second database in the next available location on the street object such as a location offset by the first building's depth. Site Generator 110 may position any subsequent building Interactive Objects 295 representing additional databases in a similar manner forming a line of building objects aligned with the street object, all of which objects User 50 may perceive and interact with (i.e. walk on, enter, exit, etc.). In a further example, Site Generator 110 may resize an object such as building Interactive Object 295. Interactive Objects 295 implemented as 3D or vector graphics may not lose any detail when resized. Therefore, Site Generator 110 may have full freedom of resizing Interactive Objects 295 to best fit them into a scene for any setting or purpose. In yet another example, Site Generator 110 may rotate an object such as building Interactive Object 295 in any direction as needed. Site Generator 110 may perform any transformations, calculations, inferences, or other determinations in positioning, resizing, rotating, or otherwise transforming Interactive Objects 295 to ensure that Interactive Objects 295 are appropriately visible and available for User's 50 perception and interaction.

In other aspects, Site Generator 110 comprises the functionality for animating or otherwise transforming over time an Interactive Object 295. Animating an Interactive Object 295 includes positioning, resizing, rotating, or otherwise transforming an object over time. Any of the previously described or other techniques, or a combination thereof, may be utilized such as polygonal modeling or meshes, subdivision surfaces, curve modeling, digital sculpting, level sets, particle systems, and/or other techniques, which may all be transformed, deformed, or otherwise manipulated by Site Generator 110 over time. Any of the previously described or other bitmap animation techniques such as a stream of bitmap images (i.e. video, etc.) showing an object or scene over time may also be utilized. Some other typical animation techniques include keyframing, inverse kinematics, motion capture, and/or other animation techniques. In one example, Site Generator 110 may cause a planet Interactive Object 295 to orbit (i.e. change position over time in a circular pattern, etc.) a star object. In another example, Site Generator 110 may cause a planet object to rotate around its own axis.

After or as part of generating a scene and/or Interactive Objects 295, Site Generator 110 may define or add interactivity to the scene and/or Interactive Objects 295. Defining or adding interactivity to a scene and/or Interactive Objects 295 may include creating one or more procedures, routines/subroutines, or functions (i.e. Interaction Functions 299, etc.) for a particular event (i.e. Interaction 297, etc.) as previously described. Site Generator 110 may look up each Interaction 297 in Interaction Association Schema 240, find its corresponding Interaction Function 299, and create the Interaction Function 299. In some aspects, an Interaction 297 and its corresponding Interaction Function 299 may be associated with a particular Interactive Object 295 and stored in the corresponding Interactive Object Definitions 220, in which case Interaction Association Schema 240 may be omitted. In one example, an Interaction Function 299 such as openFolder(tableName, rowID) may be created for a file folder opening Interaction 297. open Folder(tableName, rowID) function includes a SQL statement such as SELECT*FROM tableName WHERE PKCol=rowID. In this example, file folder Interactive Object 295 may be associated with a row of data in a table, and the name of the table and row identifier may be passed as parameters to the openFolder(tableName, rowID) function. openFolder(tableName, rowID) function may also include Interactive Object 295 animation or transformation instructions such as instructions for animating or transforming file folder Interactive Object 295 to create file folder opening experience. openFolder(tableName, rowID) function may include any other instructions in alternate implementations. Also, open Folder (tableName, rowID) function may be activated or called when the Interaction 297 (i.e. event, etc.) of user's or user controllable avatar's opening the file folder Interactive Object 295 occurs. In another example, an Interaction Function 299 such as throwIntoTrashCan(tableName, rowID) may be created for a file folder being thrown into trash can Interaction 297. throwIntoTrashCan(tableName, rowID) function includes a SQL statement such as DELETE*FROM tableName WHERE PKCol=rowID. In this example, file folder Interactive Object 295 may be associated with a row of data in a table, and the name of the table and row identifier may be passed as parameters to the throwIntoTrashCan (tableName, rowID) function. throwIntoTrashCan(tableName, rowID) function may also include Interactive Object 295 animation or transformation instructions such as instructions for animating or transforming file folder Interactive Object 295 to create file folder being thrown into trash can experience. throwIntoTrashCan(tableName, rowID) function may include any other instructions in alternate implementations. Also, throwIntoTrashCan(tableName, rowID) function may be activated or called when the Interaction 297 (i.e. event, etc.) of user's or user controllable avatar's throwing the file folder Interactive Object 295 into trash can occurs. In some aspects, throwIntoTrashCan(tableName, rowID) function may be defined for or added to the scene, which may detect that one of its Interactive Objects 295 (i.e. file folder Interactive Object 295, etc.) is being thrown or in contact with a trash can object. In other aspects, throwIntoTrashCan(tableName, rowID) function may be defined for or added to the file folder Interactive Object 295, which may detect that it is being thrown or in contact with a trash can object. In further aspects, throwIntoTrashCan(tableName, rowID) function may be defined for or added to the trash can object (i.e. Interactive Object 295, etc.), which may detect that another object (i.e. file folder Interactive Object 295, etc.) is being thrown into the trash can or in contact with the trash can. In any of the described or other configurations, throwIntoTrashCan(tableName, rowID) function may be called or activated to implement the operations for which it was designed.

In some embodiments, after or in response to performing the DBMS operation defined by the one or more DBMS instructions included in an Interaction Function 299, Site Generator 110 may re-generate Interactive Objects 295. Since re-generating comprises some or all generating functionalities, the terms re-generating and generating may be used interchangeably herein. In some implementations, re-generating Interactive Objects 295 includes deleting one or more Interactive Objects 295 and generating new Interactive Objects 295 to replace the deleted ones. In some aspects, all Interactive Objects 295 may be re-generated. In other aspects, re-generating may be optionally omitted or performed on some of the Interactive Objects 295 or DBMS Elements 395 depending on the type of Interaction 297, DBMS operation, and/or system design. In one example, Interactive Objects 295 associated with updated DBMS Elements 395 may be re-generated such as re-generating an Interactive Object 295 associated with an edited DBMS Element 395. In another example, a new Interactive Object 295 may be generated for a newly created or inserted DBMS Element 395. Therefore, re-generating of all Interactive Objects 295 may not be necessary for operations such as, for example, some data access Interactions 297 and/or DBMS operations where no DBMS Elements 395 have changed. An updated DBMS Element 395 includes a DBMS Element 395 that has been accessed, viewed, edited, added (i.e. created, inserted, etc.), removed (i.e. deleted, dropped, etc.), or otherwise manipulated. Furthermore, Site Generator 110 may re-associate the re-generated Interactive Objects 295. Since re-associating comprises some or all associating functionalities, the terms re-associating and associating may be used interchangeably herein. In some implementations, re-associating Interactive Objects 295 includes deleting one or more Interactive Object 295 associations and creating new Interactive Object 295 associations to replace the deleted ones. In some aspects, all Interactive Objects 295 may be re-associated. In other aspects, re-associating may be optionally omitted or performed on some of the Interactive Objects 295 or DBMS Elements 395 depending on the type of Interaction 297, DBMS operation, and/or system design. For example, Interactive Objects 295 associated with updated DBMS Elements 395 may be re-associated such as associating a new Interactive Object 295 with a newly created or inserted DBMS Element 395. Therefore, re-associating of all Interactive Objects 295 may not be necessary for operations such as, for example, some data access Interactions 297 and/or DBMS operations where no DBMS Elements 395 have been added or edited. Some deletion Interactions 297 and/or DBMS operations, for example, may also not require re-associating Interactive Objects 295 since deleted Interactive Objects 295 and their corresponding DBMS Elements 395 may be removed without re-associating the remaining Interactive Objects 295. Site Generator 110 may then transmit the scene and/or re-generated re-associated Interactive Objects 295 to User Interaction Unit 115 for rendering or display in a user interface such as a GUI.

User Interaction Unit 115 comprises any hardware, software, or a combination of hardware and software. User Interaction Unit 115 comprises the functionality for portraying a scene and/or Interactive Objects 295 in a user interface. User Interaction Unit 115 comprises the functionality for rendering, displaying, or otherwise portraying a scene and/or Interactive Objects 295 in a user interface through which a user can interact with Interactive Objects 295. User Interaction Unit 115 comprises the functionality for receiving user interactions with Interactive Objects 295. Examples of user interfaces that may be utilized include a graphical user interface (GUI), acoustical user interface, tactile user interface, and/or other interfaces. User Interaction Unit 115 may directly or operatively interface with Site Generator 110, Display 21, HMI 23, and/or other elements to implement the functionalities described herein.

In some embodiments, a scene includes a user controllable avatar configured to interact with Interactive Objects 295. In some aspects, user controllable avatar itself may be or include an Interactive Object 295. In some aspects, depending on user's choice, system settings, and/or other parameters AMD Unit 100 may enable a user to experience first-person perspective or view. First-person perspective may show objects (i.e. Interactive Objects 295, etc.) in a scene as seen through the eyes of the user controllable avatar, but may not typically show the avatar. Some implementations of first-person perspective may enable user to see his/her avatar's hands, feet, other body parts, and/or objects that the avatar may be holding. In other aspects, AMD Unit 100 may enable a user to experience third-person perspective where user may see his/her avatar as well as other objects (i.e. Interactive Objects 295, etc.) in a scene. In yet other aspects, AMD Unit 100 may enable a user to experience bird's eye view or perspective where the user may see geographic or other locations of objects in a scene (i.e. a map or a portion thereof, etc.). Any other view or perspective may be implemented to show any angle or viewpoint of the scene or interactive Objects 295. Also, the view or perspective may be switched to another view or perspective at any time.

In some designs, positional audio may be implemented where ambient sounds may vary depending on user controllable avatar's location in a scene. In other designs, audio conversation among proximal avatars or objects (i.e. Interactive Objects 295, etc.) may be implemented via their respective network interconnected Computing Devices 70 and their respective sound input and output devices (i.e. microphones, speakers, etc.).

User 50 (also referred to as user, etc.) may be a human user or non-human user. A non-human User 50 includes any software, hardware, or a combination of software and hardware. In some aspects, a non-human User 50 includes any system, device, and/or other mechanism for controlling or manipulating DBMS 120, AMD Unit 100, and/or other disclosed elements. A non-human User 50 may utilize more suitable interfaces instead of, or in addition to, HMI 23 and Display 21 such as application programming interface (API), bridge (i.e. bridge between applications or devices, etc.), driver, socket, direct or operative connection, handle, and/or other such interfaces to interact with AMD Unit 100.

Figure 7:
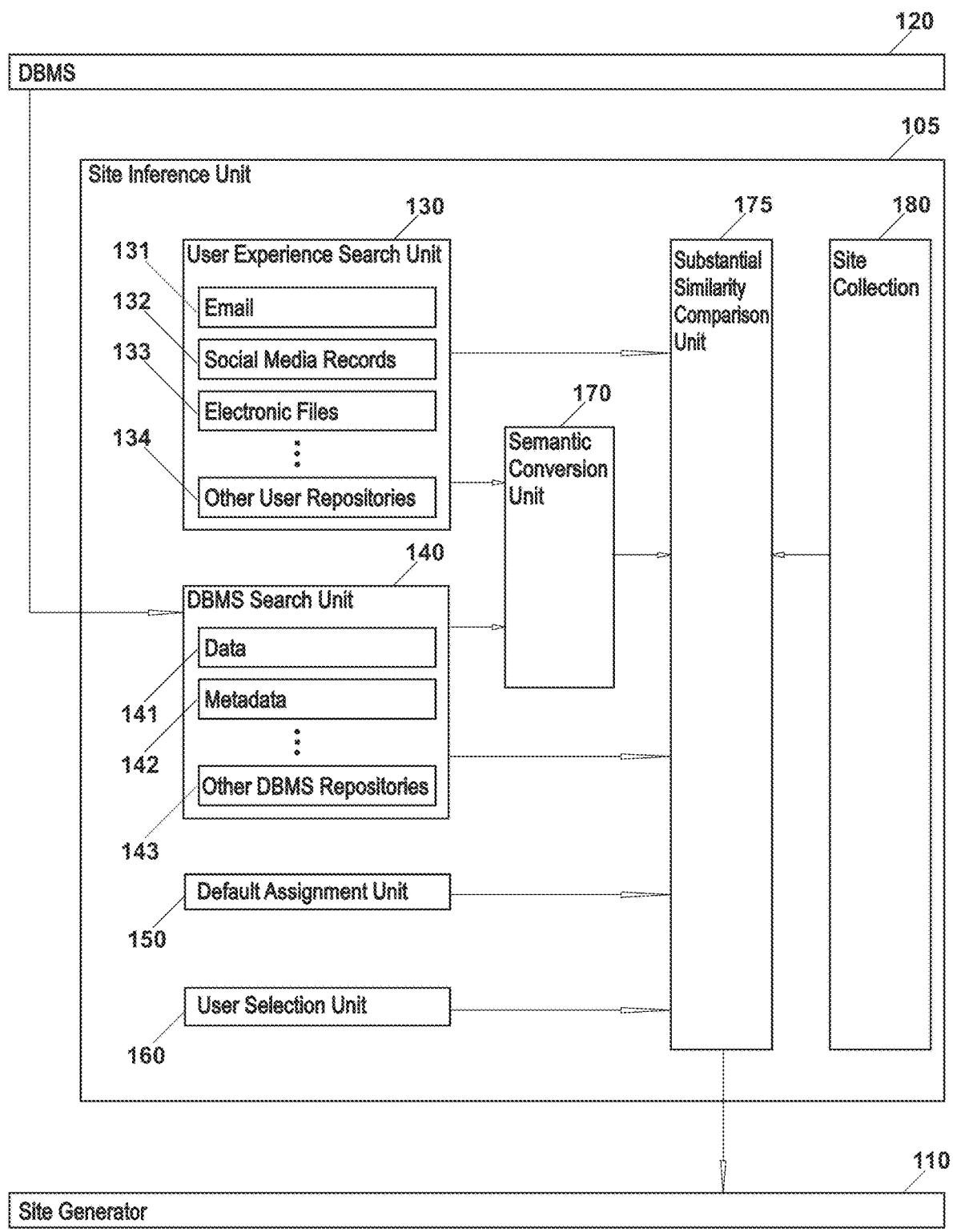
FIG. 7 illustrates an embodiment of Site Inference Unit 105.

Referring to FIG. 7, an embodiment of Site Inference Unit 105 is illustrated. Site Inference Unit 105 comprises the functionality for inferring a Site 200. Site Inference Unit 105 comprises the functionality for inferring a Site 200 to be used to represent DBMS Elements 395. Site Inference Unit 105 includes interconnected User Experience Search Unit 130, DBMS Search Unit 140, Default Assignment Unit 150, User Selection Unit 160, Semantic Conversion Unit 170, Substantial Similarity Comparison Unit 175, and Site Collection 180. Other additional elements may be included as needed, or some of the disclosed ones may be excluded, or a combination thereof may be utilized in alternate embodiments.

User Experience Search Unit 130 (also generally referred to as reference processing unit, etc.) comprises the functionality for determining one or more references from one or more electronic repositories. User Experience Search Unit 130 comprises the functionality for determining one or more references to be used for finding a Site 200. In some embodiments, User Experience Search Unit 130 may receive or access one or more electronic repositories (i.e. user electronic repositories, etc.) such as Email 131, Social Media Records 132, Electronic Files 133, and/or Other User Repositories 134 stored on User's 50 or other (i.e. remote, etc.) Computing Device 70. An electronic repository may store one or more references. Examples of a reference include a text, an image, a sound, a data, and/or other portion of an electronic repository. In one example, an electronic repository such as Email 131 stores one or more characters, one or more words, one or more phrases, and/or other one or more text each of which may be used as reference herein. In another example, an electronic repository such as Email 131 stores one or more text, one or more images, one or more sounds, one or more data, and/or other one or more portions of Email 131 each of which may be used as reference herein.

Email 131 includes User's 50 or other email stored on User's 50 or other (i.e. remote, etc.) Computing Device 70, for example. In some aspects, Email 131 stored on User's 50 Computing Device 70 may be accessed by locating and opening one or more files comprising user's email. In other aspects, Email 131 stored on a remote Computing Device 70 (i.e. email server, etc.) may be accessed via a conventional user interface using login and password, via a web interface, via an API, or via other interface. Social Media Records 132 includes text, images, sounds, and/or other data stored in User's 50 social media accounts such as Facebook, Twitter, and/or others, for example. In some aspects, Social Media Records 132 may be accessed on a remote Computing Device 70 (i.e. application server, etc.) via a conventional user interface using login and password, via a web interface, via an API, or via other interface. Electronic Files 133 includes any digital files stored on User's 50 or other (i.e. remote, etc.) Computing Device 70, for example. Electronic Files 133 stored on User's 50 or other (i.e. remote, etc.) Computing Device 70 may be accessed by locating and opening the files. Other User Repositories 134 includes text messages, voicemail, and/or other repositories stored on User's 50 or other (i.e. remote, etc.) Computing Device 70, for example. User Experience Search Unit 130 may, for example, determine frequently occurring text, images, sounds, data, and/or other portions of the received or accessed electronic repositories. References (i.e. text, images, sounds, data, portions of electronic repository, etc.) may be expressed in a frequency distribution table comprising a count of occurrences of each reference found in the electronic repositories. One or more frequently occurring references may be determined by selecting references with high or highest number of occurrences. As used herein in a context of a Site 200 and/or related elements, a reference or site reference may include a reference to a Site 200. A reference includes any data (i.e. text, image, sound, code, etc.) that may serve as a reference to a Site 200. For example, phrase "Library of Congress" may serve as a reference to a Site 200 representing a building in Washington, D.C. that functions as the research arm of Congress.

In some aspects, electronic repositories containing text may be processed by any known or custom text search or traversing technique. A simple search or traversing technique includes processing one word at a time from the beginning of a text document. Other techniques include splitting a text document and processing (i.e. recursively, parallel, etc.) one word at a time from the respective halves. Some techniques may involve estimating frequently occurring or other references from a portion of processed text document without processing the entire document. More complex techniques include a combination of recursive, parallel processing, and/or other techniques. In one example, all words in a collection of emails or other text documents may be processed and counted as references in a frequency distribution. In another example, all two-word phrases in a collection of emails or other text documents may be processed and counted as references in a frequency distribution. In yet another example, all three-word phrases in a collection of emails or other text documents may be processed and counted as references in a frequency distribution, and so on. In other aspects, electronic repositories containing digital images (i.e. bitmaps, vector graphics, etc.) may be processed by any image processing techniques. For example, object, people, or facial recognition techniques may be utilized to find objects or people in a digital image and convert a recognized object or person into a textual reference that may be treated as text from that point. Image processing techniques are described in more detail in later text and figures. In yet other aspects, electronic repositories containing digital sounds may be processed by any sound or speech processing techniques. For example, sound or speech recognition techniques may be utilized to find words, objects, or people in a digital sound file and convert a recognized sound into a textual reference that may be treated as text from that point. Sound processing techniques are described in more detail in later text and figures.

In some embodiments, once references including any image, sound, and/or other references are available in text format, they may be counted. The counting may be implemented via a counter (not shown) that may count occurrences of each reference. The counting may be expressed separately for each electronic repository or combined in a single frequency distribution table. The following is an example of a simple frequency distribution table comprising two-word and three-word phrases that may be found by processing User's 50 email and/or other text documents, User's 50 digital image files, User's 50 digital sound files, and/or other user repositories:

| Reference | Count |
|---|---|
| Empire State Building | 7 |
| Sears Tower | 5 |
| Arlington National Cemetery | 4 |
| ... | ... |

In one example, references with a count of more than one may be utilized as frequently occurring references for further consideration. In another example, references with a count of more than two may be utilized as frequently occurring references for further consideration. In yet another example, references with a count of more than five may be utilized as frequently occurring references for further consideration. In yet another example, references with a count of more than ten, twenty, hundred, thousand, or any other number may be utilized as frequently occurring references for further consideration. Any number of occurrences of a reference may be utilized as a threshold for designating a reference as a frequently occurring reference for further consideration.

In some aspects, the frequency distribution table may be rearranged, resorted, or modified based on the type of references, source of references, system settings, user preference, and/or other inputs, parameters, or considerations. For example, more importance in a frequency distribution table may be given to references found in metadata as metadata is typically descriptive of or summarizes the data it refers to and therefore may provide higher value as a reference. In more detail, a reference found in metadata may be assigned a higher weight and be placed on or close to the top of the frequency distribution table according to its assigned weight. In other aspects, any data structure, system, or technique instead of or in addition to the frequency distribution table may be used herein for organizing, expressing, or deriving a frequently occurring or other reference. A tree, for example, includes hierarchically organized references, whereas, a graph, for example, includes variously linked references.

In some embodiments, commonly used words or other references such as or, and, into, was, were, I, you, he, she, it, they, etc. may be filtered out or removed as they do not provide value as meaningful references. Such filtering or removal may be performed at the counting stage, in the frequency distribution table or other data structure, or at another stage in the process. In other embodiments, references from a an external pre-made list of references may be searched in user's or other electronic repositories to find one or more references for further consideration that may not be frequently occurring references, in which case frequency distribution table or other data structure, system, or technique for organizing, expressing, or deriving frequently occurring references may be omitted. Such pre-made list of references may be defined based on the type or context of DBMS 120, experience, testing, inquiry, analysis, synthesis, or other techniques.

DBMS Search Unit 140 (also generally referred to as reference processing unit, etc.) comprises the functionality for determining one or more references from one or more DBMS repositories. DBMS Search Unit 140 comprises the functionality for determining one or more references to be used for finding a Site 200. DBMS Search Unit 140 includes all functionalities and/or embodiments of User Experience Search Unit 130. In some embodiments, DBMS Search Unit 140 may receive or access one or more DBMS repositories such as Data 141, Metadata 142, and/or Other DBMS Repositories 143 stored in DBMS 120. DBMS Search Unit 140 may, for example, determine frequently occurring text, images, sounds, data, and/or other portions in the received or accessed DBMS repositories. References (i.e. text, images, sounds, data, portions of electronic repository, etc.) may be expressed in a frequency distribution table as previously described. One or more frequently occurring references may be determined by selecting references with high or highest number of occurrences.

In some aspects, Data 141 may be processed to determine one or more references. For example, Data 141 may typically be stored in a table's data cells comprising text, digital images, sounds, binary code, and/or other data or references thereto. In order to process Data 141, data cells may be traversed or searched by any known or custom traversing or search technique. An example of a simple traversing technique includes processing one data cell at a time from the beginning of a table. Text or other data within a data cell may then be processed, for example, one word or other data section at a time as previously described. In the case that DBMS 120 utilizes or includes a non-tabular data structure, Data 141 may be stored in fields (i.e. data fields, etc.) of the data structure where it may be accessed by reading the fields. In one example, accessing Data 141 and finding references "Mercedes E200", "Volvo S80", and "Jaguar Vanden Plas" may be utilized to determine references to car related Site 200. The following is an example of a simple frequency distribution table comprising two-word and three-word phrases that may be found by processing Data 141:

| Reference | Count |
|---|---|
| Mercedes E200 | 213 |
| Volvo S80 | 97 |
| Jaguar Vanden Plas | 2 |
| ... | ... |

In other aspects, Metadata 142 (also referred to as data about data, etc.) may be processed to determine one or more references. For example, Metadata 142 may typically be stored in DBMS reserved or special tables, files, or other repositories comprising any data about data stored in DBMS 120. Examples of Metadata 142 include names of databases, names of tables in a database, names of reports/views in a database, names of columns in a table, user account information, data relations, and/or other metadata. In one example, accessing a metadata table comprising names of tables or reports/views in a database and finding references "2014 Accounts Payable", "2014 Accounts Receivable", and "2014 Accruals" may be utilized to determine references to accounting related Site 200. The following is an example of a simple frequency distribution table comprising references that may be found by processing Metadata 142:

| Reference | Count |
|---|---|
| 2014 Accounts Payable | 5 |
| 2014 Accounts Receivable | 4 |
| 2014 Accruals | 2 |
| ... | ... |

Default Assignment Unit 150 comprises the functionality for storing a default reference. Default Assignment Unit 150 comprises the functionality for storing a reference to a default Site 200. An example of a default Site 200 includes a universally applicable Site 200 or a Site 200 with which most users can relate such as a building, a house, a mall, a restaurant, a showroom, a city, a room, or other such sites and/or objects. However, any Site 200 may be a default Site 200 and any reference may be a default reference. A default reference may be setup or assigned automatically or by User 50 or system administrator. In some embodiments, Default Assignment Unit 150 includes a means such as graphical user interface (GUI) configured to enable User 50 to setup or assign a reference to a default Site 200. For example, User 50 or system administrator may setup and Default Assignment Unit 150 may store a reference "accounting," which when searched in a collection of Sites 200 (i.e. Site Collection 180, etc.) may yield an accounting related Site 200. An exemplary embodiment of accounting related Site 200 is described in later text and figures.

User Selection Unit 160 comprises the functionality for receiving a selection of a reference from User 50. User Selection Unit 160 comprises the functionality for receiving a selection of a reference to a Site 200 from User 50. In some embodiments, User Selection Unit 160 includes a means such as graphical user interface (GUI) configured to enable User 50 to select a reference to a Site 200 that User 50 wants to utilize. For example, User 50 may be offered a list of references to Sites 200 from which User 50 may select "universe," which when searched in a collection of Sites 200 (i.e. Site Collection 180, etc.) may yield a universe related Site 200 (i.e. stars, planets, etc. representing DBMS Elements 395, etc.). An exemplary embodiment of universe related Site 200 is described in later text and figures.

In some embodiments, Site Inference Unit 105 may be configured to find a reference (i.e. reference to a Site 200, etc.) from user experience (i.e. Email 131, Social Media Records 132, Electronic Files 133, and/or Other User Repositories 134). If a reference (i.e. reference to a Site 200, etc.) is not found (i.e. no reference meets the threshold for minimum number of occurrences, no reference matches a Site Identifier 210 from Site Collection 180, etc.), Site Inference Unit 105 may be configured to find a reference (i.e. reference to a Site 200, etc.) from DBMS 120 (i.e. Data 141, Metadata 142, and/or Other DBMS Repositories 143). If a reference is still not found, Site Inference Unit 105 may be configured to utilize a default reference (i.e. reference to a Site 200, etc.) stored in Default Assignment Unit 150 or enable User 50 to select a reference from a collection or list of references (i.e. references to Sites 200, etc.) via User Selection Unit 160. In other embodiments, the disclosed or other methods for finding or determining a reference (i.e. reference to a Site 200, etc.) may be ordered or prioritized differently or according to the context in which AMD Unit 100 is used. For example, the system may use a default reference such as "building" for all DBMSs 120 comprising business data, while the system may ask User 50 to select a reference (i.e. reference to a Site 200, etc.) for DBMSs 120 comprising non-business data (i.e. music files, images, personal data etc.). In further embodiments, the system may enable User 50 to choose which automatic or manual method(s) for determining or selecting a reference (i.e. reference to a Site 200, etc.) to utilize. In yet other embodiments, only one or some of the disclosed methods may be utilized.

Substantial Similarity Comparison Unit 175 comprises the functionality for comparing or matching references or other data. Substantial Similarity Comparison Unit 175 comprises the functionality for comparing or matching text, images, sounds, and/or other data. Substantial Similarity Comparison Unit 175 comprises the functionality for comparing or matching references to Sites 200 from User Experience Search Unit 130, DBMS Search Unit 140, Default Assignment Unit 150, User Selection Unit 160, and/or other elements with Site Identifiers 210 from Site Collection 180. In some embodiments, Substantial Similarity Comparison Unit 175 comprises functions, rules, and/or logic for performing comparisons or matching and for determining that while a perfect match is not found, a substantially similar match has been found. Substantial Similarity Comparison Unit 175 may therefore determine a Site Identifier 210 from Site Collection 180 that is most like a reference (i.e. reference to a Site 200, etc.) from User Experience Search Unit 130, DBMS Search Unit 140, Default Assignment Unit 150, User Selection Unit 160, and/or other elements, even if the Site Identifier 210 from Site Collection 180 may be different from the compared reference (i.e. reference to a Site 200, etc.). In one example, total equivalence may be found when all of the words of a Site Identifier 210 match all of the words of the compared reference (i.e. reference to a Site 200, etc.). In another example, substantial similarity may be achieved when most of the words of a Site Identifier 210 match most of the words of the compared reference (i.e. reference to a Site 200, etc.). In a further example, when a total equivalence match is not found, Substantial Similarity Comparison Unit 175 may omit some of the words from the comparison such as omitting the last word in a reference "Arlington National Cemetery 2014" to find Site Identifier 210 "Arlington National Cemetery" as a substantial match.

Substantial Similarity Comparison Unit 175 may comprise comparison strictness rules, logic, and/or functions for determining the strictness criteria for finding a substantially similar match between references (i.e. references to Sites 200, etc.) and Site Identifiers 210. In some aspects, if the rules are too strict, Substantial Similarity Comparison Unit 175 may not find a matching Site Identifier 210 in Site Collection 180. On the other hand, if the rules are too lenient Substantial Similarity Comparison Unit 175 may find too many matching Site Identifiers 210. Substantial Similarity Comparison Unit 175 may therefore include the functionality for setting, resetting, or adjusting the strictness of rules for finding substantially similar matches, thereby fine tuning Substantial Similarity Comparison Unit 175 so that the rules for finding the match are not too strict nor too lenient. In some aspects, appropriately strict rules for substantial similarity may be defined based on the type or context of DBMS 120, experience, testing, inquiry, analysis, synthesis, or other techniques. As such, strictness rules of Substantial Similarity Comparison Unit 175 may be set automatically, or by User 50 or AMD Unit administrator based on such experience and knowledge, for example.

Substantial Similarity Comparison Unit 175 may automatically adjust its level of strictness for finding a substantially similar match between the compared references (i.e. references to Sites 200, etc.) and Site Identifiers 210. Depending on design, various levels of strictness may be used. In some embodiments, Substantial Similarity Comparison Unit 175 may utilize a strictness level so that only perfect matches between the compared references (i.e. references to Sites 200, etc.) and Site Identifiers 210 are considered. If such a match is not found, Substantial Similarity Comparison Unit 175 may decrease the strictness level. In some aspects, in response to decreasing the strictness level, Substantial Similarity Comparison Unit 175 may set the strictness of the rules to search for a substantially similar match in terms of a total equivalence with respect to front-most (i.e. first, second, etc.) words only, thereby tolerating mismatches in later (i.e. third, fourth, etc.) words, for example. Substantial Similarity Comparison Unit 175 may choose to relax the rules in response to determining that no total equivalence match had been found. In further embodiments, Substantial Similarity Comparison Unit 175 may, upon determining that a perfect match is not found, allow for matching all but one of the words of the searched reference (i.e. reference to a Site 200, etc.) or of the compared Site Identifier 210. In yet other embodiments, Substantial Similarity Comparison Unit 175 may, upon determining that a perfect match is not found, allow for matching all but two or more of the words of the searched reference (i.e. reference to a Site 200, etc.) or of the compared Site Identifier 210.

All the aforementioned settings of strictness of substantial similarity may be set, reset, or adjusted by Substantial Similarity Comparison Unit 175 in response to another strictness level determination. Such an adjustment in strictness may be done by Substantial Similarity Comparison Unit 175 in response to determining that a total equivalence match for an entire reference (i.e. reference to a Site 200, etc.) is not found among Site Identifiers 210 in Site Collection 180. Similarly, Substantial Similarity Comparison Unit 175 may adjust the strictness level for identifying a substantially similar match for a reference (i.e. reference to a Site 200, etc.) whose words match all but one word of the compared Site Identifier 210. Also, Substantial Similarity Comparison Unit 175 may adjust the strictness level for identifying a substantially similar match for a reference (i.e. reference to a Site 200, etc.) whose words match all but two or more words of the compared Site Identifier 210. Such an adjustment in strictness may be done by Substantial Similarity Comparison Unit 175 in response to determining that not a sufficient number of matches had been found using a higher strictness level.

In some embodiments, Substantial Similarity Comparison Unit 175 may utilize two thresholds, an upper and lower threshold, to define, increase, or decrease the strictness of the rules used for determining a substantially similar match. The upper threshold may correspond to the number of substantially similar matches that may be too high to consider. Alternatively, the lower threshold may correspond to the strictness level that may result in too few results to consider. Substantial Similarity Comparison Unit 175 may make any combination of the aforementioned adjustments to achieve that the number of substantially similar matches between the compared references (i.e. references to Sites 200, etc.) and Site Identifiers 210 falls between the upper and lower thresholds. As such, Substantial Similarity Comparison Unit 175 may keep adjusting the strictness rules for finding a substantially similar match until both thresholds are satisfied, thereby adjusting the results until the best result or best set of results is found. In some aspects, where more than one substantially similar match is found, the system may present User 50 with the matches for user selection or the system may automatically select one of the matches.

In some embodiments, Substantial Similarity Comparison Unit 175 may adjust the strictness level by choosing the number of words that it will use to find a substantially similar match. For example, Substantial Similarity Comparison Unit 175 may attempt to find only one word (i.e. first word, etc.) from a reference (i.e. reference to a Site 200, etc.) in the words of the compared Site Identifier 210. If the comparison provides a number of matching results (i.e. total equivalences, etc.) that is above a particular threshold, Substantial Similarity Comparison Unit 175 may decide to increase the strictness of the rules to decrease the number of results. In response, Substantial Similarity Comparison Unit 175 may attempt to find a second word from a reference (i.e. reference to a Site 200, etc.) in the words of the compared Site Identifier 210 in addition to the earlier found word to limit the number of matching results. If the number of matching results is still too high, Substantial Similarity Comparison Unit 175 may determine to further increase the strictness by requiring additional words to be used in the comparison and thereby further narrow the search results until a substantially similar match is found. In some aspects, the additional words include a portion of a word such as one or more characters, digits, and/or other symbols. Where a reference to a word is used herein it should be understood that a portion of a word may be used instead such as one or more characters, digits, symbols, and/or other portions of a word. As such all operations, rules, logic, and/or functions operating on words similarly apply to any portion of a word. In one example, where one or more forward-most words may be used in the comparison as previously described, one or more forward-most characters, digits, symbols, and/or other portions of a word may be used in an alternate implementation of the comparison involving portions of a word. In another example, where comparison strictness may be increased by using one or more additional words in the comparison as previously described, additional one or more characters, digits, symbols, and/or other portions of a word may be used in an alternate implementation of the comparison involving portions of a word. In general, whole words and portions of a word, including any disclosed operations involving whole words and portions of a word, may be combined to arrive at desired results.

Site Collection 180 comprises the functionality for storing Sites 200. Site Collection 180 comprises the functionality for storing, managing, and/or manipulating Sites 200. Site Collection 180 may include one or more databases, tables, files, objects, data structures, or other data repositories comprising one or more Sites 200. In some embodiments, Site Collection 180 and/or Sites 200 within the collection may be created and/or managed by a system administrator (i.e. corporate database administrator, etc.). In other embodiments, Site Collection 180 and/or Sites 200 within the collection may be created and/or managed by a service provider (i.e. AMD application service provider, etc.). In further embodiments, Site Collection 180 and/or Sites 200 within the collection may be created and/or managed by a user group and shared with other users over a network (i.e. Internet, etc.). For example, users of such a user group may create their favorite Sites 200 for other users of the group to utilize for free or for a fee under any type of license.

In some implementations, Site Collection 180 comprises the functionality to receive and process queries or requests and provide Sites 200 matching the query or request. In one example, a DBMS or database storing Sites 200 may receive and process SQL queries and provide Sites 200 that match the query criteria. In another example, a file, object, data structure, and/or other such data repository storing Sites 200 includes additional logic or functions designed to receive and process requests to access the contents of the file, object, data structure, and/or other such data repository and provide Sites 200 that match a certain criteria.

Figure 8A:
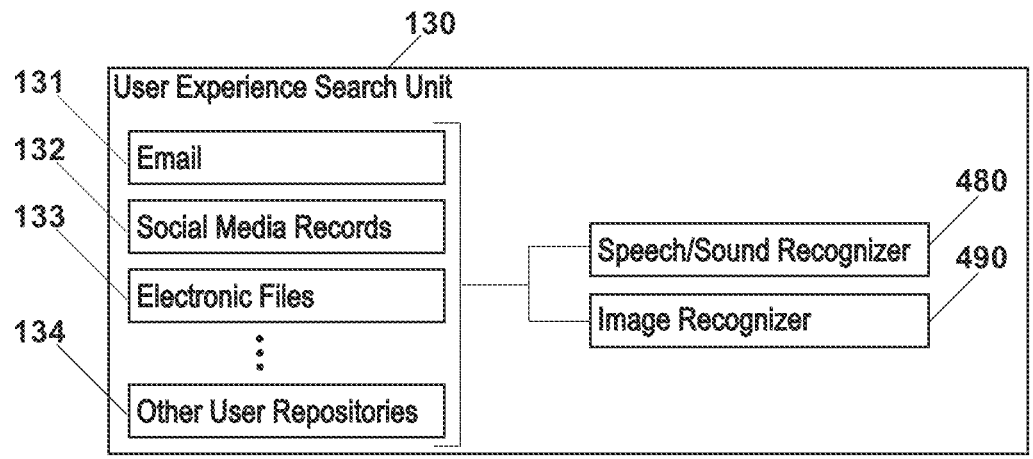
FIG. 8A illustrates an embodiment of User Experience Search Unit 130 including Speech/Sound Recognizer 480 and Image Recognizer 490.
Figure 8B:
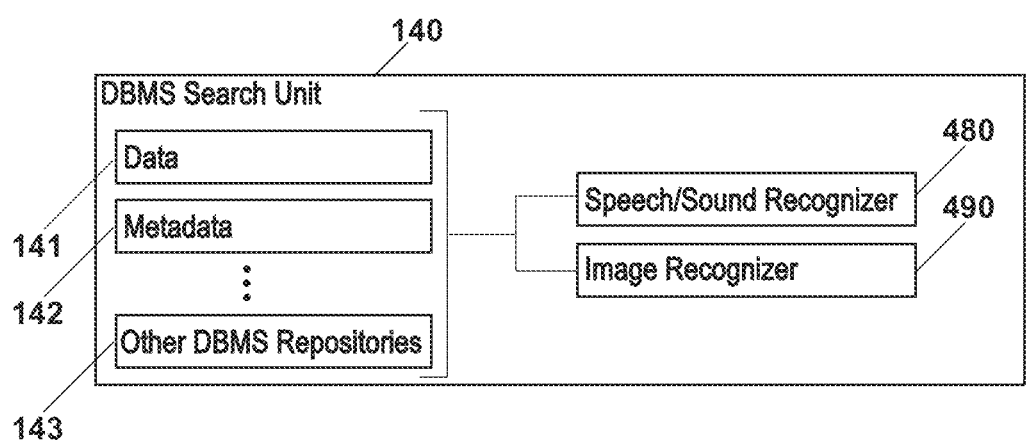
FIG. 8B illustrates an embodiment of DBMS Search Unit 140 including Speech/Sound Recognizer 480 and Image Recognizer 490.

Referring to FIG. 8A and FIG. 8B, embodiments of User Experience Search Unit 130 and DBMS Search Unit 140 including Speech/Sound Recognizer 480 and Image Recognizer 490 are illustrated.

Speech/Sound Recognizer 480 comprises any hardware, software, or a combination of hardware and software. Speech/Sound Recognizer 480 comprises the functionality for processing audio data into textual or other type of data. Speech/Sound Recognizer 480 comprises the functionality for processing audio data into textual or other type of data for use by elements of AMD Unit 100. Audio data includes digital sound, and/or other audio data. Examples of file formats that may be utilized to store audio data include WAV, WMA, AIFF, MP3, and/or other file formats. Speech/Sound Recognizer 480 may enable any electronic repository or file containing audio data such as Email 131, Social Media Records 132, Electronic Files 133, and/or Other User Repositories 134 as well as Data 141, Metadata 142, and/or Other DBMS Repositories 143 to be processed into references that may be used to find a suitable Site 200 as previously described. In some aspects, Speech/Sound Recognizer 480 may identify or recognize speech or sound from an audio file by comparing sample values of digitally sampled sound (or portions thereof) from the audio file with sample values of digitally sampled sound from a database of known sounds. The database of known sounds may be stored locally on Computing Device 70 or remotely on a remote computing device accessible over a network.

In some embodiments, operating system's speech/sound recognition functionalities such as iOS's Voice Services, Siri, and/or others may be utilized in Speech/Sound Recognizer 480. For example, iOS Voice Services may process audio data from an electronic repository such as Email 131 into textual or other references that may be utilized in Substantial Similarity Comparison Unit 175, Semantic Conversion Unit 170, and/or other elements.

In other embodiments, Java Speech API (JSAPI) implementation such as The Cloud Garden, Sphinx, and/or others may be utilized in Speech/Sound Recognizer 480. For example, Cloud Garden JSAPI may process audio data from an electronic repository such as Electronic Files 133 into textual or other references that may be utilized in Substantial Similarity Comparison Unit 175, Semantic Conversion Unit 170, and/or other elements. Any other programming language's or platform's speech or sound processing API may similarly be utilized.

In further embodiments, applications or engines providing speech/sound recognition functionalities such as OpenEars, Dragon Mobile, iSpeech, CeedVocal, Flite, Julius, and/or others may be utilized in Speech/Sound Recognizer 480. For example, OpenEars SDK may process audio data from an electronic repository such as Data 141 into textual or other references that may be utilized in Substantial Similarity Comparison Unit 175, Semantic Conversion Unit 170, and/or other elements.

In some aspects, Speech/Sound Recognizer 480 may be implemented as keyword spotting or as full speech recognition depending on resource availability. Keyword spotting may attempt to find only a select group of words and/or phrases, and because of this limited lexicon it may consume fewer resources. Full speech recognition may attempt to find all the words and/or phrases, and because of this broader lexicon it may consume significant resources.

Image Recognizer 490 comprises any hardware, software, or a combination of hardware and software. Image Recognizer 490 comprises the functionality for processing visual data into textual or other type of data. Image Recognizer 490 comprises the functionality for processing visual data into textual or other type of data for use by elements of AMD Unit 100. Visual data includes digital images (i.e. bitmaps, vector graphics, etc.), digital video, and/or other visual data. Examples of file formats that may be utilized to store visual data include JPEG, GIF, TIFF, PNG, PDF, AVI, DivX, MPEG, and/or other file formats. Image Recognizer 490 may enable any electronic repository or file containing visual data such as Email 131, Social Media Records 132, Electronic Files 133, and/or Other User Repositories 134 as well as Data 141, Metadata 142, and/or Other DBMS Repositories 143 to be processed into references that may be used to find a suitable Site 200 as previously described. In some aspects, Image Recognizer 490 may identify or recognize objects or persons from an image or video frame (or portions thereof) by comparing regions of pixels from the image or video frame with regions of pixels from a database of known images. The database of known images may be stored locally on Computing Device 70 or remotely on a remote computing device accessible over a network.

In some embodiments, optical character recognition (OCR) techniques and/or tools such as Asprise OCR software development kit (SDK), ABBYY FineReader Engine, Dynamsoft OCR SDK, Tesseract Engine, and/or others may be utilized for recognizing textual information in digital images. In some aspects, OCR techniques and/or tools may involve conversion of digital images (i.e. bitmaps, etc.) containing typewritten or printed textual data into computer-encoded text that can be edited, stored, or otherwise manipulated. For example, Asprise OCR SDK may process visual data from an electronic repository such as Social Media Records 132 into textual or other references that may be utilized in Substantial Similarity Comparison Unit 175, Semantic Conversion Unit 170, and/or other elements.

In other embodiments, facial recognition techniques and/or tools such as OpenCV (Open Source Computer Vision) library, Animetrics FaceR API, Lambda Labs Facial Recognition API, Face++ SDK, Neven Vision (also known as N-Vision) Engine, and/or others may be utilized for recognizing faces in digital images. In some aspects, facial recognition techniques and/or tools may involve identifying and/or analyzing facial features such as the relative position, size, and/or shape of the eyes, nose, cheekbones, jaw, etc., which may then be used to search for images with matching features. For example, FaceR API may process visual data from an electronic repository such as Electronic Files 133 into textual or other references that may be utilized in Substantial Similarity Comparison Unit 175, Semantic Conversion Unit 170, and/or other elements.

In further embodiments, object recognition techniques and/or tools such as OpenCV (Open Source Computer Vision) library, CamFind API, Kooaba, 6px API, Dextro API, and/or others may be utilized for recognizing objects (i.e. objects, people, etc.) in digital images. In some aspects, object recognition techniques and/or tools may involve identifying and/or analyzing object features such as lines, edges, ridge, corners or blobs, regions, and/or their relative positions, sizes, shapes, etc., which may then be used to search for images with matching features. For example, OpenCV library may process visual data from an electronic repository such as Data 141 into textual or other references that may be utilized in Substantial Similarity Comparison Unit 175, Semantic Conversion Unit 170, and/or other elements.

Figure 9:
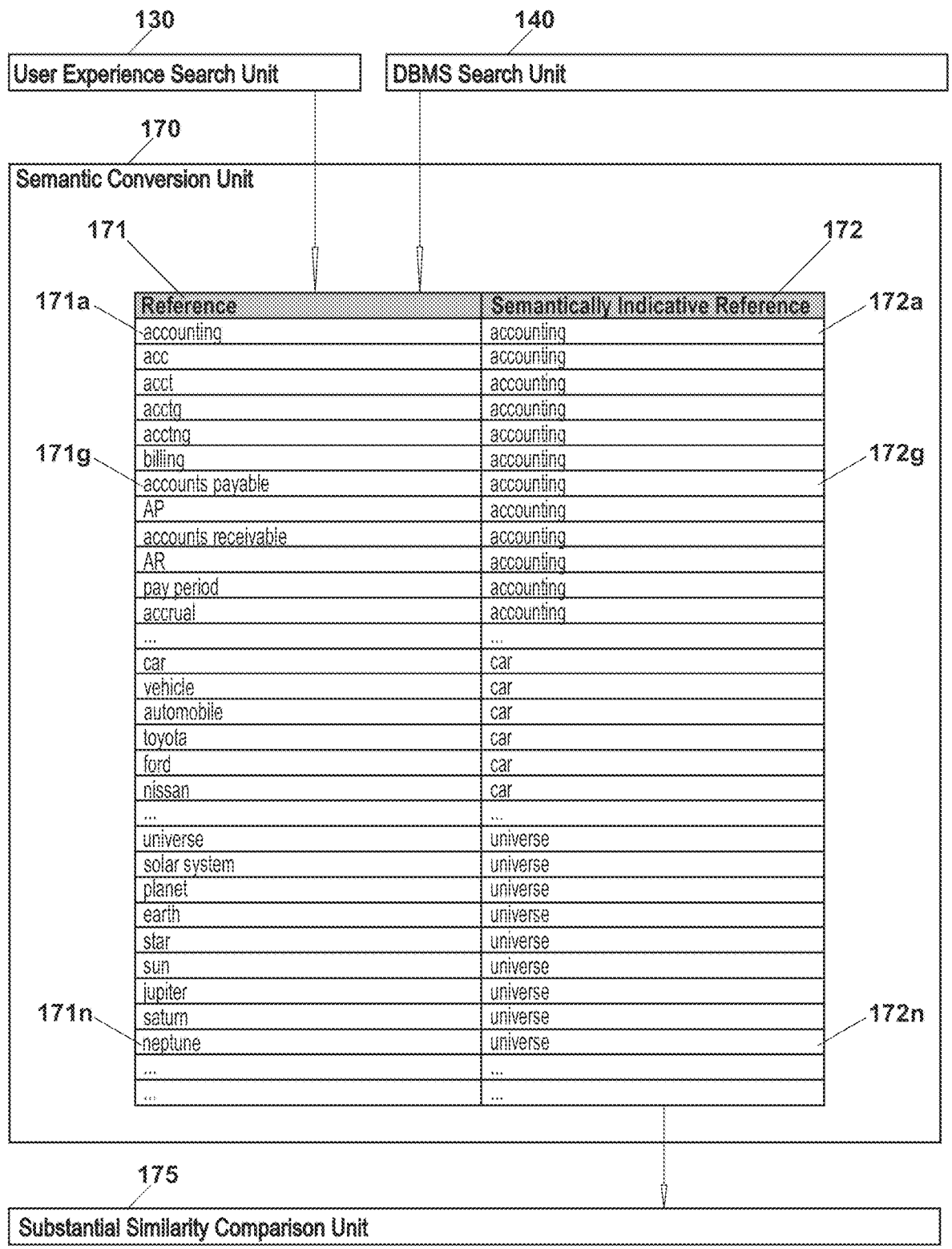
FIG. 9 illustrates an embodiment of Semantic Conversion Unit 170.

Referring to FIG. 9, an embodiment of a Semantic Conversion Unit 170 is illustrated. Semantic Conversion Unit 170 comprises the functionality for storing a collection of references associated with their corresponding semantically indicative references. Semantic Conversion Unit 170 comprises the functionality for storing a collection of references to Sites 200 associated with their corresponding semantically indicative references to Sites 200. When provided with a reference (i.e. reference to a Site 200, etc.), Semantic Conversion Unit 170 may find a semantically indicative reference (i.e. semantically indicative reference to a Site 200, etc.). In some embodiments, Semantic Conversion Unit 170 includes a table in which one column comprises References 171 such as References 171*a*-171*n* and another column comprises the corresponding Semantically Indicative References 172 such as Semantically Indicative References 172*a*-172*n*. Therefore, Semantic Conversion Unit 170 may serve as converter or look-up of a reference (i.e. frequently occurring or other reference, etc.) from User Experience Search Unit 130, DBMS Search Unit 140, and/or other elements into a semantically indicative reference (i.e. semantically indicative reference to a Site 200, etc.) that may likely be found in Site Collection 180. In one example, if a Reference 171 such as "accounts payable" (i.e. Reference 171*g*) cannot be found by a direct comparison with Site Identifiers 210 in Site Collection 180, a Semantically Indicative Reference 172 such as "accounting" (i.e. Semantically Indicative Reference 172*g*) may be found in Semantic Conversion Unit 170. Semantically Indicative Reference 172, if found in Semantic Conversion Unit 170, may then be compared with Site Identifiers 210 from Site Collection 180 with increased likelihood of finding a match (i.e. substantially similar match, etc.).

In some embodiments, one or more Site Identifiers 210 include one or more references (i.e. References 171, Semantically Indicative References 172, etc.) that identify a particular Site 200. For example, Site 200 may include Site Identifiers 210 such as "accounting", "acc", "acct", "acctg", "acctng", "billing", "accounts payable", "AP", "accounts receivable", "AR", "pay period", "accrual", etc. all identifying an "accounting" related Site 200. In such embodiments, Semantic Conversion Unit 170 may be omitted or partially utilized.

Figure 10:
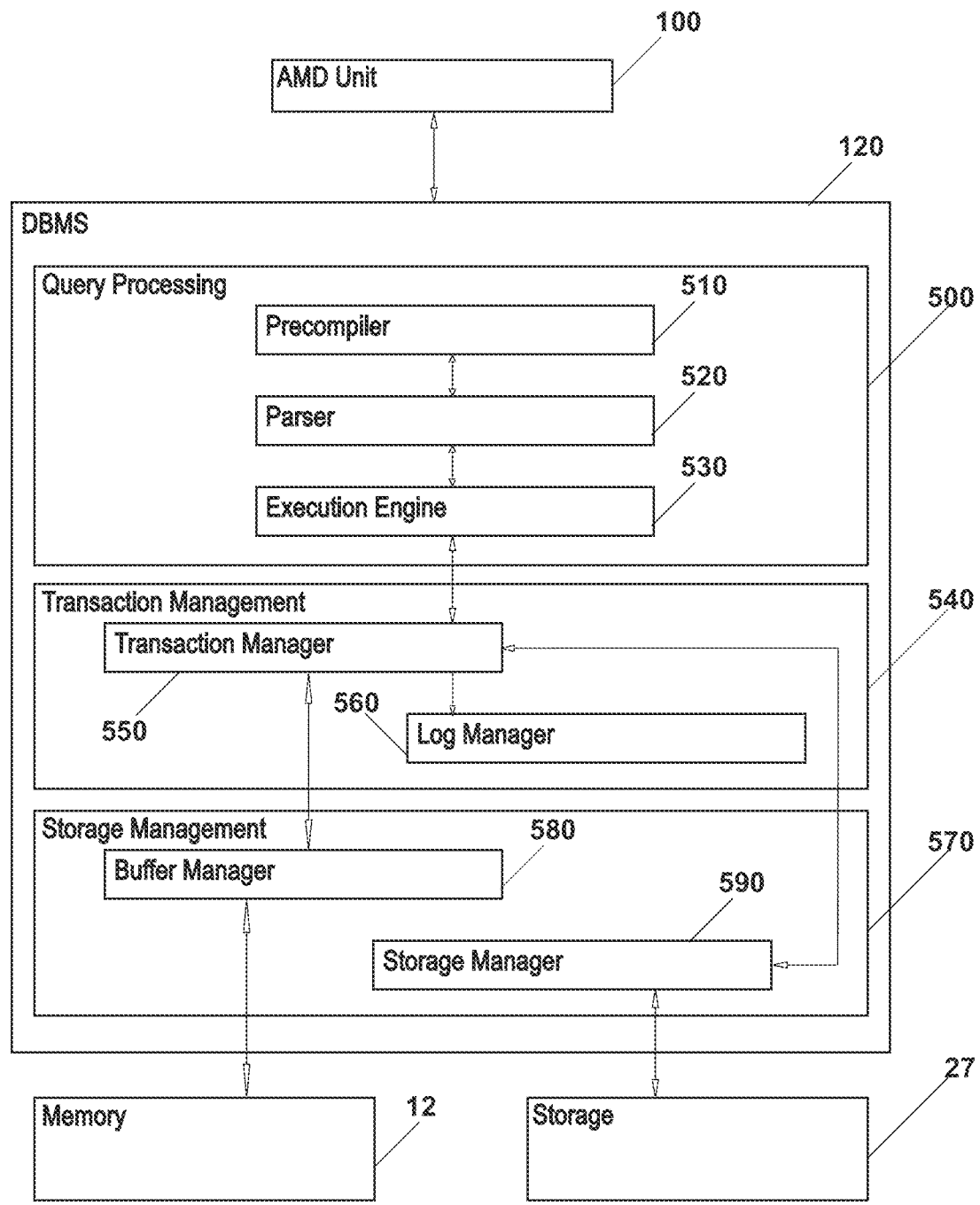
FIG. 10 illustrates an embodiment of a DBMS including typical internal processing elements.

Referring to FIG. 10, an embodiment of a DBMS including typical internal processing elements is illustrated. AMD Unit 100 may be configured to take control from, share control with, or release control to DBMS 120. Such AMD Unit 100 configuration may include a DBMS control interface or unit, DBMS control program or system, DBMS modification unit, or other such control mechanism (not shown) to facilitate control over DBMS 120. The term control may refer to control of DBMS's 120 internal processing elements and/or control of execution of DBMS internal instructions, processes, functions, and/or other operations. In some embodiments, AMD Unit 100 may take control from, share control with, or release control to DBMS 120 by manipulating internal processing elements of DBMS 120 such as Query Processing 500, Precompiler 510, Parser 520, Execution Engine 530, and/or other internal processing elements.

Precompiler 510 comprises the functionality for extracting the relevant SQL statement(s) or other DBMS command(s) embedded in the incoming DBMS instruction, and/or for translating the incoming DBMS instruction into corresponding SQL statement(s) or other DBMS command(s). The DBMS instruction may come from an application programming interface (API) or directly from a program or system such as AMD Unit 100. Precompiler 510 may process the incoming DBMS instruction into a format that DBMS 120 understands.

Parser 520 comprises the functionality for parsing SQL statement(s) or other DBMS command(s) that were deciphered from the incoming DBMS instruction. In some aspects, Parser 520 may create a parse tree structure based on the SQL statement(s) or other DBMS command(s) so that they may be in appropriate format for other elements later in DBMS 120 execution flow.

Execution Engine 530 comprises the functionality for executing SQL statement(s) or other DBMS command(s) that were deciphered from the incoming DBMS instruction. As such, Execution Engine 530 may perform an operation defined by the DBMS instruction. For example, an operation may involve (1) accessing, adding, modifying, or deleting a Database 300, (2) accessing, adding, modifying, or deleting a Table 310, (3) accessing, adding, modifying, or deleting any Columns 320, Rows 330, or Data Cells 340 (i.e. also generally referred to as data, etc.) of Tables 310, and/or (5) other operations. When executing SQL statement(s) or other DBMS command(s), a plurality of lower level operations may generally be performed by DBMS 120 in a predetermined order including issuing a read or write request to Storage 27.

Transaction Manager 550 comprises the functionality for ensuring that a transaction is executed properly in accordance with rules of the DBMS, SQL, and/or other applicable system rules. A transaction includes a single unit of work that can have one or more SQL statement(s) or other DBMS command(s). Transaction Manager 550 may also include the functionality to resolve any deadlock situations that may occur during the process such as during a situation when two transactions cannot continue because they each have some data that the other needs to proceed.

Log Manager 560 comprises the functionality for logging operations executed by DBMS 120. Log Manager 560 may store a log in Storage 27, for example.

Buffer Manager 580 comprises the functionality for allocating and managing memory space of DBMS 120. Buffer Manager 580 may allocate resources for accessing, managing, and/or manipulating data and/or other elements of DBMS 120. For example, Buffer Manager 580 may receive formatted requests and decide how much Memory 12 to allocate per buffer and how many buffers to allocate per request.

Storage Manager 590 comprises the functionality for retrieving and storing data and/or other elements of DBMS 120. For example, at the lowest level, Storage Manager 590 may issue requests through the underlying Storage 27 controller (not shown; i.e. hard disk controller, etc.) or the operating system to retrieve data from or store data into Storage 27. Storage 27 controller may include a device or system configured to provide an interface for retrieving and storing data or other DBMS elements in the file system of Storage 27.

Other additional internal processing elements such as data definition language (DDL) compiler, query preprocessor, security manager, integration manager, query optimizer, recovery manager, concurrency manager, control manager, resource manager, communications manager, lock manager, page and cache manager, and/or other elements may be included, or some of the disclosed ones may be excluded, or a combination thereof may be utilized in alternate implementations.

In some embodiments, AMD Unit 100 may take control from DBMS 120 or DBMS's native user interface by redirecting execution of DBMS 120 or DBMS's native user interface to AMD Unit 100 when a certain event, state, or other condition is detected in any of the DBMS 120 internal processing elements or at any other time as needed. Furthermore, AMD Unit 100 may release control to DBMS 120 or DBMS's native user interface by redirecting execution back to DBMS 120 or DBMS's native user interface when AMD Unit 100 operations are complete or at any other time as needed. Examples of events, states, or conditions that may trigger AMD Unit's taking control from, releasing control to, or sharing control with DBMS 120 include a DBMS start, a DBMS shut-down, AMD Unit start, AMD Unit shut-down, an operating system start, an operating system shut-down, an application start, an application shut-down, a system start, a system shut-down, a system clock event, a system scheduler event, a function call, a function exit, an instruction execution, an instruction detection, and/or others. A DBMS's native user interface includes any application or system for access, management, or manipulation of DBMS 120, any application or system running on top of DBMS 120 (i.e. application layer, etc.), or any application or system using DBMS 120 as an underlying data storage/management system. Examples of DBMS's native user interface include an application for visual data management (i.e. Microsoft Access, Oracle, MS SQL Server visual data management modules, etc.), a report or query building application, a user or web application, and/or other applications or systems. In one example, AMD Unit 100 may take control from DBMS 120 or DBMS's native user interface by redirecting execution to AMD Unit 100 when a SELECT SQL statement is detected in Precompiler 510, Parser 520, Execution Engine 530, or other internal processing elements of DBMS 120. AMD Unit 100 may then display the resulting data set using AMD Unit 100 functionalities (i.e. Interactive Objects 295 associated with DBMS Elements 395, etc.). From that point, User 50 may access, manage, and/or manipulate the data set and/or its elements through AMD Unit 100 as previously described. In another example, AMD Unit 100 may release control to DBMS 120 or DBMS's native user interface by redirecting execution back to DBMS 120 or DBMS's native user interface when User 50 is done with accessing, managing, and/or manipulating the data set and/or its elements through AMD Unit 100. For instance, User 50 may exit a room Interactive Object 295 that is associated with the data set DBMS Element 395 at which point AMD Unit 100 may release control to DBMS 120 or DBMS's native user interface. In general, AMD Unit may take control from, release control to, or share control with DBMS 120 or DBMS's native user interface at any time and remain in control for any period of time.

Various techniques or tools may be utilized to redirect or modify execution flow (i.e. taking, sharing, and/or releasing control, etc.) of an application such as DBMS 120 or DBMS's native user interface. One of ordinary skill in art will understand that, while all these techniques may be too voluminous to list, all of these techniques or tools are within the scope of this disclosure in its various implementations. These techniques or tools comprise a wide range of functionalities for modifying execution of an application such as, for example, instrumentation, dynamic code functionalities, branching, code rewriting, code overwriting, self-modifying code functionalities, hot swapping, and/or other functionalities. In some aspects, AMD Unit 100 includes any functionality to access, create, delete, modify, and/or perform other manipulations on source code, bytecode, compiled, interpreted or otherwise translated code, machine code, and/or other code of DBMS 120 or DBMS's native user interface. In other aspects, AMD Unit 100 includes any functionality to access, modify, and/or perform other manipulations of virtual machine, compiler, JIT compiler, execution stack, program counter, memory, registers (i.e. processor registers), objects, data structures, variables, parameters, and/or other computing device components, or instruction or data repositories, in addition to the previously described DBMS 120 internal processing elements. In yet other aspects, code instrumentation may be utilized for inserting additional code (i.e. AMD Unit 100 code, etc.), overwriting or rewriting existing code, and/or branching to a separate segment of code (i.e. function, procedure, routine/subroutine, etc.). In yet other aspects, AMD Unit 100 may overwrite or rewrite the original code of DBMS 120 or DBMS's native user interface with AMD Unit 100 code. In yet other aspects, AMD Unit 100 may insert or embed AMD Unit 100 code among the original code of DBMS 120 or DBMS's native user interface. In yet other aspects, AMD Unit 100 may branch, redirect, or jump to AMD Unit 100 code from the original code of DBMS 120 or DBMS's native user interface.

In one example, redirecting or modifying execution of an application such as DBMS 120 or DBMS's native user interface may be implemented using a branch, jump, trampoline, trap, or another similar mechanism. When executing an application, a computer may typically fetch and execute code or instructions in sequence until it encounters a branch or jump instruction. A jump instruction may be inserted at a specific point in the target application's execution to redirect execution to a function, routine/subroutine, or an alternate code segment. The computer may then fetch its next instruction from a different instruction sequence or code segment as specified by the branch instruction. After the execution of the alternate code segment, control may be redirected back to the original jump point or to another point in the application. The disclosed functionalities may therefore be implemented by redirecting the execution of DBMS 120 or DBMS's native user interface to AMD Unit 100, for example. Depending on design, platform, programming language, and/or other factors, AMD Unit 100 code or instructions may be pre-compiled, pre-interpreted, or otherwise pre-translated and ready for execution. AMD Unit 100 code or instructions may also be JIT compiled, interpreted, or otherwise translated immediately before execution. In other aspects, assembly language may be used to redirect application's execution to instrumentation routine/subroutine or other code segment elsewhere in memory by inserting a jump or trampoline into the target application's in-memory code, by redirecting program counter, or by other techniques.

In another example, redirecting or modifying execution of an application such as DBMS 120 or DBMS's native user interface may be implemented through independent tools that may be utilized across different platforms. These tools may enable application modification or insertion of alternate code such as AMD Unit 130 code. Examples of these tools include Pin, DynamoRIO, DynInst, Kprobes, Kernlnst, OpenPAT, DTrace, SystemTap, and/or others. In some aspects, Pin and/or any of its systems, methods, and/or techniques may be utilized for dynamic instrumentation. Pin may perform instrumentation by taking control of an application after it loads into memory. Pin may insert itself into the address space of an executing application, enabling it to take control. Pin just-in-time (JIT) compiler may then compile and implement alternate code such as AMD Unit 100 code or instructions.

In another example, redirecting or modifying execution of an application such as DBMS 120 or DBMS's native user interface may be implemented through utilizing metaprogramming techniques, which include applications that may self-modify or that may create, modify, and/or manipulate other applications. Dynamic code, reflection, self-modifying code, and/or other techniques may be used to facilitate metaprogramming. In some aspects, metaprogramming may be facilitated through a programming language's ability to access and manipulate the internals of the runtime engine of a target application directly or via an API. In other aspects, metaprogramming may be facilitated through dynamic execution of expressions (i.e. AMD Unit 100 code or instructions, etc.) that may be created and/or executed at runtime. In yet other aspects, metaprogramming may be facilitated through application modification tools, which may perform any modification on an application regardless of whether the application's programming language enables any metaprogramming capabilities.

In a further example, redirecting or modifying execution of an application such as DBMS 120 or DBMS's native user interface may be implemented through native capabilities of dynamic, interpreted, and/or scripting programming languages or platforms. Most of these languages or platforms may perform functionalities at runtime that static programming languages may perform during compilation. Dynamic, interpreted, or scripting languages may provide native functionalities such as dynamic code, self-modification of code, extending the application, adding new code, extending objects and definitions, modifying the type system, and/or other functionalities that may modify an application's execution and/or functionality at runtime. Typical dynamic, interpreted, or scripting languages include Lisp, Perl, PHP, JavaScript, Ruby, Python, Smalltalk, Tcl, VBScript, and/or others. In one example, a DBMS's native user interface written in JavaScript may modify its own code as it runs by utilizing Function object constructor such as myFunc=new Function(arg1, arg2, argN, functionBody). This example code may be inserted by a controlling application such as AMD Unit 100 and cause a new function object to be created with the specified arguments and body. The body and/or arguments of the new function object may include AMD Unit 100 code, for example. The new function may be invoked as any other function in the original code. In another example, JavaScript may utilize eval method that may accept a string of JavaScript statements (i.e. inserted AMD Unit 100 code, etc.) and execute them as if they were within the original code. In a further example, Lisp's compile and/or eval commands may be similarly utilized as the above described JavaScript commands. In yet another example, similar functionalities may also be provided in static or semi-dynamic languages such as Java, C, and/or others using reflection. Reflection includes the ability of an application to examine and modify the structure and behavior of the application at runtime.

In yet another example, redirecting or modifying execution of an application such as DBMS 120 or DBMS's native user interface may be implemented through dynamic class loading, dynamic code, reflection, and/or other native functionalities of a programming language or platform. In static applications or static programming, a class may be defined and/or loaded at compile time. Conversely, in dynamic applications or dynamic programming, a class may be loaded into a running environment at runtime. For example, Java Runtime Environment (JRE) may not require that all classes be loaded at compile time and class loading may occur when a class is first referenced at runtime. Dynamic class loading may enable inclusion or injection of on-demand software components and/or functionalities such as AMD Unit 100 code or functionalities at runtime.

In yet another example, redirecting or modifying execution of an application such as DBMS 120 or DBMS's native user interface may be implemented through utilizing operating system's native tools or capabilities such as Unix ptrace command. Ptrace includes a system call that can enable one process to control another allowing the controller to inspect and manipulate the internal state of its target. Ptrace may be used by specialized programs (i.e. AMD Unit 100, etc.) to modify running applications such as to modify DBMS 120 or DBMS's native user interface with AMD Unit 100 code or instructions. By attaching to an application using the ptrace call, the controlling program may gain extensive control over the operation of its target. This includes manipulation of its code or instructions, execution path, file descriptors, memory, registers, and/or other components.

Other examples of redirecting or modifying execution of an application such as DBMS 120 or DBMS's native user interface include (1) dynamic recompilation where an application or a part thereof may be recompiled during execution; (2) assembly language by which memory locations of a loaded application and/or computing device's processing elements may be accessed, instrumented, and/or otherwise manipulated; (3) binary rewriting tools and/or techniques that may modify an application's executable; (4) modification of instructions or data in processor registers, memory, or other computing device components where an application's instructions, data, and/or other information may be stored or used; and/or (5) other techniques or tools. Other additional techniques or tools may be utilized as needed for modifying execution flow of an application such as DBMS 120 or DBMS's native user interface, or some of the disclosed techniques or elements may be excluded, or a combination thereof may be utilized in alternate embodiments.

Figure 11:
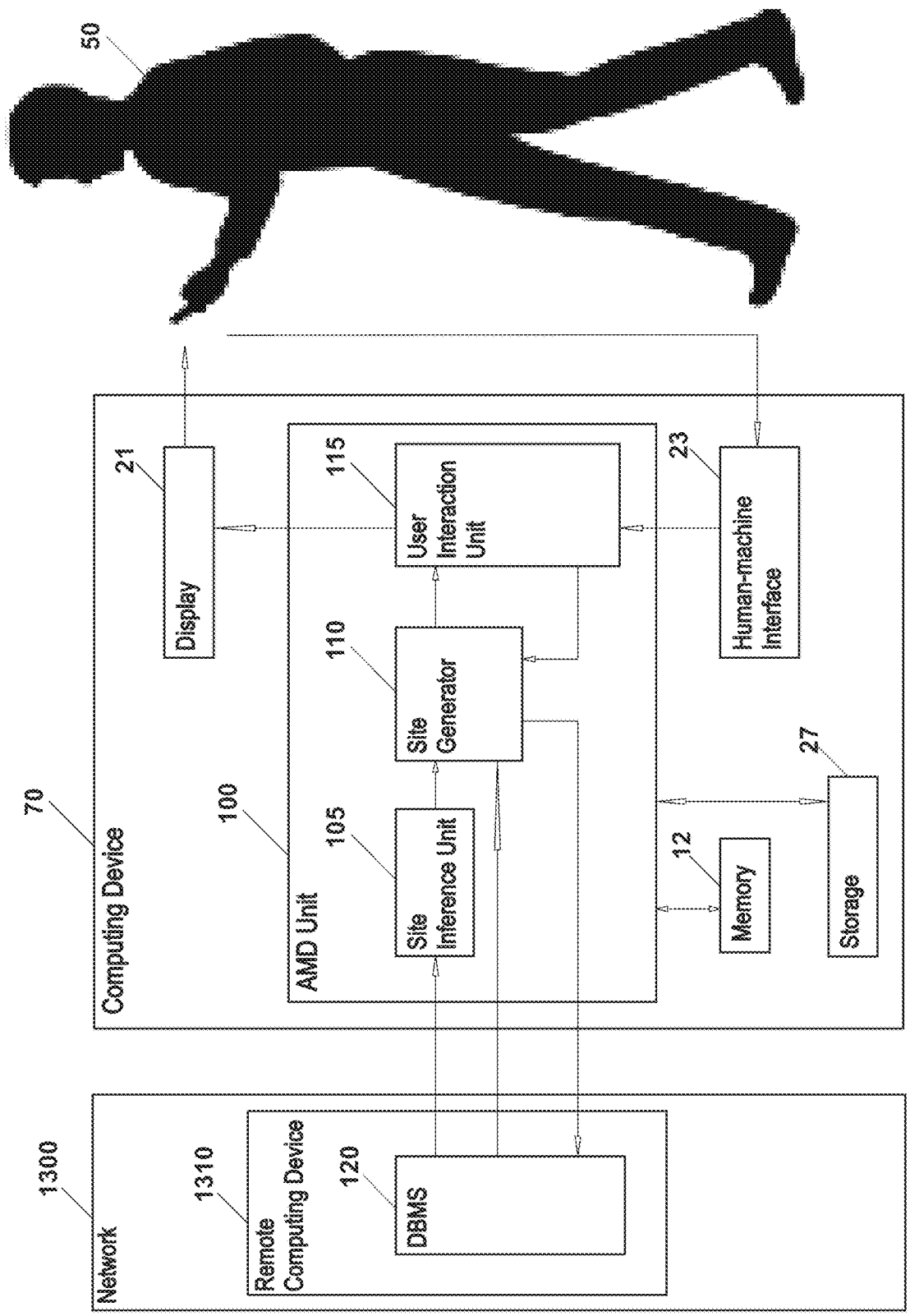
FIG. 11 illustrates an embodiment in which AMD Unit 100 executes on User's 50 Computing Device 70 while DBMS 120 executes on a Remote Computing Device 1310.

Referring to FIG. 11, an embodiment is illustrated in which AMD Unit 100 may execute on User's 50 Computing Device 70 while DBMS 120 may execute on a Remote Computing Device 1310 where Computing Device 70 may connect to Remote Computing Device 1310 over Network 1300. Similarly, AMD Unit 100 or any of its elements may execute on a Remote Computing Device 1310 while DBMS 120 may execute on Computing Device 70. In general, any of the disclosed elements may execute on a local (i.e. user's, etc.) computing device, remote computing device, or a combination thereof. Remote Computing Device 1310 may be any computing device remote from Computing Device 70 such as a remote computer, a remote server, another Computing Device 70, or another similar type of remote computing device to which Computing Device 70 may connect over Network 1300. One of ordinary skill in art will recognize that Remote Computing Device 1310 comprises any functionality of Computing Device 70 including any memory, processing, and/or similar components which may be utilized by the disclosed features and functionalities. One of ordinary skill in art will also recognize that User's 50 Computing Device 70 may connect to Remote Computing Device 1310 over Network 1300 which includes various networks, connection types, protocols, interfaces, APIs, and/or other mechanisms or techniques all of which are within the scope of this disclosure.

Figure 12:
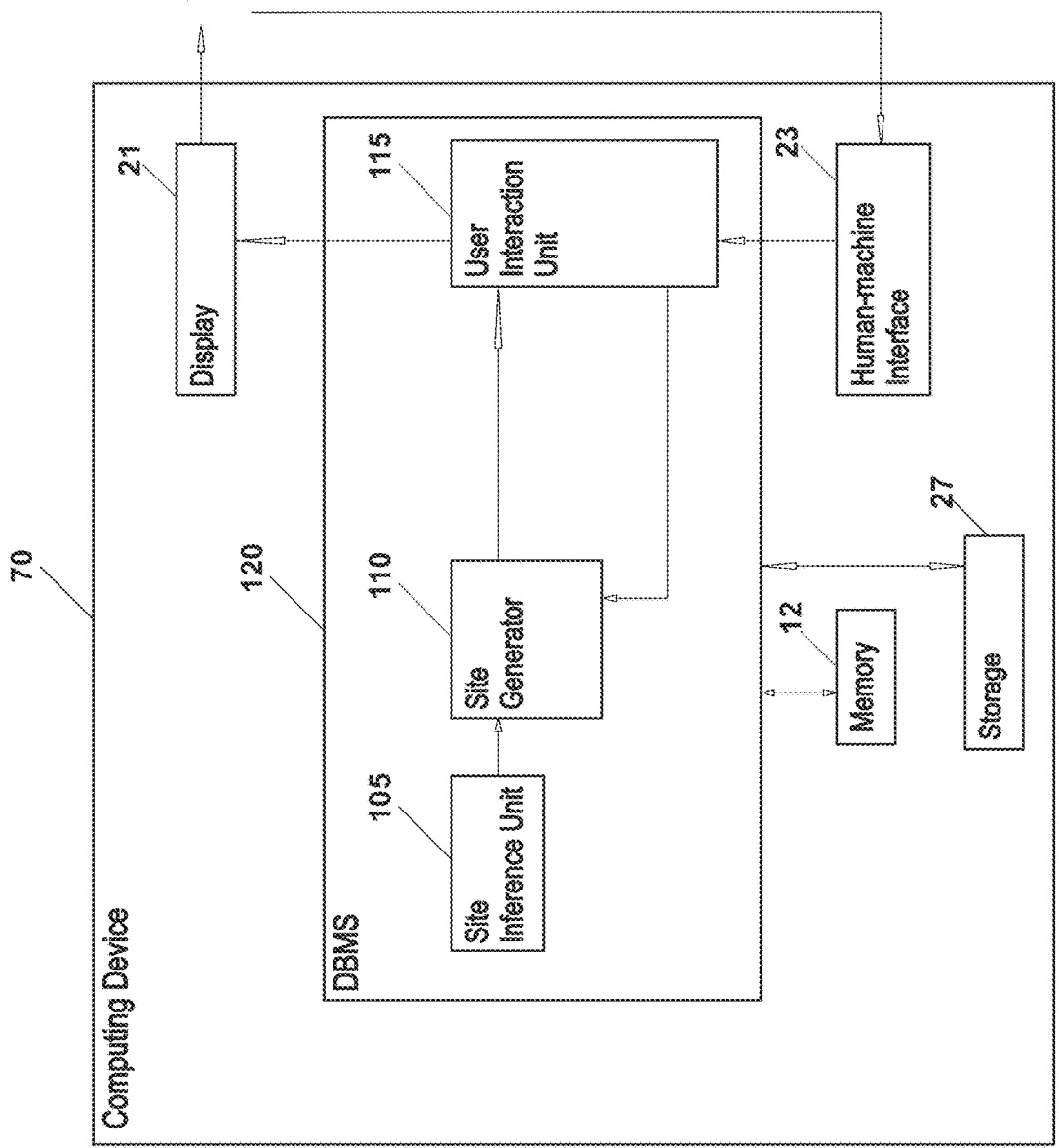
FIG. 12 illustrates an embodiment in which DBMS 120 includes AMD Unit 100 elements and/or functionalities.

Referring to FIG. 12, an embodiment is illustrated in which DBMS 120 includes AMD Unit 100 elements and/or functionalities. In such integrated implementation, AMD Unit 100 elements may directly access internal functions, processes, libraries, files, objects, data structures, and/or other elements of DBMS 120. Similarly, AMD Unit 100 may include DBMS 120 or its functionalities in some designs. In general, any of the disclosed elements may be combined to include other elements or their functionalities.

Figure 13:
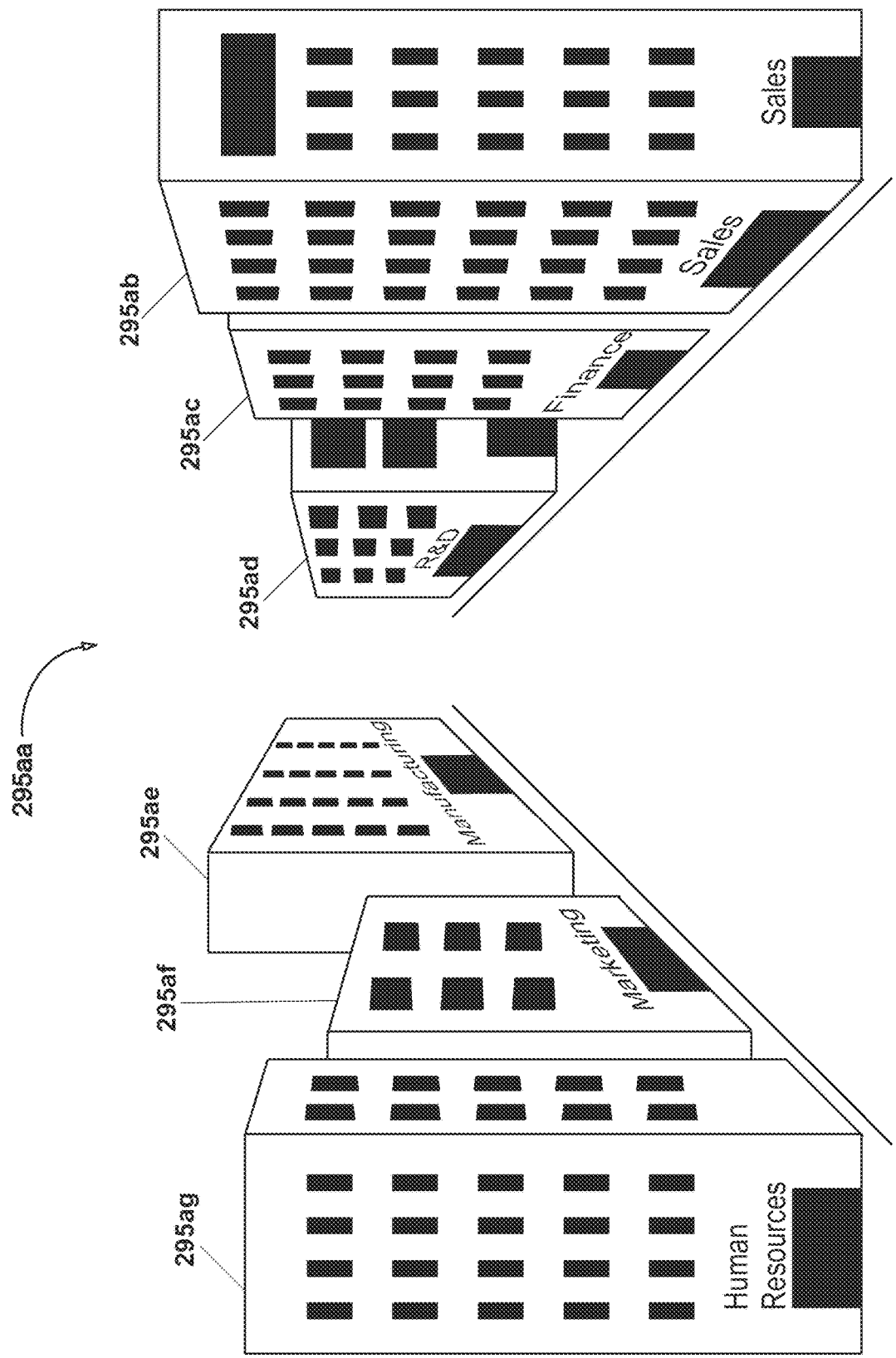
FIG. 13 shows an exemplary embodiment including a street Interactive Object 295aa.
Figure 14:
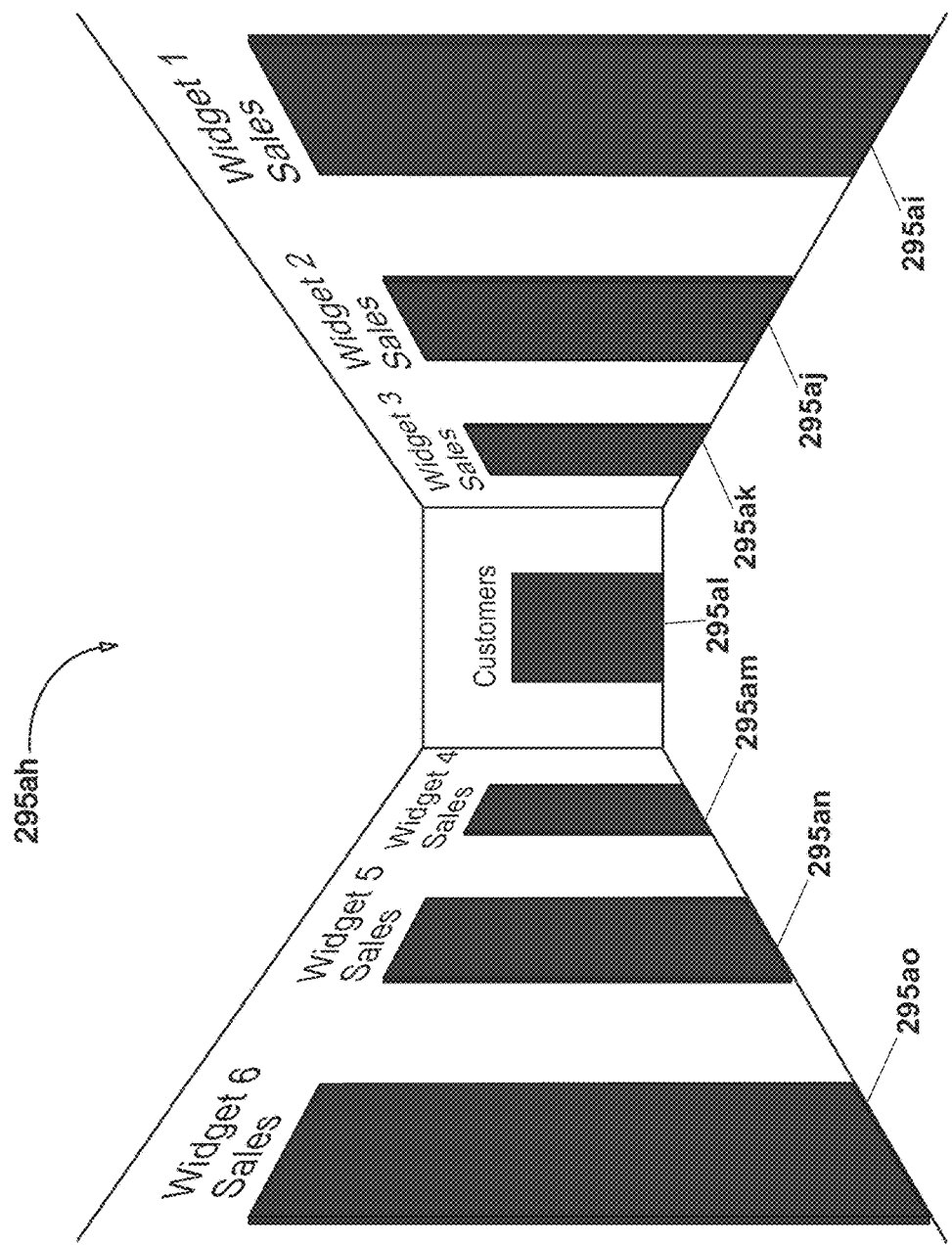
FIG. 14 shows an exemplary embodiment including a hallway Interactive Object 295ah
Figure 15:
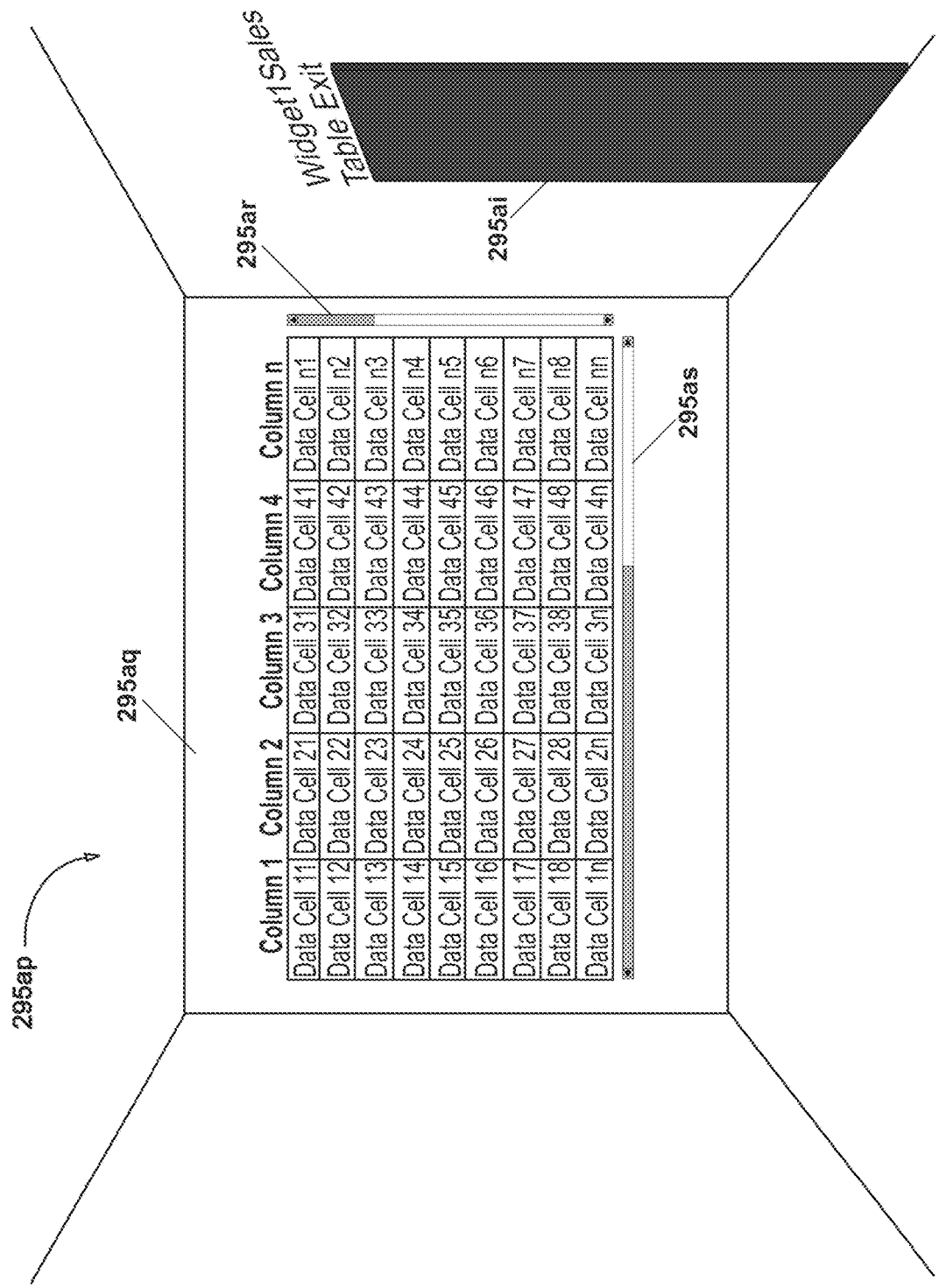
FIG. 15 shows an exemplary embodiment including a room Interactive Object 295ap

In some exemplary embodiments such as the one illustrated in FIG. 13, Site 200 includes an unassociated street Interactive Object 295aa. Street Interactive Object 295aa may be a means for a user or User Controllable Avatar 600 (later described) to move among buildings. Site 200 may also include building Interactive Objects 295ab-ag, etc. that may be associated with database DBMS Elements 395ab-ag, etc. such as Sales, Finance, R&D, Manufacturing, Marketing, and Human Resources databases. Building Interactive Objects 295ab-ag, etc. may be placed along the edges of the street Interactive Object 295aa. Site 200 may further include a hallway Interactive Object 295ah as shown in FIG. 14. The hallway Interactive Object 295ah may be inside the building Interactive Object 295ab. The hallway Interactive Object 295ah may be accessed through Interactive Objects 295 such as stairs, elevators, escalators, floors, and/or other objects (not shown). Hallway Interactive Object 295ah may be a means for a user or User Controllable Avatar 600 to move among doors. Site 200 may further include door Interactive Objects 295ai-ao, etc. that may be associated with table DBMS Elements 395ai-ao, etc. such as Widget 1-6 Sales and Customers tables. Site 200 may further include a room Interactive Object 295ap as shown in FIG. 15. Room Interactive Object 295ap may be inside the building Interactive Object 295ab. Room Interactive Object 295ap may be accessed through the hallway Interactive Object 295ah, which includes a means to enter the room Interactive Object 295ap such as a door Interactive Object 295ai. Site 200 may further include a wall Interactive Object 295aq that may be associated with a data set DBMS Element 395aq such as a data set comprising Data Cell 11 through Data Cell nn. Wall Interactive Object 295aq may therefore be a means for providing a user or User Controllable Avatar 600 with a view into a data set, or one or more data cells (i.e. also generally referred to as data, etc.) of a data set. Site 200 may also include scroll bar Interactive Objects 295ar-as, etc. that may be a means for a user or User Controllable Avatar 600 to scroll through the data or data set. In some aspects, a table of data or data set may be shown via the wall Interactive Object 295aq where subsequent or preceding columns or rows of data may be shown by activating the scroll bar Interactive Objects 295ar-as, etc.

Figure 16:
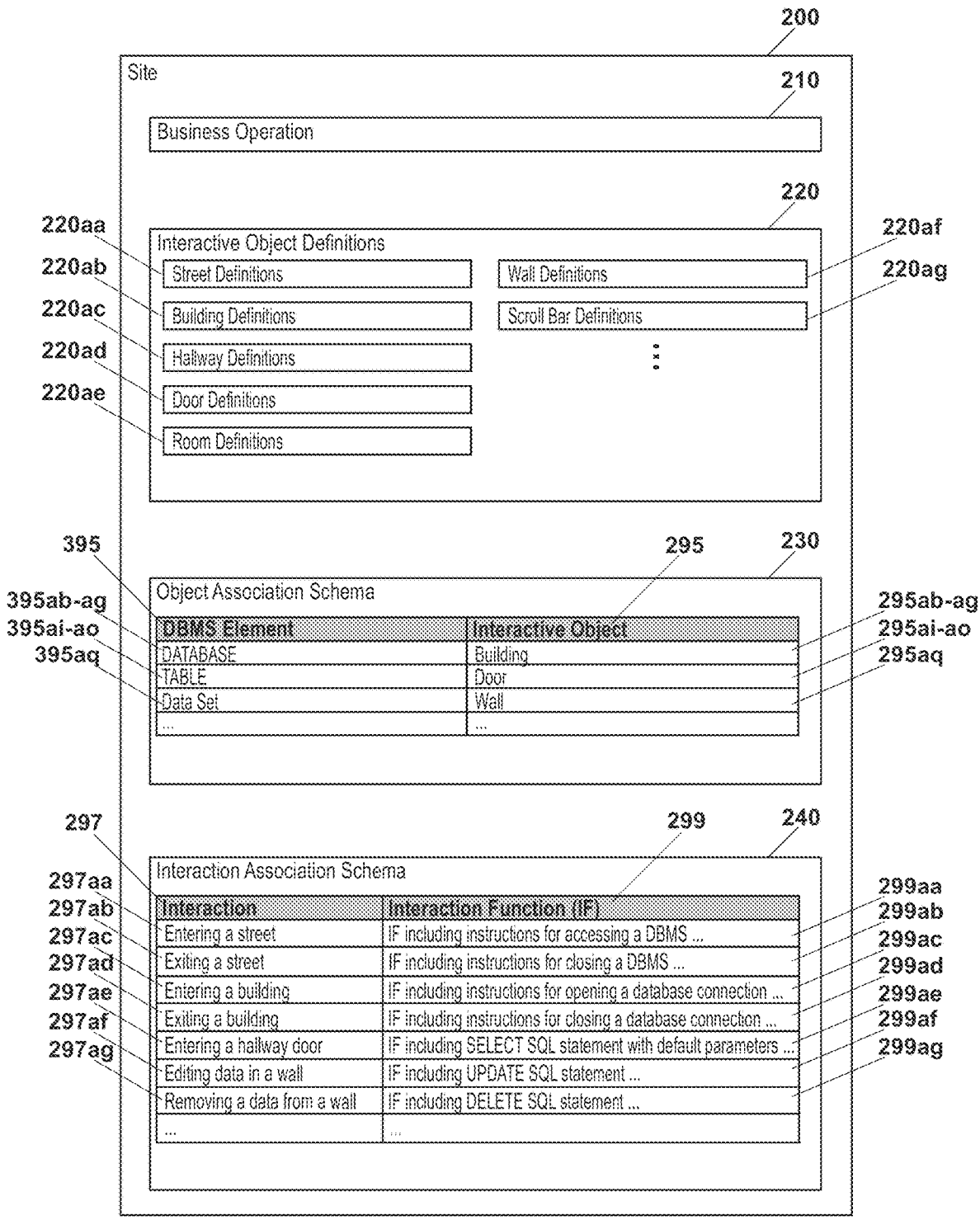
FIG. 16 illustrates an embodiment of Site 200 comprising "Business Operation" Site Identifier 210.

To implement a preceding exemplary embodiment, Site Generator 110 may receive DBMS Elements 395ab-aq, etc. (or references thereto) such as the names of databases within DBMS 120 (i.e. Sales, Finance, R&D, Manufacturing, Marketing, Human Resources, etc.), names of tables (i.e. Widget 1-6 Sales, Customers, etc.) within each of the databases, primary key values for rows of data within each of the tables, column names (i.e. Column 1-*n*, etc.) within each of the tables, and/or other needed DBMS Elements 395. Site Inference Unit 105 may traverse or process Email 131, Social Media Records 132, Electronic Files 133, and/or Other User Repositories 134, and find therein a frequently occurring reference such as "business operation." Substantial Similarity Comparison Unit 175 may compare this reference with Site Identifiers 210 in Site Collection 180 and find Site 200 comprising Site Identifier 210 identical or substantially similar to reference "Business Operation" as shown in FIG. 16. Site Generator 110 may receive from Site Inference Unit 105 the found Site 200 whose Interactive Object Definitions 220, Object Association Schema 230, and Interaction Association Schema 240 include information on Interactive Objects 295*aa-aq*, etc. to be generated, their associations with any DBMS Elements 395*ab-aq*, etc., Interactions 297*aa-ag*, etc., Interactive Functions 299*aa-ag*, etc., and/or other information. Site Generator 110 may create or generate a scene comprising Interactive Objects 295*aa-as*, etc., for example. Site Generator 110 may look up each of the previously received DBMS Elements 395*ab-aq*, etc. in Site's 200 Object Association Schema 230 and find a corresponding Interactive Object 295*aa-aq*, etc. Using Interactive Object Definitions 220*aa-ag*, etc., Site Generator 110 may then generate a corresponding associated Interactive Object 295*ab-aq*, etc. for each DBMS Element 395*ab-aq*, etc. Site Generator 110 may also generate any unassociated objects such as street Interactive Object 295*aa*, and/or others. Site Generator 110 may define one or more Interactions 297 such as Interactions 297*aa-ag*, etc. (i.e. exiting a street, entering a hallway door, etc.) and create one or more Interaction Functions 299 such as Interaction Functions 299*aa-ag*, etc. that may be activated when an event occurs such as exiting a street or entering a hallway door. User Interaction Unit 115 may render or display the scene and/or Interactive Objects 295*aa-as*, etc. such as the street, buildings, hallway, doors, rooms, and/or other objects in a graphical user interface (GUI) through which a user or User Controllable Avatar 600 can interact with Interactive Objects 295*aa-as*, etc. User may view the scene and/or Interactive Objects 295*aa-as*, etc. using a first-person view in which user may see through the eyes of his/her avatar or user controllable camera. User or User Controllable Avatar 600 may cause an Interaction 297 with an Interactive Object 295 to occur such as entering a building Interaction 297*ac* by coming in contact with or clicking on a building or door of a building signifying intent to enter the building. Site Generator 110 may execute Interaction Function 299*ac* that is handling Interaction 297*ac*. Such Interaction Function 299*ac* may include instructions for animating and/or transforming the scene and/or Interactive Objects 295*aa-as*, etc. such as portraying a door opening experience. Interaction Function 299*ac* may also include DBMS instructions for performing one or more operations on DBMS 120 such as instructions to open a database connection to the database associated with the entered building. Interaction Function 299*ac* may also include instructions to link to another Site 200 or Interactive Object 295 as needed. After or in response to performing a DBMS operation, Site Generator 110 may re-generate the scene and/or Interactive Objects 295*aa-as*, etc. based on user Interactions 297*aa-ag*, etc. such as portray a lobby, floor, or hallway of the building Interactive Object 295*ab* after entering the building. Further, Site Generator 110 may re-associate the re-generated scene and/or Interactive Objects 295*ab-aq*, etc. with updated DBMS Elements 395*ab-aq*, etc. such as re-associating door Interactive Objects 295*ai-ao*, etc. with updated table DBMS Elements 395*ai-ao*, etc. User Interaction Unit 115 may then render or display the re-generated re-associated scene and/or Interactive Objects 295*aa-as*, etc. in GUI for user's subsequent Interactions 297*aa-ag*, etc.

Figure 17:
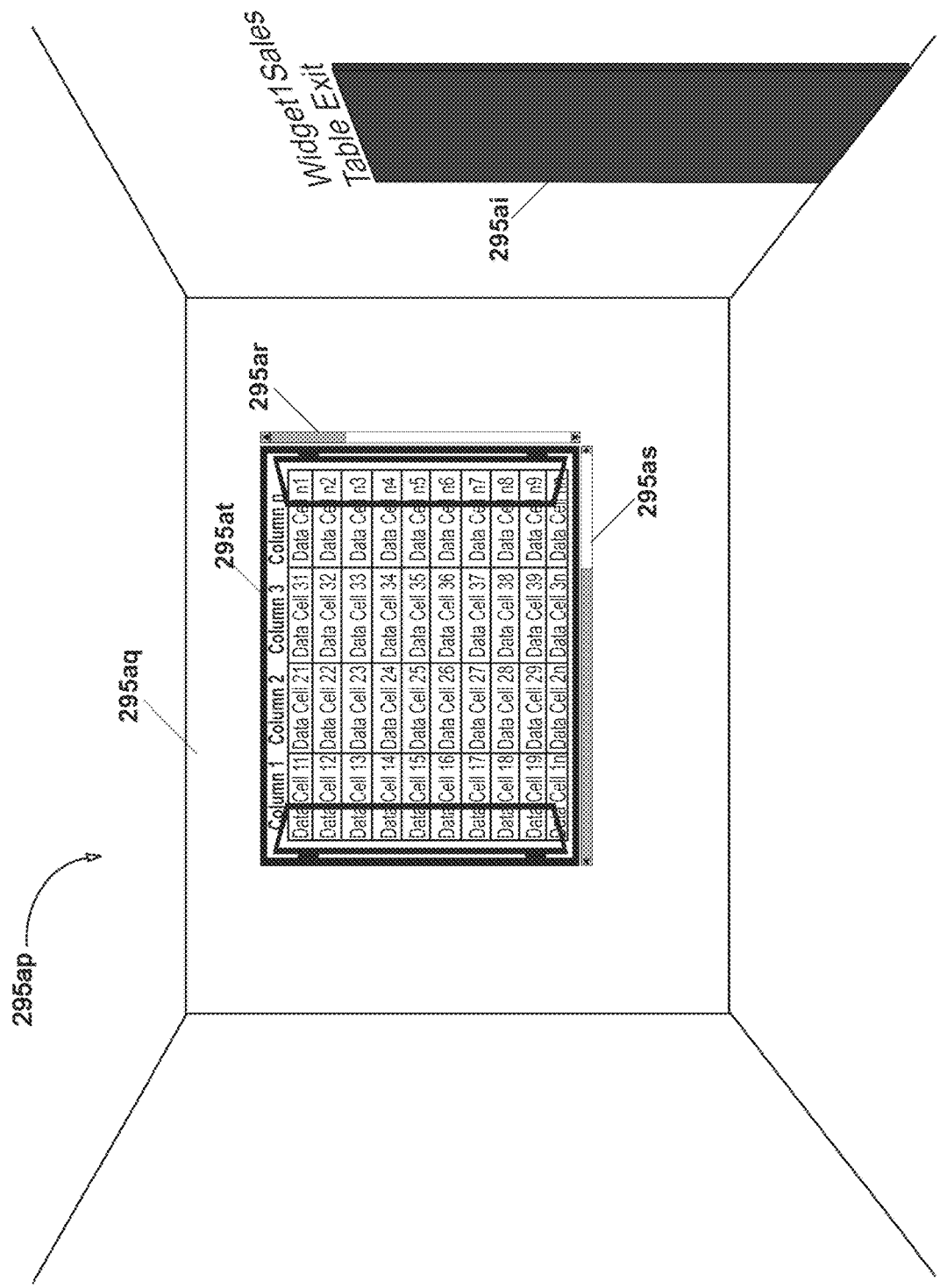
FIG. 17 shows an exemplary embodiment including a window Interactive Object 295at associated with one or more data DBMS Elements 395.
Figure 18:
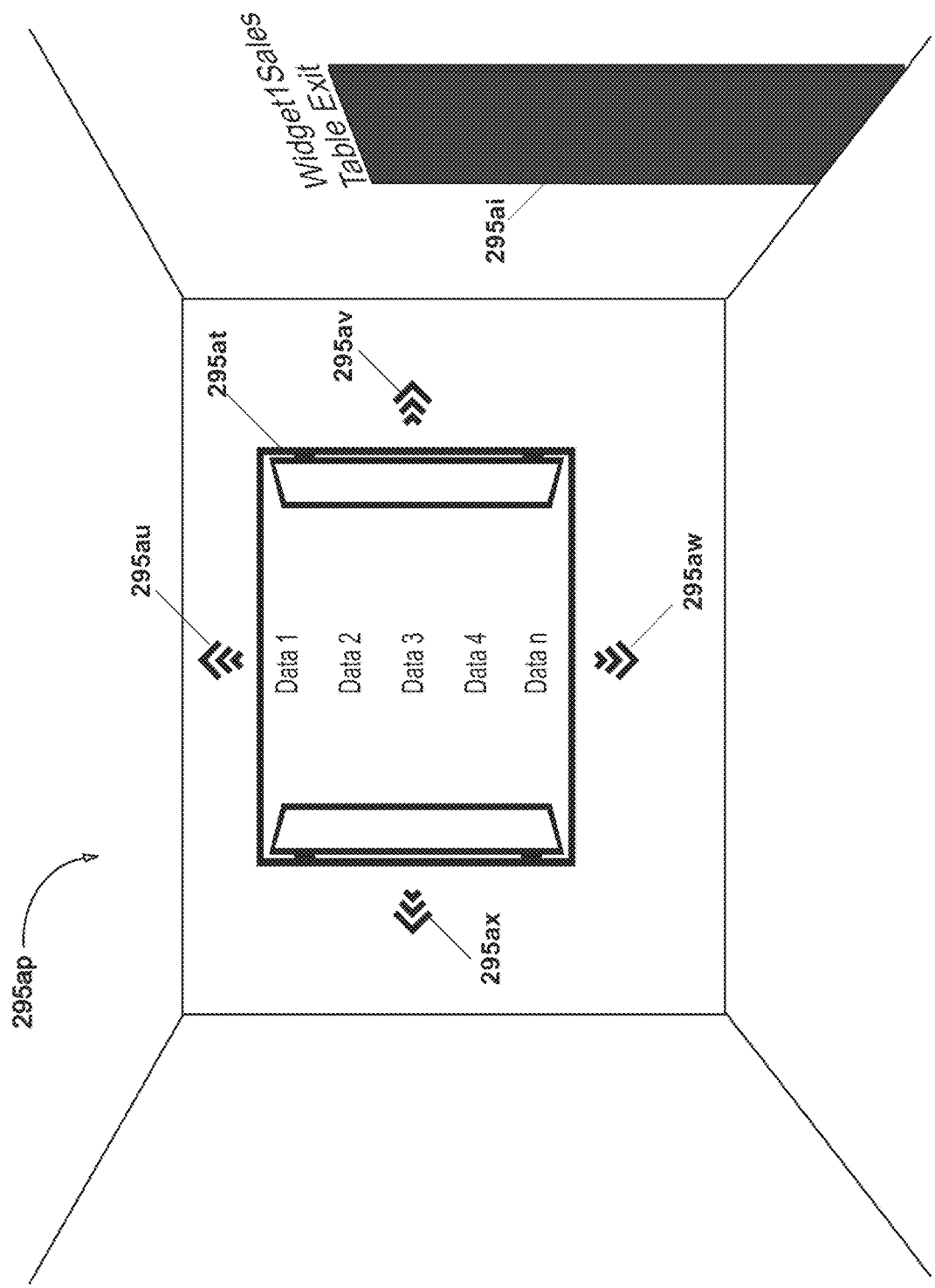
FIG. 18 shows an exemplary embodiment including a window Interactive Object 295at associated with one or more row of data DBMS Elements 395.

In a similar exemplary embodiment illustrated in FIG. 17, Site 200 includes a window Interactive Object 295*at* that may be associated with one or more data DBMS Elements 395 such as Data Cell 11 through Data Cell nn. The window Interactive Object 295*at* may be a means for providing a user or User Controllable Avatar 600 a view into one or more data cells (i.e. also generally referred to as data, etc.). In another similar exemplary embodiment illustrated in FIG. 18, Site 200 includes a window Interactive Object 295*at* that may be associated with one or more row of data DBMS Elements 395 such as a row of data including Data 1, Data 2, Data 3, Data 4, and Data n. Site 200 may further include navigation Interactive Objects 295*au-ax*, etc. that may be a means for a user or User Controllable Avatar 600 to navigate through the data. Subsequent or preceding data or rows of data may be shown by activating the navigation Interactive Objects 295*au-ax*, etc.

Any variations of Interactive Objects 295, associations with DBMS Elements 395, Interactions 297, Interaction Functions 299, and/or other elements may be implemented on the preceding exemplary embodiments. In one example, Site 200 includes one or more floor Interactive Objects 295 (not shown), where some floors may be associated with tables, other floors may be associated with reports/views, and the remaining floors may be associated with user accounts, DBMS settings (i.e. DBMS settings file or repository, etc.), and so on. In another example, Site 200 includes a basement or utility room Interactive Object 295 (not shown) that may be associated with DBMS settings DBMS Element 395 (i.e. DBMS settings file or repository, etc.). In a further example, Site 200 includes a panel (i.e. switch or other panel, etc.) Interactive Object 295 (not shown) whose switches, sliders, or other such components may be associated with specific DBMS settings and manipulating the switches, sliders, or other such components may provide a means for adjusting DBMS settings. In yet another example, Interaction 297 may be available to enable a user to click or otherwise interact with an Interactive Object 295 such as a building, a door, a wall, etc. to edit the underlying DBMS Element 395 such as a database, a table, a data, etc. In yet another example, any Interactive Objects 295 may be added to the scene depending on context such as Interactive Objects 295 for inserting a row or column in a table, Interactive Objects 295 for creating, deleting, or editing a table, report/view, or database, Interactive Objects 295 for creating, deleting, or editing a user account, Interactive Objects 295 for creating, deleting, or editing a relation between tables, and/or other Interactive Objects 295.

In some aspects, any of the different associations may be made between DBMS Elements 395 and Interactive Objects 295. For example, each street Interactive Object 295 in a city may be associated with a database DBMS Element 395. Each building Interactive Object 295 on a street may be associated with a table DBMS Element 395. Each floor Interactive Object 295 of a building may be associated with a grouping of data DBMS Elements 395. Further, each hallway Interactive Object 295 of a floor may be associated with a data such as a row of data DBMS Element 395. In other aspects, the previously described Interactive Objects 295 such as street, building, hallway, door, window, and/or other Interactive Objects 295 include labels with database names, table names, report/view names, column names, row numbers or primary keys (PKs), user account names, setting names, and/or other information indentifying their corresponding DBMS Element 395, purpose, or other helpful information for user's guidance. In yet other aspects, Site 200 or Interactive Object 295 includes a link or pointer to another Site 200 or Interactive Object 295. For example, a user may be in a building Interactive Object 295 that may represent a database DBMS Element 395. The user may select to open a door Interactive Object 295 to enter a room representing a table DBMS Element 395. The door Interactive Object 295 may include a link to a separate Site 200 portraying a room including Interactive Objects 295 such as walls, windows, closets, file cabinets, and/or other Interactive Objects 295 each associated with a DBMS Element 395 related to the table.

Default parameters in a SQL statement or other instruction may generally refer to no parameters or to any parameters desirable in a given context or situation. For example, the SELECT SQL statement in Interaction Function 299*ae* may include a SQL statement for obtaining all records in a table or other data source. Such SQL statement may be formulated as "SELECT*FROM Tbl1", for example.

Figure 19:
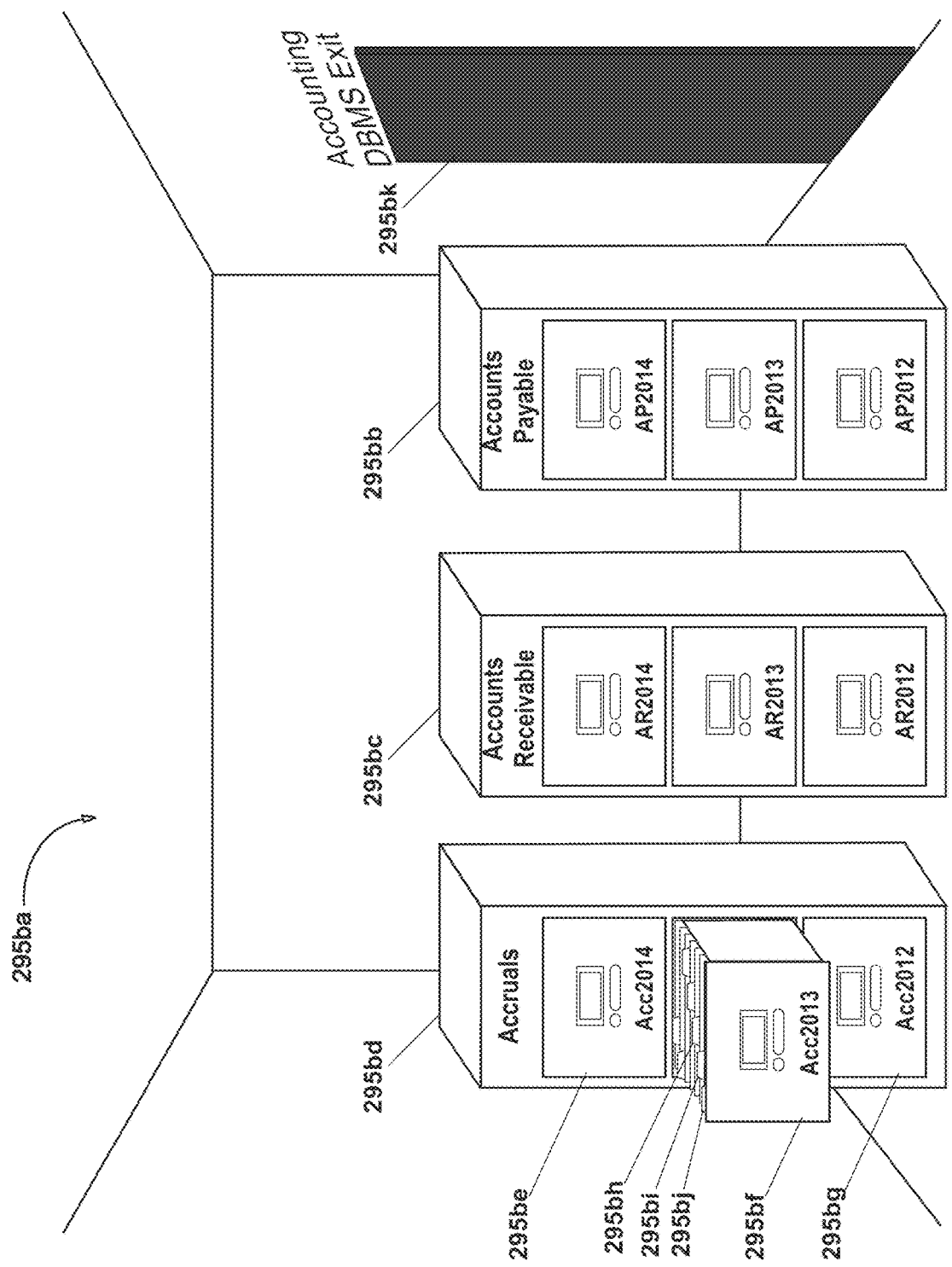
FIG. 19 shows an exemplary embodiment including an unassociated room Interactive Object 295ba.
Figure 20:
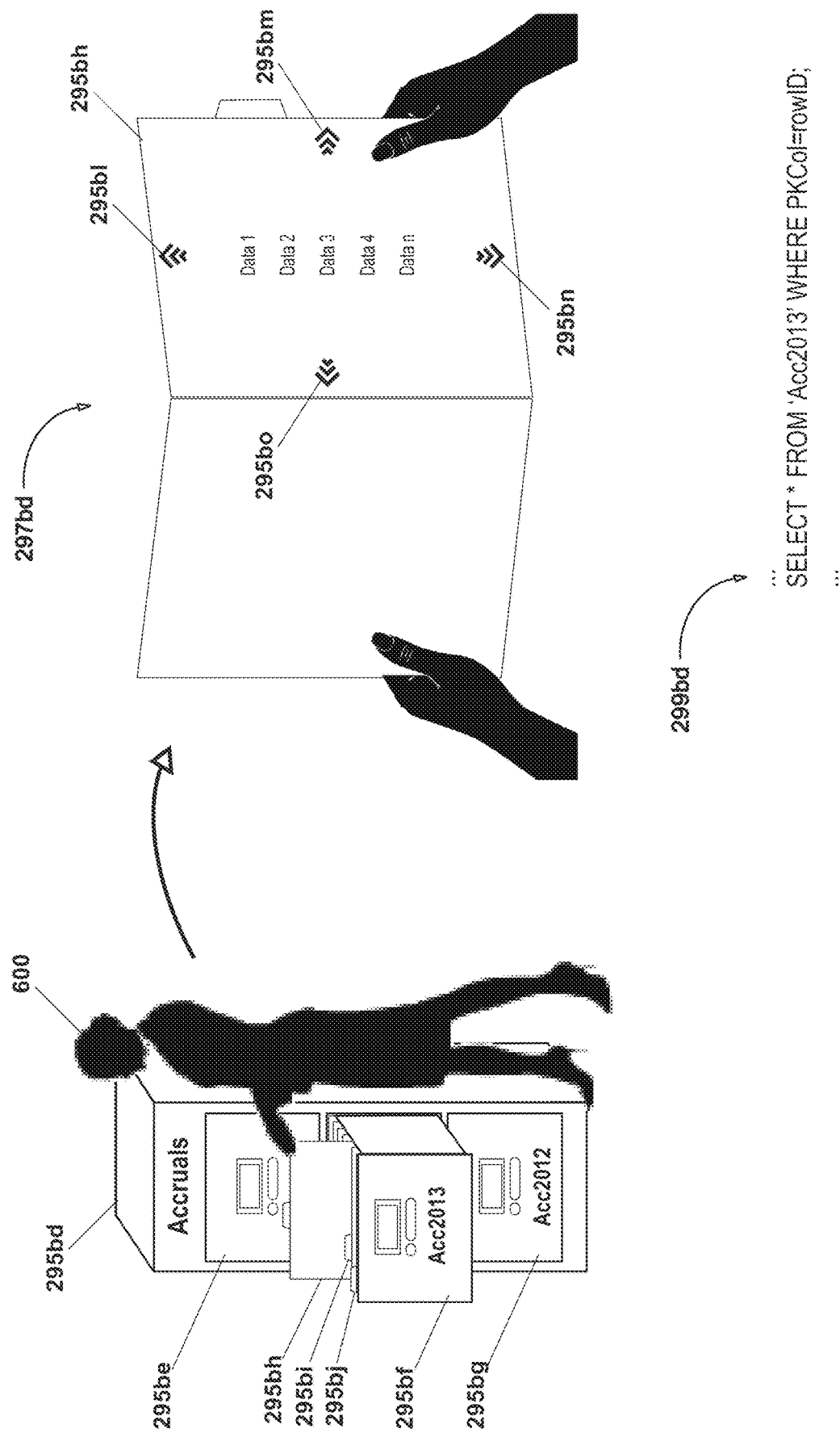
FIG. 20 illustrates User Controllable Avatar 600 opening a drawer Interactive Object 295bf and accessing file folder Interactive Object 295bh.
Figure 21:
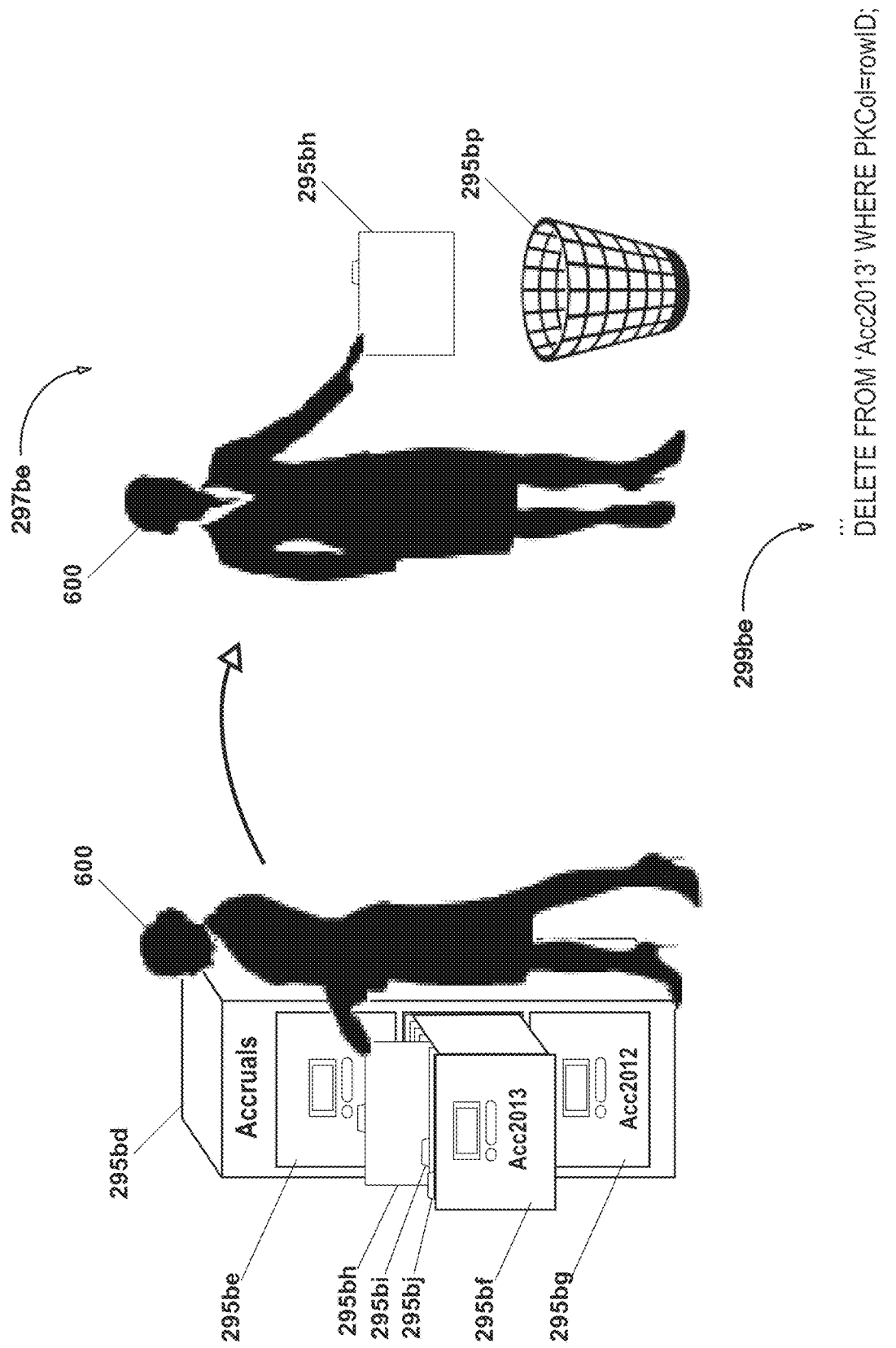
FIG. 21 shows an exemplary embodiment including a trash can Interactive Object 295bp.

In some exemplary embodiments such as the one illustrated in FIG. 19, Site 200 includes an unassociated room Interactive Object 295*ba*. Site 200 may also include door Interactive Object 295*bk* that may be a means for a user or User Controllable Avatar 600 to enter or exit the room. Site 200 may also include file cabinet Interactive Objects 295*bb-bd*, etc. each of which may be associated with database DBMS Elements 395*bb-bd*, etc. such as Accounts Payable, Accounts Receivable, and Accruals databases. File cabinet Interactive Objects 295*bb-bd*, etc. may be inside the room Interactive Object 295*ba*. Site 200 may further include drawer Interactive Objects 295*be-bg*, etc. each of which may be associated with table DBMS Elements 395*be-bg*, etc. such as Acc2014, Acc2013, and Acc2012. Drawer Interactive Objects 295*be-bg*, etc. may be inside file cabinet Interactive Object 295*bd*. Site 200 may further include file folder Interactive Objects 295*bh-bj*, etc. each of which may be associated with row of data DBMS Elements 395*bh-bj*, etc. such as a row of data including Data 1, Data 2, Data 3, Data 4, and Data n. File folder Interactive Objects 295*bh-bj*, etc. may be inside drawer Interactive Object 295*bf*. Site 200 may also include User Controllable Avatar 600 that may be directed by a user to open drawer Interactive Object 295*bf* and access file folder Interactive Object 295*bh* as shown in FIG. 20. User Controllable Avatar 600 may be directed to open file folder Interactive Object 295*bh* causing Interaction 297*bd* to occur. Site 200 may also include navigation Interactive Objects 295*bl-bo*, etc. that may be a means for a user or User Controllable Avatar 600 to navigate through the data in the file folder. Site 200 may further include an unassociated trash can Interactive Object 295*bp* as shown in FIG. 21. User Controllable Avatar 600 may be directed to throw file folder Interactive Object 295*bh* into trash can Interactive Object 295*bp* causing Interaction 297*be* to occur.

Figure 22:
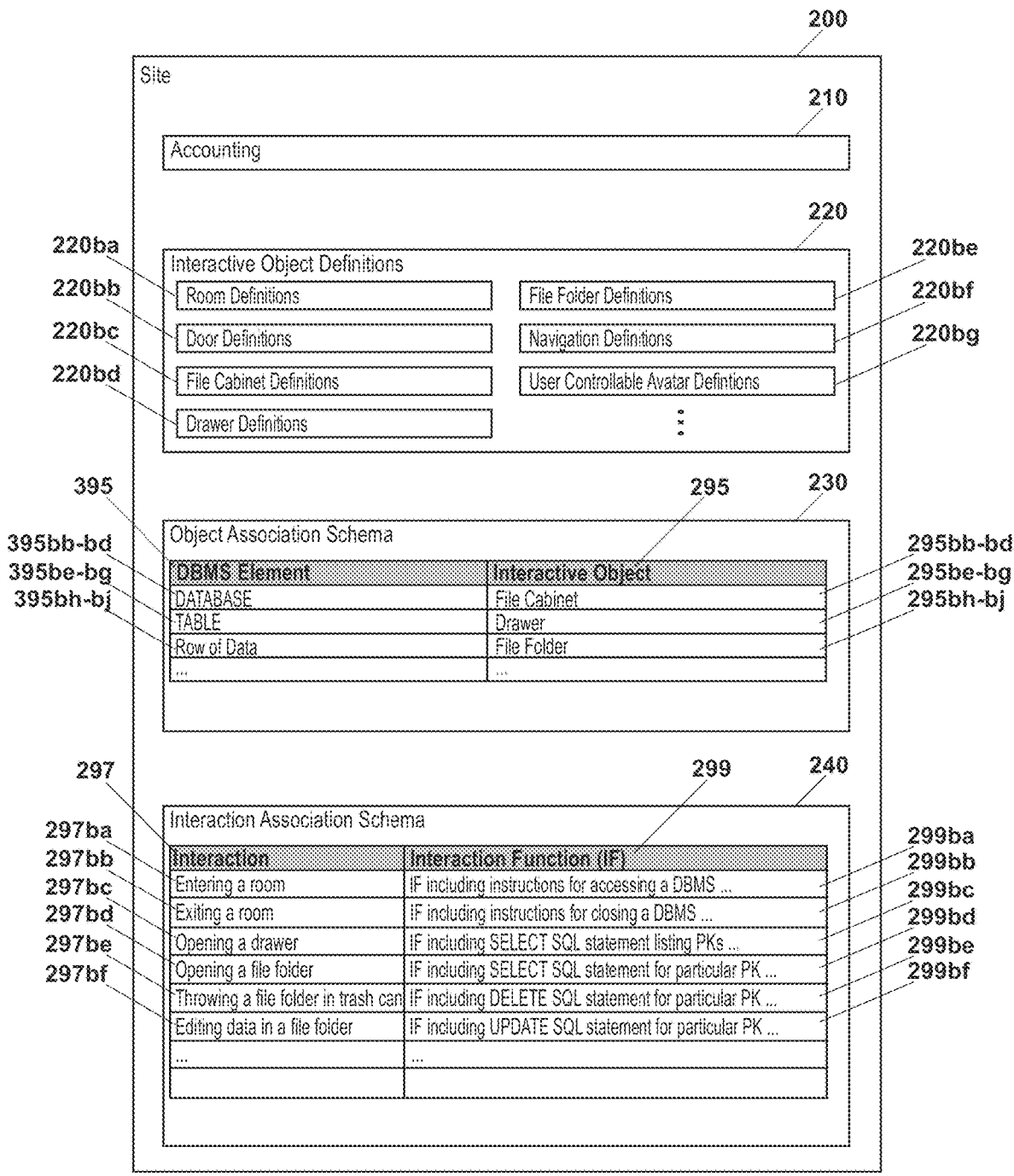
FIG. 22 illustrates an embodiment of Site 200 comprising "Accounting" Site Identifier 210.

To implement a preceding exemplary embodiment, Site Generator 110 may receive DBMS Elements 395*bb-bj*, etc. (or references thereto) such as the names of databases within DBMS 120 (i.e. Accounts Payable, Accounts Receivable, Accruals, etc.), names of tables (i.e. AP2014, AP2013, AP2012, AR2014, AR2013, AR2012, Acc2014, Acc2013, Acc2012, etc.) within each of the databases, primary key values for rows of data within each of the tables, column names within each of the tables, and/or other needed DBMS Elements 395. Site Inference Unit 105 may traverse or process Data 141, Metadata 142, and/or Other DBMS Repositories 143 and find frequently occurring references to accounting terminology such as "accounts payable," "acctg," "AR," "accrual," "billing," and/or other such references. Substantial Similarity Comparison Unit 175 may compare these references with Site Identifiers 210 in Site Collection 180 and not find a matching Site Identifier 210. Semantic Conversion Unit 170 may then be utilized to convert the frequently occurring references such as "accounts payable," "acctg," "AR," "accrual," "billing," and/or other such references into semantically indicative references such as "accounting." Substantial Similarity Comparison Unit 175 may compare this converted semantically indicative reference with Site Identifiers 210 in Site Collection 180 and find Site 200 comprising Site Identifier 210 identical or substantially similar to reference "Accounting" as shown in FIG. 22. Site Generator 110 may receive from Site Inference Unit 105 the found Site 200 whose Interactive Object Definitions 220, Object Association Schema 230, and Interaction Association Schema 240 include information on Interactive Objects 295*ba-bp*, etc. to be generated, their associations with any DBMS Elements 395*bb-bj*, etc., Interactions 297*ba-bf*, etc., Interaction Functions 299*ba-bf*, etc., and/or other information. Site Generator 110 may create or generate a scene comprising Interactive Objects 295*ba-bp*, etc., for example. Site Generator 110 may look up each of the previously received DBMS Elements 395*bb-bj*, etc. in Site's 200 Object Association Schema 230 and find a corresponding Interactive Object 295*bb-bj*, etc. Using Interactive Object Definitions 220*ba-bg*, etc., Site Generator 110 may then generate a corresponding associated Interactive Object 295*bb-bj*, etc. for each DBMS Element 395*bb-bj*, etc. Site Generator 110 may also generate any unassociated objects such as room Interactive Object 295*ba*, trash can Interactive Object 295*bp*, User Controllable Avatar 600, and/or others. Site Generator 110 may define one or more Interactions 297 such as Interactions 297*ba-bf*, etc. (i.e. opening a file folder, throwing a file folder into trash can, etc.) and create one or more Interaction Functions 299 such as Interaction Functions 299*ba-bf*, etc. that may be activated when an event occurs such as opening a file folder or throwing a file folder into trash can. User Interaction Unit 115 may render or display the scene and/or Interactive Objects 295*ba-bp*, etc. such as the room with file cabinets, drawers, file folders, and/or other objects in a GUI through which a user or User Controllable Avatar 600 can interact with the Interactive Objects 295*ba-bp*, etc. User may view the scene and/or Interactive Objects 295*ba-bp*, etc. using a third-person view in which the user may see his/her User Controllable Avatar 600 and its surroundings. User or User Controllable Avatar 600 may cause an Interaction 297 with an Interactive Object 295 to occur such as opening file folder Interaction 297*bd* by coming in contact with or clicking on a file folder signifying intent to open it. Site Generator 110 may execute Interaction Function 299*bd* that is handling Interaction 297*bd*. Such Interaction Function 299*bd* may include instructions for animating and/or transforming the scene and/or Interactive Object 295*bh* such as portraying a file folder opening experience. Interaction Function 299*bd* may also include DBMS instructions for performing one or more operations on DBMS 120 such as "SELECT*FROM 'Acc2013' WHERE PKCol=rowID;" SQL statement to access a row of data with a particular primary key value to be presented in the file folder. Interaction Function 299*bd* may also include instructions to link to another Site 200 or Interactive Object 295 as needed. User or User Controllable Avatar 600 may cause an Interaction 297 with an Interactive Object 295 to occur such as throwing file folder into trash can Interaction 297*be* by User Controllable Avatar's 600 carrying the file folder Interactive Object 295*bh*, for example, to the trash can or by user's dragging the file folder into trash can with a mouse. Site Generator 110 may execute Interaction Function 299*be* that is handling Interaction 297*be*. Such Interaction Function 299*be* may include instructions for animating and/or transforming the scene and/or Interactive Object 295*ba-bp*, etc. such as portraying a file folder throwing experience. Interaction Function 299*be* may also include DBMS instructions for performing one or more operations on DBMS 120 such as a "DELETE FROM 'Acc2013' WHERE PKCol=rowID;" SQL statement to delete the row of data with a particular primary key value represented by the file folder Interactive Object 295*bh*. Interaction Function 299*bd* may also include instructions to link to another Site 200 or Interactive Object 295 as needed. After or in response to performing a DBMS operation, Site Generator 110 may re-generate the scene and/or Interactive Objects 295*ba-bp*, etc. based on user Interactions 297*ba-bf*, etc. such as portray disappearance of file folder Interactive Object 295*bh* after being thrown into the trash can. Further, Site Generator 110 may re-associate (if or as needed) the re-generated scene and/or Interactive Objects 295*ba-bp*, etc. with updated DBMS Elements 395*bb-bj*, etc. such as re-associate (optional) the remaining file folder Interactive Objects 295*bi-bj*, etc. with remaining rows of data DBMS Elements 395*bi-bj*. User Interaction Unit 115 may then render or display the re-generated re-associated scene and/or Interactive Objects 295*ba-bp*, etc. in GUI for user's subsequent Interactions 297*ba-bf*, etc.

Any variations of Interactive Objects 295, associations with DBMS Elements 395, Interactions 297, Interaction Functions 299, and/or other elements may be implemented on the preceding exemplary embodiments. In one example, file cabinet Interactive Objects 295 may be associated with tables or reports/views, drawer Interactive Objects 295 may be associated with rows of data or pointers thereto, file folder Interactive Objects 295 may be associated with data cells, and so on. In another example, Interaction 297 may be available to enable a user to click or otherwise interact with an Interactive Object 295 such as a file cabinet, a drawer, a file folder, etc. to edit the underlying DBMS Element 395 such as a database, a table, a data, etc. In yet another example, one or more of the Data 1, Data 2, Data 3, Data 4, and Data n included in file folder Interactive Object 295*bh* may be alternatively portrayed on one or more sheets of paper Interactive Objects 295 (not shown) to further realistically simulate user's or User Controllable Avatar's 600 browsing through the folder.

Figure 23:
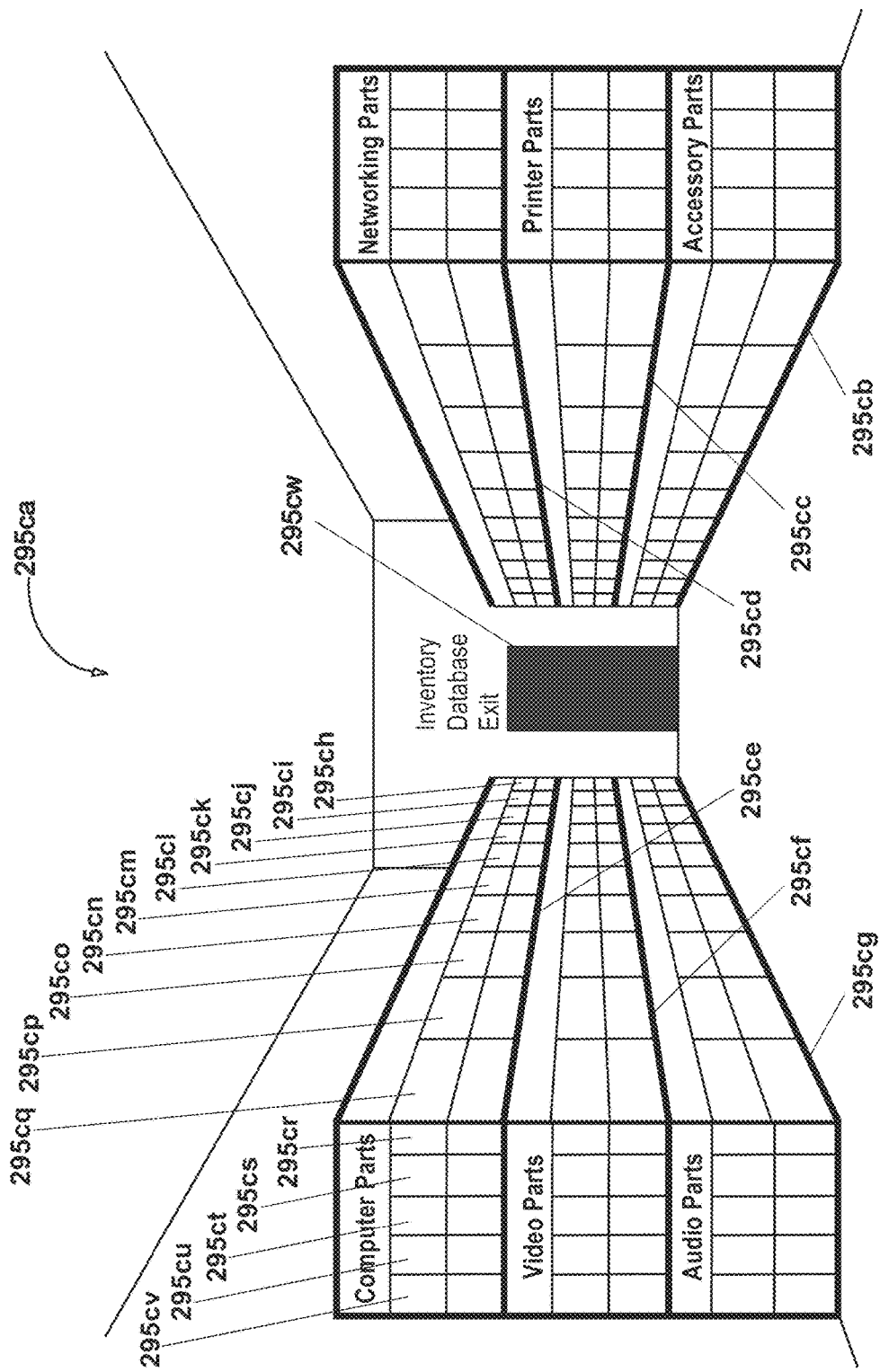
FIG. 23 shows an exemplary embodiment including a warehouse Interactive Object 295ca.

In some exemplary embodiments such as the one illustrated in FIG. 23, Site 200 includes a warehouse Interactive Object 295*ca* that may be associated with a DBMS Element 395 such as inventory database DBMS Element 395*ca*. Site 200 may also include door Interactive Object 295*cw* that may be a means for a user or User Controllable Avatar 600 to enter or exit the warehouse. Site 200 may also include shelf Interactive Objects 295*cb-cg*, etc. each of which may be associated with a table DBMS Element 395*cb-cg*, etc. such as Accessory Parts, Printer Parts, Networking Parts, Audio Parts, Video Parts, and Computer Parts tables. Shelf Interactive Objects 295*cb-cg*, etc. may be inside the warehouse Interactive Object 295*ca*. Site 200 may further include box Interactive Objects 295*ch-cq*, etc. each of which may be associated with a row of data DBMS Element 395*ch-cq*, etc. such as a row of data storing information on a computer part. Box Interactive Objects 295*ch-cq*, etc. may be inside or on a shelf Interactive Object 295*ce*. Site 200 may further include box compartment Interactive Objects 295*cr-cv*, etc. each of which may be associated with data or data cell DBMS Elements 395*cr-cv*, etc. such as a data cell storing information on a particular computer part like units in stock, unit purchase price, unit retail price, and/or other information. Box compartment Interactive Objects 295*cr-cv*, etc. may be inside box Interactive Object 295*cq*.

Figure 24:
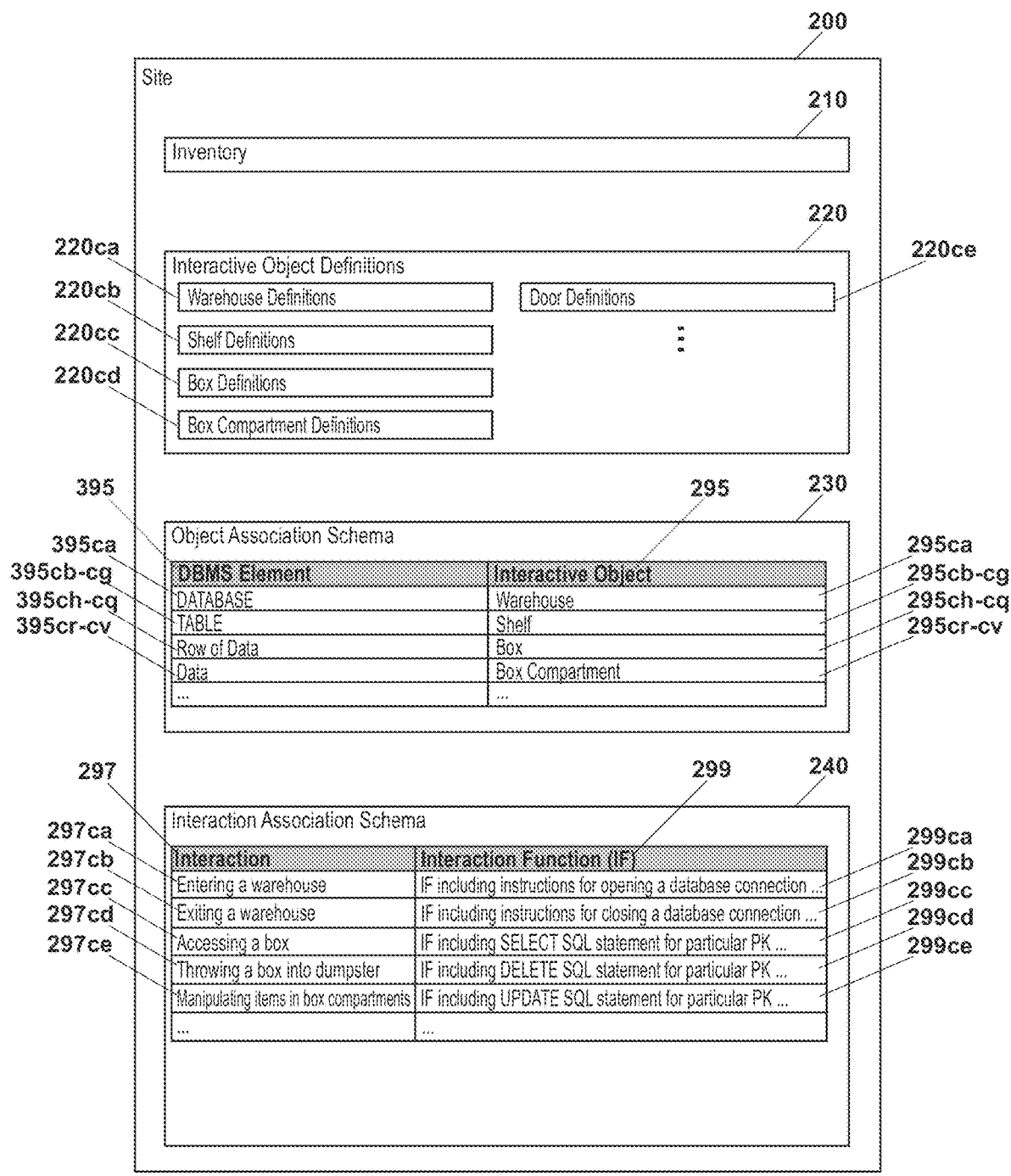
FIG. 24 illustrates an embodiment of Site 200 comprising "Inventory" Site Identifier 210.

To implement a preceding exemplary embodiment, Site Generator 110 may receive DBMS Elements 395*ca-cv*, etc. (or references thereto) such as the name of the database (i.e. inventory, etc.), names of tables within the database (i.e. Accessory Parts, Printer Parts, Networking Parts, Audio Parts, Video Parts, Computer Parts, etc.), primary key values for rows of data within each of the tables, column names within each of the tables, and/or other needed DBMS Elements 395. Site Inference Unit 105 may traverse or process Data 141, Metadata 142, and/or Other DBMS Repositories 143 and find frequently occurring reference "inventory" in Metadata 142. Substantial Similarity Comparison Unit 175 may compare this reference with Site Identifiers 210 in Site Collection 180 and find Site 200 comprising Site Identifier 210 identical or substantially similar to reference "Inventory" as shown in FIG. 24. Site Generator 110 may receive from Site Inference Unit 105 the found Site 200 whose Interactive Object Definitions 220, Object Association Schema 230, and Interaction Association Schema 240 include information on Interactive Objects 295*ca-cw*, etc. to be generated, their associations with any DBMS Elements 395*ca-cv*, etc., Interactions 297*ca-ce*, etc., Interaction Functions 297*ca-ce*, etc., and/or other information. Site Generator 110 may create or generate a scene comprising Interactive Objects 295*ca-cw*, etc., for example. Site Generator 110 may look up each of the previously received DBMS Elements 395*ca-cv*, etc. in Site's 200 Object Association Schema 230 and find a corresponding Interactive Object 295*ca-cv*, etc. Using Interactive Object Definitions 220*ca-ce*, etc., Site Generator 110 may then generate a corresponding associated Interactive Object 295*ca-cv*, etc. for each DBMS Element 395*ca-cv*, etc. Site Generator 110 may also generate any unassociated objects such as door Interactive Object 295*cw*, and/or others. Site Generator 110 may define one or more Interactions 297 such as Interactions 297*ca-ce*, etc. (i.e. entering a warehouse, accessing a box, etc.) and create one or more Interaction Functions 299 such as Interaction Functions 299*ca-ce*, etc. that may be activated when an event occurs such as entering a warehouse or accessing a box. User Interaction Unit 115 may render or display the scene and/or Interactive Objects 295*ca-cw*, etc. such as the warehouse, shelves, boxes, and/or other objects in a GUI through which a user or User Controllable Avatar 600 can interact with the Interactive Objects 295*ca-cw*, etc. User may view the scene and/or Interactive Objects 295*ca-cw*, etc. using a first-person view in which the user may see through the eyes of his/her avatar or user controllable camera. User or User Controllable Avatar 600 may cause an Interaction 297 with an Interactive Object 295 to occur such as accessing a box Interaction 297*cc* by clicking on a box signifying intent to access it, for example. Site Generator 110 may execute Interaction Function 299*cc* that is handling Interaction 297*cc*. Such Interaction Function 299*cc* may include instructions for animating and/or transforming the scene and/or Interactive Objects 295 such as portraying a box Interactive Object 295*ch-cq*, etc. opening and accessing its content (i.e. box compartment Interactive Objects 295*cr-cv*, etc.) experience. Interaction Function 299*cc* may also include DBMS instructions for performing one or more operations on DBMS 120 such as "SELECT*FROM 'Computer Parts' WHERE PKCol=rowID;" SQL statement to access a row of data with a particular primary key value to be presented in box compartments, for example. Interaction Function 299cc may also include instructions to link to another Site 200 or Interactive Object 295 as needed. After or in response to performing a DBMS operation, Site Generator 110 may re-generate the scene and/or Interactive Objects 295ca-cw, etc. based on user Interactions 297ca-ce, etc. such as portray box compartment Interactive Objects 295cr-cv, etc. after opening a box Interactive Object 295ch-cq, etc. Further, Site Generator 110 may re-associate (if or as needed) the re-generated scene and/or Interactive Objects 295ca-cv, etc. with updated DBMS Elements 395ca-cv, etc. such as re-associate box compartment Interactive Objects 295cr-cv, etc. with data or data cells of a table after an update. User Interaction Unit 115 may then render or display the re-generated re-associated scene and/or Interactive Objects 295ca-cw, etc. in GUI for user's subsequent Interactions 297ca-ce, etc.

Any variations of Interactive Objects 295, associations with DBMS Elements 395, Interactions 297, Interaction Functions 299, and/or other elements may be implemented on the preceding exemplary embodiments. In one example, shelf Interactive Objects 295 may be associated with databases, box Interactive Objects 295 may be associated with tables or reports/views, box compartment Interactive Objects 295 may be associated with rows of data, and so on. In another example, additional Interactive Objects 295 may be added such as a dumpster as a means for boxes to be thrown away and deleted from DBMS 120, a stepladder as a means to access high shelves, and so on.

Figure 25:
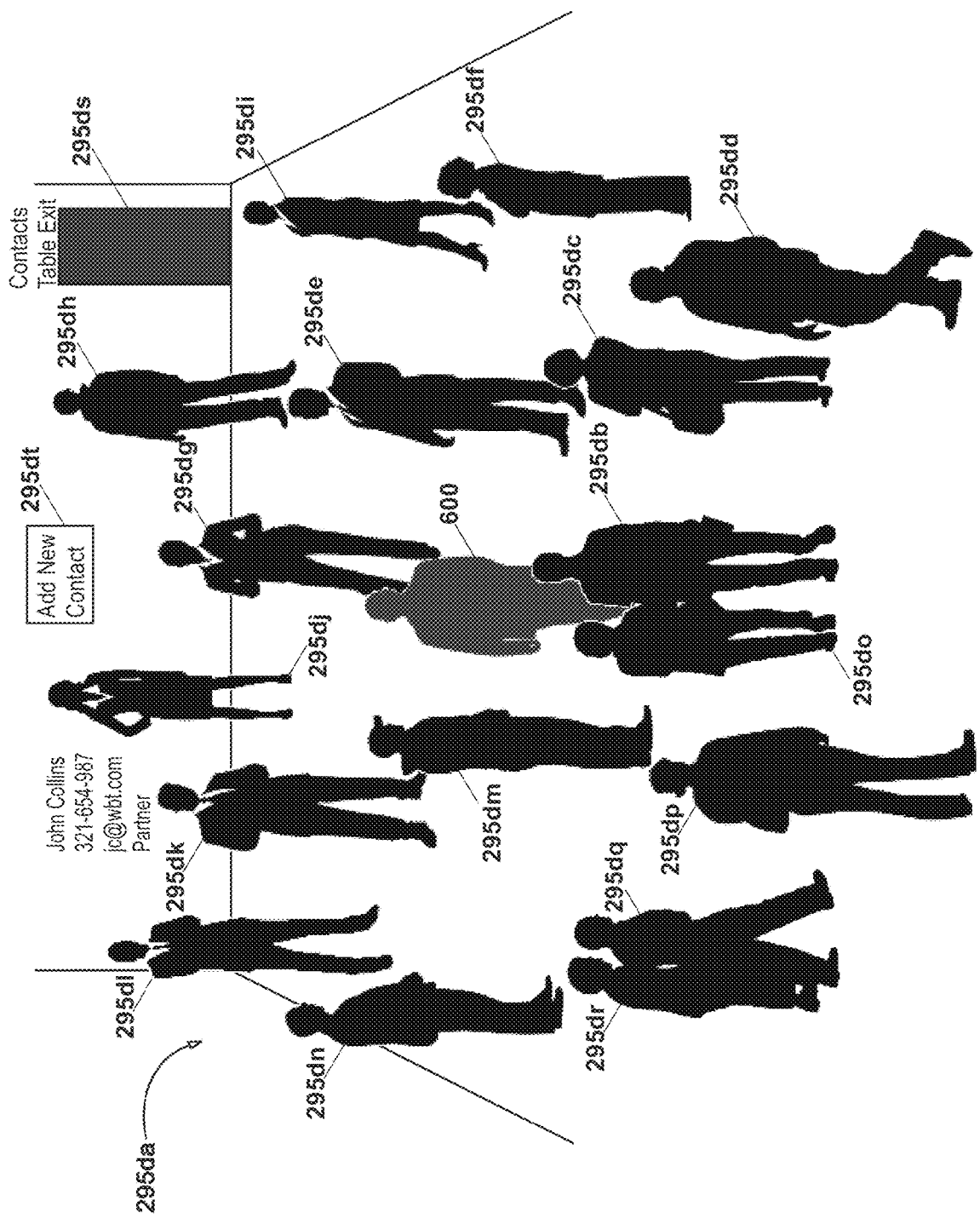
FIG. 25 shows an exemplary embodiment including a room Interactive Object 295da associated with a contacts table DBMS Element 395da.

In some exemplary embodiments such as the one illustrated in FIG. 25, Site 200 includes a room Interactive Object 295da that may be associated with a DBMS Element 395 such as contacts table DBMS Element 395da. Site 200 may also include door Interactive Object 295ds that may be a means for a user or User Controllable Avatar 600 to enter or exit the room. Site 200 may further include character Interactive Objects 295db-dr, etc. each of which may be associated with a row of data DBMS Element 395db-dr, etc. such as a row of data storing information on individuals like name, phone number, email address, title, notes, and/or other information. Character Interactive Objects 295db-dr, etc. may be inside the room Interactive Object 295da. Site 200 may further include an add new contact button Interactive Object 295dt for enabling a user to add additional contacts. Any Interactive Object 295 or method may be utilized instead of the add new contact button Interactive Object 295dt for enabling a user to add additional contacts.

Figure 26:
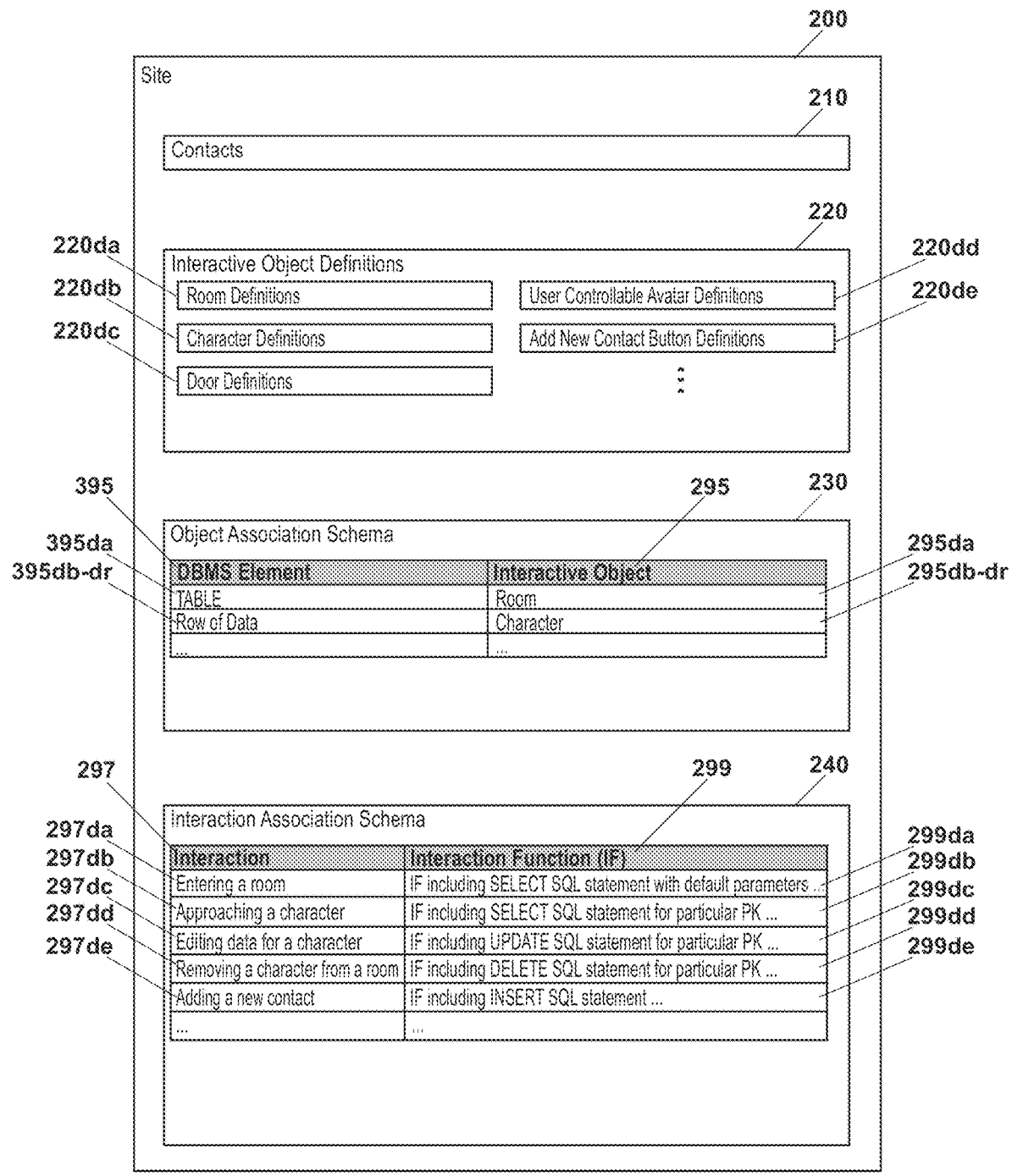
FIG. 26 illustrates an embodiment of Site 200 comprising "Contacts" Site Identifier 210.

To implement a preceding exemplary embodiment, Site Generator 110 may receive DBMS Elements 395da-dr, etc. (or references thereto) such as the name of the table (i.e. contacts, etc.), primary key values for rows of data within the table, column names within the table, and/or other needed DBMS Elements 395. Site Inference Unit 105 may enable a user to select Site 200. User may be offered a list of Sites 200 (i.e. Sites 200 from Site Collection 180, etc.) or references thereto from which user may select a Site 200 comprising Site Identifier 210 "Contacts" as shown in FIG. 26. Site Generator 110 may receive from Site Inference Unit 105 the selected Site 200 whose Interactive Object Definitions 220, Object Association Schema 230, and Interaction Association Schema 240 include information on Interactive Objects 295da-dt, etc. to be generated, their associations with any DBMS Elements 395da-dr, etc., Interactions 297da-de, etc., Interaction Functions 299da-de, etc., and/or other information. Site Generator 110 may create or generate a scene comprising Interactive Objects 295da-dt, etc., for example. Site Generator 110 may look up each of the previously received DBMS Elements 395da-dr, etc. in Site's 200 Object Association Schema 230 and find a corresponding Interactive Object 295da-dr, etc. Using Interactive Object Definitions 220da-de, etc., Site Generator 110 may then generate a corresponding associated Interactive Object 295da-dr, etc. for each DBMS Element 395da-dr, etc. Site Generator 110 may also generate any unassociated objects such as door Interactive Object 295ds, add new contact button Interactive Object 295dt, User Controllable Avatar 600, and/or others. Site Generator 110 may define one or more Interactions 297 such as Interactions 297da-de, etc. (i.e. approaching a character, adding a new contact, etc.) and create one or more Interaction Functions 299 such as Interaction Functions 299da-de, etc. that may be activated when an event occurs such as approaching a character or adding a new contact. User Interaction Unit 115 may render or display the scene and/or Interactive Objects 295da-dt, etc. such as the room, characters, and/or other objects in a GUI through which a user or User Controllable Avatar 600 can interact with the Interactive Objects 295da-dt, etc. User may view the scene and/or Interactive Objects 295da-dt, etc. using a third-person perspective in which the user may see his/her User Controllable Avatar 600 and its surroundings. User or User Controllable Avatar 600 may cause an Interaction 297 with an Interactive Object 295 to occur such as approaching a character Interaction 297db by approaching a character Interactive Object 295 with User Controllable Avatar 600 or by clicking on the character Interactive Object 295. Site Generator 110 may execute Interaction Function 299db that is handling Interaction 297db. Such Interaction Function 299db may include instructions for animating and/or transforming the scene and/or Interactive Objects 295 such as showing data (i.e. name, phone number, email address, date of birth, favorite color, etc.) associated with the approached character Interactive Object 295. Such data may be displayed above or near the character depending on context. Interaction Function 299db may also include DBMS instructions for performing one or more operations on DBMS 120 such as "SELECT*FROM 'Contacts' WHERE PKCol=rowID;" SQL statement to access a row of data with a particular primary key value associated with the approached character Interactive Object 295. Interaction Function 299db may also include instructions to link to another Site 200 or Interactive Object 295 as needed. User or User Controllable Avatar 600 may also cause an Interaction 297 with an Interactive Object 295 to occur such as adding a new contact Interaction 297de by clicking on the add new contact button Interactive Object 295dt. Site Generator 110 may execute Interaction Function 299de that is handling Interaction 297de. Such Interaction Function 299de may include instructions for animating and/or transforming the scene and/or Interactive Objects 295 such as showing a window for selecting a new contact or window with data input fields for manual input of the new contact's information (i.e. name, phone number, email address, date of birth, favorite color, etc.). Interaction Function 299de may also include DBMS instructions for performing one or more operations on DBMS 120 such as "INSERT INTO 'Contacts' (Col1, Col2, Col3, . . . ) VALUES (Val1, Val2, Val3, . . . )" SQL statement to insert a row of data comprising the new contact's information. After or in response to performing a DBMS operation, Site Generator 110 may re-generate the scene and/or Interactive Objects 295da-dt, etc. based on user Interactions 297*da-de*, etc. such as portray a newly added character Interactive Object 295 (not shown). Further, Site Generator 110 may re-associate the re-generated scene and/or Interactive Objects 295*da-dt*, etc. with updated DBMS Elements 395*da-dr*, etc. such as associate the newly added character Interactive Object 295 with a corresponding newly inserted row of data DBMS Element 395 (not shown). User Interaction Unit 115 may then render or display the re-generated re-associated scene and/or Interactive Objects 295*da-dt*, etc. in GUI for user's subsequent Interactions 297*da-de*, etc.

Figure 27:
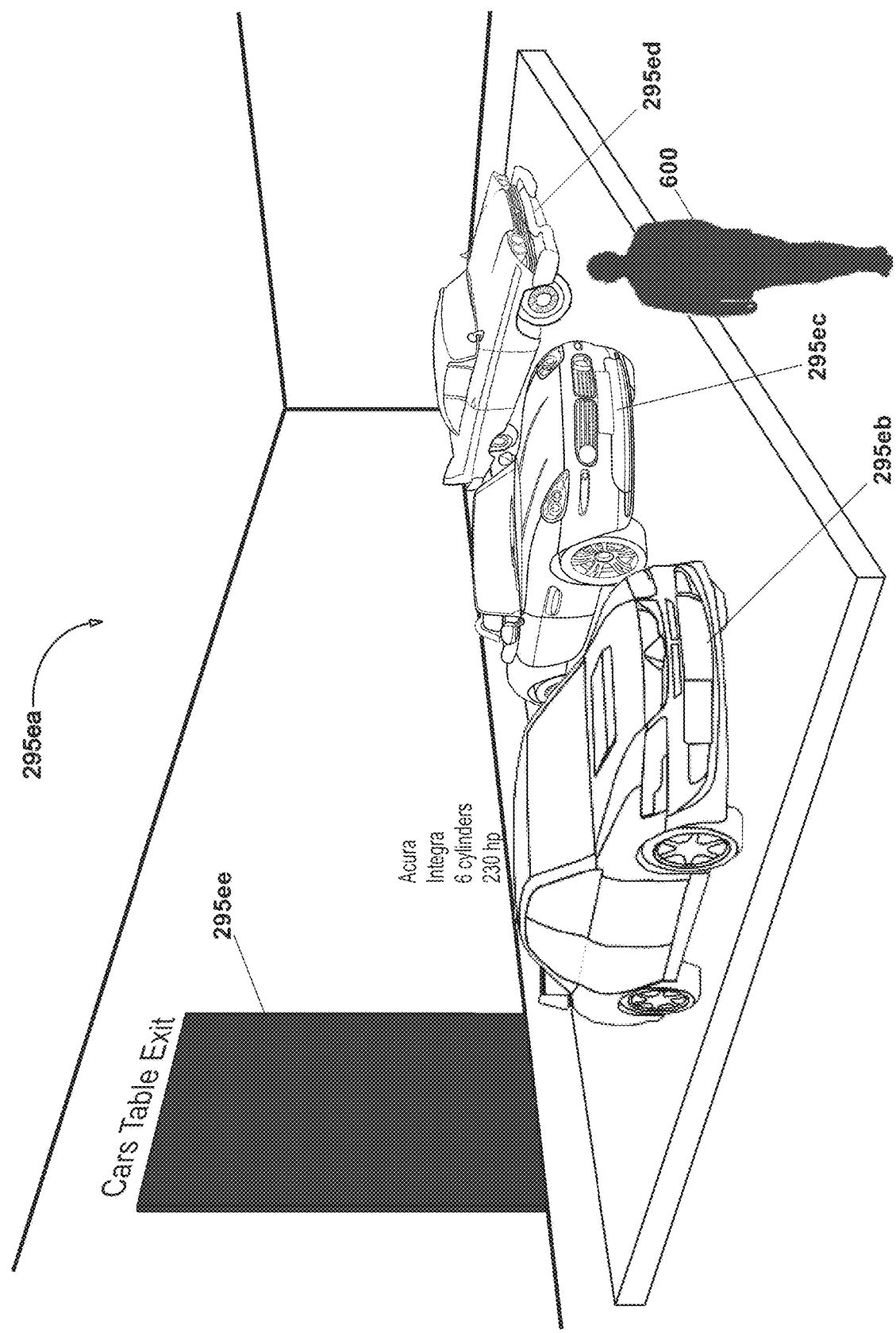
FIG. 27 shows an exemplary embodiment including a showroom Interactive Object 295ea.

In a similar exemplary embodiment illustrated in FIG. 27, Site 200 includes a showroom Interactive Object 295*ea* that may be associated with a DBMS Element 395 such as cars table DBMS Element 395 (not shown). Site 200 may also include door Interactive Object 295*ee* that may be a means for a user or User Controllable Avatar 600 to enter or exit the showroom. Site 200 may further include car Interactive Objects 295*eb-ed*, etc. each of which may be associated with a row of data DBMS Elements 395 such as a row of data storing information on cars like make, model, number of cylinders, horse powers, and/or other information. Car Interactive Objects 295*eb-ed*, etc. may be inside the showroom Interactive Object 295*ea*. The mechanics of generating the scene and/or Interactive Objects 295, associating Interactive Objects 295 with DBMS Elements 395, defining and implementing user or User Controllable Avatar 600 interactions, and/or other operations are similar to the previously described exemplary embodiments.

Any variations of Interactive Objects 295, associations with DBMS Elements 395, Interactions 297, Interaction Functions 299, and/or other elements may be implemented on the preceding exemplary embodiments. In one example, room Interactive Object 295 may be associated with a report/view including user's closest friends. Closest friends may be determined based on how often (i.e. number of phone, email, or other communications, etc.) the user communicated with each of the contacts. This communication frequency may be stored in a column of a table from which the report/view may select the contacts having communication frequency above a certain threshold. Therefore, the room Interactive Object 295 may include character Interactive Objects 295 where the closest characters to the User Controllable Avatar 600 may represent user's friends or contacts with the highest communication frequency (i.e. closest friends, etc.). In another example, each character Interactive Object 295 includes its own specific 3D model (i.e. standing, arms crossed, smiling, etc., if available) or picture (i.e. face or full body picture, etc., if available) as a means to quickly identify a contact by looking at the character Interactive Object 295. A general 3D model such as male of female may be used where contact specific model is not available. In yet another example, Site 200 includes any Interactive Object 295 instead of the room Interactive Object 295 such as beach, park, street, and/or other Interactive Objects 295 through which a user or User Controllable Avatar 600 may walk, see, and/or interact with various character interactive Objects 2995 similar to previously described room interactions. In yet another example, Interaction 297 may be available to enable a user or User Controllable Avatar 600 to click or otherwise interact with an Interactive Object 295 such as a character or any data shown nearby, etc. to edit the underlying DBMS Element 395 such as a data, etc.

Figure 28:
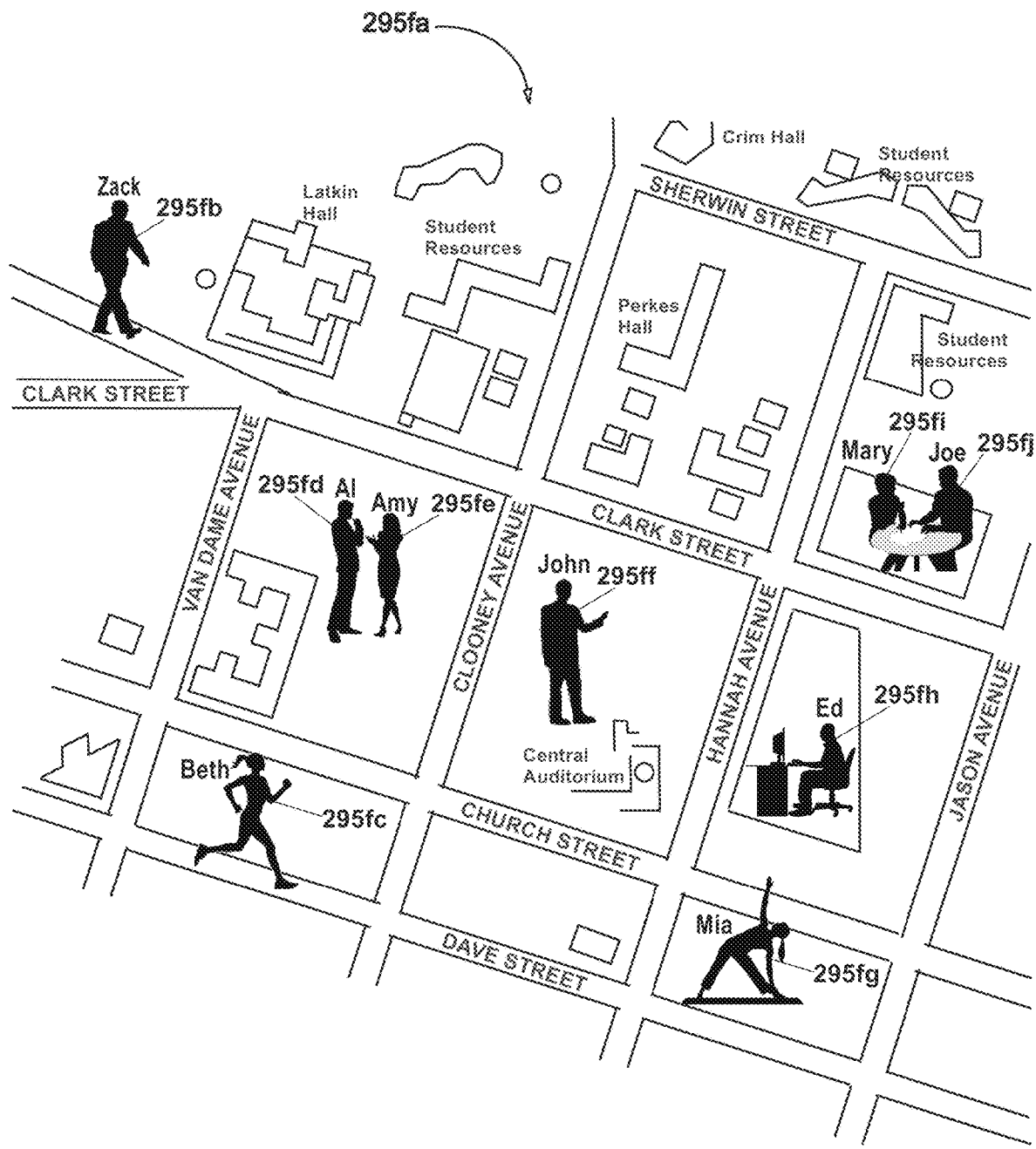
FIG. 28 shows an exemplary embodiment including a map Interactive Object 295fa.

In some exemplary embodiments such as the one illustrated in FIG. 28, Site 200 includes a map Interactive Object 295*fa* that may be associated with a DBMS Element 395 such as friends table DBMS Element 395*fa*. Site 200 may further include character Interactive Objects 295*fb-fj*, etc. each of which may be associated with a row of data DBMS Element 395*fb-fj*, etc. such as a row of data storing information on individuals like location, name, phone number, email address, date of birth, favorite color, notes, and/or other information. Character Interactive Objects 295*fb-fj*, etc. may be placed on the map Interactive Object 295*fa* based on their location information.

Figure 29:
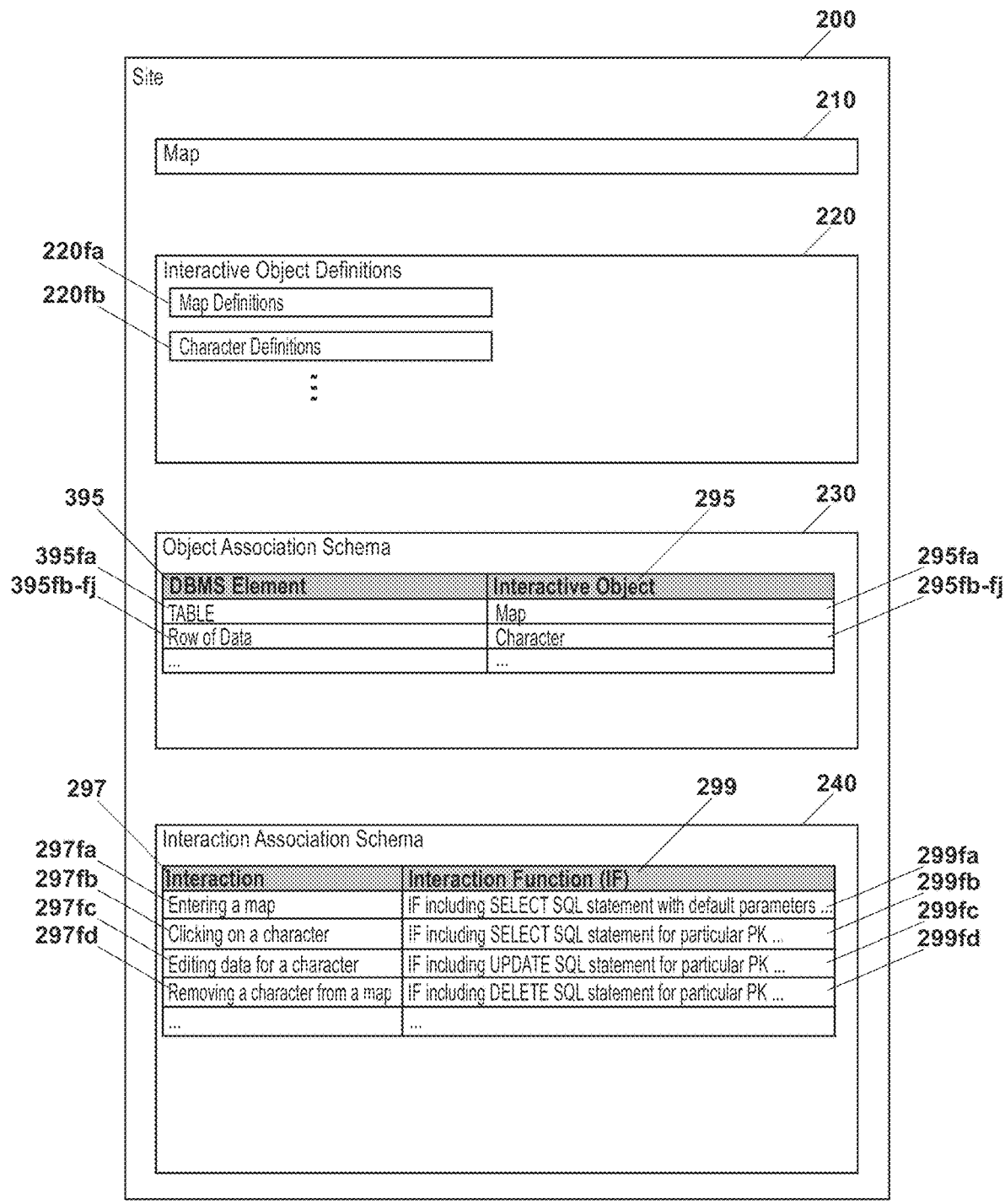
FIG. 29 illustrates an embodiment of Site 200 comprising "Map" Site Identifier 210.

To implement a preceding exemplary embodiment, Site Generator 110 may receive DBMS Elements 395*fa-fj*, etc. (or references thereto) such as the name of the table (i.e. friends, etc.), primary key values for rows of data within the table, column names within the table, and/or other needed DBMS Elements 395. Site Inference Unit 105 may traverse or process Data 141, Metadata 142, and/or Other DBMS Repositories 143 and find frequently occurring references to geographic locations such as latitude, longitude, altitude, address, and/or other references to geographic locations or location information. Such references to geographic locations may be found in a Metadata 142 repository containing column names for a table such as the friends table, for example. Substantial Similarity Comparison Unit 175 may compare these references with Site Identifiers 210 in Site Collection 180 and not find a matching Site Identifier 210. Semantic Conversion Unit 170 may then be utilized to convert the frequently occurring references such as "latitude," "longitude," "altitude," "address," and/or other such references into a semantically indicative reference such as "map." Substantial Similarity Comparison Unit 175 may compare this converted semantically indicative reference with Site Identifiers 210 in Site Collection 180 and find Site 200 comprising Site Identifier 210 identical or substantially similar to reference "Map" as shown in FIG. 29. Site Generator 110 may receive from Site Inference Unit 105 the found Site 200 whose Interactive Object Definitions 220, Object Association Schema 230, and Interaction Association Schema 240 include information on Interactive Objects 295*fa-fj*, etc. to be generated, their associations with any DBMS Elements 395*fa-fj*, etc., Interactions 297*fa-fd*, etc., Interaction Functions 299*fa-fd*, etc., and/or other information. Site Generator 110 may create or generate a scene comprising Interactive Objects 295*fa-fj*, etc., for example. Site Generator 110 may look up each of the previously received DBMS Elements 395*fa-fj*, etc. in Site's 200 Object Association Schema 230 and find a corresponding Interactive Object 295*fa-fj*, etc. Using Interactive Object Definitions 220*fa-fb*, etc., Site Generator 110 may then generate a corresponding associated Interactive Object 295*fa-fj*, etc. for each DBMS Element 395*fa-fj*, etc. Site Generator 110 may also generate any unassociated objects as needed. Site Generator 110 may define one or more Interactions 297 such as Interactions 297*fa-fd*, etc. (i.e. entering a map, clicking on a character, removing a character from a map, etc.) and create one or more Interaction Functions 299 such as Interaction Functions 299*fa-fd*, etc. that may be activated when an event occurs such as entering a map, clicking on a character, or removing a character from a map. User Interaction Unit 115 may render or display the scene and/or Interactive Objects 295*fa-fj*, etc. such as the map, characters, and/or other objects in a GUI through which a user or User Controllable Avatar 600 can interact with Interactive Objects 295*fa-fj*, etc. User may view the scene and/or Interactive Objects 295*fa-fj*, etc. using a bird's eye perspective in which the user may see geographic or other locations of objects in a scene (i.e. a map or a portion thereof, etc.). User may cause an Interaction 297 with an Interactive Object 295 to occur such as removing a character from a map Interaction 297*fd* by clicking on a character Interactive Object 295*fj*, for example, and dragging it out of the map. Site Generator 110 may execute Interaction Function 299*fd* that is handling Interaction 297*fd*. Such Interaction Function 299*fd* may include instructions for animating and/or transforming the scene and/or Interactive Objects 295 such as portraying character dragging experience. Interaction Function 299*fd* may also include DBMS instructions for performing one or more operations on DBMS 120 such as "DELETE FROM 'Friends' WHERE PKCol=rowID;" SQL statement to delete a row of data having a particular primary key value associated with the removed character Interactive Object 295*fj*. Interaction Function 299*fd* may also include instructions to link to another Site 200 or Interactive Object 295 as needed. After or in response to performing a DBMS operation, Site Generator 110 may re-generate the scene and/or Interactive Objects 295*fa-fj*, etc. based on user Interactions 297*fa-fd*, etc. such as show disappearance of the removed character Interactive Object 295*fj*. Further, Site Generator 110 may re-associate (if or as needed) the re-generated scene and/or Interactive Objects 295*fa-fi*, etc. with updated DBMS Elements 395*fa-fi*, etc. such as re-associate (optional) character Interactive Objects 295*fb-fi*, etc. with rows of data DBMS Elements 395*fb-fi*, etc. of the updated friends table. User Interaction Unit 115 may then render or display the re-generated re-associated scene and/or Interactive Objects 295*fa-fi*, etc. in GUI for user's subsequent Interactions 297*fa-fd*, etc.

Any variations of Interactive Objects 295, associations with DBMS Elements 395, Interactions 297, Interaction Functions 299, and/or other elements may be implemented on the preceding exemplary embodiments. In one example, a map Interactive Object 295 may be associated with a report/view including user's friends for whom location information is available. Therefore, Site 200 may include a map Interactive Object 295 and character Interactive Objects 295 where character Interactive Objects 295 may be placed in locations on the map Interactive Object 295 based on their known locations. A location includes any information that may define a position of a person or object such as latitude/longitude/altitude, address, geo-coordinates, triangulated coordinates, vector coordinates, x/y/z coordinates, and/or other information. A SQL statement such as "SELECT*FROM 'Friends' WHERE Lat Is Not Null and Long Is Not Null;" may be used to create report/view including user's friends' location information. Location of a friend may be determined from his/her smartphone, wearable electronics, or other mobile device running an application or configured to transmit its location to a central system or DBMS accessible to AMD Unit 100. Location information may be obtained from a user's smartphone, wearable electronics, or other mobile device where the user voluntarily configures the device to transmit such location information. Location information may also be obtained from a user's smartphone, wearable electronics, or other mobile device by a cellular phone service provider such as in cases of tracking dangerous criminals in a police search or monitoring mission. A triangulation technique may be used to determine or estimate coordinates of a device by utilizing known coordinates of any three locations (i.e. cell phone towers, etc.) with which the user's smartphone, wearable electronics, or other mobile device had radio contact. Examples of the systems of coordinates that may be used include x, y, and z coordinates, system of coordinates using angle and distance from a reference point, system of coordinates using intersecting angles from various reference points, and/or any other systems of coordinates.

In yet another example, in addition to the location information, current or recent activity information may be available for each of the friends in the friends table or any report/view derived from this table. In some aspects, a friend may post or update his/her current or recent activity such as at lunch, in a class, jogging, etc. on Twitter, Facebook, and/or other such system or DBMS accessible to AMD Unit 100. In other aspects, a smartphone, wearable electronics, or other mobile device may be configured to detect a person's activity. For example, an application running on a smartphone may be configured to detect heart rate or vibrations, with or without external sensors, and determine that a person may be exercising and the type of exercise (i.e. a much higher than average heart rate or vibration may mean jogging, a little higher than average heart rate or vibration may mean weight lifting, etc.). Any other activity detection systems or methods may be utilized instead of or in addition to the one described. Once current or recent activity is known for a friend the character Interactive Object 295 representing the friend may include a specific type of 3D model portraying an activity such as sitting in a restaurant, sitting in a classroom, jogging in a park, and so on.

In yet another example, in addition to being able to click or otherwise initiate access or other operation on data for a specific friend represented by a character Interactive Object 295, a user may also initiate any other type of operation such as communication with a friend by starting a telephonic, chat, or other communication application.

In yet another example, in addition to a person's location, data, activity, and/or other information, Site 200 may include any geographically defined data or objects. In one example, Site 200 includes airplane location, data, activity, and/or other information such as location in flight, boarding activity, refueling activity, and/or other information. In another example, Site 200 includes building location, data, activity, and/or other information such as latitude and longitude information, address information, for sale status, open house activity, and/or other information. In another example, Site 200 includes vehicle location, data, activity, and/or other information such as latitude and longitude information, still or in motion activity, person using/renting the vehicle information, and/or other information. In any of these types of exemplary embodiments, Site 200 includes a map Interactive Object 295 that may be associated with a DBMS Element 395 such as a table and where an Interactive Object 295 such as a character, airplane, building, vehicle, etc. may be a means to view or perform other operations on a record or row of data. Any other associations among other Interactive Objects 295 and other DBMS Elements 395 may be made in alternate embodiments.

Figure 30:
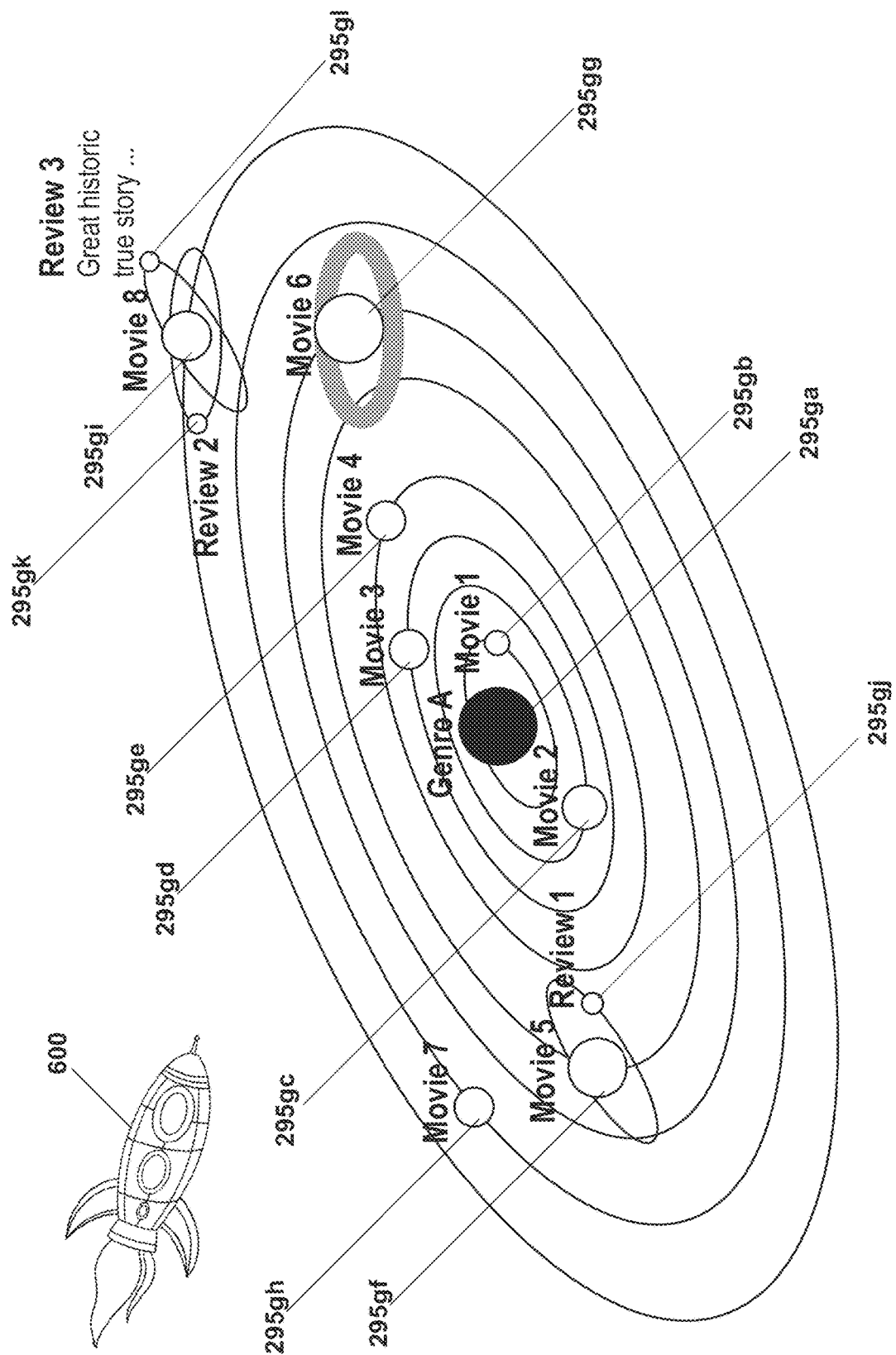
FIG. 30 shows an exemplary embodiment including one or more star Interactive Objects 295.

In some exemplary embodiments such as the one illustrated in FIG. 30, Site 200 includes one or more star Interactive Objects 295 such as star Interactive Object 295*ga* that may be associated with a DBMS Element 395 such as Genre A table DBMS Element 395*ga*. In some aspects, Genre A table may be a report/view deriving Genre A movies from a table of movies in all genres. Site 200 may also include planet Interactive Objects 295*gb-gi*, etc. each of which may be associated with a row of data DBMS Element 395*gb-gi*, etc. such as a row of data storing information on a movie like title, actors, length, and/or other information. Planet Interactive Objects 295*gb-gi*, etc. may be orbiting the star Interactive Object 295*ga*. Site 200 may further include moon Interactive Objects 295*gj-gl*, etc. each of which may be associated with extra data DBMS Element 395*gj-gl*, etc.

such as a row of data in a table (i.e. separate table, etc.) storing movie reviews where the row of data may be obtained by a unique identifier (i.e. primary key) for a particular movie. Each of the moon Interactive Objects 295*gj-gl*, etc. may be orbiting its planet Interactive Object 295*gb-gi*, etc.

Figure 31:
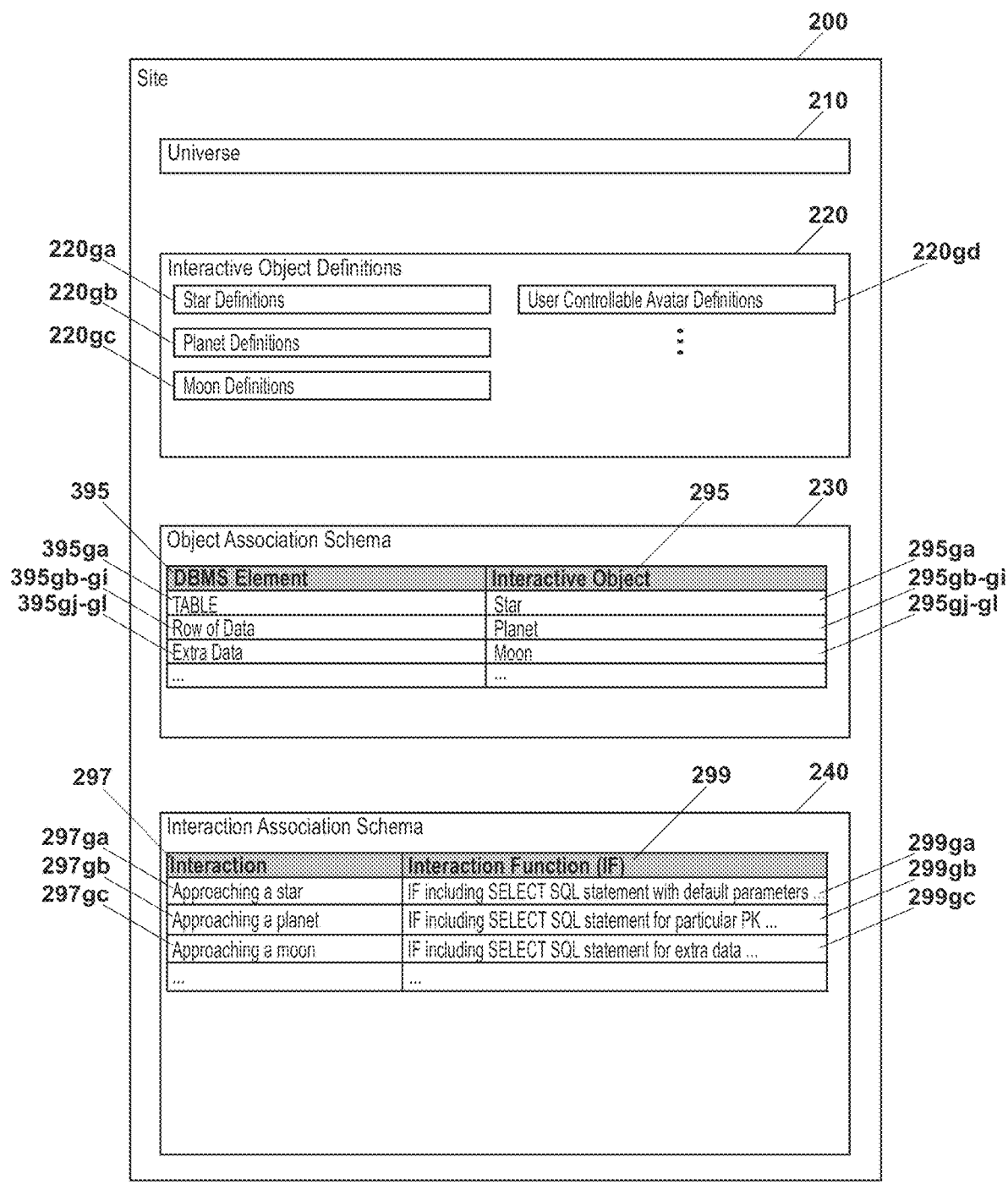
FIG. 31 illustrates an embodiment of Site 200 comprising "Universe" Site Identifier 210.

To implement a preceding exemplary embodiment, Site Generator 110 may receive DBMS Elements 395*ga-gl*, etc. (or references thereto) such as the name of the table (i.e. Genre A, etc.), primary key values for rows of data within the table, column names within the table, the name of a table or report/view (i.e. Reviews, etc.) where extra data is stored, and/or other needed DBMS Elements 395. Site Inference Unit 105 may traverse or process Email 131, Social Media Records 132, Electronic Files 133, and/or Other User Repositories 134, and find therein frequently occurring references to astronomy terminology such as "star," "planet," "jupiter," "saturn," and/or other such references. Substantial Similarity Comparison Unit 175 may compare these references with Site Identifiers 210 in Site Collection 180 and not find a matching Site Identifier 210. Semantic Conversion Unit 170 may then be utilized to convert the frequently occurring references such as "star," "planet," "jupiter," "saturn," and/or other such references into a semantically indicative reference such as "universe." Substantial Similarity Comparison Unit 175 may compare this converted reference with Site Identifiers 210 in Site Collection 180 and find Site 200 comprising Site Identifier 210 identical or substantially similar to reference "Universe" as shown in FIG. 31. Site Generator 110 may receive from Site Inference Unit 105 the found Site 200 whose Interactive Object Definitions 220, Object Association Schema 230, and Interaction Association Schema 240 include information on Interactive Objects 295*ga-gl*, etc. to be generated, their associations with any DBMS Elements 395*ga-gl*, etc., Interactions 297*ga-gc*, etc., Interaction Functions 299*ga-gc*, etc., and/or other information. Site Generator 110 may create a scene comprising Interactive Objects 295*ga-gl*, etc., for example. Site Generator 110 may look up each of the previously received DBMS Elements 395*ga-gl*, etc. in Site's 200 Object Association Schema 230 and find a corresponding Interactive Object 295*ga-gl*, etc. Using Interactive Object Definitions 220*ga-gd*, etc., Site Generator 110 may then generate a corresponding associated Interactive Object 295*ga-gl*, etc. for each DBMS Element 395*ga-gl*, etc. Site Generator 110 may also generate any unassociated objects such as User Controllable Avatar 600, and/or other unassociated Interactive Objects 295. Site Generator 110 may define one or more Interactions 297 such as Interactions 297*ga-gc*, etc. (i.e. approaching a planet, approaching a moon, etc.) and create one or more Interaction Functions 299 such as Interaction Functions 299*ga-gc*, etc. that may be activated when an event occurs such as approaching a planet or approaching a moon. User Interaction Unit 115 may render or display the scene and/or Interactive Objects 295*ga-gl*, etc. such as stars, planets, moons, and/or other objects in a GUI through which a user or User Controllable Avatar 600 can interact with the Interactive Objects 295*ga-gl*, etc. User may view the scene and/or Interactive Objects 295*ga-gl*, etc. using a first-person perspective in which the user may see through the eyes of a rocket pilot, for example, or user controllable camera moving through the universe. User or User Controllable Avatar 600 may cause an Interaction 297 with an Interactive Object 295 to occur such as approaching a moon Interaction 297*gc* by User Controllable Avatar's 600 approaching a moon Interactive Object 295*gl*, for example, or user's clicking on the moon. Site Generator 110 may execute Interaction Function 299*gc* that is handling Interaction 297*gc*. Such Interaction Function 299*gc* may include instructions for animating and/or transforming the scene and/or Interactive Objects 295 such as showing data (i.e. reviews, etc.) associated with the approached moon Interactive Object 295*gl*. Such data (i.e. reviews, etc.) may be shown above or near the moon depending on context. Interaction Function 299*gc* may also include instructions for animating and/or transforming the scene and/or Interactive Objects 295 such as stop orbiting of the moon Interactive Object 295*gl*, etc. while the user is reading the review. Interaction Function 299*gc* may also include DBMS instructions for performing one or more operations on DBMS 120 such as "SELECT ReviewText FROM 'Reviews' WHERE PKCol=MovieID;" SQL statement to access a review text in the Reviews table for a movie associated with planet Interactive Object 295*gi*. Interaction Function 299*gc* may also include instructions to link to another Site 200 or Interactive Object 295 as needed. After or in response to performing a DBMS operation, Site Generator 110 may re-generate (if or as needed) the scene and/or Interactive Objects 295*ga-gl*, etc. based on user Interactions 297*ga-gc*, etc. Further, Site Generator 110 may re-associate (if or as needed) the re-generated scene and/or Interactive Objects 295*ga-gl*, etc. with updated DBMS Elements 395*ga-gl*, etc. User Interaction Unit 115 may then render or display (if or as needed) the re-generated re-associated scene and/or Interactive Objects 295*ga-gl*, etc. in GUI for user's subsequent Interactions 297*ga-gc*, etc.

Any variations of Interactive Objects 295, associations with DBMS Elements 395, Interactions 297, Interaction Functions 299, and/or other elements may be implemented on the preceding exemplary embodiments. In one example, a star Interactive Object 295 may be associated with music genre, book topic, or other media classification. Further, a planet Interactive Object 295 may be associated with a piece of music, book, or other media. Further, a moon Interactive Object 295 may be associated with a review of a piece of music, book, or other media. In another example, any Interactive Objects 295 may be added to the scene depending on context such as additional stellar objects like galaxies (i.e. groupings of star/solar systems representing types of media for example, etc.), asteroids, and/or other Interactive Objects 295. In yet another example, Interaction 297 may be available to enable a user or User Controllable Avatar 600 to click or otherwise interact with an Interactive Object 295 such as a star, a planet, a moon or any data shown nearby, etc. to edit the underlying DBMS Element 395 such as a table, a data, etc.

In further exemplary embodiments, Site 200 includes a restaurant Interactive Object 295 (not shown) that may be associated with a DBMS Element 395 such as food and drinks database. A table Interactive Object 295 in the restaurant may be associated with a meals table DBMS Element 395 comprising meal choices. The table Interactive Object 295 may be a means for a user or User Controllable Avatar 600 to access meals table DBMS Element 395 by sitting at the table. Also, a menu Interactive Object 295 may be associated with one or more data row DBMS Elements 395 from the meals table. The menu Interactive Object 295 may be a means for a user or User Controllable Avatar 600 to access data in the meals table DBMS Element 395 by opening the menu. Further, a bar Interactive Object 295 in the restaurant may be associated with a drinks table DBMS Element 395 comprising choices of drinks. The bar Interactive Object 295 may be a means for a user or User Controllable Avatar 600 to access drinks table DBMS Element 395 by sitting at the bar.

An Interactive Object 295 or any other disclosed element may be interfaced or linked with other graphical data portrayal systems such as virtual tours, 360 degree views, 3D worlds, street views, and/or other systems or applications. In some aspects, AMD Unit 100 may take control from, share control with, or release control to such system or application as previously described. For example, a user may move through a 3D world application representing a street and see a house for sale. User or User Controllable Avatar 600 may approach or click on the door of the house to enter a Site 200 comprising a house Interactive Object 295 associated with a DBMS Element 395 such as database of sale listing information. Each room Interactive Object 295 may be associated with a table DBMS Element 395 such as a table comprising past sale history, a table comprising current sale data, a table comprising comparable sales, and/or other tables. A room Interactive Object 295 may be a means for a user or User Controllable Avatar 600 to access a table DBMS Element 395 by entering a room. Also, a wall Interactive Object 295 within a room may be associated with one or more row of data DBMS Elements 395. A wall Interactive Object 295 may be a means for a user or User Controllable Avatar 600 to access data in a table DBMS Element 395.

Figure 32:
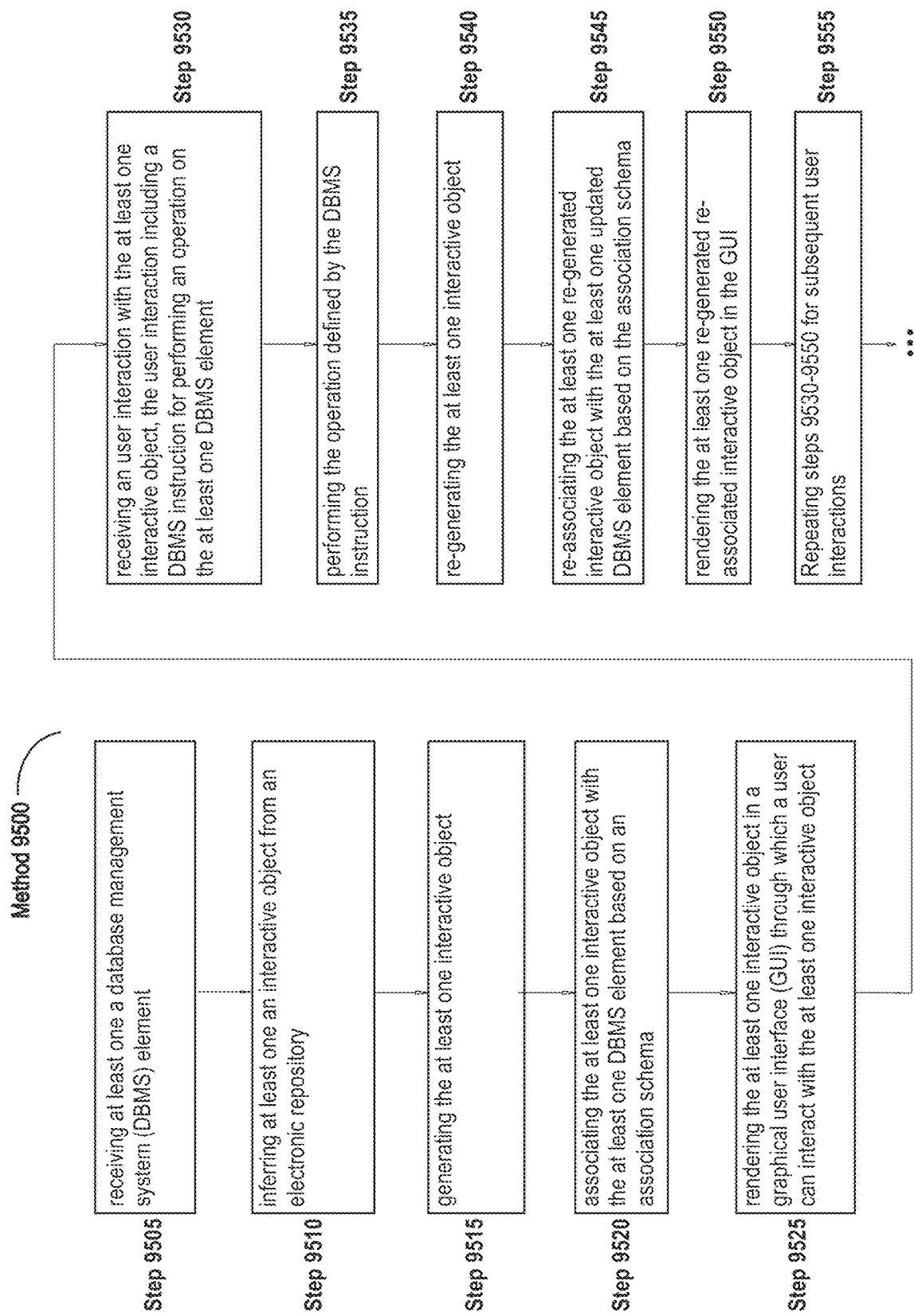
FIG. 32 shows an embodiment of a method 9500 for associative management of data.

Referring to FIG. 32, the illustration shows an embodiment of a method 9500 for associative management of data (i.e. AMD Unit, etc.). The method may therefore be used on one or more computing devices to enable a user to manage data, metadata, and/or other elements of a DBMS through interacting with objects from the user's experience or with which the user can relate. In some embodiments, the method may be used on one or more computing devices operating an interface for AMD Unit that may enable a user to manage data, metadata, and/or other elements of a DBMS through interacting with objects from the user's experience or with which the user can relate.

At step 9505, at least one a database management system (DBMS) element is received. DBMS elements (i.e. DBMS Elements 395, etc.) may be received from a DBMS (i.e. DBMS 120, etc.). All DBMS elements or only DBMS elements of interest may be received from a DBMS. A DBMS element may be received via any of the previously described connections or interfaces such as ODBC/JDBC API 410, ODBC/JDBC Bridge 420, Native ODBC/JDBC Driver 430, and/or other connections or interfaces. A DBMS element may be received over a network such as Internet, local area network, wireless network, and/or other networks. A DBMS element may be received by an interface for AMD Unit operating on a computing device. A DBMS element may be received by any element of AMD Unit or the overall system. A DBMS element may be received by or from a computing device, or by any other computing device in general. A DBMS element may be received by issuing a SQL statement to DBMS responsive to which DBMS may transmit the requested DBMS element or reference thereto. A DBMS element may be received by reading a data dictionary or metadata of a DBMS. A DBMS element may be received by accessing a DBMS's files, data structures, and/or other repositories stored on a computing device or a remote computing device. A DBMS element may be received by utilizing a native, third party, or custom API, software development kit (SDK), report building tool (i.e. Crystal Reports, etc.), or other data access tool that may access DBMS elements utilizing any of the previously described and/or other techniques. A DBMS element comprises any of the previously described elements of a DBMS such as Database 300, Table 310, Row 330, Column 320, Data Cell 340 (i.e. also generally referred to as data, etc.), Report/View 350, Relation 360, User Account 370, a login, a password, a privilege, a DBMS or database setting, and/or other elements of a DBMS, which may collectively be referred to as DBMS elements herein. In some aspects, DBMS element may also include a cube (i.e. multi-dimensional data set, etc.), dimension, and/or other such elements.

At step 9510, at least one an interactive object is inferred from an electronic repository. One or more interactive objects may be included in a collection, data structure, repository, or other arrangement such as a site (i.e. Site 200, etc.) comprising a set of interactive objects, for example. As such, inferring at least one interactive object comprises inferring a collection, a data structure, a repository, or other arrangement of interactive objects such as a site (i.e. Site 200, etc.). A site (i.e. Site 200, etc.) comprises a file, object, data structure, or other data repository or system. A site comprises one or more interactive objects (i.e. Interactive Objects 295, etc.) to be used to represent one or more DBMS elements (i.e. DBMS Elements 395, etc.), for example. In some embodiments, a site comprises a data structure including a site identifier (i.e. Site Identifier 210, etc.), interactive object definitions (i.e. Interactive Object Definitions 220, etc.), object association schema (i.e. Object Association Schema 230, etc.), interaction association schema (i.e. Interaction Association Schema 240, etc.), and/or other elements. Inferring an interactive object includes traversing or processing one or more electronic repositories comprising references to interactive objects. In some embodiments, an electronic repository comprises one or more user electronic repositories such as email (i.e. Email 131, etc.), social media records (i.e. Social Media Records 132, etc.), files (i.e. Electronic Files 133, etc.), and/or other user repositories (i.e. Other User Repositories 134, etc.) stored on user's or other (i.e. remote, etc.) computing device. In other embodiments, an electronic repository comprises one or more DBMS repositories such as data (i.e. Data 141, etc.), metadata (i.e. Metadata 142, etc.), and/or other DBMS repositories (i.e. Other DBMS Repositories 143, etc.) stored in a DBMS (i.e. DBMS 120). In some aspects, a site and/or interactive objects can be inferred by determining a frequently occurring or other reference from one or more electronic repositories. A reference includes a reference to a site and/or interactive objects. A reference may include any data (i.e. text, image, sound, code, etc.) that may serve as a reference to a site and/or interactive objects. In case where a reference includes an image, the image may be converted or interpreted (i.e. using Image Recognizer 490, etc.) into one or more textual references describing the image or comprising information encoded in the image. In case where a reference includes a sound, the sound may be converted or interpreted (i.e. using Speech/Sound Recognizer 480, etc.) into one or more textual references describing the sound or comprising information encoded in the sound. References with occurrence count of more than zero, one, two, four, six, ten, twenty, hundred, thousand, or any other threshold number may be utilized as frequently occurring references. In other aspects, a site and/or interactive objects may be inferred by reading a default reference (i.e. Default Assignment Unit 150, etc.) assigned by a user, system administrator, or other person or system. A default reference may include a reference from most users' experiences or with which most users can relate such as a building, a house, a mall, a restaurant, a showroom, a room, a universe, a map, or other such reference. In yet other aspects, a site and/or interactive objects may be inferred by user selection (i.e. User Selection Unit 160, etc.) via a means such as graphical user interface (GUI) configured to ask or enable user to select a reference of user's choice. The system may be configured to determine a reference from user's experience (i.e. user electronic repositories, etc.) first, DBMS (i.e. DBMS repositories, etc.) second as needed, default site reference third as needed, and user selection last as needed. Any other order or prioritization may be used. Once a frequently occurring or other reference is known, substantial similarity comparison (i.e. Substantial Similarity Comparison Unit 175, etc.) may be performed to compare or match the reference with site identifiers (i.e. Site Identifiers 210, etc.) from a collection of sites (i.e. Site Collection 180, etc.). Substantial similarity comparison may determine a site identifier from the collection of sites that is most like the compared reference, even if the site identifier may be different from the compared reference. In case where substantial similarity comparison finds no match for a reference among site identifiers from the collection of sites, semantic translation or conversion may be performed (i.e. Semantic Conversion Unit 170, etc.). Semantic conversion may utilize a collection of references where each reference may be associated with its corresponding semantically indicative reference. The semantically indicative reference may then be used in substantial similarity comparisons with site identifiers from a collection of sites with increased likelihood of finding an identifier matching the reference. An inferred site may be transmitted to a generator element (i.e. Site Generator 110, etc.) to implement the functionalities described herein. Inferring a site includes any action or operation by or for a Site Inference Unit 105 or any of its elements. An inferred site may also be determined by method 9600 later described. Therefore, step 9510 includes any action or operation described in steps 9605-9645 of method 9600 as applicable.

At step 9515, the at least one interactive object is generated. One or more interactive objects may be generated for each of the at least one DBMS element. In some embodiments, interactive objects may be generated by utilizing interactive object definitions (i.e. Interactive Object Definitions 220, etc.), which may store information about how to generate interactive objects. The information includes shape, color, transparency, size, and/or other information. The information may further include any data, metadata, attributes, parameters, fields, features, and/or other information that may be used for generating interactive objects. Such information, when provided to a generator (i.e. Site Generator 110, etc.), game engine, simulation engine, CAD/CAM application, graphics engine, or other such system, may enable generation of computer or mathematical representations of interactive objects. Interactive object definitions include definitions of a three (3D) or two (2D) dimensional interactive object that may generally be implemented using 3D or 2D graphics, voxel graphics, vector graphics, raster graphics (i.e. bitmaps, etc.), and/or other techniques. 3D or 2D graphics, voxel graphics, vector graphics, raster graphics (i.e. bitmaps, etc.), and/or other graphic techniques may be combined with each other or with other graphic techniques. A 3D interactive object, for example, may be created or generated by using a 3D modeling tool, by converting or vectorizing a bitmap image into 3D or vector graphics, by using a programming language's graphic capabilities, by specialized programs, APIs, or other similar tools, and/or by other techniques. In some aspects, computer or mathematical representation of a 3D interactive object includes shell or boundary representation that may define the surface of the object through polygonal modeling, subdivision surfaces, curve modeling, digital sculpting, level sets, particle systems, and/or other techniques. In other aspects, computer or mathematical representation of a 3D interactive object includes solid representation that may define the volume of an object in addition to its surface. A generated interactive object may be associated with a DBMS element. Generating an interactive object may include creating or generating a scene (i.e. 3D or 2D scene, 3D or 2D space, 3D or 2D environment, 3D or 2D setting, 3D or 2D site, etc.) comprising interactive objects. In some embodiments, a 3D, graphics, simulation, game, or other such engine or tool to may be utilized to implement generation of a scene and/or interactive objects. Such engines or tools typically provide high-level functionalities such as a physics engine, collision detection and response, sound, animation, event detection and handlers, networking, memory management, scene graph, rendering 3D or 2D graphics, scripting/programming capabilities and interfaces, and/or other functionalities. Scripting or programming functionalities may enable defining the mechanics, behavior, interactivity, and/or other properties of interactive objects in a scene at or prior to runtime. Generating interactive objects may include processing each of the previously received DBMS elements and generating a corresponding interactive object. Any of the generated interactive objects may be resized, rotated, or otherwise transformed and positioned anywhere within a scene. Any of the generated interactive objects may also be animated or otherwise transformed over time. Generating includes any action or operation by or for a Site Generator 110 or any of its elements.

At step 9520, the at least one interactive object are associated with the at least one DBMS element based on an association schema. A generated interactive object may be associated with a corresponding DBMS element. In some embodiments, each DBMS element may be looked up in an object association schema (i.e. Object Association Schema 230, etc.) where a corresponding interactive object or reference thereto may be found. Such association may be facilitated by a table comprising DBMS elements or references thereto and corresponding interactive objects or references thereto. In some aspects, the association between an interactive object and a DBMS element may be stored in the interactive object's field, member, attribute, variable, or other such repository for storing information about the interactive object. In other aspects, the association between an interactive object and a DBMS element may be stored in the DBMS element's field, member, attribute, variable, or other such repository for storing information about the DBMS element. In yet other aspects, the association between an interactive object and a DBMS element may be stored in table including specific DBMS elements and corresponding specific generated interactive objects. Associating includes any action or operation by or for a Site Generator 110 or any of its elements.

At step 9525, the at least one interactive object are rendered in a graphical user interface (GUI) through which a user can interact with the at least one interactive object. A scene and/or interactive objects, when provided to a graphics rendering engine or other such system, may enable visual portrayal of the scene and/or interactive objects. For example, a 3D interactive object that exists as a computer or mathematical representation in a computing device may be displayed visually through rendering or other similar process for showing computer generated objects. A computer generated scene and/or interactive objects may be rendered or shown on a display or other visual portrayal device. Rendering interactive objects includes any action or operation by or for a User Interaction Unit 115 or any of its elements.

At step 9530, an user interaction with the at least one interactive object is received, the user interaction including a DBMS instruction for performing an operation on the at least one DBMS element. A scene and/or interactive objects may include interactivity and a user may utilize such interactivity to operate a DBMS. Such interactivity may be implemented via interactions (i.e. Interactions 297, events, etc.) and their corresponding interaction functions (i.e. Interaction Functions 299, etc.). In some aspects, interactions and their corresponding interaction functions may be stored in an interaction association schema (i.e. Interaction Association Schema 240, etc.). An interaction may include an event. In some embodiments, an interaction includes any user related event such as mouse click, button or key press, touchscreen tap, swipe, or drag, and/or other user related events. In other embodiments, an interaction includes any user controllable avatar event such as the avatar's contact or collision with an object, the avatar's detection of an object, the avatar's approaching (i.e. coming into vicinity, etc.) an object, and/or other user controllable avatar events. In yet other embodiments, an interaction includes any object event such as the object's contact or collision with another object, the object's detection of another object, the object's approaching (i.e. coming into vicinity, etc.) another object, and/or other object events. In further embodiments, an interaction includes any computer, operating system, or other system event such as application start event, application close event, system start event, system shut-down event, system clock event, system scheduler event, and/or other computer or system events. An interaction may include any computer event. Interactivity of a scene and/or interactive objects may be implemented via a function, procedure, or routine/sub-routine (i.e. Interaction Function 299, etc.) handling a specific event (i.e. Interaction 297, etc.). In some embodiments, an interaction function includes an event handler for handling a specific interaction (i.e. event, etc.). In some aspects, an event handler may be added to an interactive object or be available as a native built-in feature of an object in some programming languages. In other aspects, an event handler may be created for or added to an application, program, scene, window, screen, template, thread, runtime, or other such application or object comprising other objects (i.e. interactive objects, etc.). An event handler may be activated when an event for which the event handler is designed occurs anywhere in the application or anywhere in an object to which the event handler is attached. In some embodiments, an interaction function includes one or more instructions for animating and/or transforming a scene and/or interactive objects such as portraying a door opening experience, file folder disappearance experience, user controllable avatar's movement experience, and/or other animating and/or transforming. In other embodiments, an interaction function includes instructions for linking or transitioning from one site and/or interactive object to another site and/or interactive object such as portraying a building lobby after entering the building. An interaction function may include instructions for performing any operation needed to affect a transformation or transition appropriate for a particular scene or situation. An interaction function may also include one or more DBMS instructions for performing one or more operations on a DBMS. In one example, a DBMS instruction includes a SELECT, DELETE, INSERT INTO, UPDATE, ALTER TABLE, DROP TABLE, CREATE TABLE, CREATE DATABASE, ALTER DATABASE, DROP DATABASE, and/or other SQL statement. In another example, DBMS instruction includes a function or instruction such as a database connection or close function. Any instruction understood or implementable by any DBMS may be utilized as a DBMS instruction. Receiving user interaction includes any action or operation by or for a User Interaction Unit 115 or any of its elements.

At step 9535, the operation defined by the DBMS instruction is performed. In one example, an operation includes inserting, deleting, or editing data in a table. In another example, an operation includes creating, deleting, or editing a table, a report/view, or a database. In a further example, an operation includes creating, deleting, or editing a user account, a DBMS setting, a relation, and/or other DBMS element. Any other operation enabled by a DBMS may be performed.

At step 9540, the at least one interactive object are re-generated. In some aspects, all interactive objects may be re-generated. In other aspects, re-generating may be optionally omitted or performed on some of the interactive objects or DBMS elements depending on the type of interaction, DBMS operation, and/or system design. In one example, interactive objects associated with updated DBMS elements may be re-generated such as re-generating an interactive object associated with an edited DBMS element. In another example, a new interactive object may be generated for a newly created or inserted DBMS element. Therefore, re-generating of all interactive objects may not be necessary for operations such as, for example, some data access interactions and/or DBMS operations where no DBMS elements have changed. An updated DBMS element includes a DBMS element that has been accessed, viewed, edited, added (i.e. created, inserted, etc.), removed (i.e. deleted, dropped, etc.), or otherwise manipulated. Step 9540 includes any action or operation described in step 9515 as applicable.

At step 9545, the at least one re-generated interactive object are re-associated with the at least one updated DBMS element based on the association schema. In some aspects, all interactive objects may be re-associated. In other aspects, re-associating may be optionally omitted or performed on some of the interactive objects or DBMS elements depending on the type of interaction, DBMS operation, and/or system design. For example, interactive objects associated with updated DBMS elements may be re-associated such as associating a new interactive object with a newly created or inserted DBMS element. Therefore, re-associating of all interactive objects may not be necessary for operations such as, for example, some data access interactions and/or DBMS operations where no DBMS elements have been added or edited. Some deletion interactions and/or DBMS operations, for example, may also not require re-associating interactive objects since deleted interactive objects and their corresponding DBMS elements may be removed without the need for re-associating the remaining interactive objects. Step 9545 includes any action or operation described in step 9520 as applicable.

At step 9550, the at least one re-generated re-associated interactive object are rendered in the GUI. Step 9550 includes any action or operation described in step 9525 as applicable.

At step 9555, steps 9530-9550 are repeated for subsequent user interactions.

Figure 33:
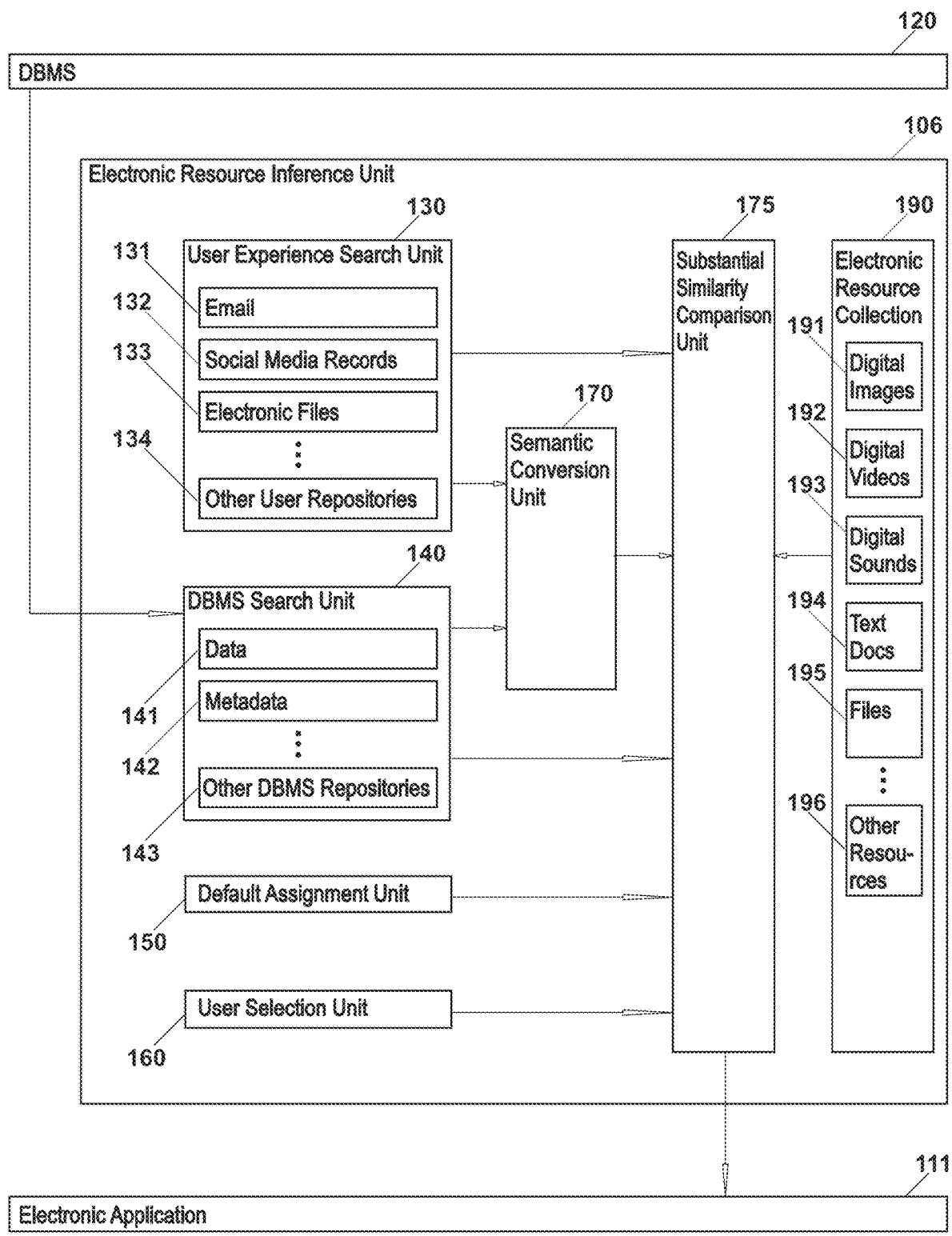
FIG. 33 illustrates an embodiment of Electronic Resource Inference Unit 106.

Referring to FIG. 33, in some aspects, the teaching presented by the disclosure may be implemented to include electronic resource inference functionalities. Shown is an embodiment of Electronic Resource Inference Unit 106. Electronic Resource Inference Unit 106 comprises any hardware, software, or a combination of hardware and software.

Electronic Resource Inference Unit 106 includes the functionality for inferring an electronic resource. An electronic resource comprises an electronic file, an electronic repository, a data structure, an electronic object, a data, or other such electronic resource or reference thereto. Examples of electronic resources include digital images, digital videos, digital sounds, digital text documents (also referred to as text docs), computer files (also referred to as files), and/or other such resources or references thereto. In some embodiments, Electronic Resource Inference Unit 106 includes interconnected User Experience Search Unit 130, DBMS Search Unit 140, Default Assignment Unit 150, User Selection Unit 160, Semantic Conversion Unit 170, Substantial Similarity Comparison Unit 175, and Electronic Resource Collection 190. Other additional elements may be included as needed, or some of the disclosed ones may be excluded, or a combination thereof may be utilized in alternate embodiments. Electronic Resource Inference Unit 106 may operate as a part of AMD Unit 100 to provide inference functionalities as previously described in Site Inference Unit 105. Electronic Resource Inference Unit 106 may also operate as a standalone unit, as a part of a system, or in any other arrangement with other elements or systems with no relation to AMD Unit 100. Electronic Resource Inference Unit 106 includes some or all the features and embodiments of the previously described Site Inference Unit 105. Similar to Site Inference Unit 105 being utilized to infer Site 200, Electronic Resource Inference Unit 106 may be utilized to infer an electronic file, an electronic repository, a data structure, an electronic object, a data, or other such electronic resource. As such, Electronic Resource Collection 190 comprising electronic files, electronic repositories, data structures, electronic objects, data, or other such electronic resources may be utilized instead of Site Collection 180.

Electronic Resource Collection 190 comprises the functionality for storing electronic resources. Electronic Resource Collection 190 includes the functionality for storing, managing, and/or manipulating electronic resources. Electronic Resource Collection 190 comprises one or more databases, tables, objects, data structures, or other data repositories for storing and/or organizing a collection of one or more electronic resources. In some embodiments, Electronic Resource Collection 190 includes Digital Images 191, Digital Videos 192, Digital Sounds 193, Text Docs 194, Files 195, and Other Resources 196. Other additional elements may be included as needed, or some of the disclosed ones may be excluded, or a combination thereof may be utilized in alternate embodiments. An electronic resource may include an identifier (i.e. such as or similar to Site Identifier 210, etc.), descriptor, or other label that can identify or describe the electronic resource. Such identifier, descriptor, or other label may be used for comparison with a reference from any data source.

Electronic Application 111 comprises any software, hardware, or a combination of software and hardware. Electronic Application 111 includes the functionality for utilizing one or more electronic resources. Electronic Application 111 includes the functionality for utilizing one or more electronic resources inferred by Electronic Resource Inference Unit 106. Electronic Application 111 may be or include any application or system.

In one example, Electronic Application 111 such as a movie streaming service may utilize Electronic Resource Inference Unit 106 to personalize user's playing options. For instance, Electronic Resource Inference Unit 106 may traverse or process Email 131, Social Media Records 132, Electronic Files 133, and/or Other User Repositories 134, and find therein frequently occurring references such as "Mel Gibson", "Ben Affleck", and "Al Pacino." Substantial Similarity Comparison Unit 175 may compare these references with movie identifiers (i.e. names of actors starring in the movies, etc.) in Electronic Resource Collection 190 (i.e. collection of movies available for streaming, etc.) and find movies comprising movie identifiers identical or substantially similar to references "Mel Gibson", "Ben Affleck", or "Al Pacino". The inferred movies (i.e. Digital Videos 192, etc.) may then be offered for streaming to a user, for example.

In another example, Electronic Application 111 such as a news or content provider may utilize Electronic Resource Inference Unit 106 to personalize user's article options. For instance, Electronic Resource Inference Unit 106 may traverse or process Email 131, Social Media Records 132, Electronic Files 133, and/or Other User Repositories 134, and find therein frequently occurring references such as "gross domestic product", "GDP", "unemployment rate", "trade deficit", and "federal funds rate." Substantial Similarity Comparison Unit 175 may compare these references with article identifiers (i.e. names of articles, article keywords, etc.) in Electronic Resource Collection 190 (i.e. collection of articles or other information, etc.) and not find a matching article identifier. Semantic Conversion Unit 170 may then be utilized to convert the frequently occurring references such as "gross domestic product", "GDP", "unemployment rate", "trade deficit", "federal funds rate", and/or other such references into semantically indicative reference such as "economics." Substantial Similarity Comparison Unit 175 may compare this converted semantically indicative reference with article identifiers in Electronic Resource Collection 190 (i.e. collection of articles or other information, etc.) and find articles comprising article identifiers identical or substantially similar to reference "economics". The inferred articles (i.e. Text Docs 194, Files 195, Other Resources 196, etc.) or other information may then be listed for user's reading, for example.

In a further example, Electronic Application 111 such as a web store may utilize Electronic Resource Inference Unit 106 to personalize the for sale items displayed to a user. For instance, Electronic Resource Inference Unit 106 may traverse or process Email 131, Social Media Records 132, Electronic Files 133, and/or Other User Repositories 134, and find therein a frequently occurring reference such as "mountain bike." Substantial Similarity Comparison Unit 175 may compare this reference with item identifiers (i.e. item names, item keywords, etc.) in Electronic Resource Collection 190 (i.e. inventory of items for sale, etc.) and find items comprising item identifiers identical or substantially similar to reference "mountain bike". Information on the inferred items for sale may then be displayed to the user, for example. An item may include an object or data structure comprising the information on the item such as a picture of the item, item specifications, textual description, price, and or other information, for example.

In a further example, Electronic Application 111 such as an operating system (i.e. desktop OS, smartphone OS, embedded OS, etc.) may utilize Electronic Resource Inference Unit 106 to personalize a theme for portrayal of graphical elements. For instance, Electronic Resource Inference Unit 106 may traverse or process Email 131, Social Media Records 132, Electronic Files 133, and/or Other User Repositories 134, and find therein frequently occurring references such as "tiger", "elephant", and "giraffe." Substantial Similarity Comparison Unit 175 may compare these references with theme identifiers (i.e. theme names, theme descriptors, etc.) in Electronic Resource Collection 190 (i.e. collection of themes, etc.) and not find a matching theme identifier. Semantic Conversion Unit 170 may then be utilized to convert the frequently occurring references such as "tiger", "elephant", and "giraffe", and/or other such references into semantically indicative reference such as "wild life." Substantial Similarity Comparison Unit 175 may compare this converted semantically indicative reference with theme identifiers in Electronic Resource Collection 190 (i.e. collection of themes, etc.) and find a theme comprising theme identifier identical or substantially similar to reference "wild life". The inferred theme may then be utilized in the operating system for portrayal of graphical elements, for example. A theme may include a data structure, object, or other such repository comprising information on the theme such as images of variously themed graphical elements, sounds accompanying the graphical elements, and or other information, for example.

In yet another example, Electronic Application 111 such as a media player may utilize Electronic Resource Inference Unit 106 to personalize user's media playing experience. For instance, Other User Repositories 134 includes a user's music playlist. Electronic Resource Inference Unit 106 may traverse or process Other User Repositories 134 and find therein a frequently occurring reference to an artist (i.e. name of frequently occurring artist, etc.) such as "Celine Dion." Substantial Similarity Comparison Unit 175 may compare this reference with image identifiers (i.e. image names, image classifiers, etc.) in Electronic Resource Collection 190 (i.e. Yahoo Images, Google Images, Flickr, user's own image collection, etc.) and find an image comprising image identifier identical or substantially similar to reference "Celine Dion". The inferred image of the user's favorite artist may then be displayed in the media player, for example.

User Experience Search Unit 130, DBMS Search Unit 140, and/or any of their elements include some examples of repositories or data sources from which references to electronic resources may be derived. Other additional data sources may be utilized as needed, or some of the disclosed ones may be excluded, or a combination thereof may be utilized in alternate implementations. In some embodiments, frequently occurring or other references may be derived from any data source instead of or in addition to the previously described user repositories (i.e. Email 131, Social Media Records 132, Electronic Files 133, and/or Other User Repositories 134, etc.) and DBMS repositories (i.e. Data 141, Metadata 142, Other DBMS Repositories 143, etc.). In general, Electronic Resource Inference Unit 106 may derive information from any data source to determine an electronic resource indicated by the derived information. In other embodiments, DBMS Search Unit 140 and/or any of its elements may be omitted in implementations where no DBMS is present (i.e. some consumer applications, etc.).

Figure 34:
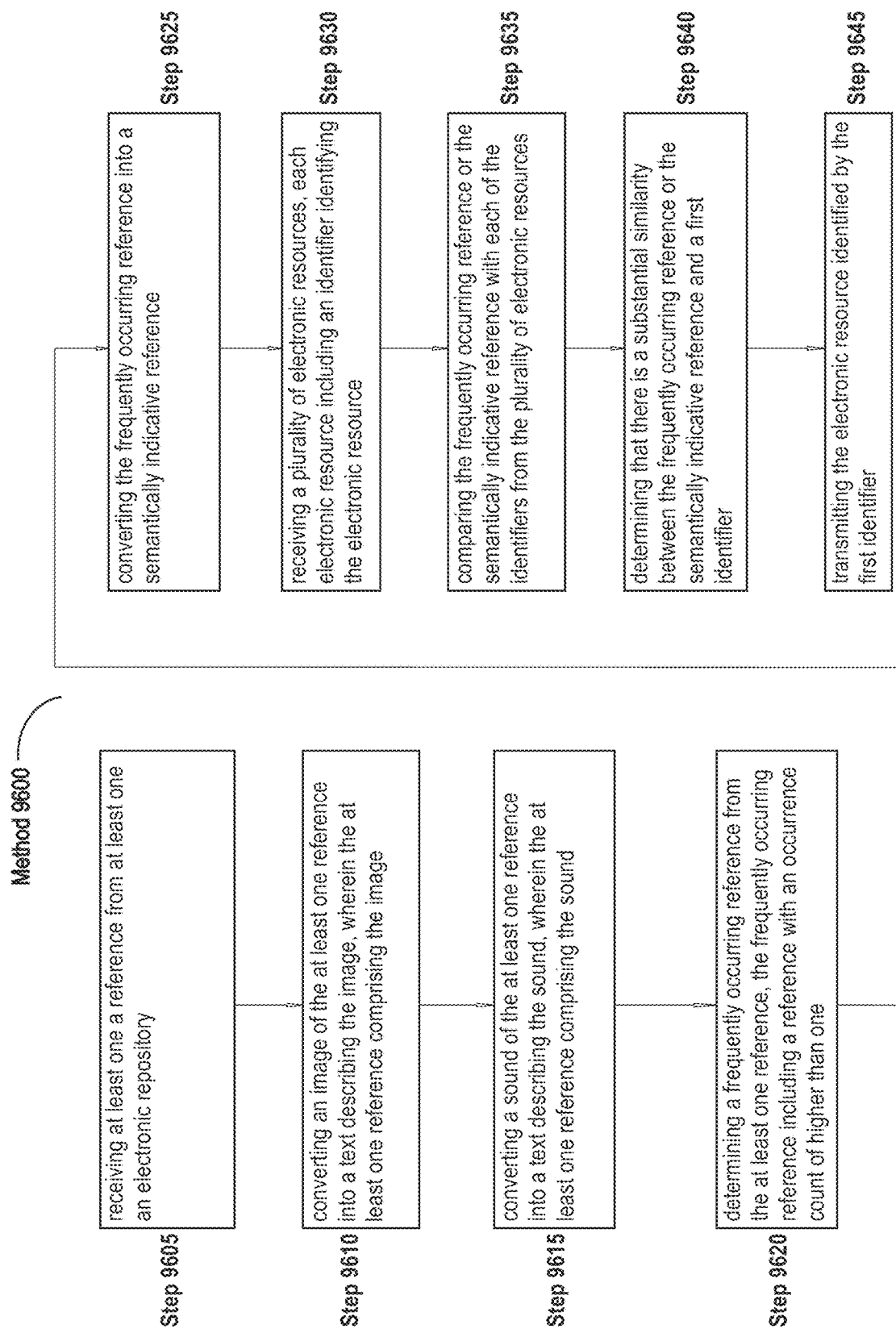
FIG. 34 shows an embodiment of a method 9600 for inferring an electronic resource.

Referring to FIG. 34, the illustration shows an embodiment of a method 9600 for inferring an electronic resource. The method may therefore be used on one or more computing devices to automatically infer an electronic resource to be used by an electronic application. In some embodiments, the method may be used on one or more computing devices operating an interface that may enable automatic inference of an electronic resource to be used by an electronic application.

At step 9605, at least one a reference are received from at least one an electronic repository. A reference includes a reference to any electronic resource such as a site (i.e. Site 200, etc.) and/or an interactive object, an electronic file, an electronic repository, a data structure, an electronic object, a data, or other such electronic resource. Examples of electronic resources include digital images, digital videos, digital sounds, digital text documents (also referred to as text docs), computer files (also referred to as files), and/or other such resources. Examples of a reference include text, image, sound, code, data, and/or portion of electronic repository. Text includes one or more letters, one or more symbols, one or more digits, and/or other characters. Text may also include one or more words, one or more phrases, and/or other collections of characters or symbols. Image includes a raster graphic (i.e. bitmap, etc.), vector graphic, digital video, and/or other image or stream of images. Sound includes any digitally sampled or other electronically processed sound. In some embodiments, an electronic repository includes one or more user electronic repositories such as email (i.e. Email 131, etc.), social media records (i.e. Social Media Records 132, etc.), files (i.e. Electronic Files 133, etc.), and/or other user repositories (i.e. Other User Repositories 134, etc.). User electronic repositories may be stored on user's or other (i.e. remote, etc.) computing device. A user's electronic repository stored on user's computing device may be received or accessed by locating and opening the repository or file. A user electronic repository stored on a remote computing device (i.e. server, etc.) may be received or accessed over a network via a conventional user interface using login and password, via a web interface, via an API, or via other interface. In other embodiments, an electronic repository includes one or more DBMS repositories such as data (i.e. Data 141, etc.), metadata (i.e. Metadata 142, etc.), and/or other DBMS repositories (i.e. Other DBMS Repositories 143, etc.). DBMS repositories may be stored in a DBMS (i.e. DBMS 120, etc.). A DBMS repository may be received via any of the previously described connections or interfaces such as ODBC/JDBC API 410, ODBC/JDBC Bridge 420, Native ODBC/JDBC Driver 430, and/or other connections or interfaces. In further embodiments, an electronic repository includes a repository (i.e. repository in Default Assignment Unit 150, etc.) comprising a default reference. A default reference may be assigned by a user, system administrator, or other person or system. In yet other embodiments, an electronic repository includes a repository comprising a user selected reference. A user selected reference may be selected by a user via a means such as graphical user interface (GUI) configured to ask or enable user to select a reference of user's choice. User selection of a reference includes any action or operation by or for a User Selection Unit 160 or any of its elements. In general, an electronic repository includes any disclosed or other data source. The system may be configured to utilize one or more references from user electronic repositories (i.e. user experience, etc.) first, DBMS repositories second as needed, default reference repository third as needed, and user selected reference repository last as needed, etc. Any other order or prioritization may be implemented.

At step 9610, an image of the at least one reference is converted into a text describing the image, wherein the at least one reference comprising the image. In some aspects, this step may be omitted if there are no references comprising an image or if method 9600 is applied on electronic repositories comprising no images. Any reference comprising an image may have the image converted into a text by an image recognition or interpretation process (i.e. Image Recognizer 490, etc.). As such, an image reference may be converted into a textual reference. Such text may include information encoded in the image or information describing the image. Such text may then be utilized for text comparisons later in the process. Image recognition may be implemented through processing visual data into textual or other type of data. Image recognition may enable any electronic repository or file containing visual data to be processed into one or more references that may later be used to find a corresponding electronic resource. Image recognition may generally identify or recognize objects or persons from an image or video frame (or portions thereof) by comparing regions of pixels from the image or video frame with regions of pixels from a database of known images. In some embodiments, optical character recognition (OCR) techniques and/or tools may be utilized for recognizing textual information encoded or included in digital images. For example, OCR techniques and/or tools may involve conversion of digital images comprising typewritten or printed textual data into computer-encoded text that can be edited, stored, compared, or otherwise manipulated. In other embodiments, facial recognition techniques and/or tools may be utilized for recognizing faces in digital pictures. For example, facial recognition techniques and/or tools may involve identifying and/or analyzing facial features such as the relative position, size, and/or shape of the eyes, nose, cheekbones, jaw, etc., which may then be used to search for images with matching features. In further embodiments, object recognition techniques and/or tools may be utilized for recognizing objects (i.e. objects or people, etc.) in digital pictures. For example, object recognition techniques and/or tools may involve identifying and/or analyzing object features such as lines, edges, ridge, corners or blobs, regions, and/or their relative positions, etc., which may then be used to search for images with matching features. In some aspects, references comprising images may be converted into text in a later method step or as needed. Image recognition includes any action or operation by or for an Image Recognizer 490 or any of its elements.

At step 9615, a sound of the at least one reference is converted into a text describing the sound, wherein the at least one reference comprising the sound. In some aspects, this step may be omitted if no references comprise a sound or if method 9600 is applied on electronic repositories that contain no sounds. Any reference including a sound may have the sound converted into a text by a sound recognition or interpretation process (i.e. Speech/Sound Recognizer, etc.). As such, a sound reference may be converted into a textual reference. Such text may include information encoded in the sound or information describing the sound. Such text may then be utilized for text comparisons later in the process. Sound recognition may be implemented through processing audio data into textual or other type of data. Sound recognition may enable any electronic repository or file containing audio data to be processed into one or more references that may later be used to find a corresponding electronic resource. Sound recognition may generally identify or recognize speech or sound from an audio file by comparing sample values of digitally sampled sound (or portions thereof) from the audio file with sample values of digitally sampled sound from a database of known sounds. In some embodiments, sound recognition may be implemented by utilizing the operating system's speech/sound recognition functionalities such as iOS's Voice Services, Siri, etc. In other embodiments, sound recognition may be implemented by utilizing a programming language's or platform's API such as Java Speech API (JSAPI) implementation such as The Cloud Garden, Sphinx, etc. In further embodiments, sound recognition may be implemented by utilizing applications or engines providing speech/sound recognition functionalities such as OpenEars, Dragon Mobile, iSpeech, CeedVocal, Flite, Julius, etc. In some aspects, sound recognition includes keyword spotting or full speech recognition depending on resource availability. Keyword spotting may attempt to find only a select group of words and/or phrases whereas full speech recognition may attempt to find all words and/or phrases. In some aspects, references comprising sounds may be converted into text in a later method step or as needed. Sound recognition includes any action or operation by or for a Speech/Sound Recognizer 480 or any of its elements.

At step 9620, a frequently occurring reference is determined from the at least one reference, the frequently occurring reference including a reference with an occurrence count of higher than one. In some embodiments, one or more references with a count of more than zero, one, two, four, six, ten, twenty, hundred, thousand, or any other threshold number may be utilized as frequently occurring references. In other embodiments, one or more references with high or highest number of occurrences may be utilized as frequently occurring references. Determination of the frequently occurring reference may be implemented by utilizing any known or custom traversing technique or counter. A simple traversing technique includes processing one word or phrase at a time from the beginning of a text document to the end. Other techniques include recursively splitting a text document and processing one word or phrase at a time from the resulting halves. More complex techniques include a combination of recursive, parallel processing, and/or other techniques. In one example, each word in one or more text documents may be counted as a reference. In another example, each two-word, three-word, four-word, etc. phrase in one or more text documents may be counted as a reference. In some aspects, the counting may be expressed in a frequency distribution table wherein one column comprises references and a second column comprises the count or number of occurrences of the corresponding reference. The frequency distribution table may be rearranged, resorted, or modified based on the type of references, source of references, system settings, user preferences, and/or other inputs, parameters, or considerations. For example, more importance or weight in a frequency distribution table may be given to references found in metadata as metadata is typically descriptive of or summarizes the data it refers to and therefore may provide higher value as a reference. In other aspects, any data structure, system, or technique instead of or in addition to the frequency distribution table may be used herein for organizing, expressing, or deriving a frequently occurring or other reference. A tree, for example, comprises hierarchically organized references, whereas, a graph, for example, comprises variously linked references. In yet other aspects, references from a an external pre-made list of references may be searched in user's or other electronic repositories to find one or more references for further consideration that may not be frequently occurring references, in which case frequency distribution table or other data structure, system, or technique for organizing, expressing, or deriving frequently occurring references may be omitted. Such pre-made list of references may be defined based on the type or context of DBMS, experience, testing, inquiry, analysis, synthesis, or other techniques. Determining includes any action or operation by or for a User Experience Search Unit 130, DBMS Search Unit 140, a reference processing unit, or any of their elements.

At step 9625, the frequently occurring reference is converted into a semantically indicative reference. In some embodiments, performance of step 9625 may be contingent upon the outcome of step 9640. In such embodiments, step 9625 may be skipped until the outcome of step 9640 is known. For example, step 9625 may be performed if substantial similarity comparison determination of step 9640 finds no match between the frequently occurring reference and an electronic resource identifier. Otherwise, step 9625 may be omitted if substantial similarity comparison determination of step 9640 finds a match between the frequently occurring reference and an electronic resource identifier. Semantic conversion may be facilitated by utilizing a collection of references each associated with its corresponding semantically indicative reference. In some aspects, semantic conversion includes a table with one column comprising references (i.e. References 171, etc.) and another column comprising the corresponding semantically indicative references (i.e. Semantically Indicative References 172, etc.). Semantically indicative reference may be utilized in later comparisons increasing the likelihood of finding a match. Converting includes any action or operation by or for a Semantic Conversion Unit 170 or any of its elements.

At step 9630, a plurality of electronic resources is received, each electronic resource including an identifier identifying the electronic resource. A plurality of electronic resources (i.e. Electronic Resource Collection 190, Site Collection 180, etc.) includes one or more electronic resources such as electronic files, electronic repositories, data structures, electronic objects, data, and/or other such electronic resources or references thereto. Examples of electronic resources include sites (i.e. Sites 200, etc.) and/or interactive objects, digital images (i.e. Digital Images 191, etc.), digital videos (i.e. Digital Videos 192, etc.), digital sounds (i.e. Digital Sounds 193, etc.), digital text documents (i.e. Text Docs 194, etc.), computer files (i.e. Files 195, etc.), and/or other such resources (i.e. Other Resources 196, etc.). A collection of electronic resources may include one or more databases, tables, objects, data structures, or other data repositories for storing and/or organizing a collection of one or more electronic resources. An electronic resource stored in a collection of electronic resources may include an identifier (i.e. electronic resource identifier, Site Identifier 210, etc.), descriptor, or other label that may identify or describe the electronic resource. Such identifier, descriptor, or other label may include textual information, visual information (i.e. image, video, etc.), sound, pointer, reference, and/or other information. For example, an identifier including a text "Empire State Building" may identify or describe a site, an interactive object, an image, a file, or other electronic resource comprising information on the tallest building in New York City.

At step 9635, the frequently occurring reference or the semantically indicative reference is compared with each of the identifiers from the plurality of electronic resources. Comparing may be implemented using a substantial similarity comparison (i.e. Substantial Similarity Comparison Unit 175, etc.) to compare or match a reference (i.e. frequently occurring reference or semantically indicative reference, etc.) with identifiers (i.e. electronic resource identifiers, Site Identifiers 210, etc.) from the plurality of electronic resources (i.e. Electronic Resource Collection 190, Site Collection 180, etc.). Substantial similarity comparison may compare or match text, images, sounds, and/or other data. Substantial similarity comparison may include comparison strictness rules, logic, or functions for determining the strictness criteria for finding a substantially similar match. Substantial similarity comparison may therefore include the functionality for setting and resetting the strictness rules, thereby fine tuning substantial similarity comparison so that the rules for finding the match are not too strict nor too lenient. Appropriately strict rules for substantial similarity may be defined based on the type or context of data, experience, testing, inquiry, analysis, synthesis, or other techniques. As such, the strictness rules of the substantial similarity comparison may be set by user, system administrator, or automatically. For example, a total equivalence may be found by the substantial similarity comparison when all of the words of an identifier match all of the words of the compared reference. When a total equivalence match is not found, some of the words may be omitted from the comparison and substantial similarity may be achieved when most of the words of an identifier match most of the words of the compared reference. Depending on design, various levels of strictness may be utilized. In some embodiments, the strictness rules or levels may be relaxed in response to determining that no total equivalence match had been found. In one example, the strictness rules may be set to look for a total equivalence with respect to front-most (i.e. first, second, etc.) words only, thereby tolerating mismatches in later (i.e. third, fourth, etc.) words. In another example, the strictness rules may allow for matching all but one, two, three, or more of the words. All of the aforementioned settings of strictness may be set or reset in response to another strictness level determination. In some embodiments, two thresholds may be utilized, an upper and lower threshold, to define the strictness of the rules used for determining a substantially similar match. The upper threshold may correspond to the number of substantially similar matches that may be too high to consider. Alternatively, the lower threshold may correspond to the strictness level that may result in too few results to consider. Any combination of the aforementioned adjustments may be made and the adjustments may keep being made to achieve that the number of substantially similar matches falls between the upper and lower thresholds. In some aspects where more than one substantially similar match is found, the system may present user with the matches for user selection or the system may automatically select a match. All operations, rules, logic, and/or functions including words similarly apply to any portion of a word such as a character, digit, symbol, and/or other portion of a word. Comparing includes any action or operation by or for a Substantial Similarity Comparison Unit 175 or any of its elements.

At step 9640, a determination is made that there is a substantial similarity between the frequently occurring reference or the semantically indicative reference and a first identifier. In some embodiments, a perfect match may be determined. In other embodiments, a determination may be made that while a perfect match is not found, a substantially similar match has been found. Substantial similarity comparison may therefore determine an identifier (i.e. electronic resource identifier, Site Identifier 210, etc.) such as the first identifier from a plurality of electronic resources (i.e. Electronic Resource Collection 190, Site Collection 180, etc.) that is most like a reference such as the frequently occurring reference or the semantically indicative reference, even if the identifier may be different from the compared reference. Determining includes any action or operation by or for a Substantial Similarity Comparison Unit 175 or any of its elements.

At step 9645, the electronic resource identified by the first identifier is transmitted. An electronic resource may be transmitted to an application (i.e. Electronic Application 111, etc.) or system that can utilize the electronic resource. The transmission may be facilitated via any type of connection, interface, or other element. In one example, an inferred site (i.e. Site 200, etc.) and/or interactive object may be transmitted to a generator (i.e. Site Generator 110, etc.) to generate the site and/or interactive objects therein. In another example, one or more inferred movies (i.e. Digital Videos 192, etc.) may be transmitted to a movie streaming service to offer the movies for streaming. In another example, one or more inferred articles or other information (i.e. Text Docs 194, Digital Images 191, Digital Videos 192, Digital Sounds 193, Files 195, Other Resources 196, etc.) may be transmitted to a news or content provider to offer the articles or other information for reading or viewing. In a further example, one or more inferred items (i.e. Files 195, Other Resources 196, etc.) may be transmitted to a web store to offer the items for sale. In a further example, one or more inferred themes (i.e. Files 195, Other Resources 196, etc.) may be transmitted to an operating system to personalize portrayal of graphical elements. In a further example, one or more inferred images (i.e. Digital Images 191, etc.) may be transmitted to a media player to show the images to a user. An electronic resource may be transmitted to any of the disclosed or other elements to implement the functionalities described herein.

Figure 35:
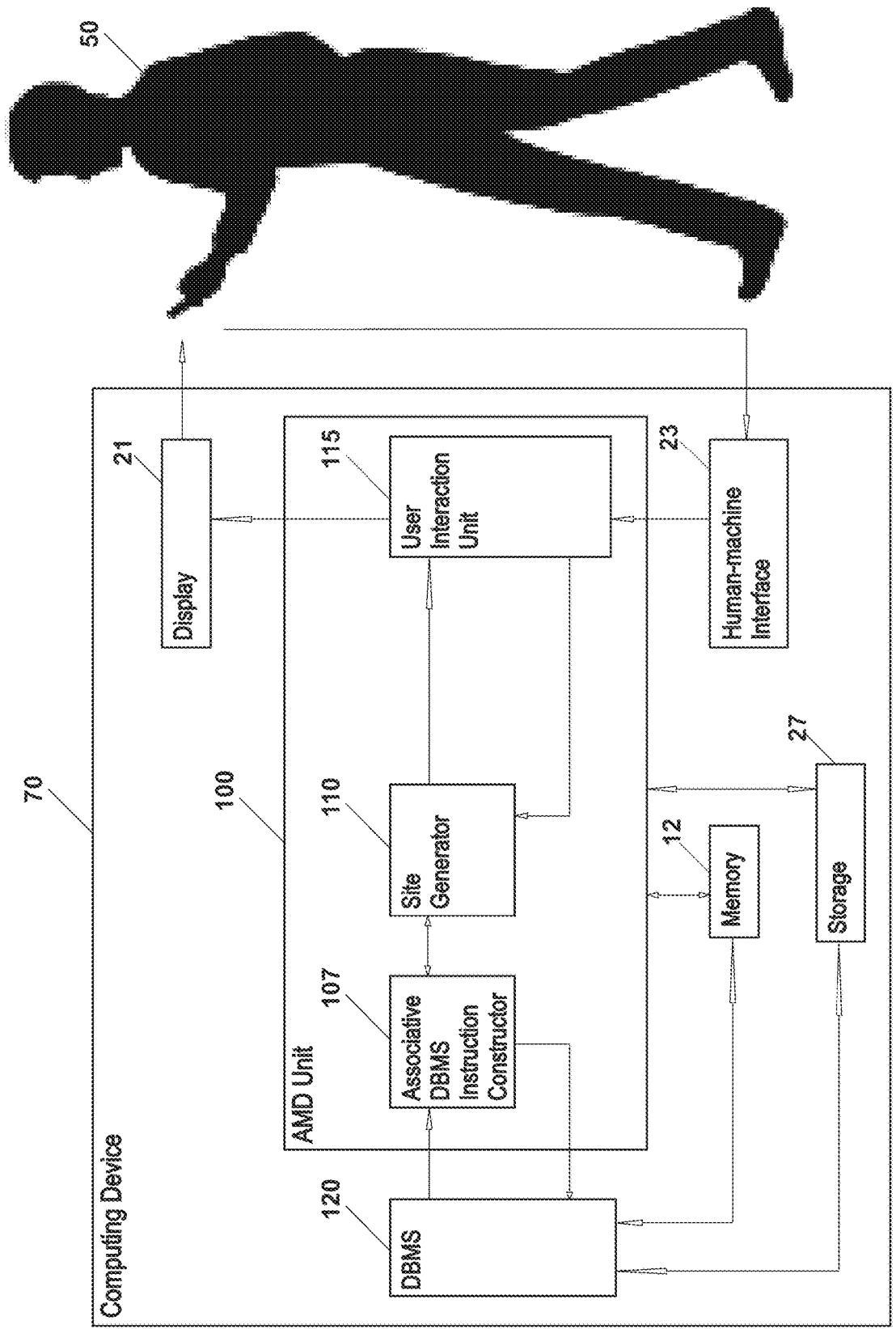
FIG. 35 illustrates an embodiment of AMD Unit 100 comprising Associative DBMS Instruction Constructor 107.

Referring to FIG. 35, in some aspects, the teaching presented by the disclosure may be implemented to include associative constructing of DBMS instructions. As such, AMD Unit 100 may enable a user to create a DBMS instruction by interacting with a site and/or objects (i.e. Interactive Objects 295, etc.) therein from user's experience or with which user can relate. Each object may be associated with a DBMS instruction portion to facilitate the construction of the DBMS instruction. Therefore, user may utilize objects associated with DBMS instruction portions to input a DBMS instruction portion by portion until user completes inputting the entire DBMS instruction or until the DBMS instruction can be determined.

DBMS instruction comprises a structured query language (SQL) statement, any DBMS command, any computer command, or any instruction or instruction set used to access, manage, and/or manipulate data and/or other elements of DBMS 120. DBMS instruction may be issued in SQL, a language utilized by many standard DBMSs, or in any programming language or code understood by DBMS 120. A DBMS instruction may comprise a number of commands, keywords, instructions, operators, variables, values, objects, functions, and/or other components or portions for performing a particular operation on DBMS 120.

As shown for example in FIG. 35, an embodiment of AMD Unit 100 comprising Associative DBMS Instruction Constructor 107 is illustrated. AMD Unit 100 comprises interconnected Associative DBMS Instruction Constructor 107, Site Generator 110, and User Interaction Unit 115. Elements such as Site 200 (not shown) or Site Inference Unit 105 (not shown) or any of their components may also be included to provide their specific functionalities as previously described. AMD Unit 100 may be connected to DBMS 120, Display 21, Human-machine Interface (HMI) 23, Memory 12, and Storage 27. Other additional elements may be included as needed, or some of the disclosed ones may be excluded, or a combination thereof may be utilized in alternate embodiments.

Figure 36:
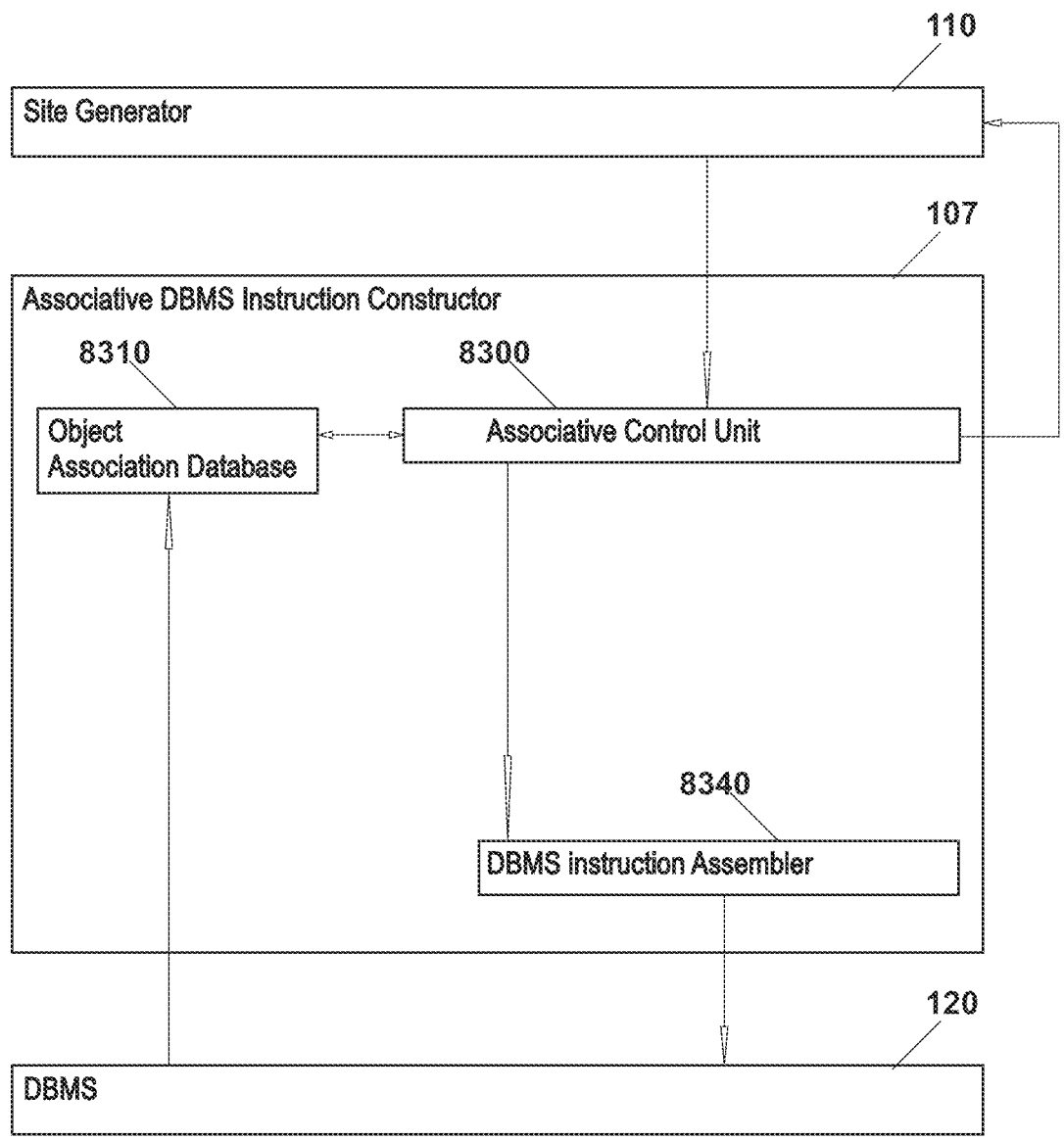
FIG. 36 illustrates an embodiment of Associative DBMS Instruction Constructor 107.

Referring to FIG. 36, Associative DBMS Instruction Constructor 107 comprises any hardware, software, and/or a combination of hardware and software. Associative DBMS Instruction Constructor 107 comprises the functionality for constructing a DBMS instruction. Associative DBMS Instruction Constructor 107 comprises the functionality for constructing a DBMS instruction by associating Interactive Objects 295 with DBMS Instruction Portions 8420 (shown in later figures) of the DBMS instruction. Associative DBMS Instruction Constructor 107 comprises the functionality for constructing a DBMS instruction by associating Interactive Object 295 with DBMS Instruction Portions 8420 of the DBMS instruction based on Level 8430 (shown in later figures) in the constructing process. Associative DBMS Instruction Constructor 107 may be, directly or operatively, connected with Site Generator 110, DBMS 120, and/or other elements to facilitate the overall system operation and implement the functionalities described herein.

Associative DBMS Instruction Constructor 107 comprises Associative Control Unit 8300, Object Association Database 8310, and DBMS Instruction Assembler 8340. Other additional elements may be included as needed, or some of the disclosed ones may be excluded, or a combination thereof may be utilized in alternate embodiments.

Figure 37:
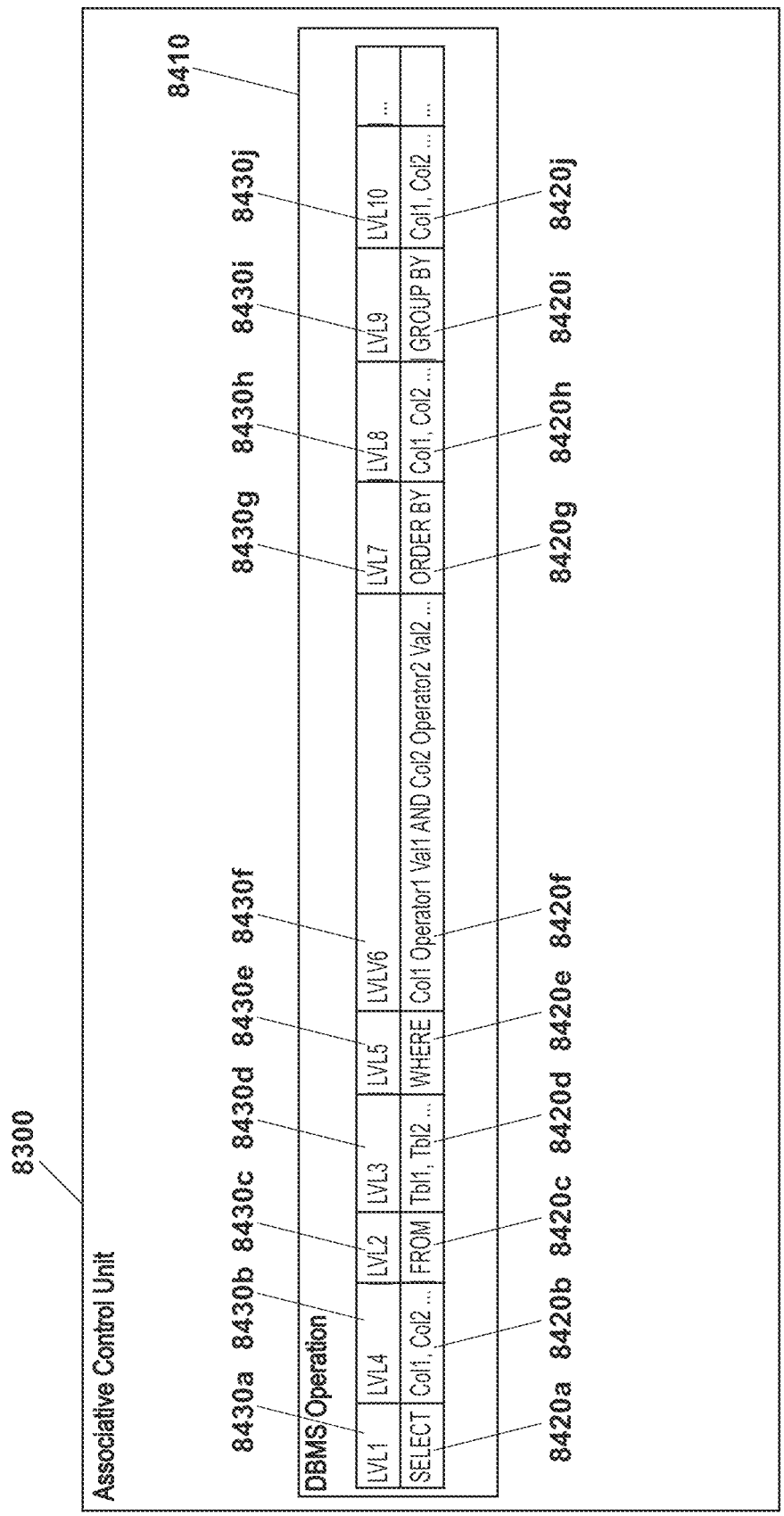
FIG. 37 illustrates an embodiment of Associative Control Unit 8300.

Referring to FIG. 37, Associative Control Unit 8300 comprises the functionality for controlling a DBMS instruction construction process. In some embodiments, Associative Control Unit 8300 may utilize a data structure such as DBMS Operation 8410. DBMS Operation 8410 may comprise any data structure or repository for storing DBMS Instruction Portions 8420 such as DBMS Instruction Portions 8420a-j, etc. and/or Levels 8430 such as Levels 8430a-j, etc. DBMS Instruction Portion 8420 includes any portion of a DBMS instruction such as a command, a keyword (i.e. "SELECT", "FROM", "INSERT", etc.), an instruction, an operator (i.e. =, <, >, etc.), a variable, a value, an object (i.e. table, database, report/view, etc.), a function (i.e. FIRST( ) MIN( ) MAX( ) etc.), and/or other component or portion. Level 8430 may be utilized to keep track of where the system is in a DBMS instruction construction process. For example, Level 8430 may be utilized to keep track of DBMS Instruction Portion 8420 up to which a DBMS instruction is constructed.

In some embodiments and as general overview, at each Level 8430, Associative Control Unit 8300 may receive from Object Association Database 8310 an Association Table 8500 (later described) appropriate for the Level 8430 being implemented. Associative Control Unit 8300 may provide the obtained Association Table 8500 to Site Generator 110 for generating Interactive Objects 295 associated with appropriate DBMS Instruction Portions 8420. Site 200 or any of its elements such as Interactive Object Definitions 220, Interaction Association Schema 240, etc. may be provided to facilitate Interactive Object 295 generation as previously described. Interactive Objects 295 may be displayed in a GUI by User Interaction Unit 115 as previously described. User 50 may interact with Interactive Objects 295 such as clicking, selecting, dragging, moving, sliding, and/or performing other interactions. Associative Control Unit 8300 may receive a selected Interactive Object 295 from Site Generator 110 and derive a DBMS Instruction Portion 8420 associated with the selected Interactive Object 295. Associative Control Unit 8300 may then store the DBMS Instruction Portion 8420 into DBMS Operation 8410 and move on to implement a subsequent Level 8430 in the DBMS instruction construction process. When all needed DBMS Instruction Portions 8420 at their respective Levels 8430 are known, Associative Control Unit 8300 may transmit the completed DBMS Operation 8410 to DBMS Instruction Assembler 8340 for assembling a DBMS instruction for execution.

As shown for example in FIG. 37, at the initiation of Associative DBMS Instruction Constructor 107, User 50 may be offered a selection of Interactive Objects 295 each associated with a DBMS Instruction Portion 8420 from LVL1 Association Table 8500*a* (shown in later figures). The Interactive Objects 295 may be generated by Site Generator 110 and displayed in a graphical user interface (GUI) by User Interaction Unit 115 as previously described. User 50 may select (i.e. click on, etc.) an Interactive Object 295 associated with "SELECT" DBMS Instruction Portion 8420*a* from LVL1 Association Table 8500*a*. "SELECT" DBMS Instruction Portion 8420*a* may indicate the type of DBMS instruction as a SELECT type SQL statement and "SELECT" DBMS Instruction Portion 8420*a* may be stored in a data field of DBMS Operation 8410 coupled with LVL1 Level 8430*a*. The next DBMS Instruction Portion 8420*c* that may be at LVL2 Level 8430*c* is "FROM" keyword that has only one association for the SELECT type SQL statement and no User 50 selection may be needed. The next selection of Interactive Objects 295 the User 50 is offered may be at LVL3 Level 8430*d* to choose from "Tbl1, Tbl2 . . . " representing a collection of tables from which to obtain data. The next selection of Interactive Objects 295 the User 50 is offered may be at LVL4 Level 8430*b* to choose from "Col1, Col2 . . . " representing a collection of columns to be selected. The next selection of Interactive Objects 295 the User 50 is offered may be at LVL5 Level 8430*e* to choose from a collection of "WHERE", "ORDER BY", or "GROUP BY" keywords. In the case of Interactive Object 295 associated with the "WHERE" DBMS Instruction Portion 8420*e* being selected by User 50 at LVL5 Level 8430*e*, the next selection of Interactive Objects 295 the User 50 is offered may be at LVL6 Level 8430*f* to choose from a collection of "Col1 Operator1 Val1 AND Col2 Operator2 Val2 . . . " representing columns, operators, and values used in restricting output results. Since "Col1 Operator1 Val1 AND Col2 Operator2 Val2 . . . " DBMS Instruction Portion 8420*f* comprises more than one command, keyword, instruction, operator, variable, value, object, function, and/or other sub-portion, sub-selections may be offered for each of the sub-portions. The next selection of Interactive Objects 295 the User 50 is offered may be at LVL7 Level 8430*g* to choose from a collection of "WHERE", "ORDER BY", or "GROUP BY" keywords. In the case of Interactive Object 295 associated with the "ORDER BY" DBMS Instruction Portion 8420*g* being selected by User 50 at LVL7 Level 8430*g*, the next selection of Interactive Objects 295 the User 50 is offered may be at LVL8 Level 8430*h* to choose from a collection of "Col1, Col2 . . . " representing columns by which to sort the resulting data set. The next selection of Interactive Objects 295 the User 50 is offered may be at LVL9 Level 8430*i* to choose from a collection of "WHERE", "ORDER BY", or "GROUP BY" keywords. In the case of Interactive Object 295 associated with the "GROUP BY" DBMS Instruction Portion 8420*i* being selected by User 50 at LVL9 Level 8430*i*, the next selection of Interactive Objects 295 the User 50 is offered may be at LVL10 Level 8430*j* to choose from a collection of "Col1, Col2 . . . " representing columns by which to group the resulting data set. Other DBMS Instruction Portions 8420 not shown may be utilized in alternate examples or embodiments such as functions including MIN( ) MAX( ) SUMO, FIRST( ) LAST( ) etc.; operators including OR, LESS THAN, GREATER THAN, etc.; objects including databases, relations, user accounts, privileges, etc.; and/or other DBMS Instruction Portions 8420.

In some aspects, Levels 8430 may be utilized to rearrange the inherent SQL order of constructing DBMS instructions (i.e. SQL statements, etc.). The rearranged order may be an order in which User 50 (i.e. non-technical user, etc.) may think of constructing a DBMS instruction. This option to rearrange the order is available where rearrangement is appropriate or where User 50 chooses it. Therefore, as shown for example in FIG. 37, after the "SELECT" keyword at LVL1 Level 8430*a*, the "FROM" keyword is used at LVL2 Level 8430*c*, the "Tbl1, Tbl2 . . . " selection is implemented at LVL3 Level 8430*d*, the "Col1, Col2 . . . " selection is implemented at LVL4 Level 8430*b*, and so forth. This user friendly order of constructing a DBMS instruction may be preferred by User 50 because it allows User 50 to first select a table from a list of tables within a database and then select column(s) from a list of columns within the selected table. Conversely, the inherent SQL syntax such as for example "SELECT Col1, Col2 . . . FROM Tbl1, Tbl2 . . . " assumes (often wrongly) that the user knows which columns exist in a table. Any DBMS Instruction Portions 8420 may be rearranged using Levels 8430 and any order of rearrangement may be implemented.

Figure 38:
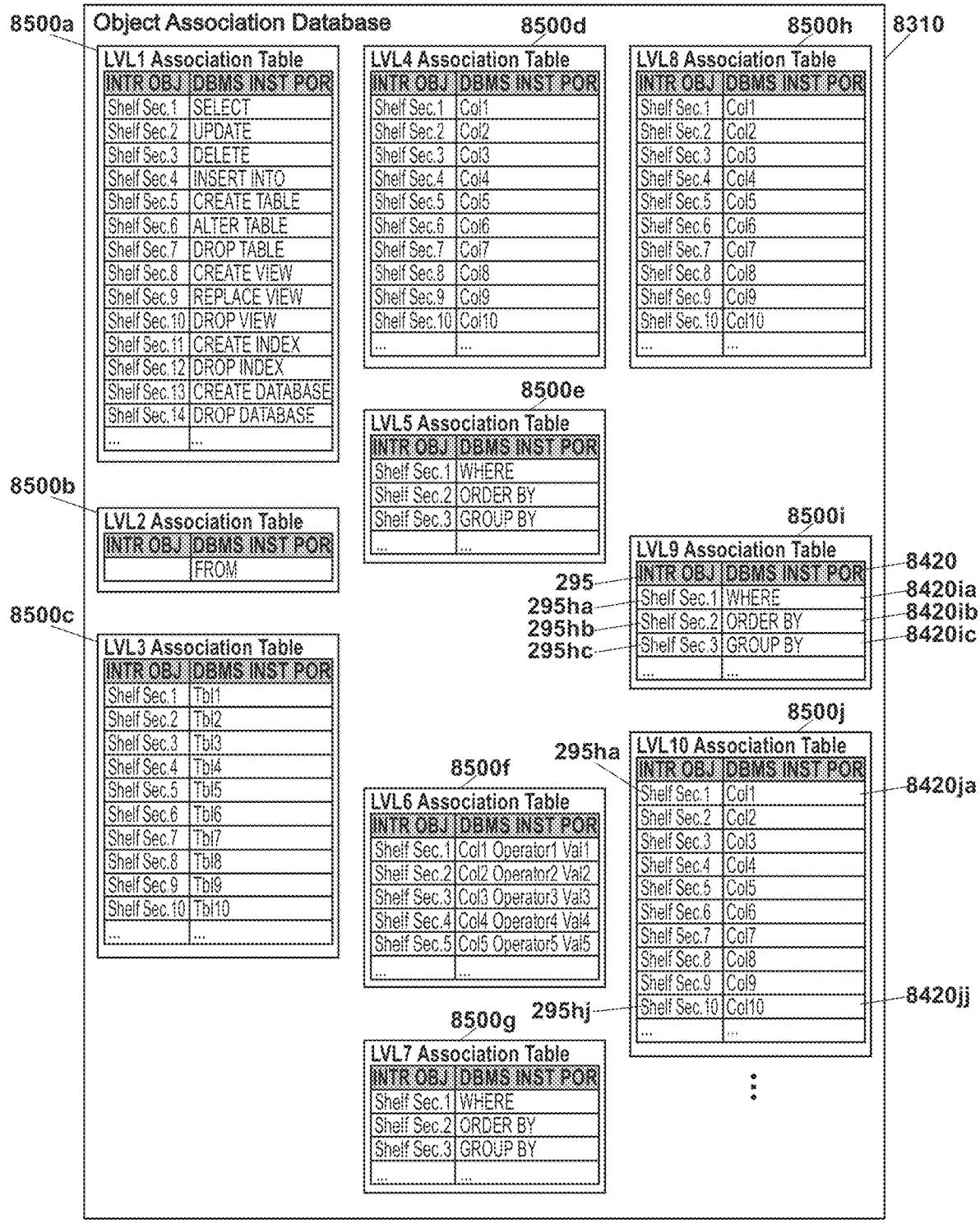
FIG. 38 illustrates an embodiment of Object Association Database 8310.

Referring to FIG. 38, Object Association Database 8310 comprises the functionality for storing associations between Interactive Objects 295 (i.e. INTR OBJ) and DBMS Instruction Portions 8420 (i.e. DBMS INST POR). In some embodiments, the associations between Interactive Objects 295 and DBMS Instruction Portions 8420 may be stored in one or more Association Tables 8500 such as Association Tables 8500*a-j*, etc. An Association Table 8500 may include a column for Interactive Objects 295 (or references thereto) and a column for the corresponding DBMS Instruction Portions 8420 (or references thereto). Each Association Table 8500 may correspond to a Level 8430 in a DBMS instruction construction process. An Association Table 8500 may be implemented in any table, linked arrays, linked queues, a hash table, a collection, or any data structure that can store associated elements. In some aspects, the associations between Interactive Objects 295 and DBMS Instruction Portions 8420 may be stored in a single Association Table 8500 where an additional column may identify the Level 8430 for each association. Object Association Database 8310 may receive elements of DBMS 120 such as names of databases, names of tables and reports/views within each database, names of columns within each table, and/or other elements. Association Tables 8500 may then be pre-defined for every possible operation on each of the elements or objects of DBMS 120. If pre-defined, Association Tables 8500 may change as the elements or objects of DBMS 120 change. For example, if the name of a database in DBMS 120 changes, Association Tables 8500 related to this database may change to reflect the changed database name. Alternatively, Association Tables 8500 may be created on-fly or as needed in anticipation of the upcoming DBMS Instruction Portion 8420 that User 50 may wish to enter.

DBMS Instruction Assembler 8340 comprises the functionality for assembling a DBMS instruction. DBMS Instruction Assembler 8340 comprises the functionality for assembling a DBMS instruction from DBMS Instruction Portions 8420. DBMS Instruction Assembler 8340 comprises the functionality for assembling a DBMS instruction from DBMS Instruction Portions 8420 stored in DBMS Operation 8410. In one example, when all needed DBMS Instruction Portions 8420 are known, as tracked by Associative Control Unit 8300, a complete DBMS Operation 8410 may be sent to DBMS Instruction Assembler 8340 for assembling of DBMS instruction for execution. In some embodiments, as User 50 is inputting the required DBMS Instruction Portions 8420, Associative Control Unit 8300 may append the incoming DBMS Instruction Portions 8420 as strings of characters to arrive at a complete DBMS instruction without using DBMS Operation 8410 as an intermediary data structure. In such configurations with omitted DBMS Operation 8410, DBMS Instruction Assembler's 8340 functionality may also be omitted or partially utilized.

Figure 39:
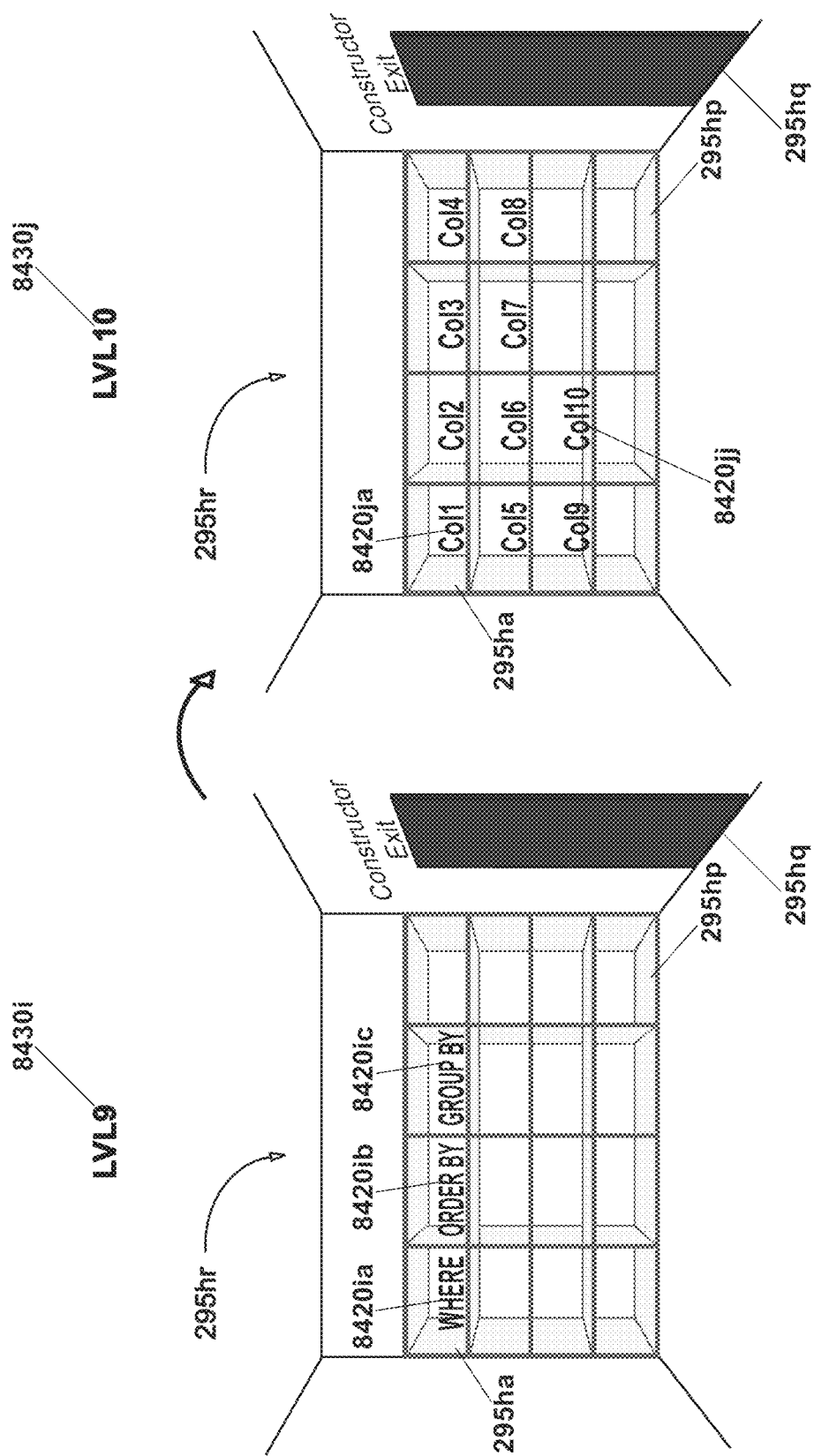
FIG. 39 illustrates an example of a transition from one Level 8430 to another Level 8430.

Referring FIG. 39, an example of a transition from one Level 8430 to another Level 8430 is illustrated. At LVL9 Level 8430*i*, shelf section (i.e. shelf sec.) Interactive Objects 295*ha-hp* may be generated by Site Generator 110 and displayed to User 50. Site 200 or any of its elements such as Interactive Object Definitions 220, Interaction Association Schema 240, etc. may be provided to facilitate Interactive Object 295 generation as previously described. For example, Interactive Object Definitions 220 may provide information on shelf section Interactive Objects' 295*ha-hp* shape, color, and/or other properties. Shelf section Interactive Objects 295*ha-hp* may be within a room Interactive Object 295 hr. A door Interactive Object 295*q* may be generated as a means for User 50 to enter and/or exit Associative DBMS Instruction Constructor 107. Shelf section Interactive Objects 295*ha-hc* may be associated with "WHERE", "ORDER BY", and "GROUP BY" DBMS Instruction Portions 8420*ia-ic* respectively using LVL9 Association Table 8500*i*. The remaining shelf section Interactive Objects 295*hd-hp* may be unassociated, for example. DBMS Instruction Portions 8420*ia-ic* may be shown as labels in their respective shelf sections to aid User's 50 selection. User 50 may select shelf section 295*hc* associated with "GROUP BY" DBMS Instruction Portion 8420*ic*, for example. Associative Control Unit 8300 may store the inputted "GROUP BY" DBMS Instruction Portion 8420*ic* into DBMS Operation 8410 at LVL9 Level 8430*i*. Associative Control Unit 8300 may then receive LVL10 Association Table 8500*j* from Object Association Database 8310. Site Generator 110 may regenerate shelf section Interactive Objects 295*ha-hp* and/or other Interactive Objects 295 as needed. Some of the shelf section Interactive Objects 295*ha-hp* may be re-associated with "Col1", "Col2", . . . "Col10", etc. DBMS Instruction Portions 8420*ja-jj*, etc. using LVL10 Association Table 8500*j* as shown. DBMS Instruction Portions 8420*ja-jj* may be shown as labels in their respective shelf sections to aid User's 50 selection. Any other Interactive Objects 295 such as file cabinets, drawers, file folders, doors, windows, characters, cars, planets, and/or others may be utilized instead of or in addition to shelf sections to represent DBMS Instruction Portions 8420. Also, different Interactive Objects 295 may be used at different Levels 8430 such as, for example, using shelf sections at one Level 8430 and using file cabinets at another Level 8430. In some embodiments, DBMS Instruction Portions 8420 may themselves be generated as Interactive Objects 295 by Site Generator 110 and used instead of or in addition to shelf section or other Interactive Objects 295.

Figure 40:
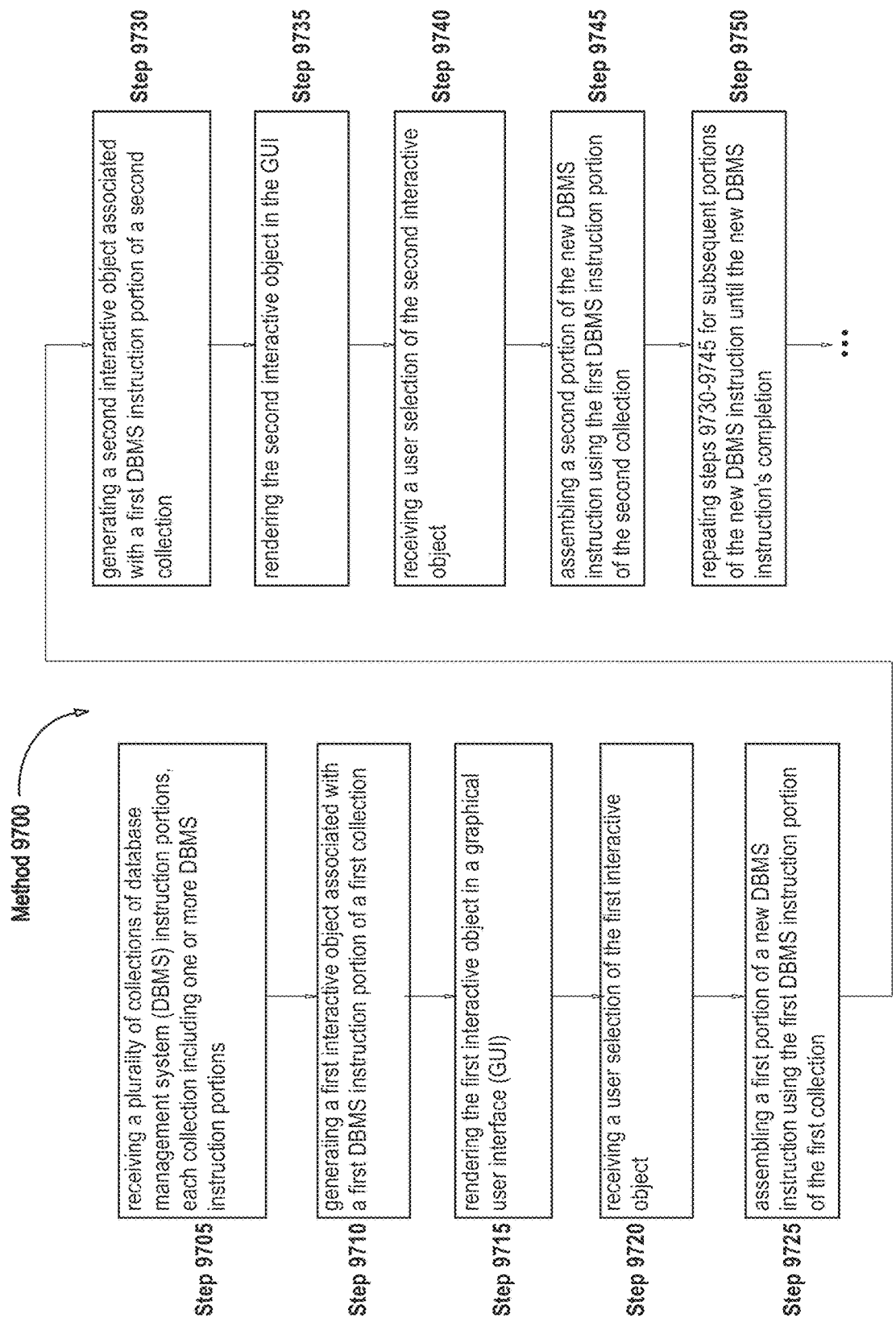
FIG. 40 shows an embodiment of a method 9700 for associative construction of DBMS instructions.

Referring to FIG. 40, the illustration shows an embodiment of a method 9700 for associative construction of DBMS instructions. The method may therefore be used on one or more computing devices to enable a user to construct a DBMS instruction by interacting with objects from user's experience or with which user can relate. In some embodiments, the method may be used on one or more computing devices operating an interface that may enable a user to construct a DBMS instruction by interacting with objects from user's experience or with which user can relate. Method 9700 includes any steps, actions, or operations previously described in methods 9500 and 9600 as applicable.

At step 9705, a plurality of collections of database management system (DBMS) instruction portions are received, each collection including one or more DBMS instruction portions. Collections of DBMS instruction portions may be stored, maintained, and/or organized in various arrangements including one or more tables, databases, memory structures, data structures, storage structures, repositories, and/or other arrangements. Storing, maintaining, and/or organizing includes any action or operation by or for an Object Association Database 8310 and/or any of its elements. In some embodiments, collections of DBMS instruction portions may be ordered or correspond to levels or positions in a DBMS instruction construction process. As such, collections of DBMS instruction portions may include a first collection, followed by a second collection, which may also be followed by a third collection, and so on, to complete the DBMS instruction. The first collection of DBMS instruction portions may include all possible or most likely first DBMS instruction portions where the user may select among the possibilities, the second collection of DBMS instruction portions may include all possible or most likely second DBMS instruction portions where the user may select among the possibilities, and so on. In some embodiments, collections of DBMS instruction portions may be pre-defined for all possible or most used operations on each of the elements or objects (i.e. tables, databases, reports/views, relations, user accounts, etc.) of a DBMS and the collections of DBMS instruction portions may change as the objects in the DBMS change. In other embodiments, collections of DBMS instruction portions may be created on-fly or as needed in anticipation of an upcoming DBMS instruction portion that the user may wish to enter. A DBMS instruction portion may be associated with an interactive object of a computer generated scene. A DBMS instruction includes a structured query language (SQL) statement, any DBMS command, any computer command, any function, or any instruction or instruction set used to access, manage, and/or manipulate data and/or other elements of a DBMS. DBMS instruction may be issued in SQL, a language utilized by many standard DBMSs, or in any programming language understood by a DBMS. A DBMS instruction may comprise a number of commands, keywords, instructions, operators, variables, values, objects, functions, and/or other components or portions for performing a particular operation on DBMS 120. Any interactive object may be associated with any DBMS instruction portion. Such association may be facilitated by an association table comprising a column for interactive objects or references thereto, and a column for the associated DBMS instruction portions or references thereto. For example, a first collection of DBMS instruction portions may be implemented in a data structure such as a table comprising a column for interactive objects or references thereto, and a column for the associated DBMS instruction portions or references thereto. Therefore, an association may be established between an interactive object and a DBMS instruction portion in the same row of the table. The new DBMS instruction may be used to perform an operation on a DBMS and/or any of its elements. In one example, the operation includes one or more of accessing, modifying, creating, or deleting a database. In another example, the operation includes one or more of accessing, modifying, creating, or deleting a table of a database. In a further example, the operation includes one or more of accessing, modifying, creating, deleting, searching, sorting, or rearranging of a row, column, or cell (i.e. also referred to as data, etc.) within a table. In yet another example, the operation includes one or more of accessing, modifying, creating, or deleting a report/view, relation, user account, and/or other elements or objects in a DBMS. The operation performed includes any disclosed or other DBMS operation.

At step 9710, a first interactive object associated with a first DBMS instruction portion of a first collection is generated. Any collection of DBMS instruction portions, such as the first collection, includes one or more DBMS instruction portions each of which may be associated with a corresponding interactive object, which interactive object may be generated. Therefore, a number of interactive objects may be generated resulting from the first collection of DBMS instruction portions. In some embodiments, an interactive object may be generated by utilizing interactive object definitions (i.e. Interactive Object Definitions 220, etc.), which may store information about how to generate the interactive object. The information includes shape, color, transparency, size, and/or other information. The information may further include any data, metadata, attributes, parameters, fields, features, and/or other information that may be used for generating the interactive object. Such information, when provided to a generator (i.e. Site Generator 110, etc.), game engine, simulation engine, CAD/CAM engine, graphics engine, or other such system, may enable generation of computer or mathematical representations of an interactive object. Interactive object definitions includes definitions of a three (3D) or two (2D) dimensional interactive object that may generally be implemented using 3D or 2D graphics, voxel graphics, vector graphics, raster graphics (i.e. bitmaps, etc.), and/or other techniques. 3D or 2D graphics, voxel graphics, vector graphics, raster graphics (i.e. bitmaps, etc.), and/or other graphic techniques may be combined with each other or with other graphic techniques. A 3D interactive object, for example, may be created or generated by using a 3D modeling tool, by converting or vectorizing a bitmap image into 3D or vector graphics, by using a programming language's graphic capabilities, by specialized programs, APIs, or other similar tools, and/or by other techniques. Computer or mathematical representation of a 3D interactive object includes shell or boundary representation that may define the surface of the object through polygonal modeling, subdivision surfaces, curve modeling, digital sculpting, level sets, particle systems, and/or other techniques. Computer or mathematical representation of a 3D interactive object includes solid representation that may define the volume of an object in addition to its surface. Generating an interactive object includes creating or generating a scene (i.e. 3D or 2D scene, 3D or 2D space, 3D or 2D environment, 3D or 2D setting, 3D or 2D site, etc.) comprising interactive objects. In some embodiments, a 3D, graphics, simulation, game, or other such engine or tool to may be utilized to implement generation of a scene and/or interactive objects. Such engines or tools typically provide high-level functionalities such as a physics engine, collision detection and response, sound, animation, event detection and handlers, networking, memory management, scene graph, rendering 3D or 2D graphics, scripting/programming capabilities and interfaces, and/or other functionalities. Scripting or programming functionalities may enable defining the mechanics, behavior, interactivity, and/or other properties of interactive objects in a scene at or prior to runtime. Generating interactive objects may include processing DBMS instruction portions stored in a collection (i.e. Association Table 8500, etc.) of DBMS instruction portions and generating the associated interactive object for each DBMS instruction portion. Any of the generated interactive objects may be resized, rotated, or otherwise transformed and positioned anywhere within a scene. Any of the generated interactive objects may also be animated or otherwise transformed over time. Generating includes any action or operation by or for a Site Generator 110, Site 200, and/or any of their elements. Step 9710 includes any action or operation described in step 9515 of method 9500 as applicable.

At step 9715, the first interactive object is rendered in a graphical user interface (GUI). A scene and/or interactive objects, when provided to a graphics rendering engine or other such system, may enable visual portrayal of the scene and/or interactive objects. For example, a 3D interactive object that exists as a computer or mathematical representation in a computing device may be displayed visually through rendering or other similar process for showing computer generated objects. A computer generated scene and/or interactive objects may be rendered or shown on a display or other visual portrayal device. In some embodiments, labels, signs, arrows, or other such signs or indicia may be provided or shown for each interactive object to indicate an association with a DBMS instruction portion for user's consideration. Rendering includes any action or operation by or for User Interaction Unit 115 and/or any of its elements.

At step 9720, a user selection of the first interactive object is received. A user may select or otherwise interact (i.e. click, drag, move, slide, tap, swipe, and/or perform other interactions, etc.) with an interactive object by using an input device such as human-machine interface, keyboard, mouse, touchscreen, and/or other input device. Selection of an interactive object may be received by an interface for AMD Unit, by GUI, or by other interface or system. Selection of an interactive object may be received by any element of AMD Unit or the overall disclosed system. DBMS instruction portion associated with the selected interactive object may identify or indicate one or more commands, keywords, instructions, operators, variables, values, objects, functions, and/or other components or portions of a new DBMS instruction to be assembled. Receiving includes any action or operation by or for User Interaction Unit 115 and/or any of its elements.

At step 9725, a first portion of a new DBMS instruction is assembled using the first DBMS instruction portion of the first collection. In some embodiments, assembling includes storing a DBMS instruction portion associated with a selected interactive object in a data structure such as a table, array, list, etc. comprising known DBMS instruction portions of the new DBMS instruction. Assembling may also include storing a DBMS instruction portion at an appropriate level or position in the new DBMS instruction. In other embodiments, assembling includes appending a DBMS instruction portion associated with a selected interactive object to a string of characters comprising known DBMS instruction portions of the new DBMS instruction. Assembling includes any action or operation by or for an Associative Control Unit 8300, DBMS Instruction Assembler 8340, and/or any of their elements.

At step 9730, a second interactive object associated with a first DBMS instruction portion of a second collection is generated. Step 9730 includes any action or operation described in Step 9710 as applicable.

At step 9735, the second interactive object is rendered in the GUI. Step 9735 includes any action or operation described in Step 9715 as applicable.

At step 9740, a user selection of the second interactive object is received. Step 9740 includes any action or operation described in Step 9720 as applicable.

At step 9745, a second portion of the new DBMS instruction is assembled using the first DBMS instruction portion of the second collection. Step 9745 includes any action or operation described in Step 9725 as applicable.

At step 9750, steps 9730-9745 are repeated for subsequent portions of the new DBMS instruction until the new DBMS instruction's completion. Steps 9730-9745 may be performed repeatedly for subsequent collections of DBMS instruction portions to assemble the new DBMS instruction one portion at a time. Once all the needed DBMS instruction portions are known or can be determined the new DBMS instruction may be complete.

Figure 41:
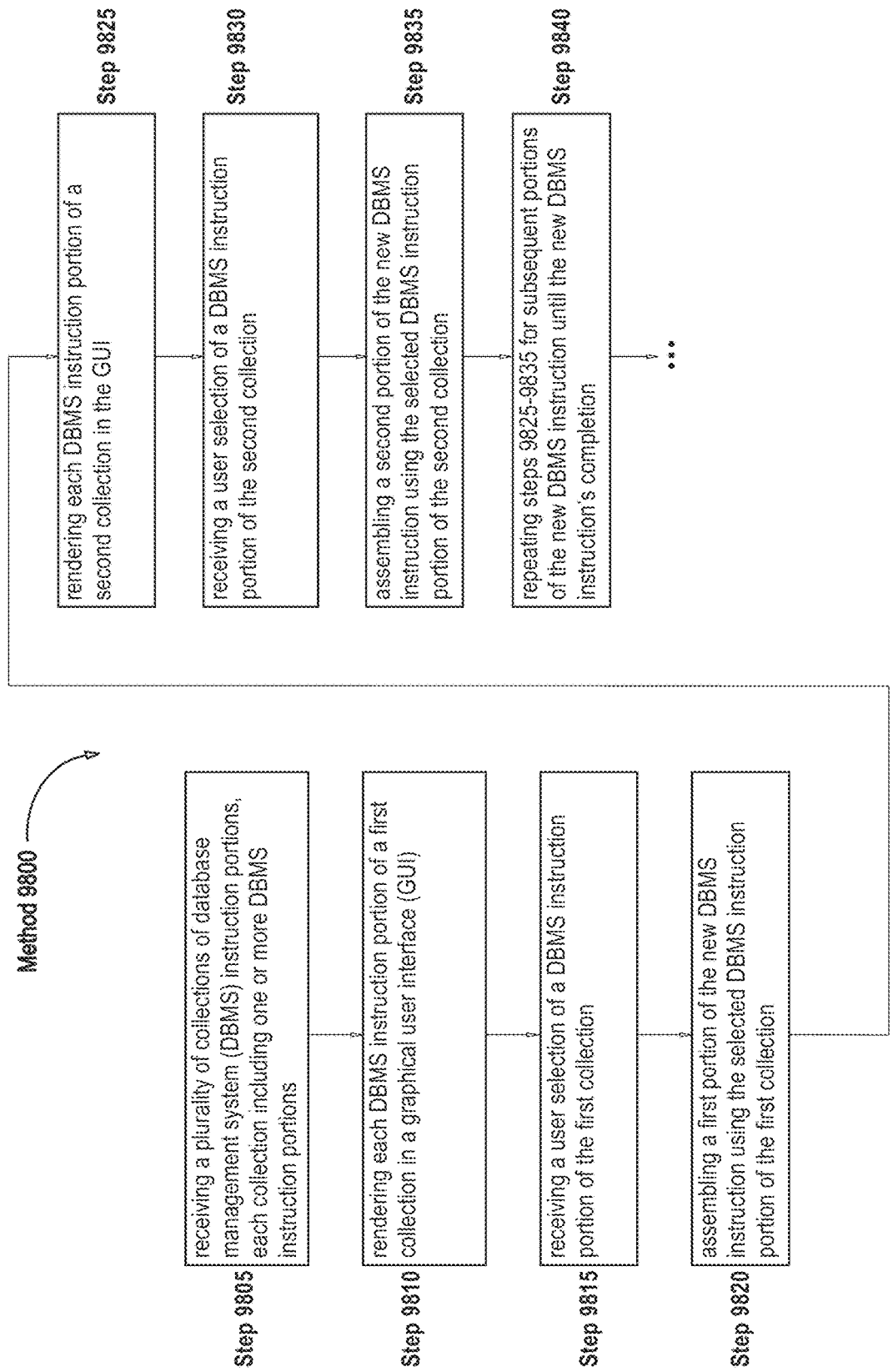
FIG. 41 shows an embodiment of a method 9800 for construction of DBMS instructions.

Referring to FIG. 41, the illustration shows an embodiment of a method 9800 for construction of DBMS instructions. The method may therefore be used on one or more computing devices to enable a user to construct a DBMS instruction by interacting with DBMS instruction portions. In some embodiments, the method may be used on one or more computing devices operating an interface that may enable a user to construct a DBMS instruction by interacting with DBMS instruction portions. Method 9800 includes any steps, actions, or operations previously described in methods 9500, 9600, and 9700 as applicable.

At step 9805, a plurality of collections of database management system (DBMS) instruction portions are received, each collection including one or more DBMS instruction portions. At step 9810, each DBMS instruction portion of a first collection is rendered in a graphical user interface (GUI). At step 9815, a user selection of a DBMS instruction portion of the first collection is received. At step 9820, a first portion of the new DBMS instruction is assembled using the selected DBMS instruction portion of the first collection. At step 9825, each DBMS instruction portion of a second collection is rendered in the GUI. At step 9830, a user selection of a DBMS instruction portion of the second collection is received. At step 9835, a second portion of the new DBMS instruction is assembled using the selected DBMS instruction portion of the second collection. At step 9840, steps 9825-9835 are repeated for subsequent portions of the new DBMS instruction until the new DBMS instruction's completion.

It must be noted that as used herein and in the appended claims, the singular forms "a", "an", and "the" include plural referents unless the context clearly dictates otherwise.

A number of embodiments have been described herein. While this disclosure contains many specific implementation details, these should not be construed as limitations on the scope of any inventions or of what may be claimed, but rather as descriptions of features specific to particular embodiments. It will be understood that various modifications may be made without departing from the spirit and scope of the invention. The logic flows depicted in the figures do not require the particular order shown, or sequential order, to achieve desirable results. In addition, other or additional steps, elements, or connections may be provided, or some of the steps, elements, or connections may be eliminated, and/or other components may be added to, or removed from, the described methods, systems, and techniques. Further, the various aspects of the disclosed methods, systems, and techniques can be combined in whole or in part with each other to produce additional implementations. Moreover, the separation of various components in the embodiments described herein should not be understood as requiring such separation in all embodiments, and it should be understood that the described components may generally be integrated together in a single software product or packaged into multiple software products. Accordingly, other embodiments are within the scope of the following claims.

The invention claimed is:

1. A system comprising:
one or more processors;
a database management system (DBMS) that includes a first DBMS element;
a memory that stores a first object association schema including a reference to the first DBMS element associated with a reference to a first interactive object, wherein the memory further stores a second object association schema including the reference to the first DBMS element associated with a reference to a second interactive object, and wherein the first object association schema and the second object association schema are selectable so that a different interactive object is generated for the first DBMS element based on a selection of: the first object association schema, or the second object association schema,
and wherein the one or more processors are configured to:
select the first object association schema, or receive a selection of the first object association schema;
generate a user controllable avatar;
generate, based on the first object association schema, the first interactive object;
cause at least a portion of the user controllable avatar and at least a portion of the first interactive object to be displayed;
receive a user's input causing the user controllable avatar to perform an interaction with the first interactive object; and
cause an operation on the first DBMS element in response to the interaction.

2. The system of claim 1, where the DBMS includes a second DBMS element, and wherein the first object association schema includes a reference to the second DBMS element associated with a reference to a third interactive object.

3. The system of claim 2, wherein the one or more processors are further configured to:
generate, based on the first object association schema, the third interactive object;
cause at least a portion of the third interactive object to be displayed;
receive a user's input causing the user controllable avatar to perform an interaction with the third interactive object; and
in response to the user controllable avatar's interaction with the third interactive object, cause an operation on at least one of: the first DBMS element, or the second DBMS element.

4. The system of claim 1, wherein the memory further stores a first interaction association schema including a reference to the interaction associated with: an instruction for performing the operation on the first DBMS element, or a reference to an instruction for performing the operation on the first DBMS element, and wherein the first interaction association schema is included in or associated with at least one of: the first interactive object, the reference to the first interactive object, or the first object association schema, and wherein the memory further stores a second interaction association schema including a reference to an interaction with the second interactive object associated with: an instruction for performing another operation on the first DBMS element, or a reference to an instruction for performing another operation on the first DBMS element, and wherein the second interaction association schema is included in or associated with at least one of: a generated second interactive object, the reference to the second interactive object, or the second object association schema, and wherein the cause the operation on the first DBMS element includes executing, based on the first interaction association schema, the instruction for performing the operation on the first DBMS element.

5. The system of claim 1, wherein the generate, based on the first object association schema, the first interactive object includes looking up, in the first object association schema, the reference to the first interactive object by the reference to the first DBMS element.

6. The system of claim 1, wherein the memory further stores a first interaction association schema including a reference to the interaction associated with: an instruction for performing the operation on the first DBMS element, or a reference to an instruction for performing the operation on the first DBMS element, and wherein the memory further stores a second interaction association schema including a reference to the interaction associated with: an instruction for performing another operation on the first DBMS element, or a reference to an instruction for performing another operation on the first DBMS element, and wherein the one or more processors are further configured to:
select the first interaction association schema, or receive a selection of the first interaction association schema, and wherein the cause the operation on the first DBMS element includes executing, based on the first interaction association schema, the instruction for performing the operation on the first DBMS element.

7. The system of claim 1, wherein the user controllable avatar is controlled by the user, and wherein the interactive object is at least a portion of another user controllable avatar, and wherein the another user controllable avatar is controlled by another user.

8. The system of claim 1, wherein the first interactive object includes one or more bounding volumes.

9. The system of claim 1, wherein the operation on the first DBMS element includes: altering the first DBMS element, or editing the first DBMS element.

10. The system of claim 1, wherein the reference to the first DBMS element includes: an identifier of the first DBMS element, a type of the first DBMS element, or a data related to the first DBMS element, and wherein the reference to the first interactive object includes: an identifier of the first interactive object, a type of the first interactive object, an interactive object definition of the first interactive object, a reference to an interactive object definition of the first interactive object, a model of the first interactive object, a reference to a model of the first interactive object, a data for generating the first interactive object, a reference to a data for generating the first interactive object, or a data related to the first interactive object, and wherein the reference to the second interactive object includes: an identifier of the second interactive object, a type of the second interactive object, an interactive object definition of the second interactive object, a reference to an interactive object definition of the second interactive object, a model of the second interactive object, a reference to a model of the second interactive object, a data for generating the second interactive object, a reference to a data for generating the second interactive object, or a data related to the second interactive object.

11. The system of claim 1, wherein the one or more processors select the first object association schema, and wherein the selecting the first object association schema includes inferring the first object association schema from at least one of: an email, a social media record, a file, a repository, the DBMS, or a portion of the DBMS.

12. The system of claim 1, wherein the system further comprising: an application that uses the DBMS, and wherein the first interactive object is a portion of the application, and wherein the user controllable avatar is: a portion of the application, an element that uses the application, an element that interacts with the application, or an element related to the application.

13. The system of claim 1, wherein the generate, based on the first object association schema, the first interactive object includes generating, based on the first object association schema, an instance of the first interactive object.

14. The system of claim 1, wherein the user controllable avatar's interaction with the first interactive object includes at least one of: the user controllable avatar shooting at the first interactive object, the user controllable avatar striking the first interactive object, the user controllable avatar colliding with the first interactive object, or an object related to the user controllable avatar colliding with the first interactive object.

15. The system of claim 1, wherein the DBMS includes a data structure, and wherein the first DBMS element includes: one element of the data structure, or a plurality of related elements of the data structure.

16. The system of claim 1, wherein at least some elements of the system are included in: a single device, or multiple devices, and wherein the one or more processors include: one or more microcontrollers, one or more computing devices, or one or more electronic devices, and wherein the user controllable avatar includes: a three dimensional user controllable avatar, a two dimensional user controllable avatar, a cursor, or an object controlled by a user, and wherein the first interactive object includes: a three dimensional interactive object, a two dimensional interactive object, or an object with which interactions can be performed, and wherein the second interactive object includes: a three dimensional interactive object, a two dimensional interactive object, or an object with which interactions can be performed, and wherein the first object association schema includes a data structure for storing, structuring, or organizing the reference to the first DBMS element associated with the reference to the first interactive object, and wherein the second object association schema includes a data structure for storing, structuring, or organizing the reference to the first DBMS element associated with the reference to the second interactive object, and wherein the DBMS includes: a relational DBMS, a non-relational DBMS, a data structure, or an element that at least stores a data, and wherein the operation on the first DBMS element includes: storing the first DBMS element, accessing the first DBMS element, creating the first DBMS element, altering or editing the first DBMS element, deleting the first DBMS element, searching the first DBMS element, sorting the first DBMS element, rearranging the first DBMS element, manipulating the first DBMS element, or operating on the first DBMS element.

17. The system of claim 1, wherein the one or more processors are further configured to:
alter at least a portion of the first object association schema.

18. The system of claim 1, wherein the first DBMS element includes a first one or more related DBMS elements, and wherein the reference to the first DBMS element includes one or more references to the first one or more related DBMS elements, and wherein the first interactive object includes a first one or more related interactive objects, and wherein the reference to the first interactive object includes one or more references to the first one or more related interactive objects, and wherein the second interactive object includes a second one or more related interactive objects, and wherein the reference to the second interactive object includes one or more references to the second one or more related interactive objects.

19. A system comprising:
means for processing; and
means for storing machine readable code that, when executed by the means for processing, causes the means for processing to perform at least:
accessing a memory that stores a first object association schema including a reference to a first DBMS element associated with a reference to a first interactive object, wherein the memory further stores a second object association schema including the reference to the first DBMS element associated with a reference to a second interactive object, and wherein the first object association schema and the second object association schema are selectable so that a different interactive object is generated for the first DBMS element based on a selection of: the first object association schema, or the second object association schema;
selecting the first object association schema, or receiving a selection of the first object association schema;
generating a user controllable avatar;
generating, based on the first object association schema, the first interactive object;
causing at least a portion of the user controllable avatar and at least a portion of the first interactive object to be displayed;
receiving a user's input causing the user controllable avatar to perform an interaction with the first interactive object; and
causing an operation on the first DBMS element in response to the interaction.

20. A method implemented using a computing system that includes one or more processors, the method comprising:
accessing a memory that stores a first object association schema including a reference to a first DBMS element associated with a reference to a first interactive object, wherein the memory further stores a second object association schema including the reference to the first DBMS element associated with a reference to a second interactive object, and wherein the first object association schema and the second object association schema are selectable so that a different interactive object is generated for the first DBMS element based on a selection of: the first object association schema, or the second object association schema;
selecting the first object association schema, or receiving a selection of the first object association schema;
generating a user controllable avatar;
generating, based on the first object association schema, the first interactive object;
causing at least a portion of the user controllable avatar and at least a portion of the first interactive object to be displayed;
receiving a user's input causing the user controllable avatar to perform an interaction with the first interactive object; and
causing an operation on the first DBMS element in response to the interaction.

\* \* \* \* \*